(12) United States Patent
Maeda et al.

(10) Patent No.: US 10,609,602 B2
(45) Date of Patent: Mar. 31, 2020

(54) MOBILE COMMUNICATION SYSTEM

(71) Applicant: Mitsubishi Electric Corporation, Chiyoda-ku (JP)

(72) Inventors: Miho Maeda, Tokyo (JP); Mitsuru Mochizuki, Tokyo (JP); Shinsuke Uga, Tokyo (JP); Noriyuki Fukui, Tokyo (JP); Yasushi Iwane, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/426,775

(22) Filed: Feb. 7, 2017

(65) Prior Publication Data

US 2017/0150404 A1   May 25, 2017

Related U.S. Application Data

(63) Continuation of application No. 14/355,989, filed as application No. PCT/JP2012/078479 on Nov. 2, 2012, now Pat. No. 9,603,060.

(30) Foreign Application Priority Data

Nov. 4, 2011   (JP) ................. 2011-241919

(51) Int. Cl.
  *H04W 36/00*   (2009.01)
  *H04W 88/04*   (2009.01)
  *H04W 76/10*   (2018.01)
  *H04W 84/00*   (2009.01)
  *H04W 36/32*   (2009.01)
  (Continued)

(52) U.S. Cl.
  CPC .... *H04W 36/0016* (2013.01); *H04W 36/0011* (2013.01); *H04W 36/0083* (2013.01);
  (Continued)

(58) Field of Classification Search
  CPC ............... H04W 36/00; H04W 36/005; H04W 36/0011; H04W 36/0022; H04W 36/0033;
  (Continued)

(56) References Cited

U.S. PATENT DOCUMENTS 7,069,007 B2   6/2006  Masuda et al.
8,576,900 B2   11/2013 Kim et al.
(Continued)

FOREIGN PATENT DOCUMENTS

CA   2 793 175 A1   9/2011
CN   101090557 A   12/2007
(Continued)

OTHER PUBLICATIONS

International Search Report dated Dec. 4, 2012, in PCT/JP2012/078479, filed Nov. 2, 2012.
(Continued)

*Primary Examiner* — Ashley Shivers
(74) *Attorney, Agent, or Firm* — Oblon, McClelland, Maier & Neustadt, L.L.P.

(57) ABSTRACT

A mobile communication system includes a movable user equipment device, a plurality of base station devices configured to perform radio communication with the user equipment device, and a relay device movably configured to relay radio communications between the user equipment device and the base station devices. In a handover process of switching a base station device to be connected with the relay device from a base station device being a moving source to a base station device being a moving destination along with moving of the relay device, the base station device being a moving source selects the base station device being a moving destination from base station devices other than a base station device that does not have a function supporting the relay device, and performs the handover process such that the relay device is connected to the selected base station device.

4 Claims, 72 Drawing Sheets

(51) Int. Cl.
  *H04W 36/06*   (2009.01)
  *H04W 36/08*   (2009.01)
  *H04W 84/04*   (2009.01)
  *H04W 16/26*   (2009.01)
(52) U.S. Cl.
  CPC ........... *H04W 36/06* (2013.01); *H04W 36/32* (2013.01); *H04W 76/10* (2018.02); *H04W 84/005* (2013.01); *H04W 16/26* (2013.01); *H04W 36/08* (2013.01); *H04W 84/047* (2013.01); *H04W 88/04* (2013.01)
(58) Field of Classification Search
  CPC ......... H04W 36/0055; H04W 36/0066; H04W 88/04; H03W 36/0016
  See application file for complete search history.

(56) References Cited

U.S. PATENT DOCUMENTS

| | | | |
|---|---|---|---|
| 8,665,761 | B2 | 3/2014 | Seo et al. |
| 8,681,686 | B2 | 3/2014 | Saito et al. |
| 2011/0194482 | A1 | 8/2011 | Ji et al. |
| 2011/0194483 | A1 | 8/2011 | Ji et al. |
| 2011/0201332 | A1* | 8/2011 | Siomina ............... G01S 5/10 455/434 |
| 2011/0249611 | A1 | 10/2011 | Khandekar |
| 2012/0039299 | A1 | 2/2012 | Teyeb |
| 2012/0250602 | A1 | 10/2012 | Ou |
| 2012/0252355 | A1 | 10/2012 | Huang |
| 2012/0314569 | A1* | 12/2012 | Liu ................. H04W 36/0094 370/230 |
| 2012/0315916 | A1 | 12/2012 | Van Phan et al. |
| 2013/0070663 | A1 | 3/2013 | Gunnarsson |
| 2013/0090123 | A1* | 4/2013 | Gunnarsson ....... H04B 7/15528 455/450 |
| 2013/0128803 | A1 | 5/2013 | Takahashi et al. |
| 2013/0183971 | A1* | 7/2013 | Tamaki ............ H04W 36/0061 455/436 |
| 2013/0229942 | A1* | 9/2013 | Kubota ................ H04W 36/22 370/252 |
| 2013/0250773 | A1 | 9/2013 | Ohta et al. |
| 2014/0029508 | A1 | 1/2014 | Kim et al. |
| 2014/0192781 | A1* | 7/2014 | Teyeb .................. H04W 36/34 370/331 |
| 2015/0237546 | A1* | 8/2015 | Lin ................... H04W 36/0083 455/436 |

FOREIGN PATENT DOCUMENTS

| | | |
|---|---|---|
| CN | 101110658 A | 1/2008 |
| CN | 101123463 A | 2/2008 |
| JP | 2001-189950 | 7/2001 |
| JP | 2004-363886 | 12/2004 |
| JP | 2009-534899 A | 9/2009 |
| JP | 2010-21906 A | 1/2010 |
| JP | 2011-29988 A | 2/2011 |
| JP | 2011-135439 A | 7/2011 |
| WO | 2010/093221 A2 | 8/2010 |
| WO | WO 2011/019973 A2 | 2/2011 |
| WO | WO 2011/066853 A1 | 6/2011 |
| WO | 2011/093095 A1 | 8/2011 |
| WO | 2011/111111 A1 | 9/2011 |
| WO | WO 2012/158094 A1 | 11/2012 |
| WO | WO 2013/023171 A1 | 2/2013 |
| WO | WO 2013/046447 A1 | 4/2013 |

OTHER PUBLICATIONS

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", 3GPP TS 36.300, V10.2.0, Release 10, 2010, 200 pages.

"3$^{rd}$ Generation Partnership Project; Technical Specification Group Radio Access Network; Evolved Universal Terrestrial Radio Access (E-UTRA); Radio Resource Control (RRC); Protocol Specification", 3GPP TS 36.331, V10.0.0, Release 10, 2010, 276 pages.

"3$^{rd}$ Generation Partnership Project; Technical Specification Group Radio Access Network; Evolved Universal Terrestrial Radio Access (E-UTRA); User Equipment (UE) procedures in idle mode", 3GPP TS 36.304, V10.0.0, Release 10, 2010, 33 pages.

"LS on HNB/HeNB Open Access Mode", 3GPP SA WG1, 3GPP TSG-SA1 #42, Release 9, S1-083461, Oct. 13-17, 2008, 2 pages.

"LS on CSG cell identification", RAN2, 3GPP TSG-RAN WG 2 Meeting #62, R2-082899, May 5-9, 2008, 2 pages.

"3$^{rd}$ Generation Partnership Project; Technical Specification Group Radio Access Network; Evolved Universal Terrestrial Radio Access (E-UTRA); Further advancements for E-UTRA physical layer aspects", 3GPP TR 36.814, V9.0.0, Release 9, 2010, 104 pages.

"3$^{rd}$ Generation Partnership Project; Technical Specification Group Radio Access Network; Feasibility study for Further Advancements for E-UTRA (LTE-Advanced)", 3GPP TR 36.912, V9.3.0, Release 9, 2010, 262 pages.

"3rd Generation Partnership Project; Technical Specification Group Radio Access Network; Evolved Universal Terrestrial Radio Access (E-UTRA); User Equipment (UE) radio transmission and reception", 3GPP TS 36.101, V10.0.0, Release 10, 2010, 188 pages.

"3rd Generation Partnership Project; Technical Specification Group Services and System Aspects; Architecture aspects of Home NodeB and Home eNodeB", 3GPP TR 23.830, V9.0.0, Release 9, 2009, 55 pages.

"3rd Generation Partnership Project; Technical Specification Group Services and System Aspects; General Packet Radio Service (GPRS) enhancements for Evolved Universal Terrestrial Radio Access Network (E-UTRAN) access", 3GPP TS 23.401, V10.3.0, Release 10, 2011, 278 pages.

"Application Scenarios for LTE-Advanced Relay", China Mobile, Vodafone, Huawei, TSG-RAN WG1 #54, R1-082975, Aug. 18-22, 2008, 7 pages.

"Requirements for supporting high speed train scenario in LTE", CMCC, 3GPP TSG-RAN WG3 #71, R3-110656, Feb. 21-25, 2011, 3 pages.

International Preliminary Report on Patentability and Written Opinion dated May 15, 2014 in PCT/JP2012/078479 with English Translation.

Extended European Search Report dated Jul. 14, 2015 in European Patent Application No. 12845947.6.

CATT: Selection of Donor Cell, 3GPP TSG RAN WG2 Meeting #69, R2-101098, 3$^{rd}$ Generation Partnership Project: (3GPP) Mobile Competence Centre; 650, XP050421429, vol. RAN WG2, No. San Francisco, Feb. 13, 2010, pp. 1-2.

CATT: Analysis on Mobile Relay Functionalities, 3GPP TSG RAN WG3#74, R3-1 12821, 3$^{rd}$ Generation Partnership Project: (3GPP) Mobile Competence Centre; 650, XP050566060, vol. RAN WG3, No. San Francisco, Nov. 4, 2011, pp. 1-4.

Office Action dated Dec. 20, 2016 in Japanese Patent Application No. 2013-541859 (with English language translation).

Combined Office Action and Search Report dated Jul. 4, 2017 in Chinese Patent Application No. 201260054083.1 (with English language translation).

European Office Action dated Feb. 13, 2018, issued in European Patent Application No. 12 845 947.6.

Japanese Office Action dated Jul. 3, 2018 in Japanese Patent Application No. 2017-165495 (with unedited computer generated English translation), 7 pages.

Extended European Search Report dated May 21, 2019 in Patent Application No. 19170129.1, 14 pages.

Japanese Office Action dated Sep. 10, 2019 in Patent Application No. 2018-206579 (with unedited computer generated English translation), 6 pages.

Office Action dated Nov. 11, 2019 in Indian Patent Application No. 3338/CHENP/2014, citing document AA therein, 7 pages.

* cited by examiner

F I G. 1
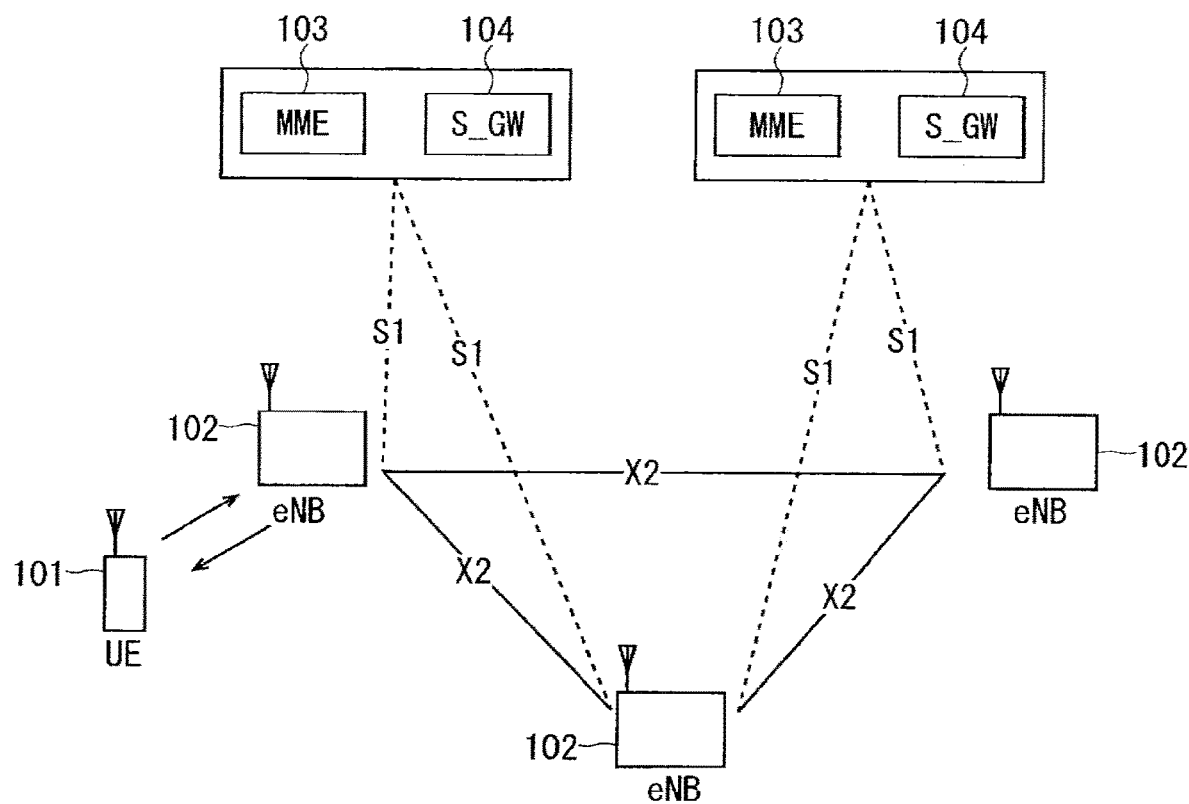

F I G . 2
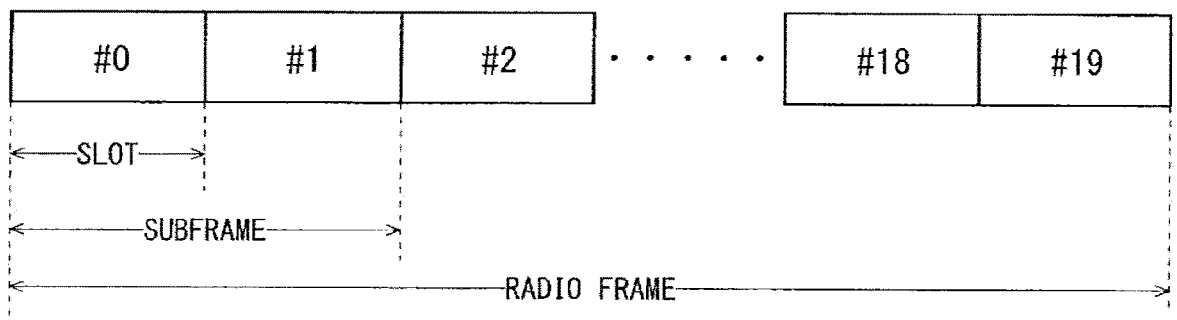

F I G. 4
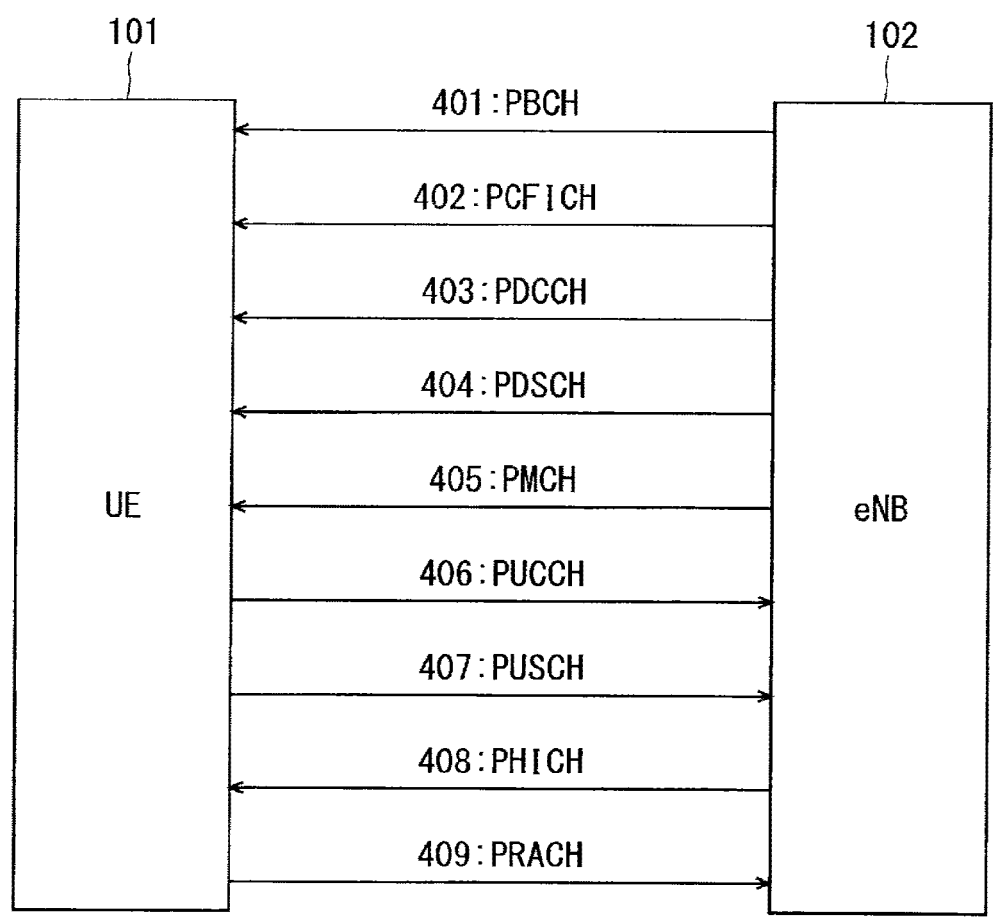

F I G. 5
(A)
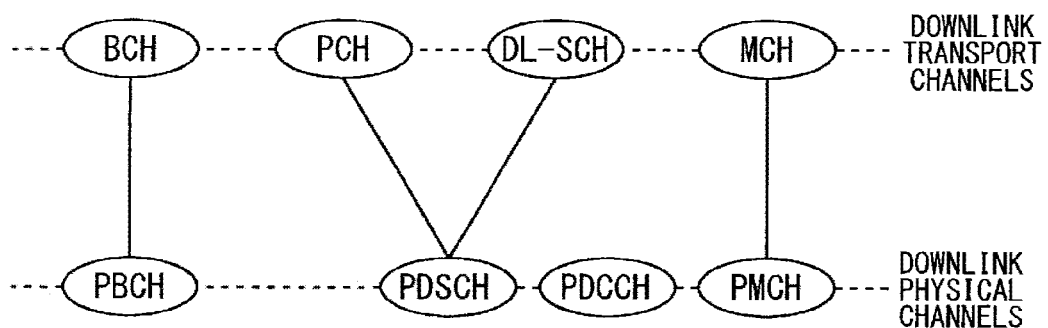
(B)
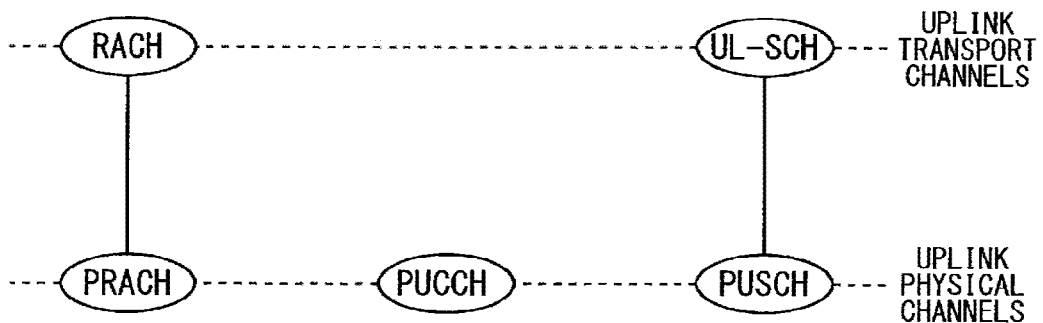

F I G. 6
(A)
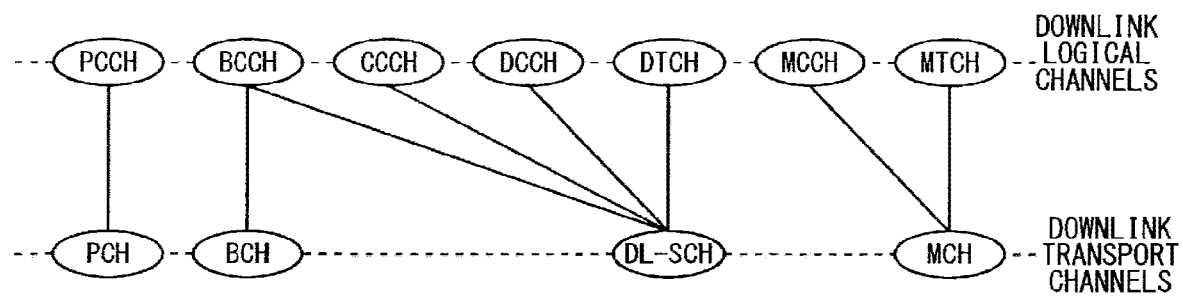
(B)
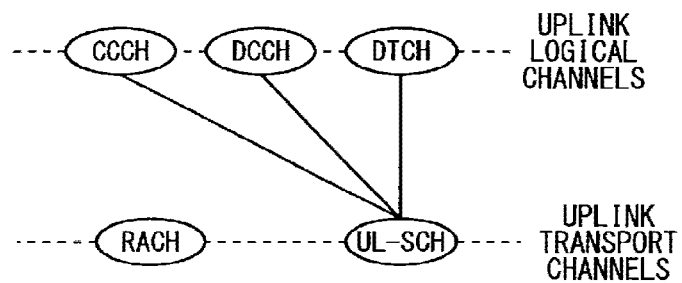

F I G . 1 1
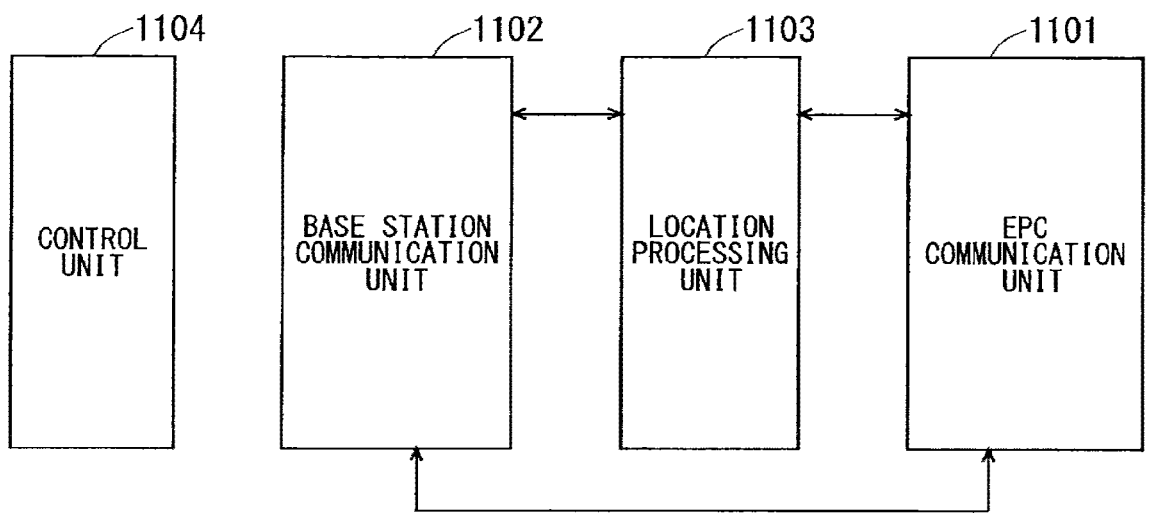

F I G. 1 2
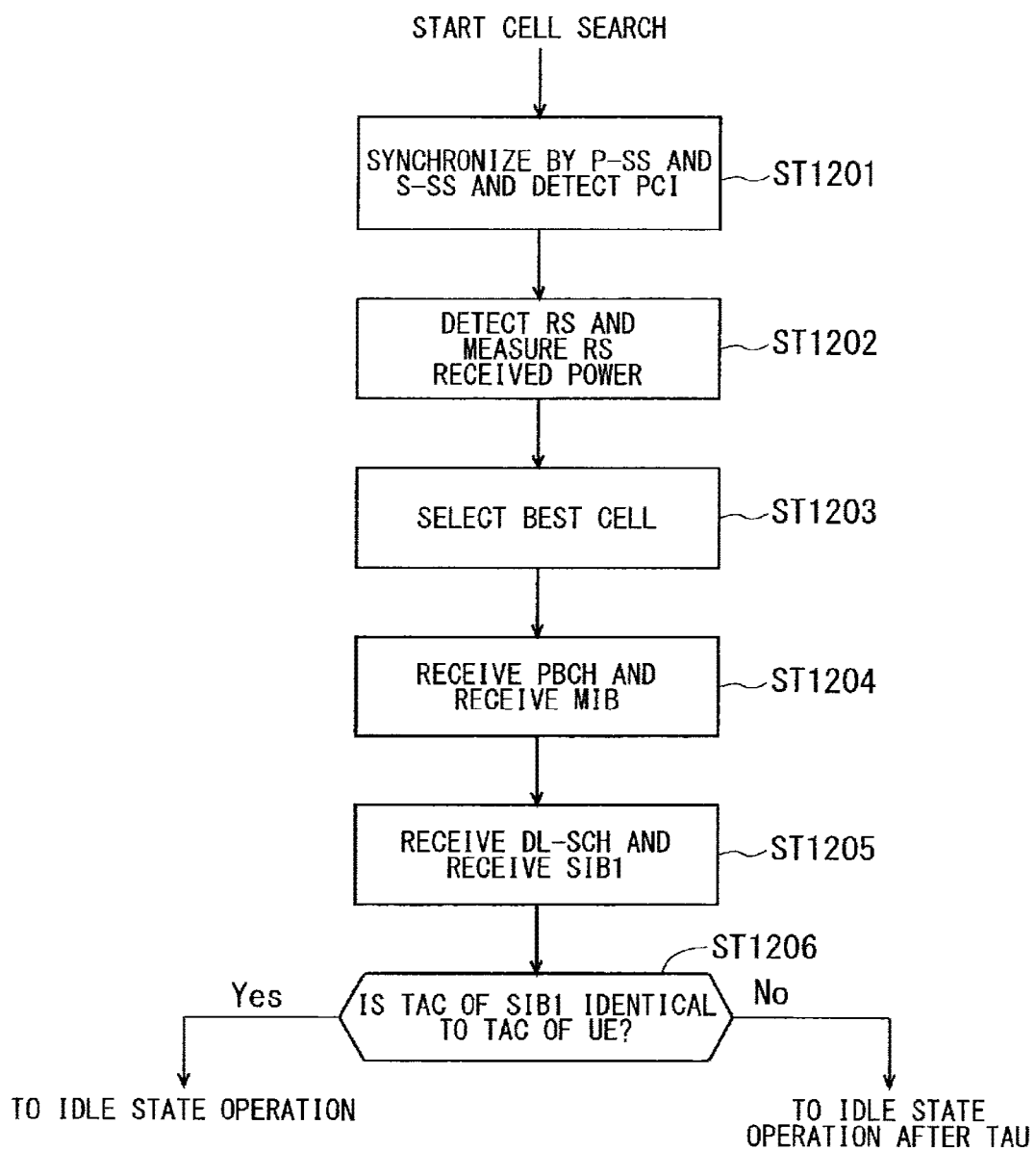

F I G. 1 3
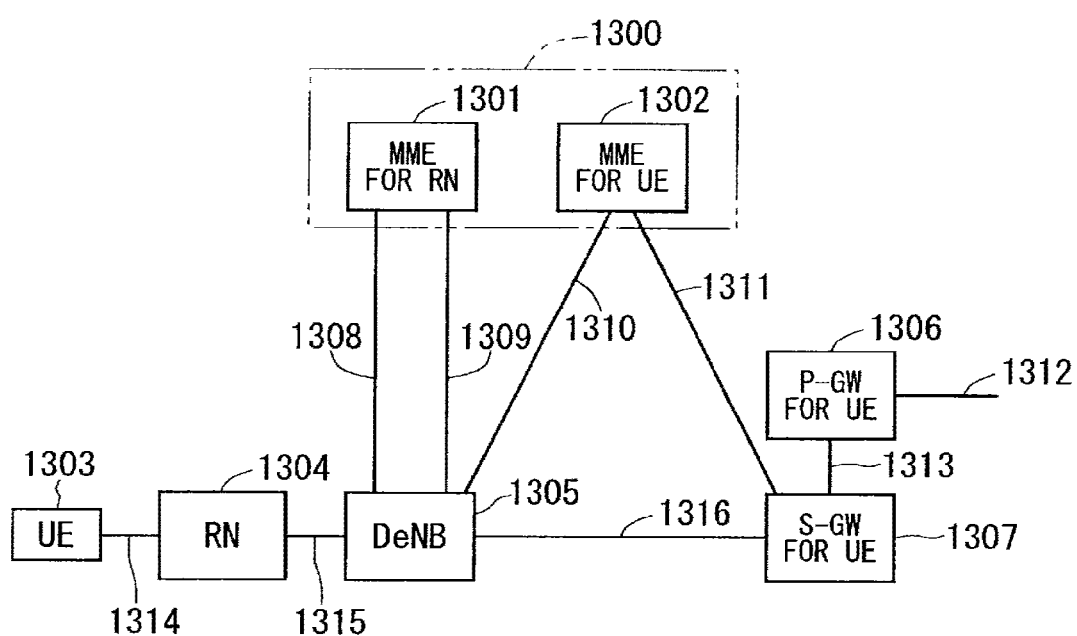

F I G . 1 8
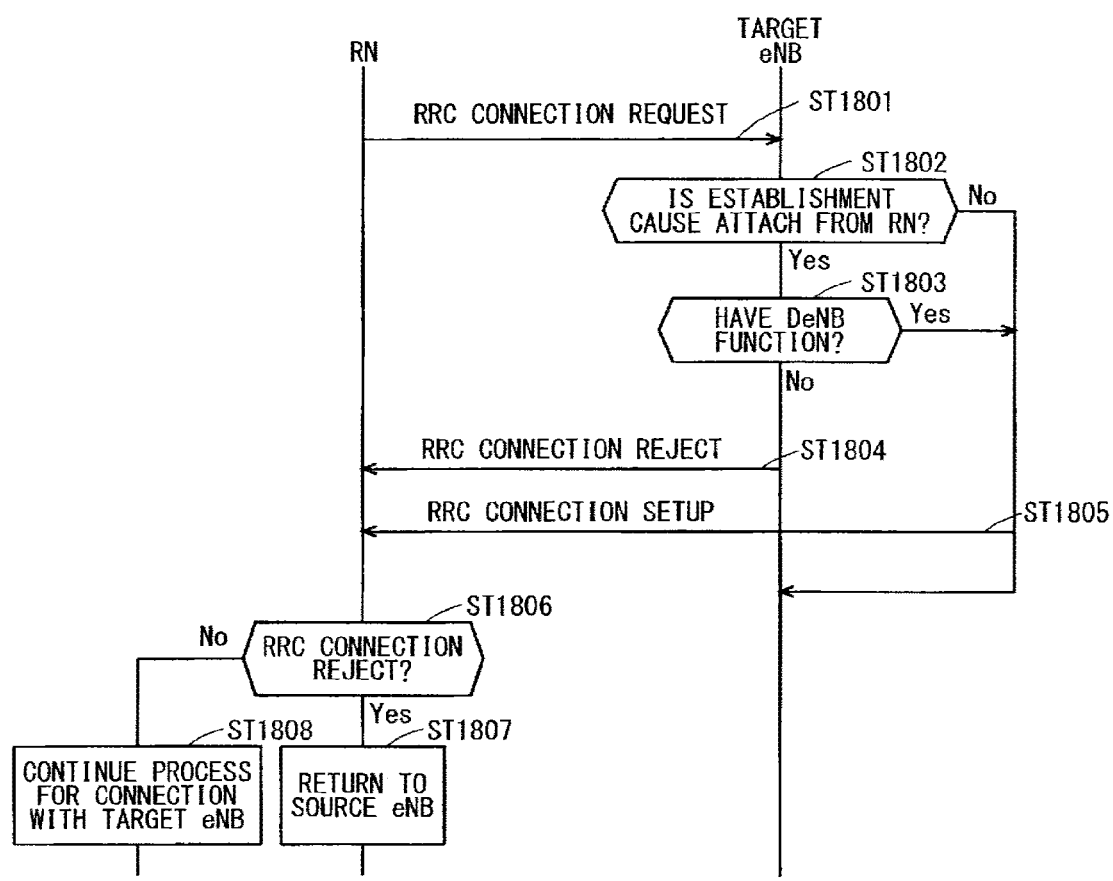

F I G . 1 9
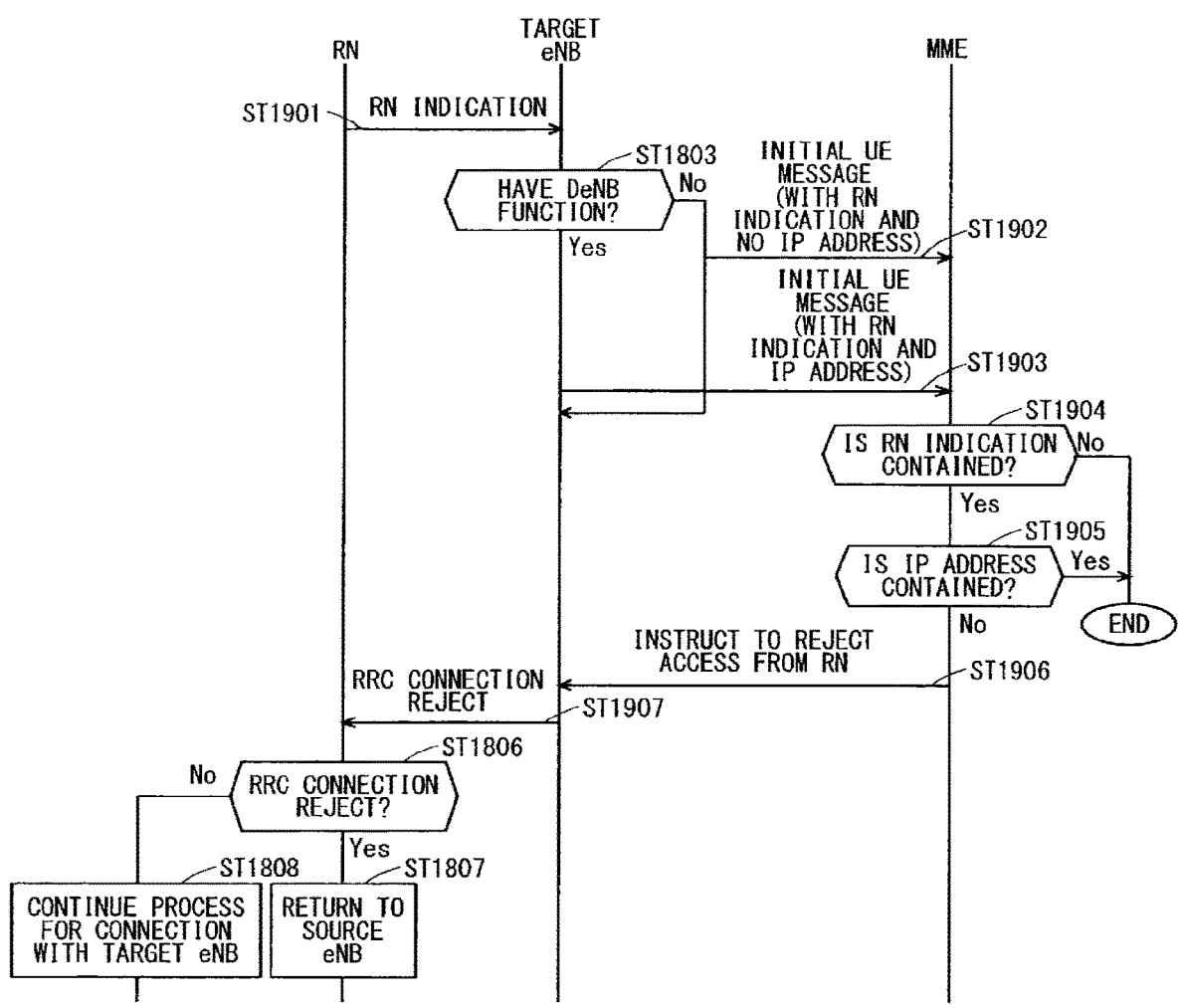

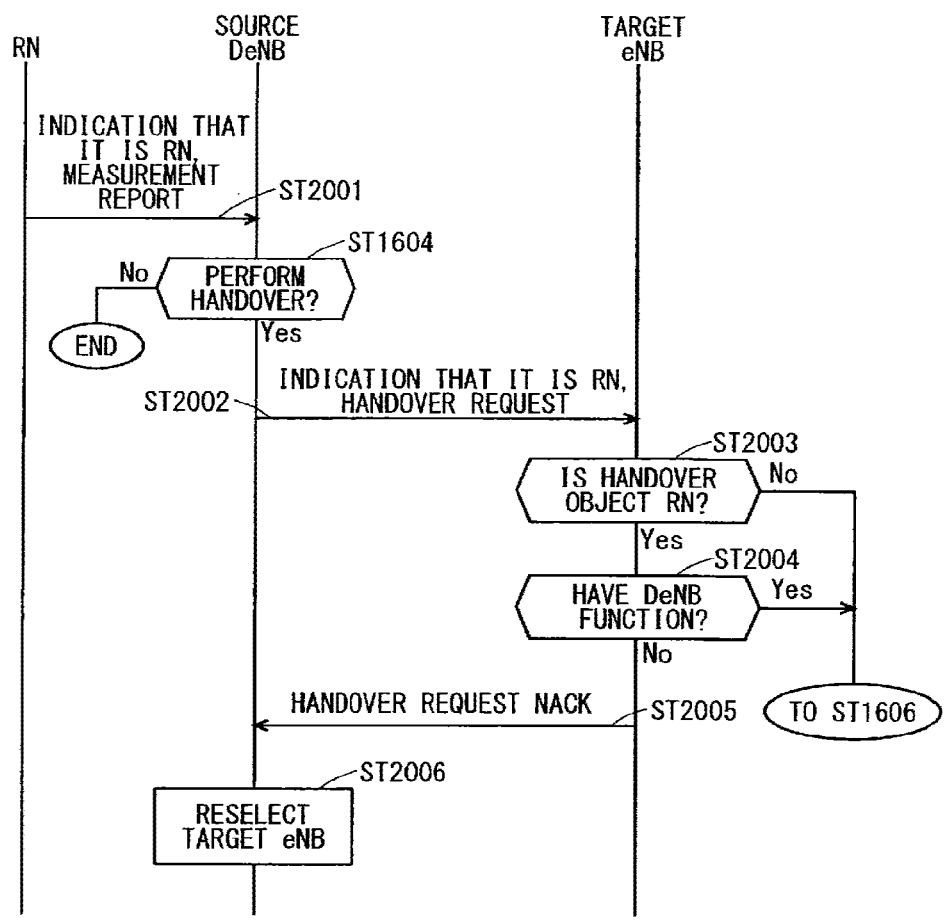
F I G . 2 0

F I G. 2 4
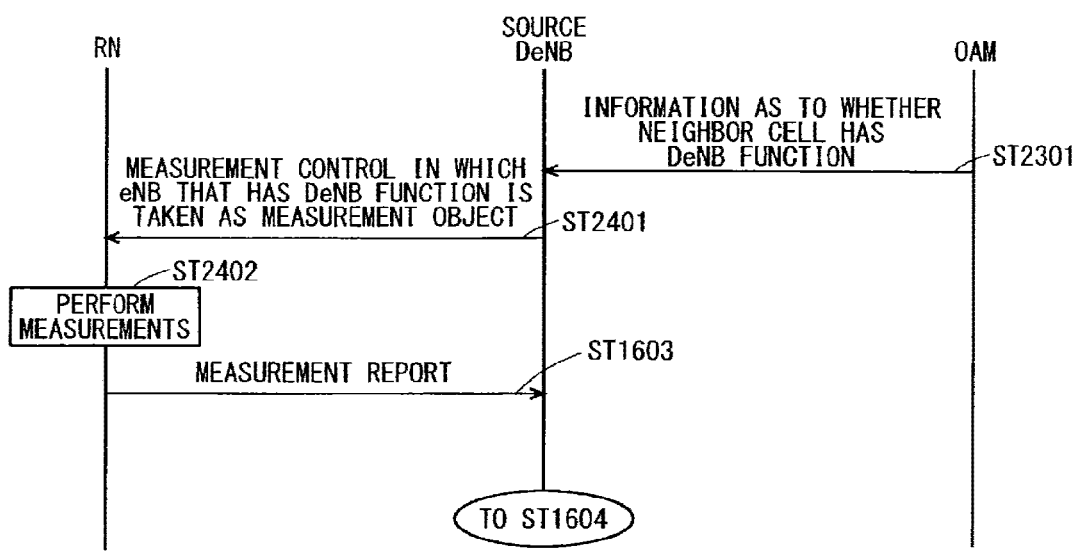

F I G. 2 8
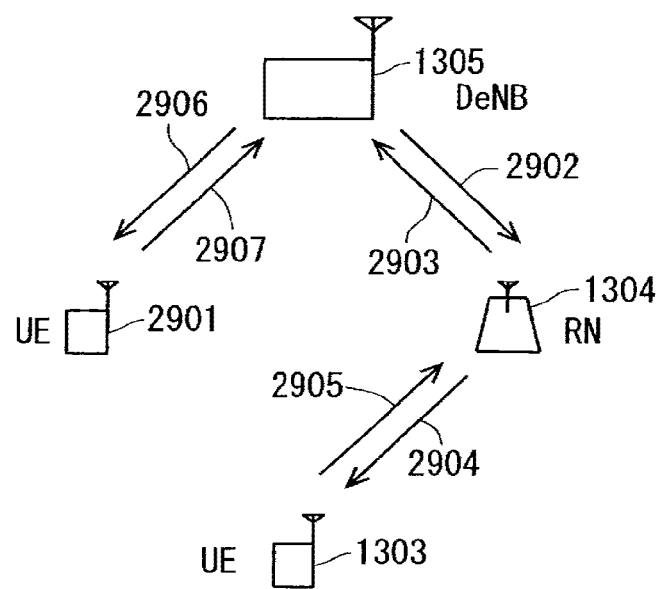

F I G. 3 3
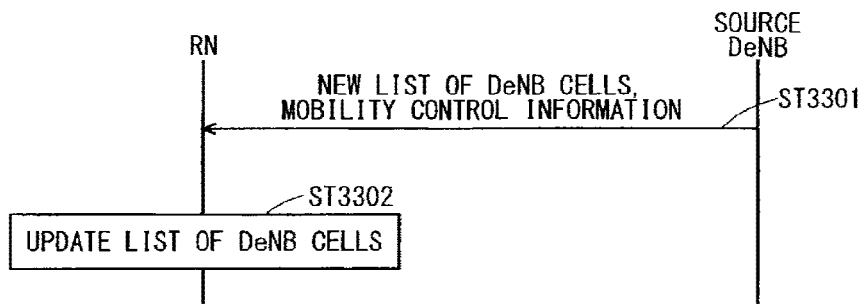
F I G. 3 4
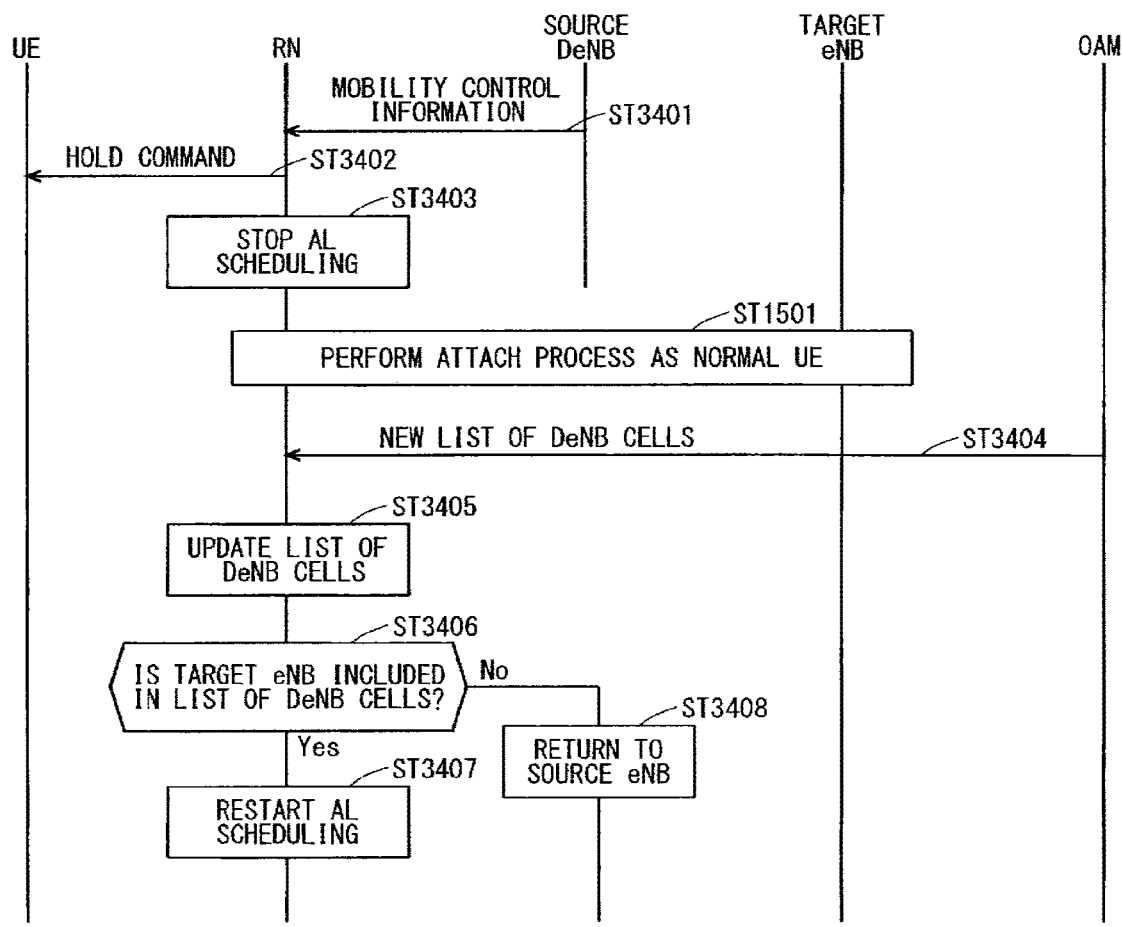

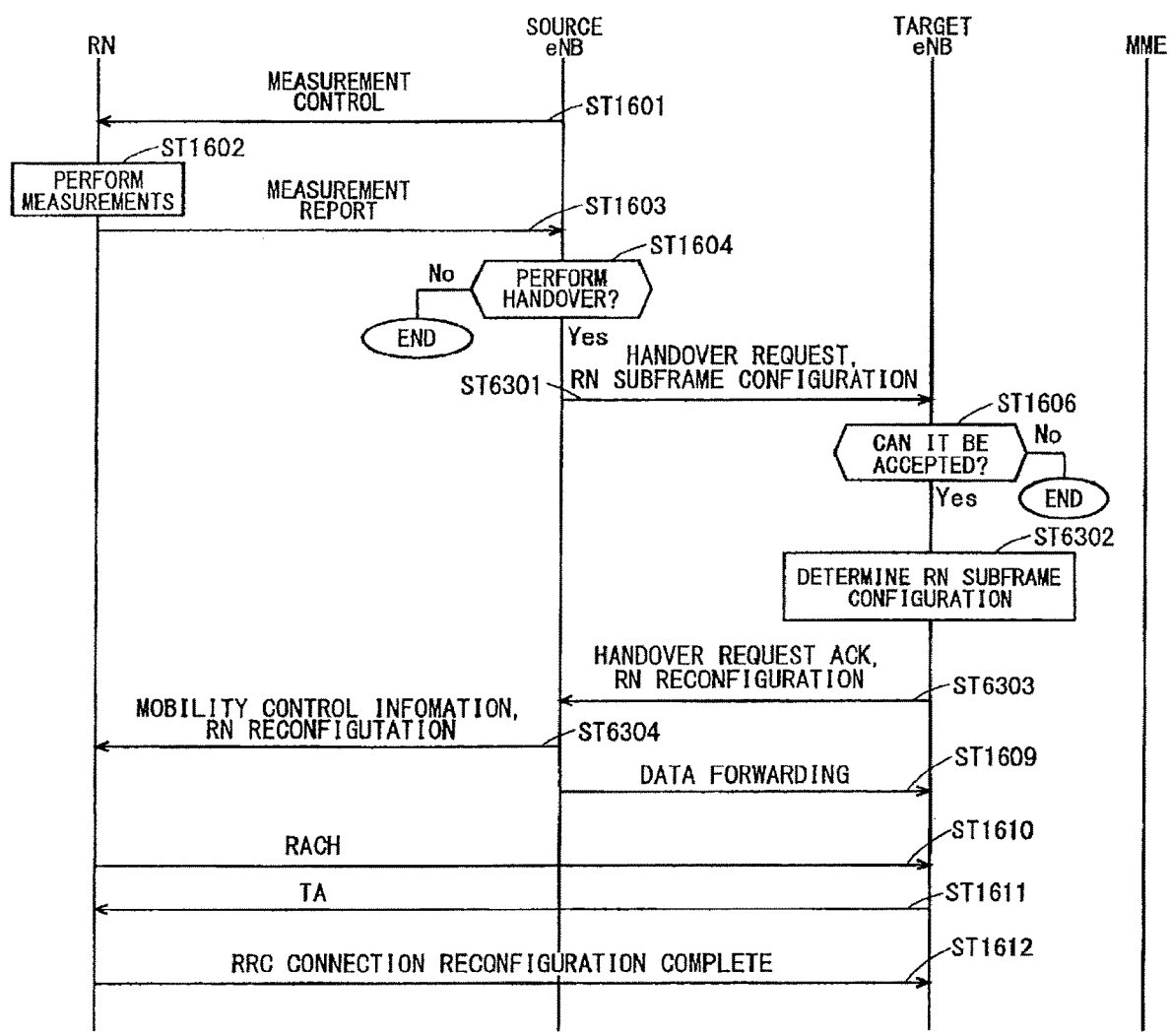
F I G . 4 4

F I G. 4 6
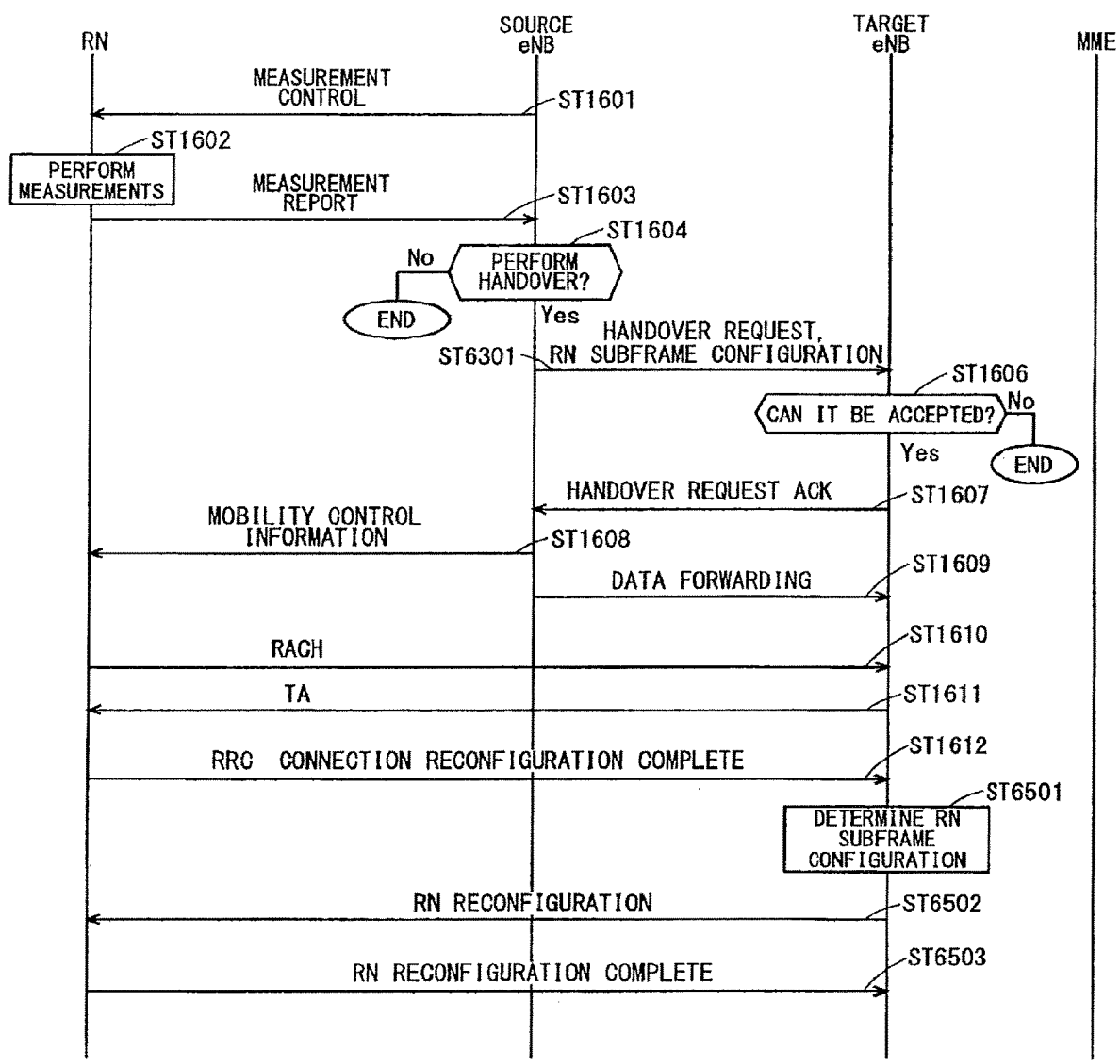

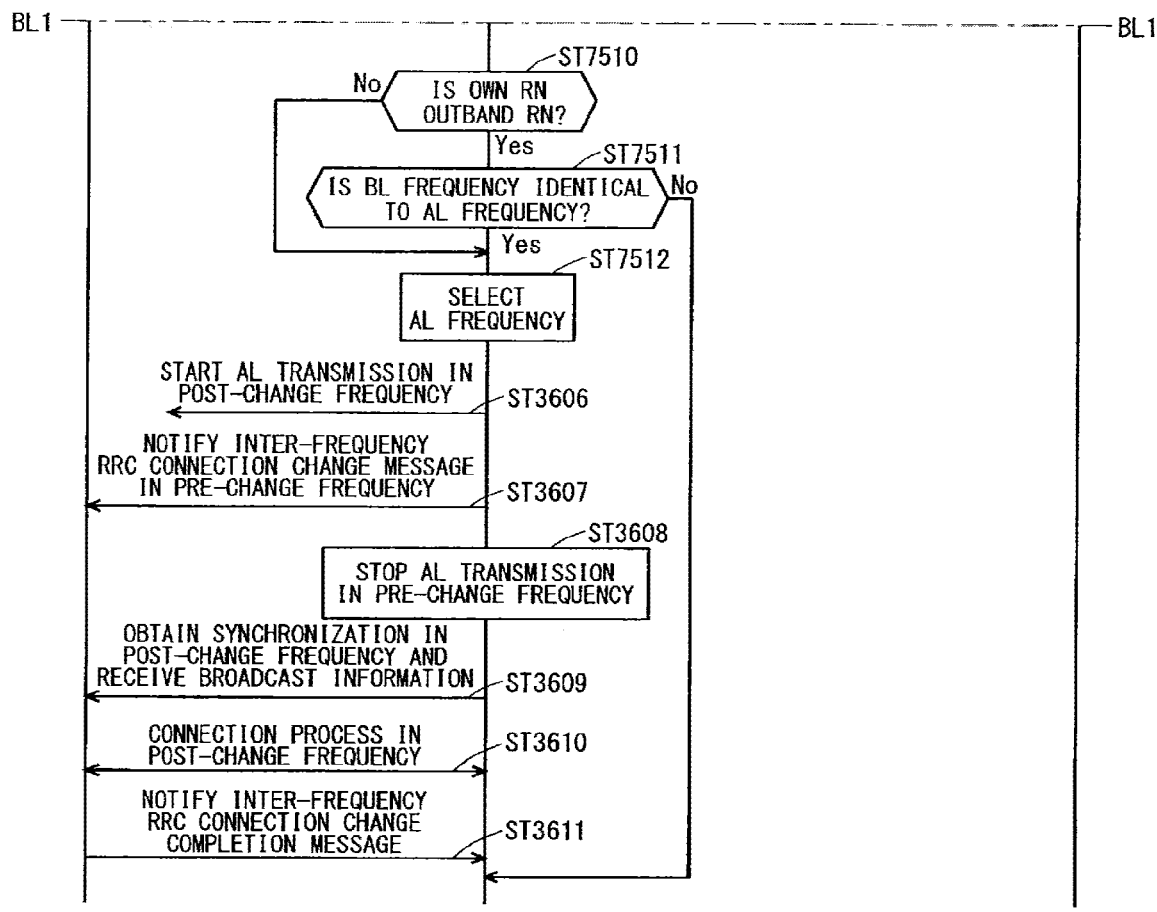
F I G. 5 8

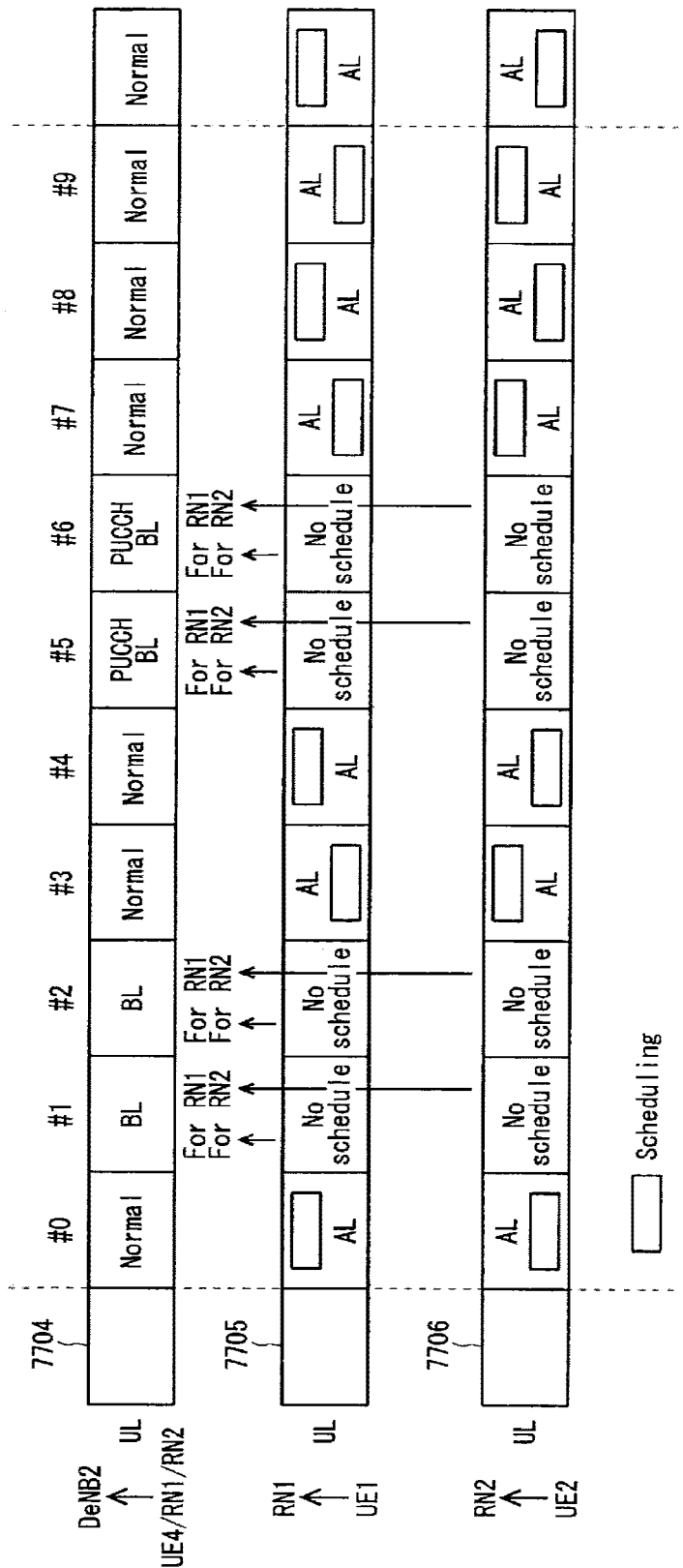

F I G. 6 3
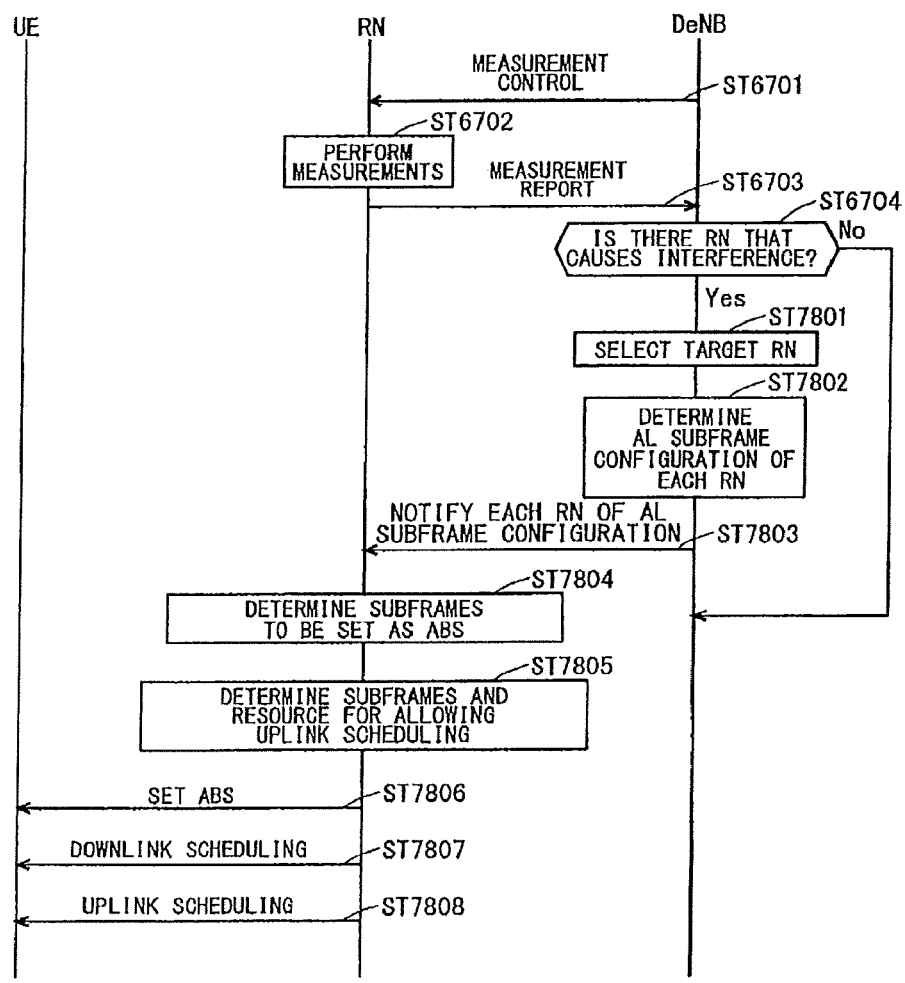

F I G. 6 6
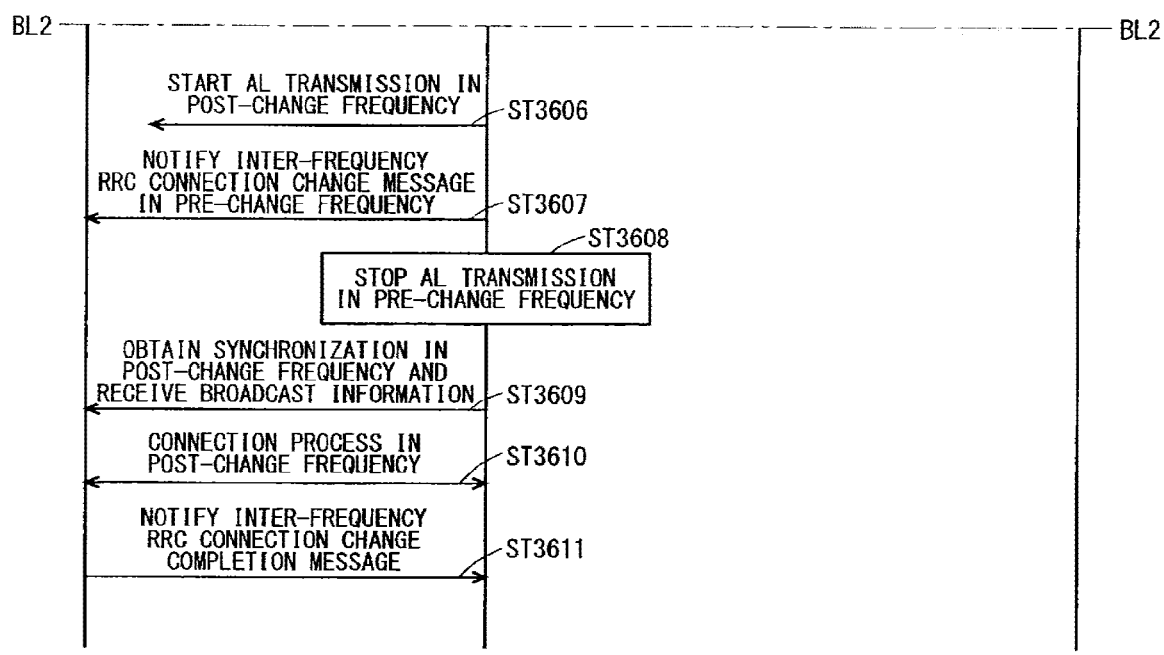

FIG. 67
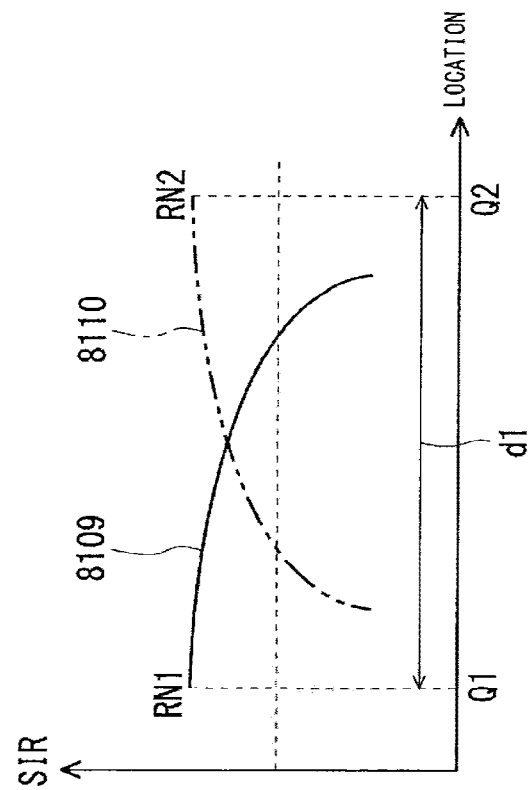
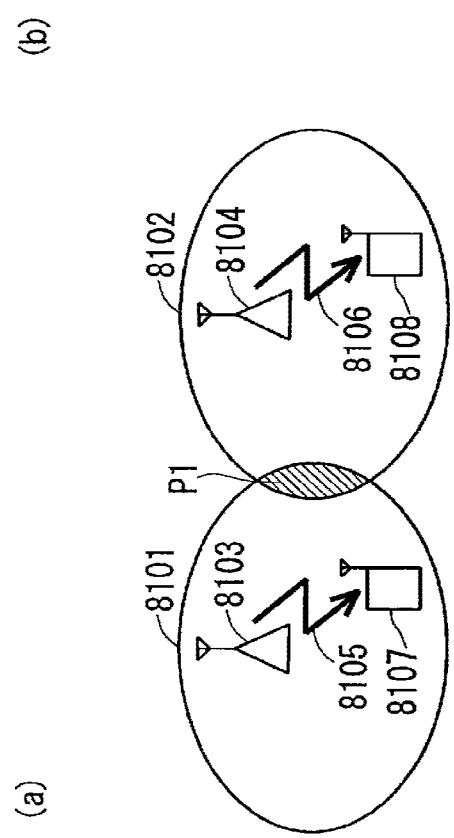

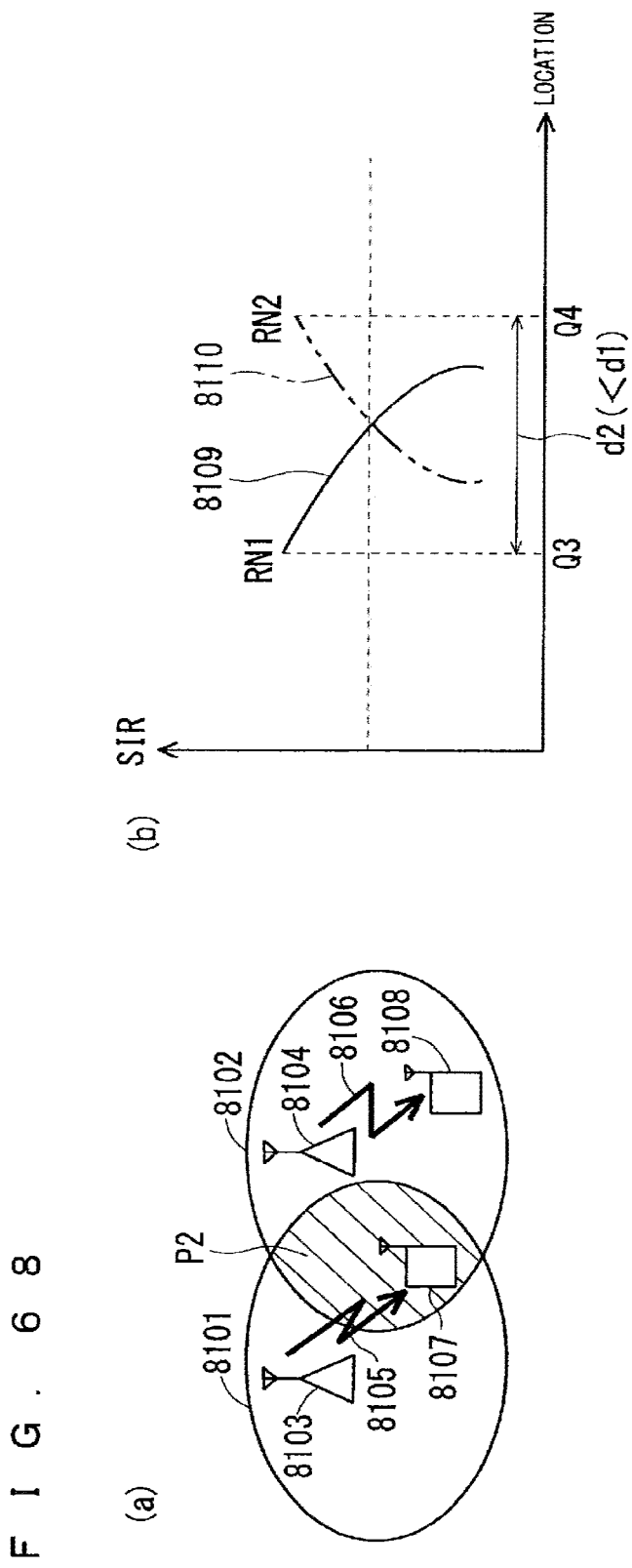

F I G. 6 9
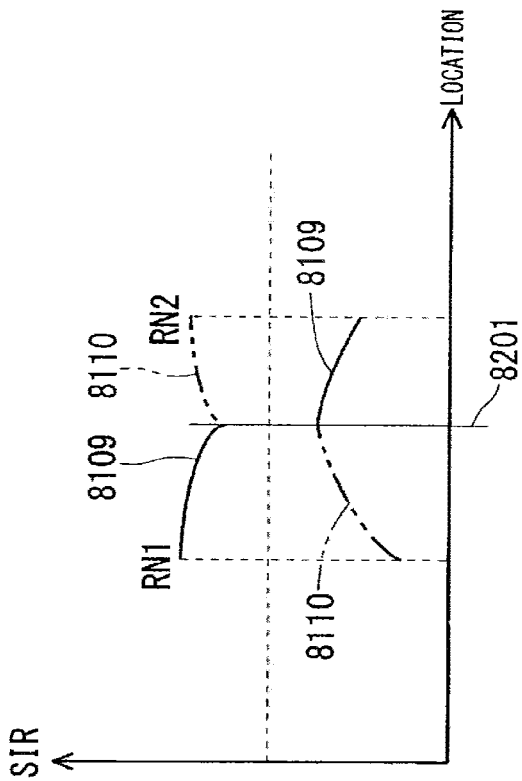
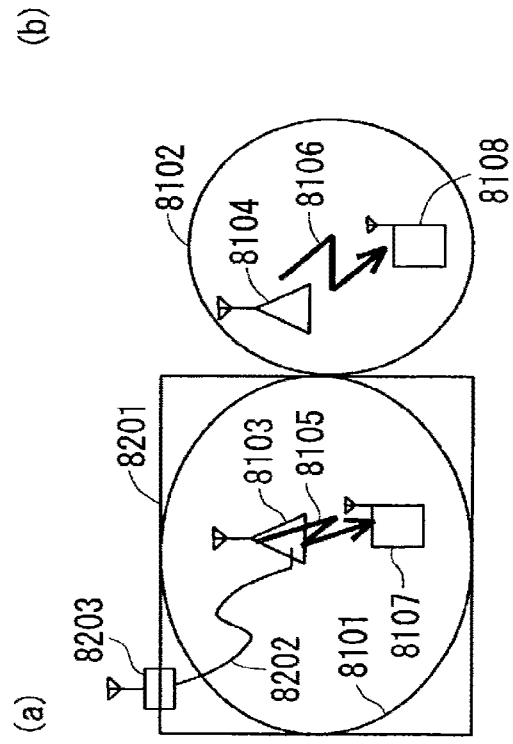

F I G. 7 1
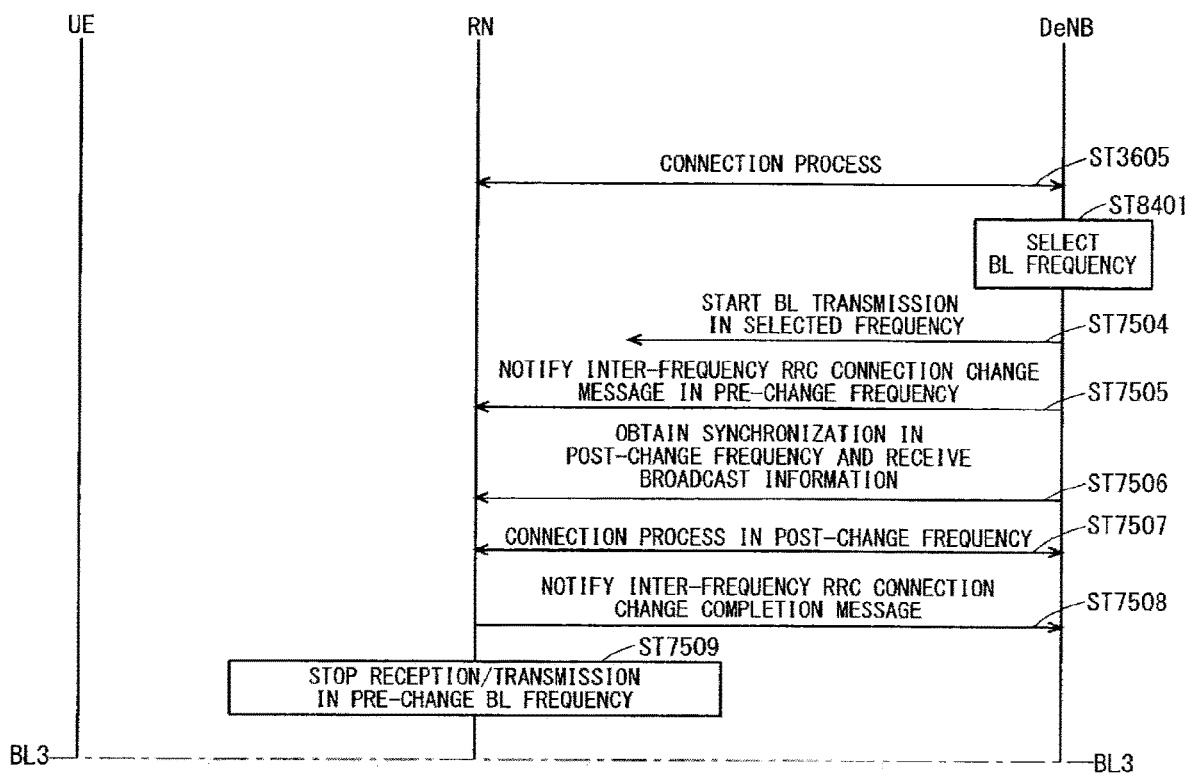

FIG. 73

| IDENTIFICATION NUMBERS | FREQUENCY BANDS | SUPPORTING AREAS /COUNTRIES | OPERATION CONDITIONS | OPERATING AREAS | OPERATING TIMES |
|---|---|---|---|---|---|
| 1 | fL1~fU1 | EU, JP | ○ | Lc1 | Ts1~Te1 |
| 2 | fL2~fU2 | JP | ○ | Lc2 | Ts2~Te2 |
| 3 | fL3~fU3 | CN | — | — | — |

F I G. 7 4
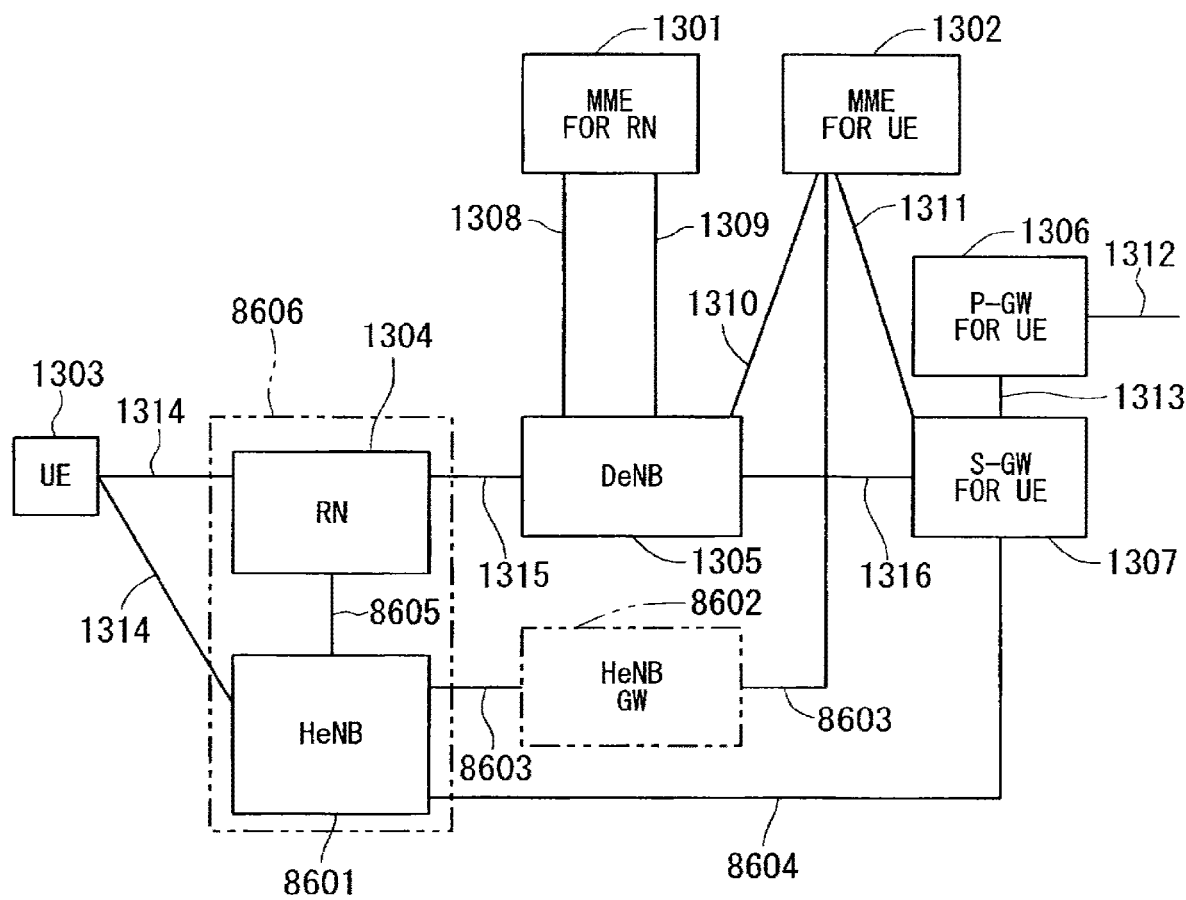

F I G. 7 5
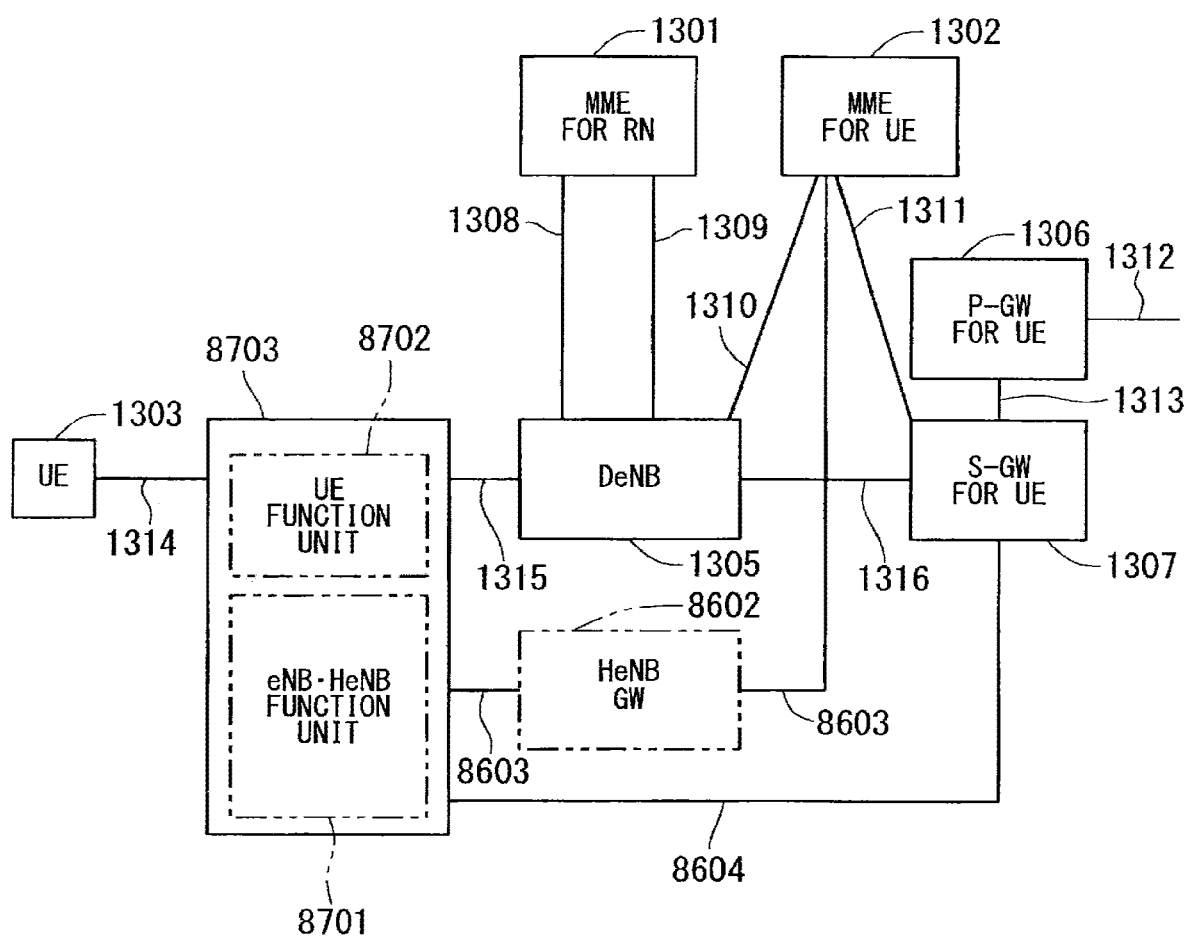

MOBILE COMMUNICATION SYSTEM

CROSS-REFERENCE TO RELATED APPLICATIONS

This application is a continuation of and claims the benefit of priority from U.S. application Ser. No. 14/355,989, filed May 2, 2014, which is a National Stage application of Application No. PCT/JP2012/078479, filed Nov. 2, 2012, which is based upon and claims the benefit of priority from Japanese Patent Application No. 2014-014338, filed Jan. 29, 2014, the entire contents of which are incorporated herein by reference.

TECHNICAL FIELD

The present invention relates to a mobile communication system in which a base station device performs radio communication with a plurality of mobile terminal devices.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, 3GPP is studying new communication systems referred to as long term evolution (LTE) regarding radio areas and system architecture evolution (SAE) regarding the overall system configuration including a core network and a radio access network (hereinafter, also referred to as network) as communication systems independent of W-CDMA. This communication system is also referred to as 3.9 generation (3.9 G) system. In the LTE, an access scheme, a radio channel configuration, and a protocol are totally different from those of the W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz, and 20 MHz per base station. Further, differently from the W-CDMA, circuit switching is not provided but a packet communication system is only provided in the LTE.

In the LTE, a communication system is configured with a new core network different from the general packet radio service (GPRS) being the core network of the W-CDMA, and thus, the radio access network of the LTE is defined as a radio access network independent of the W-CDMA network.

Therefore, for differentiation from the W-CDMA communication system, a core network and a radio access network are referred to as an evolved packet core (EPC) and an evolved universal terrestrial radio access network (E-UTRAN), respectively, in the LTE communication system. Also in the radio access network, the base station that communicates with a mobile terminal (a user equipment (UE)) is referred to as an E-UTRAN NodeB (eNB). The EPC functions as a radio network controller that exchanges control data and user data with a plurality of base stations. The EPC is also referred to as an access gateway (aGW). The system formed of the EPC and E-UTRAN is referred to as an evolved packet system (EPS).

Unicast service and evolved multimedia broadcast multicast service (E-MBMS service) are provided in this LTE communication system. The E-MBMS service is broadcast multimedia service. The E-MBMS service is merely referred to as MBMS in some cases. Bulk broadcast contents such as news, weather forecast, and mobile broadcast are transmitted to a plurality of user equipments in the E-MBMS service. This is also referred to as point to multipoint service.

Non-Patent Document 1 (Chapter 4) describes the current decisions by 3GPP regarding an overall architecture in the LTE system. The overall architecture will be described with reference to FIG. 1. FIG. 1 is a diagram illustrating the configuration of the LTE communication system. With reference to FIG. 1, the E-UTRAN is composed of one or a plurality of base stations 102, provided that a control protocol for a user equipment 101 such as a radio resource control (RRC), and user planes such as a packet data convergence protocol (PDCP), radio link control (RLC), medium access control (MAC) and physical layer (PHY) are terminated in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC. The P-GW performs per-user packet filtering and UE-ID address allocation.

The control protocol RRC between the user equipment 101 and the base station 102 performs broadcast, paging, RRC connection management, and the like. The states of the base station and the user equipment in RRC are classified into RRC_IDLE and RRC_CONNECTED. In RRC_IDLE, public land mobile network (PLMN) selection, system information (SI) broadcast, paging, cell re-selection, mobility, and the like are performed. In RRC_CONNECTED, the user equipment has RRC connection and is capable of transmitting/receiving data to/from a network. In RRC_CONNECTED, for example, handover (HO) and measurement of a neighbour cell are performed.

The current decisions by 3GPP regarding the frame configuration in the LTE system described in Non-Patent Document 1 (Chapter 5) will be described with reference to FIG.

2. FIG. 2 is a diagram illustrating the configuration of a radio frame used in the LTE communication system. With reference to FIG. 2, one radio frame is 10 ms. The radio frame is divided into ten equally sized sub-frames. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is the simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. As shown in FIG. 3, the radio frames including the MBSFN subframes are allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod} = \text{radioFrameAllocationOffset} \quad (1)$$

The MBSFN subframe is allocated with six bits. The leftmost bit in FIG. 3 defines the MBSFN allocation for the second subframe (#1). The second bit, third bit, fourth bit, fifth bit, and sixth-bit from the left define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the current decisions by 3GPP regarding the channel configuration in the LTE system. It is assumed that the same channel configuration is used in a closed subscriber group (CSG) cell as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a channel for downlink transmission from the base station 102 to the user equipment 101. A BCH transport block is mapped to four subframes within a 40 ms interval. There is no explicit signaling indicating 40 ms timing.

A physical control format indicator channel (PCFICH) 402 is a channel for downlink transmission from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a channel for downlink transmission from the base station 102 to the user equipment 101. The PDCCH notifies the resource allocation information for downlink shared channel (DL-SCH) being one of the transport channels shown in FIG. 5 described below, resource allocation information for a paging channel (PCH) being one of the transport channels shown in FIG. 5, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is channel for downlink transmission from the base station 102 to the user equipment 101. A downlink shared channel (DL-SCH) that is a transport channel and a PCH that is a transport channel are mapped to the PDSCH.

A physical multicast channel (PMCH) 405 is a channel for downlink transmission from the base station 102 to the user equipment 101. A multicast channel (MCH) that is a transport channel is mapped to the PMCH.

A physical uplink control channel (PUCCH) 406 is a channel for uplink transmission from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) 407 is a channel for uplink transmission from the user equipment 101 to the base station 102. An uplink shared channel (UL-SCH) that is one of the transport channels shown in FIG. 5 is mapped to the PUSCH.

A physical hybrid ARQ indicator channel (PHICH) 408 is a channel for downlink transmission from the base station 102 to the user equipment 101. The PHICH carries Ack/Nack that is a response signal to uplink transmission. A physical random access channel (PRACH) 409 is a channel for uplink transmission from the user equipment 101 to the base station 102. The PRACH carries a random access preamble.

A downlink reference signal (RS) is a known symbol in a mobile communication system. The following five types of downlink reference signals are defined: cell-specific reference signals (CRSs), MBSFN reference signals, data demodulation reference signals (DM-RSs) being UE-specific reference signals, positioning reference signals (PRSs), and channel-state information reference signals (CSG-Ss). The physical layer measurement objects of a user equipment include reference symbol received power (RSRP).

The transport channels described in Non-Patent Document 1 (Chapter 5) will be described with reference to FIG. 5. FIG. 5 is a diagram illustrating transport channels used in the LTE communication system. Part (A) of FIG. 5 shows mapping between a downlink transport channel and a downlink physical channel. Part (B) of FIG. 5 shows mapping between an uplink transport channel and an uplink physical channel.

A broadcast channel (BCH) among the downlink transport channels shown in part (A) of FIG. 5(A) is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS services (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH) among the uplink transport channels shown in FIG. 5(B) part (B) of FIG. 5. The UL-SCH supports dynamic or semi-static resource allocation. The UL-SCH is mapped to the physical uplink shared channel (PUSCH).

A random access channel (RACH) shown in part (B) of FIG. 5 is limited to control information. The RACH involves a collision risk. The RACH is mapped to the physical random access channel (PRACH).

The HARQ will be described. The HARQ is the technique for improving the communication quality of a channel by combination of automatic repeat request (ARQ) and error correction (forward error correction). The HARQ is advantageous in that error correction functions effectively by retransmission even for a channel whose communication quality changes. In particular, it is also possible to achieve further quality improvement in retransmission through combination of the reception results of the first transmission and the reception results of the retransmission.

An example of the retransmission method will be described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. Chase combining is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

The logical channels described in Non-Patent Document 1 (Chapter 6) will be described with reference to FIG. 6. FIG. 6 is a diagram illustrating logical channels used in an LTE communication system. Part (A) of FIG. 6 shows mapping between a downlink logical channel and a downlink transport channel. Part (B) of FIG. 6 shows mapping between an uplink logical channel and an uplink transport channel.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging signals and system information change notifications. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a point-to-point channel that transmits dedicated control information between a user equipment and a network. The DCCH is used if the user equipment has an RRC connection. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

CGI represents a cell global identification identifier. ECGI represents an E-UTRAN cell global identifier. A closed subscriber group (CSG) cell is introduced in the LTE, and the long term evolution advanced (LTE-A) and universal mobile telecommunication system (UMTS) described below. The CSG will be described below (see Chapter 3.1 of Non-Patent Document 3).

The closed subscriber group (CSG) cell is a cell in which subscribers who are allowed to use are specified by an operator (also referred to as a "cell for specific subscribers").

The specified subscribers are allowed to access one or more cells of a public land mobile network (PLMN). One or more cells in which the specified subscribers are allowed access are referred to as "CSG cell(s)". Note that access is limited in the PLMN.

The CSG cell is part of the PLMN that broadcasts a specific CSG identity (CSG ID; CSG-ID) and broadcasts "TRUE" in a CSG indication. The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling user equipments, in other words, incoming calling to user equipments) even in an idle state. An area for tracking locations of user equipments is referred to as a tracking area.

The CSG whitelist is a list that may be stored in a universal subscriber identity module (USIM) in which all CSG IDs of the CSG cells to which the subscribers belong are recorded. The CSG whitelist may be merely referred to as a whitelist or an allowed CSG list as well. As to the access of user equipments through a CSG cell, the MME performs access control (see Chapter 4.3.1.2 of Non-Patent Document 9). Specific examples of the access of user equipments include attach, combined attach, detach, service request, and a tracking area update procedure (see Chapter 4.3.1.2 of Non-Patent Document 9).

The service types of a user equipment in an idle state will be described below (see Chapter 4.3 of Non-Patent Document 3). The service types of user equipments in an idle state include a limited service, normal service, and operator service. The limited service includes emergency calls, earthquake and tsunami warning system (ETWS), and commercial mobile alert system (CMAS) on an acceptable cell described below. The standard service (also referred to as normal service) is a public service on a suitable cell described below. The operator service includes a service for operators only on a reserved cell described below.

A "suitable cell" will be described below. The "suitable cell" is a cell on which a UE may camp to obtain normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):

(a) the cell is not a barred cell;

(b) the cell is part of a tracking area (TA), not part of the list of "forbidden LAs for roaming", where the cell needs to fulfill (1) above;

(c) the cell shall fulfill the cell selection criteria; and (d) for a cell specified as CSG cell by system information (SI), the CSG-ID is part of a "CSG whitelist" of the UE, that is, is contained in the CSG whitelist of the UE.

An "acceptable cell" will be described below. The "acceptable cell" is the cell on which a UE may camp to obtain limited service. Such a cell shall fulfill the all following requirements.

(1) The cell is not a prohibited cell (also referred to as a "barred cell").

(2) The cell fulfills the cell selection criteria.

"Barred cell" is indicated in the system information. "Reserved cell" is indicated in the system information.

"Camping on a cell" represents the state where a UE has completed the cell selection/cell reselection process and the UE has selected a cell for monitoring the system information and paging information. The cell on which the UE camps may be referred to as a "serving cell".

3GPP is studying base stations referred to as Home-NodeB (Home-NB; HNB) and Home-eNodeB (Home-eNB; HeNB). HNB/HeNB is a base station for, for example, household, corporation, or commercial access service in UTRAN/E-UTRAN. Non-Patent Document 4 discloses three different modes of the access to the HeNB and HNB. Specifically, those are an open access mode, a closed access mode, and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a CSG cell where only CSG members are allowed access. In the hybrid access mode, the HeNB and HNB are operated as CSG cells where non-CSG members are allowed access at the same time. In other words, a cell in the hybrid access mode (also referred to as hybrid cell) is the cell that supports both the open access mode and the closed access mode.

In 3GPP, among all physical cell identities (PCIs), there is a range of PCIs reserved by the network for use by CSG cells (see Chapter 10.5.1.1 of Non-Patent Document 1). Division of the PCI range is also referred to as PCI split. The information about PCI split (also referred to as PCI split information) is broadcast in the system information from a base station to user equipments being served thereby. To being served by a base station means to take the base station as a serving cell.

Non-Patent Document 5 discloses the basic operation of a user equipment using PCI split. The user equipment that does not have the PCI split information needs to perform cell search using all PCIs, for example, using all 504 codes. On the other hand, the user equipment that has the PCI split information is capable of performing cell search using the PCI split information.

Further, 3GPP is pursuing specifications standard of long term evolution advanced (LTE-A) as Release 10 (see Non-Patent Documents 6 and 7).

As to the LTE-A system, it is studied that a relay and a relay node (RN) are supported for achieving a high data rate, high cell-edge throughput, new coverage area, and the like. The relay node is wirelessly connected to the radio-access network via a cell referred to as a donor cell (hereinafter, also referred to as a "Donor eNB; DeNB"). The network (NW)-to-relay node link shares the same frequency band with the network-to-UE link within the range of the donor cell. In this case, the UE supporting Release 8 of 3GPP can also be connected to the donor cell. The link between a donor cell and a relay node is referred to as a backhaul link, and the link between the relay node and the UE is referred to as an access link.

As the method of multiplexing a backhaul link in frequency division duplex (FDD), the transmission from a DeNB to an RN is performed at a downlink (DL) frequency band, and the transmission from an RN to a DeNB is performed at an uplink (UL) frequency band. As the method of dividing resources in a relay, a link from a DeNB to an RN and a link from an RN to a UE are time-division multiplexed at one frequency, and a link from an RN to a DeNB and a link from a UE to an RN are also time-division multiplexed at one frequency band. In a relay, accordingly, the transmission of the relay is prevented from interfering the reception of the own relay.

Not only a normal eNB (macro cell) but also so-called local nodes such as pico eNB (pico cell), HeNB (HNB, CSG cell), node for hotzone cells, relay node, remote radio head (RRH), and repeater are studied in 3GPP. The network composed of various types of cells as described above is also referred to as a heterogeneous network (HetNet) in some cases.

The frequency bands (hereinafter, also referred to as "operating bands") usable for communication have been predetermined in the LTE. Non-Patent Document 8 describes the frequency bands.

Carrier aggregation (CA) is studied in the LTE-A system, in which two or more component carriers (CCs) are aggregated to support wider transmission bandwidths up to 100 MHz.

A Release 8 or 9 of 3GPP-compliant UE, which supports LTE, is capable of transmission/reception only on one CC corresponding to one serving cell. Meanwhile, it is conceivable that a Release 10 of 3GPP-compliant UE may have the capability of transmission and reception, only reception, or only transmission on a plurality of CCs corresponding to a plurality of serving cells at the same time.

Each CC employs the configuration of Release 8 or 9 of 3GPP, and the CA supports contiguous CCs, non-contiguous CCs, and CCs in different frequency bandwidths. The UE cannot configure the number of uplink CCs (UL CCs) more than the number of downlink CCs (DL CCs). The CCs configured by the same eNBs do not need to provide the same coverage. The CC is compatible with Release 8 or 9.

In CA, an independent HARQ entity is provided per serving cell in uplink as well as downlink. A transport block is generated per TTI for each serving cell. Each transport block and HARQ retransmission are mapped to a single serving cell.

In a case where CA is configured, a UE has single RRC connection with a NW. In RRC connection, one serving cell provides NAS mobility information and security input. This cell is referred to as a primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

The above-mentioned LTE Advanced (LTE-A) is studied as a further advanced communication system regarding radio areas in 3GPP (see Non-Patent Documents 6 and 7). The LTE-A is based on the LTE communication system regarding radio areas and is configured by addition of several new techniques thereto. The new techniques include the technique of supporting wider bands (wider bandwidth extension) and the coordinated multiple point transmission and reception (CoMP) technique. The CoMP studied for LTE-A in 3GPP is described in Non-Patent Documents 6 and 7.

CoMP is the technique of improving the coverage of high data rates, improving a cell-edge throughput, and increasing a communication system throughput by transmission or reception coordinated among multiple geographically separated points. The CoMPs are grouped into downlink CoMP (DL CoMP) and uplink CoMP (UL CoMP).

In DL CoMP, the PDSCH to one user equipment (UE) is transmitted in cooperation among multiple points. The PDSCH to one UE may be transmitted from one point among multiple points or may be transmitted from points among multiple points. In DL CoMP, a serving cell refers to a single cell that transmits resource allocation over the PDCCH.

Joint processing (JP) and coordinated scheduling (CS)/coordinated beamforming (CB) (hereinafter, also referred to as "CS/CB") are studied as the DL CoMP method.

For JP, data is available at each point in a CoMP cooperating set. JPs are grouped into joint transmission (JT) and dynamic cell selection (DCS). In JT, the PDSCH is transmitted from multiple points, specifically, part of or entire CoMP cooperating set, at a time. In DCS, the PDSCH is transmitted from one point in the CoMP cooperating set at a time.

In CS/CB, data is only available in transmission from a serving cell. In CS/CB, user scheduling or beamforming decisions are made with coordination among cells corresponding to the CoMP cooperating set.

Base stations (NB, eNB, HNB, HeNB), remote radio unit (RRU), remote radio equipment (RRE), remote radio head (RRH), relay node, and the like are studied as the units and cells that perform transmission at multiple points. The unit (cell) that performs coordinated multiple point transmission is referred to as multi-point unit (multi-point cell).

PRIOR ART DOCUMENTS

Non-Patent Documents

Non-Patent Document 1: 3GPP TS 36.300 V10.2.0
Non-Patent Document 2: 3GPP TS 36.331 V10.0.0
Non-Patent Document 3: 3GPP TS 36.304 V10.0.0 Chapter 3.1, Chapter 4.3, Chapter 5.2.4
Non-Patent Document 4: 3GPP S1-083461
Non-Patent Document 5: 3GPP R2-082899
Non-Patent Document 6: 3GPP TR 36.814 V9.0.0
Non-Patent Document 7: 3GPP TR 36.912 V9.3.0
Non-Patent Document 8: 3GPP TS 36.101 V10.0.0
Non-Patent Document 9: 3GPP TR 23.830 V9.0.0

SUMMARY OF INVENTION

Problems to be Solved by the Invention

In 3GPP, a movable RN (hereinafter, also referred to as a "mobile relay (mobile RN)") is newly proposed in addition to a conventional RN that is used while being fixed (hereinafter, also referred to as a "fixed RN"). It is conceivable that the operation of a mobile RN may improve the communication quality between a UE being served thereby and a network and reduce the power consumption of the UE being served thereby. Also, it is conceivable that the operation of a mobile RN may eliminate the need for newly installing a macro cell, resulting in reductions in investment and operational costs of an operator.

In 3GPP, however, no specific discussion has been made as to the communication method when the RN moves. If a mobile RN is supported in the conventional technique, a problem that the RN and the destination DeNB cannot communicate with each other arises.

For example, in a case where the RN has moved and the HO has been activated, a DeNB being a moving source does not recognize which cell is the cell that can support the RN and thus cannot select a suitable moving destination cell. Thus, the DeNB being a moving source cannot perform HO of this RN and fails HO, and further, disconnects communication. If the RN can perform HO to the DeNB being a moving destination, the presence of other RN near the above-mentioned RN causes a problem that communication cannot be made due to interference with the other RN.

When the RN is movable, a problem arises not only in the function as a UE in the RN but also in the function as an eNB if no improvement is made. For example, if the RN moves and the handover (hereinafter, also referred to as "inter-frequency handover (HO)") to an eNB operated in a frequency or frequency band different from that of the DeNB being a moving source is activated, a problem such as a sudden deterioration of reception quality or sudden disconnection of communication arises in the communication between the RN and the UE being served thereby.

The present invention has an object to provide a mobile communication system capable of continuing communication between a user equipment device and a base station device through a relay device if the relay device moves.

Means to Solve the Problems

A mobile communication system of the present invention includes a movable user equipment device, a plurality of base station devices configured to perform radio communication with the user equipment device, and a relay device movably configured to relay radio communications between the user equipment device and the base station devices, wherein in a handover process of switching a base station device to be connected with the relay device from a base station device being a moving source to a base station device being a moving destination along with moving of the relay device, the base station device being a moving destination rejects a connection request from the relay device in a case where the own base station device does not have a function supporting the relay device.

Another mobile communication system of the present invention includes a movable user equipment device, a plurality of base station devices configured to perform radio communication with the user equipment device, and a relay device movably configured to relay radio communications between the user equipment device and the base station devices, wherein in a handover process of switching a base station device to be connected with the relay device from a base station device being a moving source to a base station device being a moving destination along with moving of the relay device, the base station device being a moving source selects the base station device being a moving destination from base station devices other than a base station device that does not have a function supporting the relay device, and performs the handover process such that the relay device is connected to the selected base station device.

Effects of the Invention

In the mobile communication system of the present invention, if the base station device being a moving destination does not have the function supporting the relay device, the base station device being a moving destination rejects a connection request from the relay device. This allows the relay device to return to the connection with the base station device being a moving source or select other base station device as a connection target, whereby the connection between the base station device and the relay device can be continued. The communication between the relay device and base station device can be continued if the relay device moves, so that the communication service to a user equipment device being served by the relay device can be continued.

In the other mobile communication system of the present invention, a base station device being a moving destination is selected by the base station device being a moving source from base station devices other than a base station device that does not have a function supporting the relay device, and the handover process is performed such that the relay device is connected to the selected base station device. This prevents the activation of the handover process of switching the base station device that does not have the function supporting the relay device to a base station device being a moving destination. Consequently, the connection target of the relay device can be returned to the base station device being a moving source, or the handover process of switching other base station device to a base station device being a moving destination can be performed. This allows for connection continued between the relay device and base station device. The communication between the relay device and base station device can be continued if the relay device moves, so that the communication service to a user equipment device being served by the relay device can be continued.

The handover process of switching a base station device that does not have the function supporting the relay device to the base station device being a moving destination is always rejected because the base station device being a moving destination does not have the function supporting the relay device. The activation of the handover process is prevented, resulting in a reduction in processing load as a whole mobile communication system. Also, a control delay can be prevented.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 2 is a diagram illustrating the configuration of a radio frame used in the LTE communication system.

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 11 is a block diagram showing the configuration of a HeNBGW 74 shown in FIG. 7 being a HeNBGW according to the present invention.

FIG. 12 is a flowchart showing an outline from a cell search to an idle state operation performed by a user equipment (UE) in the LTE communication system.

FIG. 13 shows an architecture of a mobile communication system in a case where an RN according to Release 10 of 3GPP is provided.

FIG. 18 shows an exemplary sequence of a mobile communication system in a first embodiment.

FIG. 19 shows another exemplary sequence of the mobile communication system in the first embodiment.

FIG. 20 shows an exemplary sequence of a mobile communication system in a first modification of the first embodiment.

FIG. 24 shows another exemplary sequence of the mobile communication system in the third modification of the first embodiment.

FIG. 28 shows an architecture of a mobile communication system in a case where an RN is located being served by a DeNB.

FIG. 33 shows an exemplary sequence of the mobile communication system in the sixth modification of the first embodiment.

FIG. 34 shows an exemplary sequence of the mobile communication system in the sixth modification of the first embodiment.

FIG. 44 shows an exemplary sequence of a mobile communication system in a third embodiment.

FIG. 46 shows an exemplary sequence of the mobile communication system in the third embodiment.

FIG. 58 shows the exemplary sequence of the mobile communication system in the third modification of the third embodiment.

FIG. 62 shows an exemplary configuration of uplink subframes in a case where an access link subframe differs between RNs.

FIG. 63 shows an exemplary sequence of a mobile communication system in a fourth embodiment.

FIG. 66 shows the exemplary sequence of the mobile communication system in the first modification of the fourth embodiment.

FIG. 67 is a diagram for describing changes in the signal to interference ratio (SIR) of an access link in a UE being served by each RN before RNs come close to each other.

FIG. 68 is another diagram for describing changes in the signal to interference ratio (SIR) of an access link in a UE being served by each RN in a case where RNs are close to each other.

FIG. 69 is a diagram for describing the SIR of an access link in a UE being served by each RN when RNs are close to each other in a case where one of the RNs is provided indoors.

FIG. 71 shows an exemplary sequence of a mobile communication system in a first modification of the fifth embodiment.

FIG. 73 shows a specific example of the data managed in a server.

FIG. 74 shows an architecture of a mobile communication system in a sixth embodiment, which includes a node having an RN function and a HeNB function.

FIG. 75 shows another architecture of the mobile communication system in the sixth embodiment, which includes a node having an RN function and a HeNB function.

DESCRIPTION OF EMBODIMENTS

First Embodiment

Figure 3:
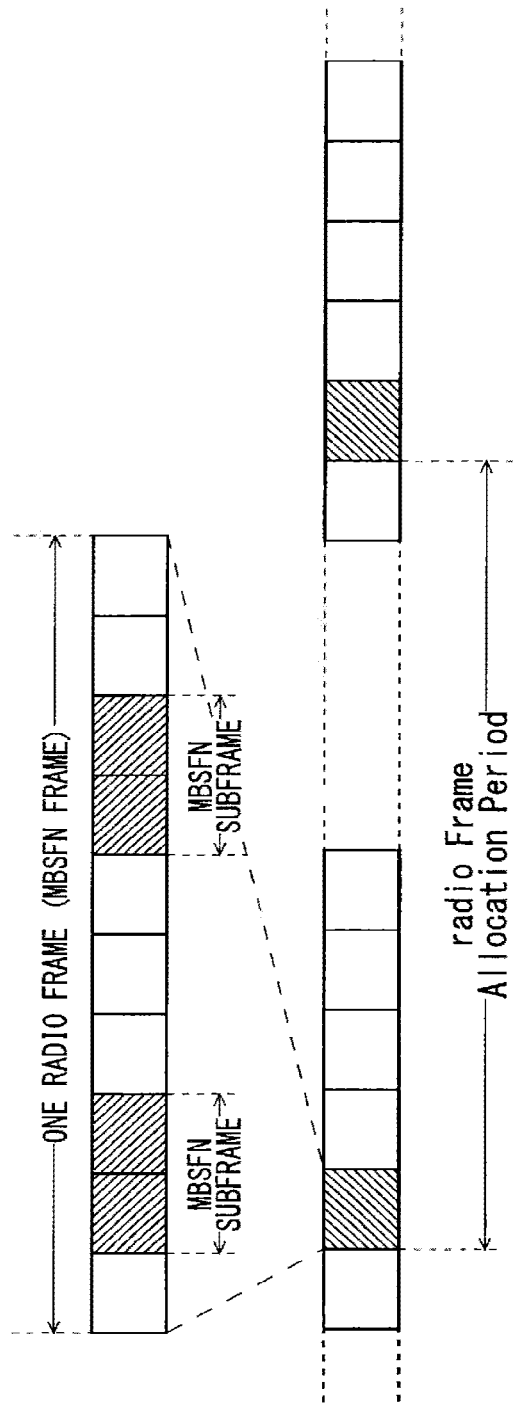
FIG. 3 is a diagram illustrating the configuration of an MBSFN frame.
Figure 7:
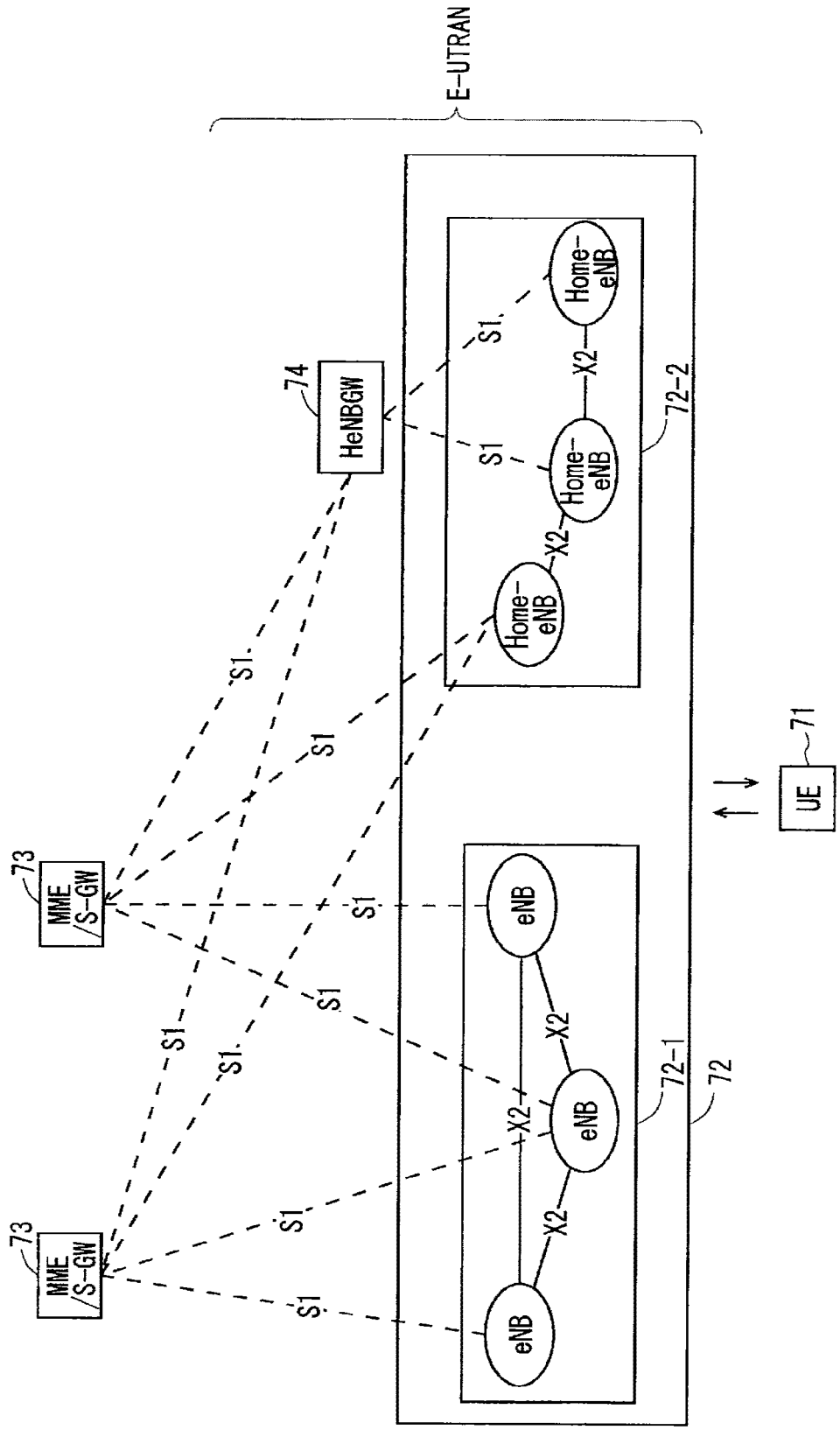
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. 3GPP is studying an overall configuration of a system including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, is proposing the configuration as shown in FIG. 7 (see Chapter 4.6.1 of Non-Patent Document 1).

FIG. 7 will be described. A user equipment device (hereinafter, referred to as "user equipment" or "UE") 71 is capable of performing radio communication with a base station device (hereinafter, referred to as "base station") 72 and transmits/receives signals through radio communication. The base stations 72 are classified into an eNB 72-1 that is a macro cell and a Home-eNB 72-2 that is a local node. The eNB 72-1 has a relatively large-scale coverage as the coverage in a range in which communication is allowed with the user equipment (UE) 71. The Home-eNB 72-2 has a relatively small-scale coverage as the coverage.

The eNB 72-1 is connected to an MME/S-GW unit (hereinafter, also referred to as an "MME unit") 73 including an MME, S-GW, or MME and S-GW through an S1 interface, and control information is communicated between the eNB 72-1 and the MME unit 73. A plurality of MME units 73 may be connected to one eNB 72-1. The MME unit 73 is equivalent to management means. The MME unit 73 is included in an EPC being a core network. The eNBs 72-1 are connected to each other by means of an X2 interface, and control information is communicated between the eNBs 72-1.

The Home-eNB 72-2 is connected to the MME unit 73 by means of an S1 interface, and control information is communicated between the Home-eNB 72-2 and the MME unit 73. A plurality of Home-eNBs 72-2 are connected to one MME unit 73. Or, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface.

One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

The MME units 73 and HeNBGW 74 are devices of higher nodes and control the connection between the user equipment (UE) 71 and the eNB 72-1 or Home-eNB 72-2 being a base station. The MME units 73, specifically, the MME and S-GW constituting the MME unit 73 and the HeNBGW 74 are equivalent to management means. The MME units 73 and HeNBGW are included in an EPC being a core network.

Further, 3GPP is currently studying the configuration below. The X2 interface between the Home-eNBs 72-2 is supported. In other words, the Home-eNBs 72-2 are connected to each other by means of an X2 interface, and control information is communicated between the Home-eNBs 72-2. The HeNBGW 74 appears to the MME unit 73 as the eNB 72-1. The HeNBGW 74 appears to the Home-eNB 72-2 as the MME unit 73.

The interfaces between the Home-eNBs 72-2 and the MME units 73 are the same, which are the S1 interfaces, in both cases where the Home-eNB 72-2 is connected to the MME unit 73 through the HeNBGW 74 and it is directly connected to the MME unit 73. The mobility to the Home-eNB 72-2 or the mobility from the Home-eNB 72-2 that spans a plurality of MME units 73 is not supported. The Home-eNB 72-2 constitutes and supports a single cell.

The base station device supports a single cell alone, such as the Home-eNB 72-2, which is not limited thereto. One base station device may support a plurality of cells. In a case where one base station device supports a plurality of cells, every cell functions as a base station device.

Figure 8:
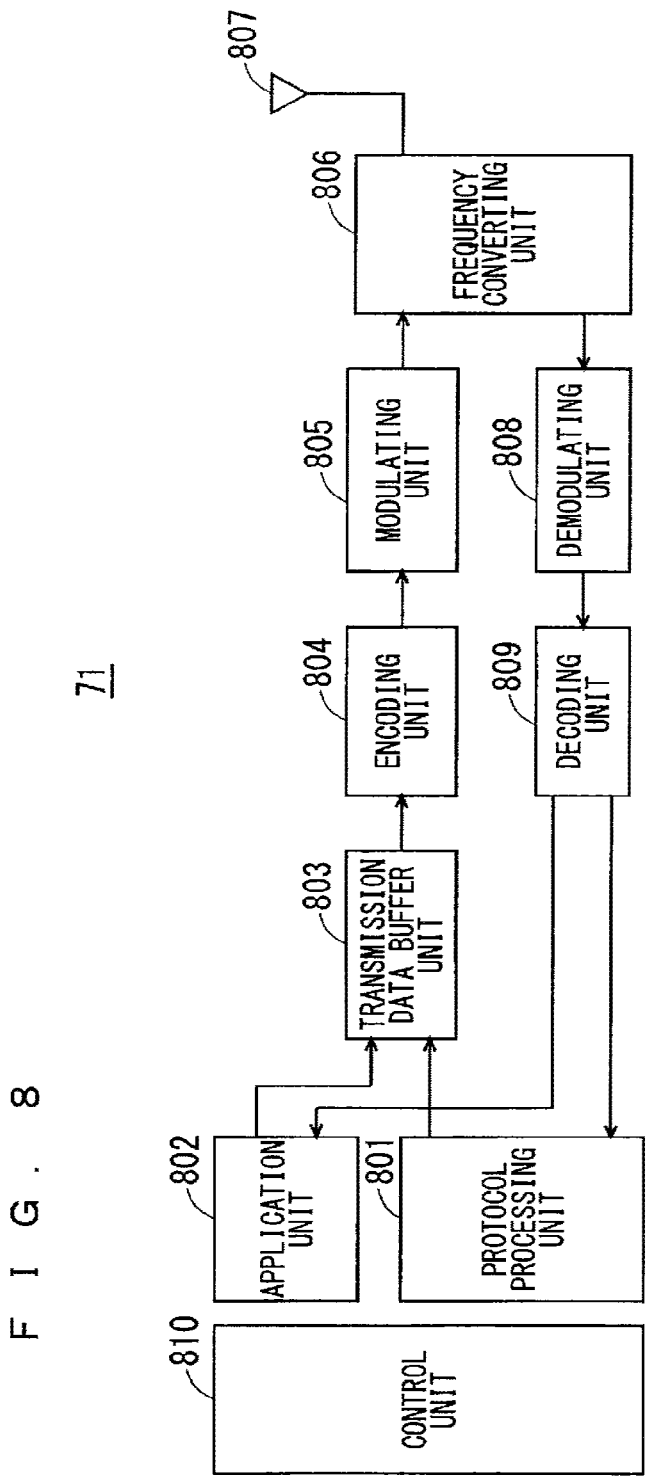
FIG. 8 is a block diagram showing the configuration of a user equipment 71 of FIG. 7 being a user equipment according to the present invention.

FIG. 8 is a block diagram showing the configuration of the user equipment 71 of FIG. 7 being a user equipment according to the present invention. The transmission process of the user equipment 71 shown in FIG. 8 will be described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and is then converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency into a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

Figure 9:
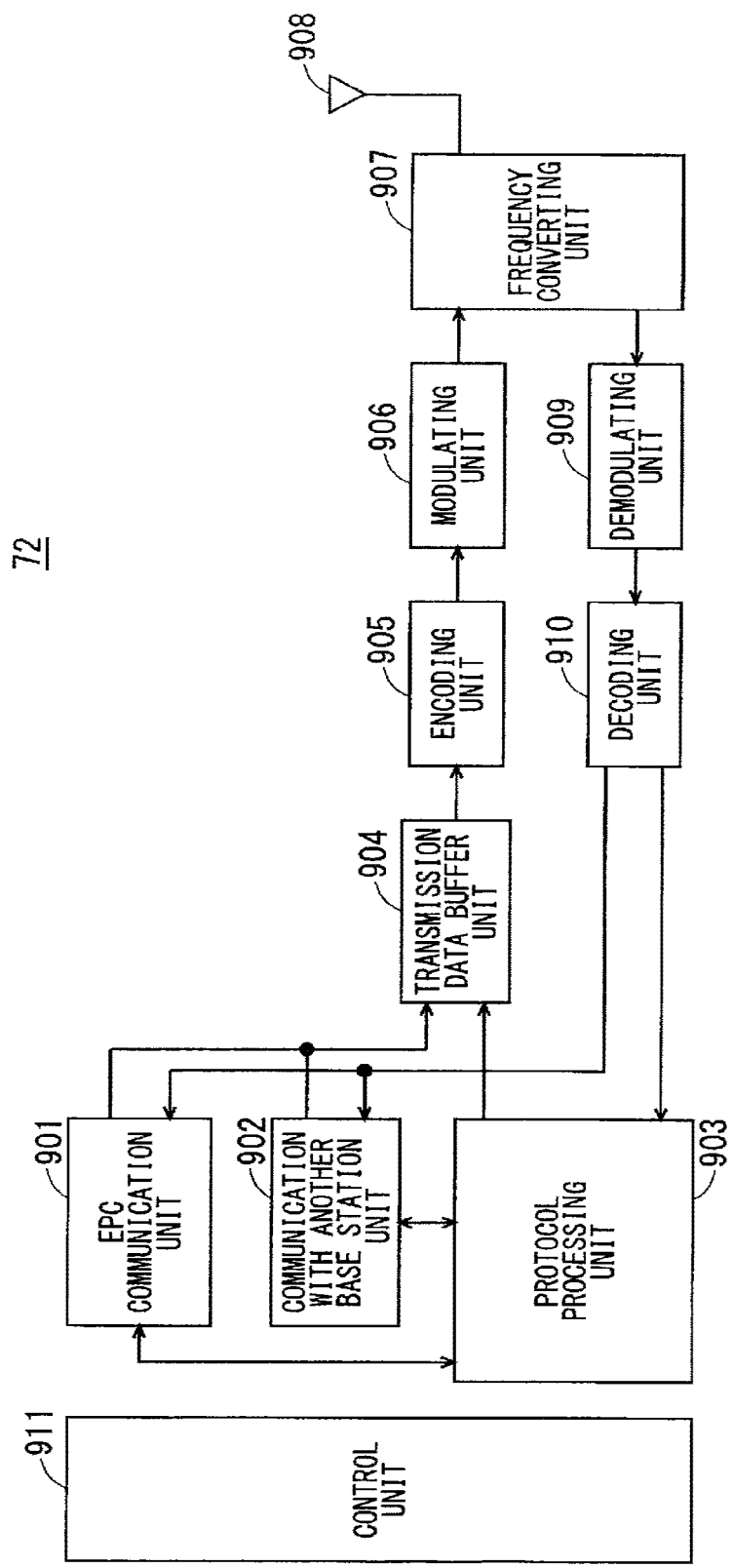
FIG. 9 is a block diagram showing the configuration of a base station 72 of FIG. 7 being a base station according to the present invention.

FIG. 9 is a block diagram showing the configuration of the base station 72 of FIG. 7 being a base station according to the present invention. The transmission process of the base station 72 shown in FIG. 9 will be described. An EPC communication unit 901 performs data transmission/reception between the base station 72 and the EPCs (such as MME unit 73 and HeNBGW 74). A communication with another base station unit 902 performs data transmission/reception to/from another base station. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

The reception process of the base station 72 is executed as follows. A radio signal from one or a plurality of user equipments 71 is received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes by the base station 72 is controlled by a control unit 911. This means that, though not shown in FIG. 9, the control unit 911 is connected to the respective units 901 to 910.

The communication with another base station unit 902 is equivalent to a notification unit and an acquisition unit. The transmission data buffer unit 904, encoding unit 905, modulating unit 906, frequency converting unit 907, antenna 908, demodulating unit 909, and decoding unit 910 are equivalent to a communication unit.

The functions of the Home-eNB 72-2 currently under discussion of 3GPP will be described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. The Home-eNB 72-2 in this case is accordingly required to be connected to a different HeNBGW 74 depending on its location.

Figure 10:
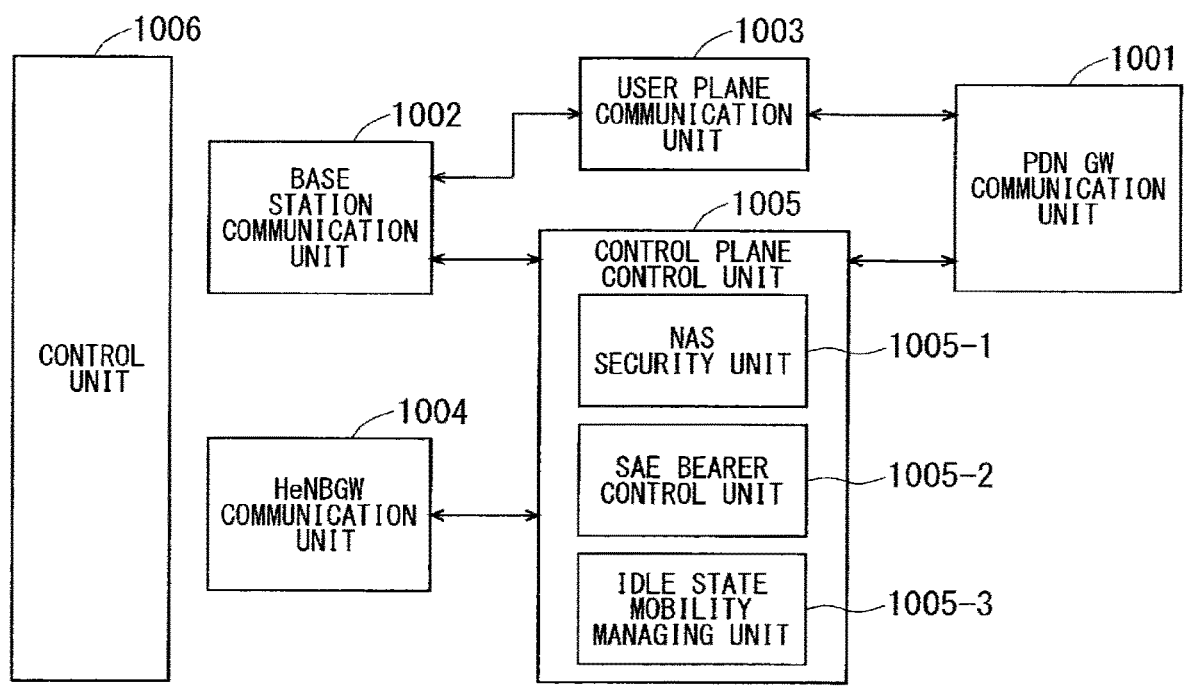
FIG. 10 is a block diagram showing the configuration of an MME unit 73 of FIG. 7 being an MME according to the present invention.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission/reception between the MME 73a and a PDN GW. A base station communication unit 1002 performs data transmission/reception between the MME 73a and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception of the interface (IF) between the MME 73a and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2, an idle state mobility managing unit 1005-3, and other unit, and performs overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of a paging signal in an idle state, addition, deletion, update, and search of a tracking area (TA) of one or a plurality of user equipments 71 being served thereby, and tracking area list (TA list) management.

The MME 73a begins a paging protocol by transmitting a paging message to the cell belonging to a tracking area (TA) in which the UE is registered. The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (for example, added, deleted, updated, or searched). For example, the relationship may be the relationship between one or a plurality of user equipments whose user access registration has been performed with a CSG-ID and the CSG cells belonging to this CSG-ID. In the whitelist management, the relationship between the user equipment and the CSG-ID is managed (for example, added, deleted, updated, or searched). As an example, one or a plurality of CSG-IDs with which user registration has been performed by a user equipment may be stored in the whitelist. The above-mentioned management related to the CSG may be performed by another part of the MME 73a. A series of processes by the MME 73a is controlled by a control unit 1006. This means that, though not shown in FIG. 10, the control unit 1006 is connected to the respective units 1001 to 1005.

The function of the MME 73a currently under discussion of 3GPP will be described below (see Chapter 4.6.2 of Non-Patent Document 1). The MME 73a performs access control for one or a plurality of user equipments being members of closed subscriber groups (CSGs). The MME 73a recognizes the execution of paging optimization as an option.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME 73a by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73a through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP will be described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME 73a. When the HeNBGW 74 is deployed, the procedure that is not associated with the user equipment 71 is communicated between the Home-eNB 72-2 and the HeNBGW 74 and between the HeNBGW 74 and the MME 73a. The X2 interface is not set between the HeNBGW 74 and another node. The HeNBGW 74 recognizes the execution of paging optimization as an option.

An example of a cell search method in a mobile communication system will be described next. FIG. 12 is a flowchart showing an outline from a cell search to an idle state operation performed by a user equipment (UE) in the LTE communication system. When starting a cell search, in Step ST1201, the user equipment synchronizes the slot timing and frame timing by a primary synchronization signal (P-SS) and a secondary synchronization signal (S-SS) transmitted from a neighbor base station.

The P-SS and S-SS are collectively referred to as a synchronization signal (SS). Synchronization codes, which individually correspond to physical cell identities (PCIs) assigned per cell, are assigned to the synchronization signal (SS) including the P-SS and S-SS. The number of PCIs is currently studied in 504 ways. These 504 ways are used for synchronization, and the PCIs of the synchronized cells are detected (specified).

In Step ST1202, next, the user equipment detects a cell-specific reference signal (CRS) being a reference signal (RS) transmitted from the base station per cell and measures the reference signal received power (RSRP). The codes individually corresponding to the PCIs are used for the reference signal RS. Separation from another cell is enabled by correlation using the code. The code for RS of the cell is derived from the PCI specified in Step ST1201, which makes it possible to detect the RS and measure the RS received power.

In Step ST1203, next, the user equipment selects the cell having the best RS reception quality, for example, cell having the highest RS received power, that is, best cell, from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 contains the information about the access to the cell, information on cell selection, and scheduling information about other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC portion of a tracking area identity (TAI) in the tracking area (TA) list that has been already possessed by the user equipment. The tracking area (TA) list is also referred to as a TAI list. TAI is a TA identity and is formed of a mobile country code (MCC), a mobile network code (MNC), and a tracking area code (TAC). MCC is a country code. MNC is a network code. TAC is a TA code number.

In a case where the TAC received in Step ST1205 is identical to the TAC included in the TA list as a result of the comparison of Step ST1206, the user equipment enters an idle state operation in the cell. In a case where the TAC received in Step ST1205 is not included in the TA list as a result of the comparison, the user equipment requires a core network (EPC) including MME and the like to change a TA through the cell for performing tracking area update (TAU). The core network updates the TA list based on an identification number (such as a UE-ID) of the user equipment transmitted from the user equipment together with a TAU request signal. The core network transmits the updated tracking area (TA) list to the user equipment. The user equipment rewrites (updates) the TAC list of the user equipment based on the received TA list. After that, the user equipment enters the idle state operation in the cell.

In the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. One CSG may contain a plurality of CSG cells. After being registered with any one of the CSG cells, the user equipment can access another CSG cell of the CSG to which the registered CSG cell belongs.

Alternatively, the Home-eNB in the LTE and LTE-A and the Home-NB in the UMTS are used as the CSG cell in some cases. The user equipment registered with the CSG cell has a whitelist. Specifically, the whitelist is stored in the subscriber identity module (SIM) or USIM. The whitelist stores the CSG information of the CSG cell with which the user equipment has been registered. Specific examples of the CSG information may include CSG-ID, tracking area identity (TAI), and TAC. Any one of the CSG-ID and TAC is adequate as long as they are associated with each other. Alternatively, ECGI is adequate as long as the CSG-ID and TAC are associated with ECGI.

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

The HeNB and HNB are required to support various services. For example, an operator causes the predetermined HeNB and HNB to register user equipments therein and permits only the registered user equipments to access the cells of the HeNB and HNB, which increases radio resources available for the user equipments and enables high-speed communication. The operator correspondingly sets a high charge compared with a normal service.

In order to achieve the above-mentioned service, the closed subscriber group (CSG) cell accessible only to the registered (subscribed or member) user equipments is introduced. It is required to install a large number of closed subscriber group (CSG) cells in shopping malls, apartment buildings, schools, companies, and the like. For example, the following manner of use is required: the CSG cells are installed for each store in shopping malls, for each room in apartment buildings, for each classroom in schools, and for each section in companies such that only the users who have registered with the respective CSG cells are permitted to use those CSG cells. The HeNB/HNB is required not only to complement the communication outside the coverage of the macro cell (area complementing HeNB/HNB) but also to support various services as described above (service providing HeNB/HNB). This also leads to a case where the HeNB/HNB is installed within the coverage of the macro cell.

As described above, supporting a relay and a relay node (RN) is studied as a new LTE-A technique. The RN that is supported in Release 10 of 3GPP is a fixed RN and does not move after starting an operation.

FIG. 13 shows the architecture of a mobile communication system in a case where an RN according to Release 10 of 3GPP is provided. The architecture of the mobile communication system (hereinafter, merely referred to as a "communication system" as well) shown in FIG. 13 is described in TS23.401 V10.3.0 (hereinafter, referred to as "Reference 1") by 3GPP. The mobile communication system includes an MME for RN 1301, an MME for UE 1302, a UE 1303, an RN 1304, a DeNB 1305, a P-GW for UE 1306, and an S-GW for UE 1307.

The MME for RN 1301 is an MME that manages the RN 1304. The MME for UE 1302 is an MME that manages the UE 1303. The MME for RN 1301 and the MME for UE 1302 may be configured in the same MME 1300. FIG. 13 shows a case in which the MME for RN 1301 and the MME for UE 1302 are configured in the same MME 1300. The MME for RN 1301 and the MME for UE 1302 may not be configured in the same MME 1300. The P-GW for UE 1306 is a P-GW for the UE 1303. The S-GW for UE 1307 is an S-GW for the UE 1303.

The UE 1303 and the RN 1304 are connected by a Uu interface 1314. The RN 1304 and the DeNB 1305 are connected by an interface 1315 composed of an S1 interface, an X2 interface, and a Uu interface. The DeNB 1305 and the MME for RN 1301 are connected by an S1 interface 1308 and an S11 interface 1309.

The MME for UE 1302 and the DeNB 1305 are connected by an S1 interface 1310. The MME for UE 1302 and the S-GW for UE 1307 are connected by an S11 interface 1311. The DeNB 1305 and the S-GW for UE 1307 are connected by an S1 interface 1316. The P-GW for UE 1306 and the S-GW for UE 1307 are connected by an S5/S8 interface 1313. The P-GW for UE 1306 and an external packet network are connected by an SGi interface 1312.

As the concept of the architecture of the mobile communication system involving an RN, an RN is recognized as an eNB from a UE and is recognized as a UE from a DeNB. In other words, the RN operates as an eNB for the UE and operates as a UE for the DeNB.

The DeNB is an eNB to which the function for supporting an RN is added. The DeNB has two functions (1) and (2) described below in addition to the conventional functions of the eNB (see Non-Patent Document 1).

(1) S1/X2 proxy functionality for supporting one or a plurality of RNs.

(2) S11 termination and S-GW/P-GW functionality for supporting one or a plurality of RNs.

When the RN operates as a UE, the RN, the DeNB, the MME for RN, and the S-GW/P-GW functionality of the DeNB communicate with each other. A Un interface is used in the communication between the RN and the DeNB. An S1 interface is used in the communication between the DeNB and the MME for RN. An S11 interface is used in the communication between the MME for RN and the S-GW/P-GW functionality of the DeNB.

If the RN operates as an eNB for a UE, meanwhile, the UE, the RN, the S1/X2 proxy functionality of the DeNB, the MME for UE, and S-GW for UE/P-GW for UE communicate with each other. A Uu interface is used in the communication between the UE and the RN. An S1 interface is used in the communication between the RN and the MME for UE through an S1 proxy function of the DeNB. An S11 interface is used in the communication between the MME for UE and the S-GW for UE/P-GW for UE. For use of an X2 interface in place of the S1 interface, a Uu interface is used in the communication between the UE and the RN. An X2 interface is used in the communication between the RN and a neighboring eNB through the X2 proxy functionality of the DeNB.

In 3GPP, a mobile relay (mobile RN) is newly proposed in addition to a fixed RN. The mobile RN is disclosed in R1-082975 (hereinafter, referred to as "Reference 2") by 3GPP and R3-110656 (hereinafter, referred to as "Reference 3") by 3GPP.

The mobile RN is installed in, for example, a moving body such as an express bus and high-speed train and move together with the moving body. The mobile RN relays the communication between the base station and a user equipment (UE) of a passenger in the moving body such as an express bus and a high-speed train.

Figure 14:
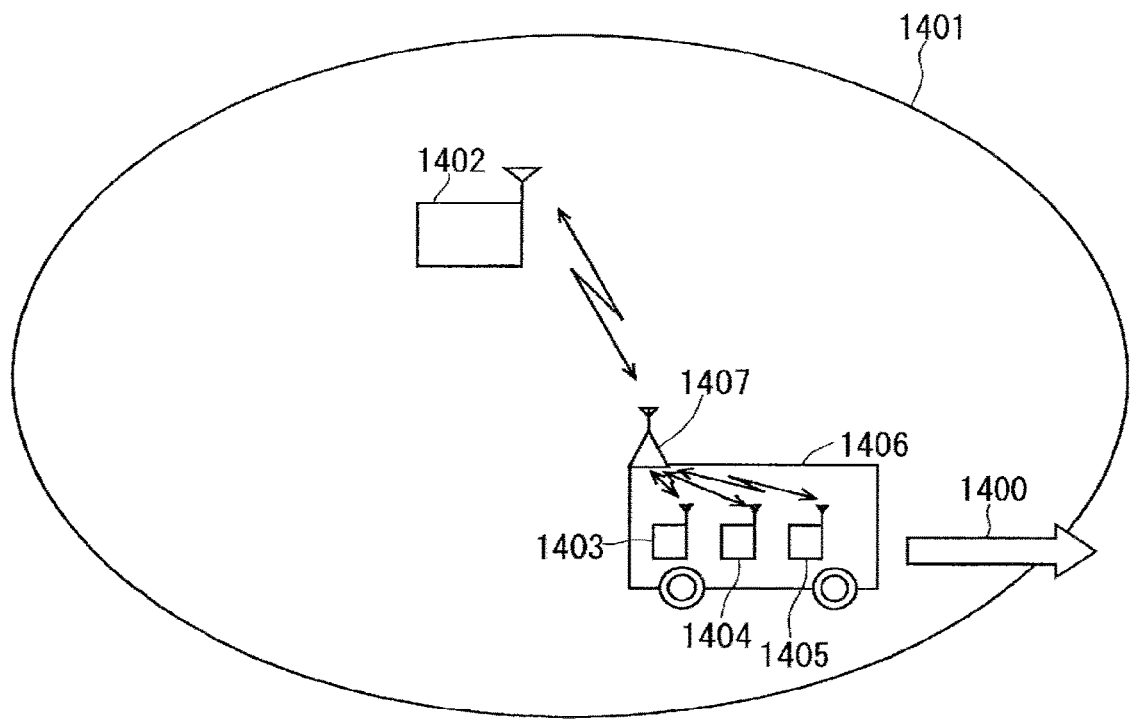
FIG. 14 is a diagram for describing a use case of a mobile RN.

FIG. 14 is a diagram for describing a use case of the mobile RN. A base station 1402 is located in a coverage 1401 formed by the base station 1402. FIG. 14 shows a case in which one base station 1402 forms one cell. In this case, the cell is equivalent to the base station 1402. Not limited to the above, one base station may form a plurality of cells. In this case, every cell is equivalent to the base station 1402. The above holds true for the case in which, for example, the base station is an eNB. This also holds true for the diagrams below.

The moving body, for example, an express bus 1406 is currently located within the coverage 1401 provided by the base station 1402 and is moving along the direction of an arrow 1400. An RN 1407 is installed in the express bus 1406. The passengers on the express bus 1406 carry UEs 1403 to 1405. In other words, the UEs 1403 to 1405 are installed in the express bus 1406.

The base station 1402 communicates with the RN 1407 moving together with the express bus 1406. The UEs 1403 to 1405 in the express bus 1406 do not directly communicate with the base station 1402 but communicate with the base station 1402 via the RN 1407 installed in the express bus 1406. In other words, the RN 1407 appears as a base station to the UEs 1403 to 1405 in the express bus 1406.

The following problems arise in the case where the UEs 1403 to 1405 in the express bus 1406 directly communicate with the base station 1402 being a macro cell. The problems include an impact of the Doppler shift to the UEs, a transmission loss between the inside and outside of a vehicle, a reduction in HO success rate, and increases in investment and operational costs of an operator.

The mobile RN is considered to be effective as the means for solving those problems. The UE communicates with the mobile RN, without any impact of the Doppler shift to the UE and any transmission loss between the inside and outside of a vehicle. The distance between the UE and mobile RN is much smaller than the distance between the UE and macro cell, leading to a reduction in consumption power of the UE as well. Further, the UE is connected to the mobile RN via an air interface and thus needs not to perform HO, which solves signaling congestion. This does not need to install a new macro cell, resulting in reductions in investment and operational costs of the operator.

Figure 15:
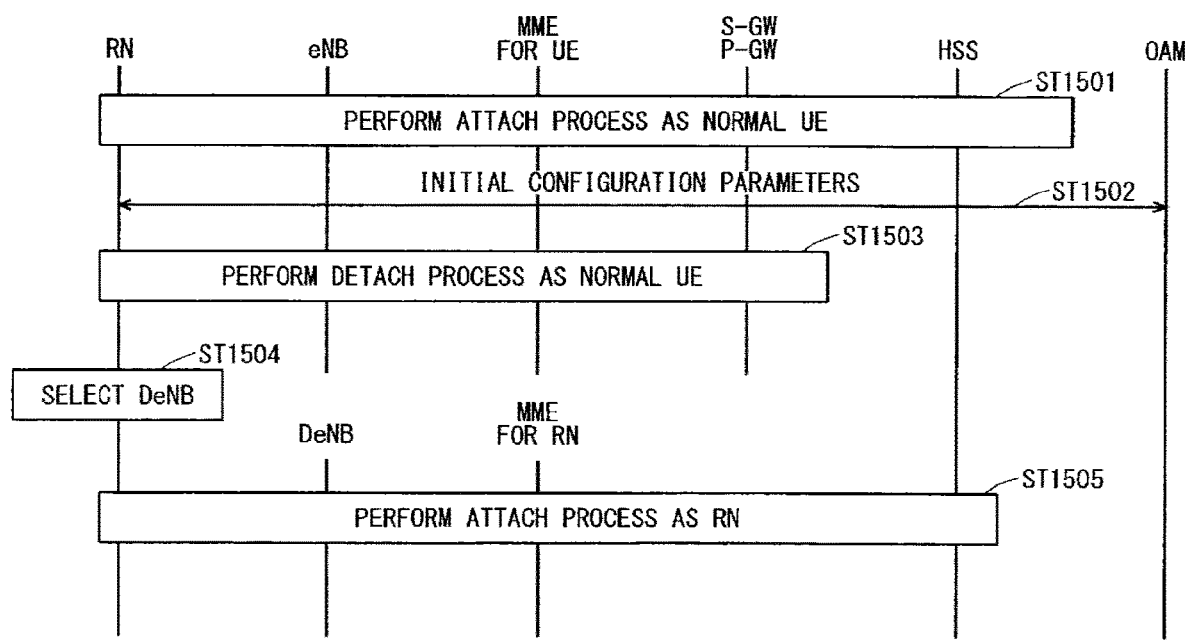
FIG. 15 shows an exemplary sequence of an RN startup process.

The RN startup procedure will be described with reference to FIG. 15 (see Non-Patent Document 1). FIG. 15 shows an exemplary sequence of the RN startup process.

In Step ST1501, the RN attaches to an E-UTRAN or EPC as a normal UE for initial configuration. As a specific example, the RN performs an attach process with the eNB, MME for UE, and home subscriber server (HSS).

In Step ST1502, the RN reads initial configuration parameters including a list of DeNB cells from an operation administration and maintenance (OAM) for RN.

In Step ST1503, the RN detaches from a network as a normal UE. The RN then triggers Phase II of the RN startup procedure described below.

The processes of Steps ST1501 to ST1503 are referred to as Phase I of the RN startup procedure.

In Step ST1504, the RN selects a DeNB from the list of DeNB cells obtained in Phase I.

In Step ST1505, the RN performs an attach process as an RN. During the RRC connection establishment in the attach process as an RN, the RN transmits an RN indication to the DeNB. The DeNB transmits the RN indication and an IP address of the S-GW/P-GW functionality of the DeNB to the MME for RN by including those in an initial UE message. The MME for RN selects the S-GW/P-GW for the RN based on the initial UE message transmitted from the DeNB. During the attach process as an RN in Step ST1505, the EPC checks whether the RN is allowed relay operations.

The processes of Steps ST1504 and ST1505 are referred to as Phase II of the RN startup procedure.

The problem to be solved in the first embodiment will be described below. The use of a mobile RN as an RN is proposed as described above (see References 2 and 3). If the RN is a mobile RN, it is conceivable that, in startup shown in FIG. 15, the RN will move outside the coverage of the DeNB selected from the list of DeNB cells in Step ST1504. There is no specific discussion in 3GPP on the communication method when an RN moves (see References 2 and 3).

The solution in the first embodiment will be described below. The mobile RN performs handover differently from a conventional RN. As the procedure of carrying out handover by the mobile RN, the procedure for handover (hereinafter, also referred to as "handover procedure") by the UE may be used. This can prevent the mobile communication system from becoming complicated.

For the use of the handover procedure by the UE as the handover procedure in a mobile RN, the following points may be improved.

In the relay, as described above, in order to prevent the relay transmission from interfering with the reception of the own relay, the link from the DeNB to the RN and the link from the RN to the UE are time-division multiplexed in one frequency band, and the link from the RN to the DeNB and the link from the UE to the RN are also time-division multiplexed in one frequency band.

Figure 29:
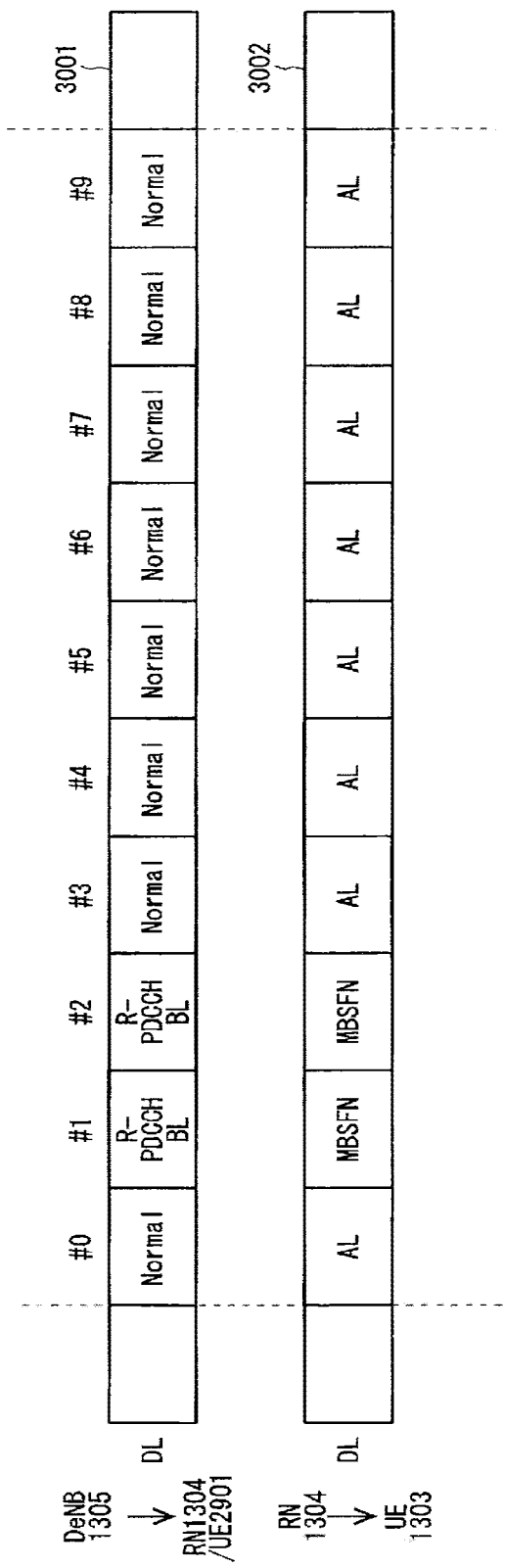
FIG. 29 shows exemplary configurations of downlink subframes in an FDD in a case where an RN 1304 and a UE 2901 are located being served by a DeNB 1305.
Figure 30:
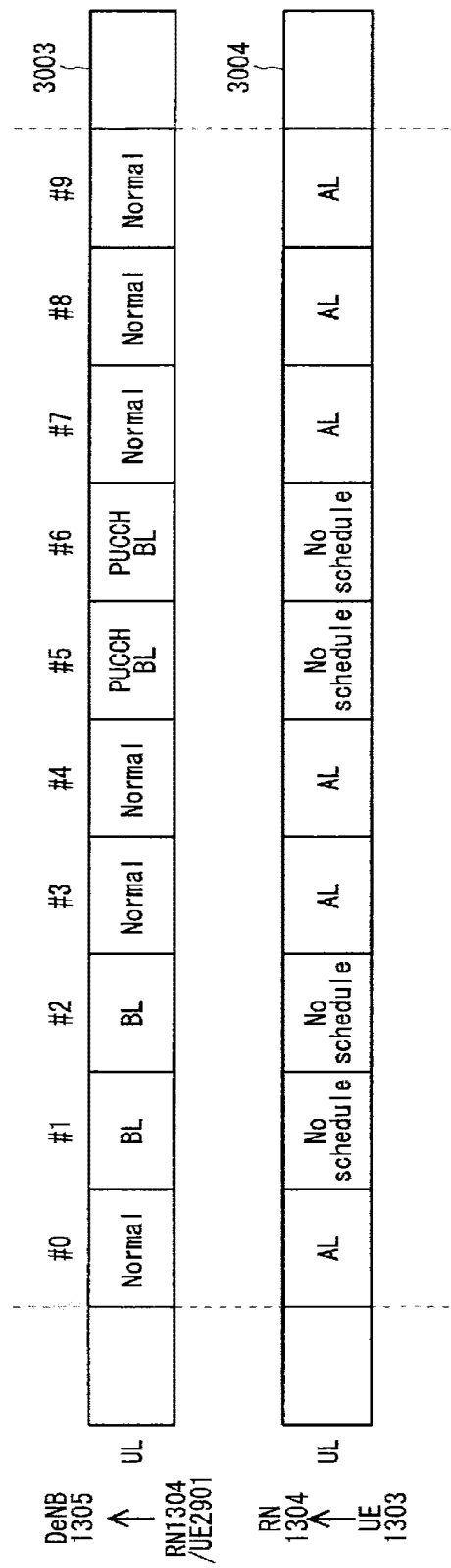
FIG. 30 shows exemplary configurations of uplink subframes in the FDD in the case where the RN 1304 and the UE 2901 are located being served by the DeNB 1305.

FIGS. 29 and 30 below show specific examples of the subframe configurations of an inband RN. The inband RN is an RN having a backhaul link frequency and an access link frequency identical to one another. FIGS. 29 and 30 show that in one RN, the subframes are configured such that the transmission of a downlink access link does not interfere with the reception of a downlink backhaul link or the transmission of an uplink backhaul link does not interfere with the reception of an uplink access link. Thus, no interference occurs between the backhaul link and the access link in one RN.

The subframe configuration of the backhaul link of the RN is notified per RN from the DeNB through RRC signaling. The subframe configuration of the backhaul link for the RN in a target eNB may accordingly differ from the subframe configuration of the backhaul link for the RN in a source DeNB. In other words, in a case where the RN starts communication based on the subframe configuration of the backhaul link for the RN in the source DeNB while being served by a target eNB, interference may occur in the relay. Here, the target eNB is an eNB being a handover destination. The source DeNB is a source eNB that is an eNB being a handover source and also is a source eNB that has an RN function.

The following (1) to (3) will be disclosed as specific examples of the method of preventing interference in a relay when the RN starts communication while being served by a target eNB.

(1) The mobile RN does not allocate resources to a UE being served thereby for a predetermined period. The mobile RN may notify the UE being served thereby of a hold command indicating that resources are not allocated for a predetermined period. Alternatively, the mobile RN may provide a gap in which resources are not allocated to the UE being served thereby for a predetermined period. Specific examples of the predetermined period include a period in which a connection process is performed on a target eNB, for example, a period in which the processes of Steps ST1610 to ST1612 shown in FIG. 16 described below are performed. As a specific example of the termination of the predetermined period, the predetermined period terminates when a notification of the subframe configuration of the backhaul link is received from the target eNB.

(2) The source DeNB notifies the target eNB of the subframe configuration of the backhaul link set for the mobile RN. A specific example of the method of notifying of the subframe configuration of the backhaul link will be disclosed below. When notifying the target eNB of a request of handover (handover request), the source DeNB also notifies the subframe configuration of the backhaul link set for the mobile RN. The target eNB that has received the subframe configuration of the backhaul link formed in the source DeNB performs scheduling for an RN to perform the process for connection with the RN, based on this subframe configuration. After that, the target eNB may notify the RN of the subframe configuration of the backhaul link anew.

(3) The target eNB notifies the source DeNB of the subframe configuration of the backhaul link to be set after handover of the RN. The target eNB may also notify the source DeNB of the parameters necessary for calculations of the CRC and resource of the own cell. The source DeNB notifies, using mobility control information or a handover command, the RN of the subframe configuration of the backhaul link set for the RN by the target eNB. The RN performs the process for connection with the target eNB, based on the subframe configuration of the backhaul link set for the RN by the target eNB. The RN may determine the MBSFN subframe configuration and access scheduling for a UE being served thereby after handover.

If the handover of the mobile RN is supported by the UE handover procedure as such, the following problem arises newly in the selection of a target eNB.

Figure 16:
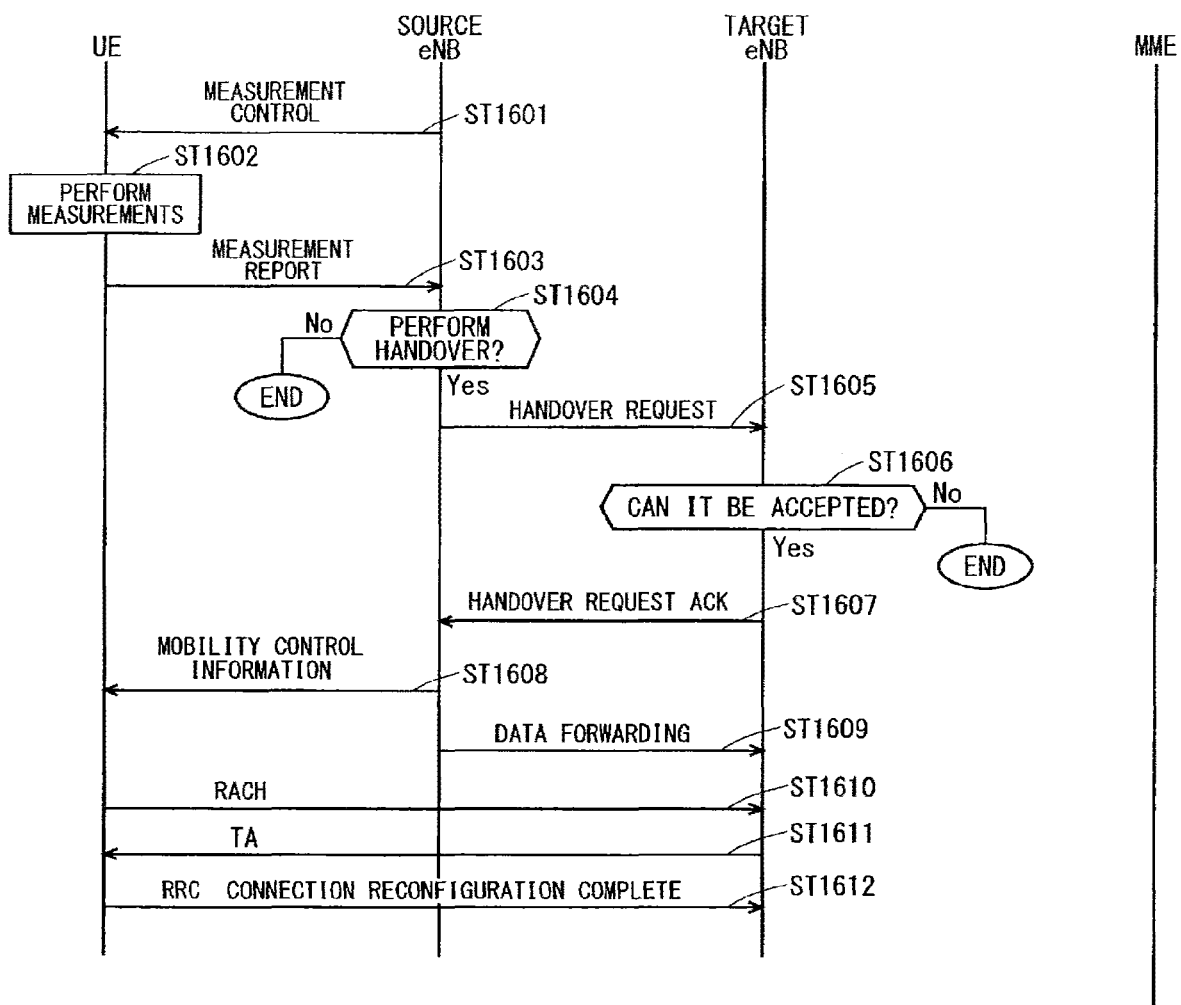
FIG. 16 shows an exemplary sequence of a handover process based on an X2 interface.

First, a conventional UE handover procedure will be described with reference to FIGS. 16 and 17 (see Non-Patent Document 1 and Reference 1). FIG. 16 shows an exemplary sequence of a handover process based on an X2 interface.

In Step ST1601, the source eNB that is an eNB being a handover source notifies the UE of measurement control. The measurement control is also referred to as a measurement configuration. The source eNB is equivalent to a base station device being a moving source.

In Step ST1602, the UE performs measurements in accordance with the measurement control received in Step ST1601.

In Step ST1603, the UE notifies the source eNB of a measurement report for reporting the measurement results of Step ST1602, in accordance with the measurement control received in Step ST1601.

In Step ST1604, the source eNB judges whether to perform handover, that is, to cause the UE to perform handover, based on the measurement report received in Step ST1603, and the like. When causing the UE to perform handover, the source eNB determines a target eNB that is an eNB being a handover destination. The target eNB is equivalent to a base station device being a moving destination.

In Step ST1605, the source eNB notifies the target eNB of a request of handover (handover request).

In Step ST1606, the target eNB judges, based on resources, whether it can accept handover (admission control). In a case of judging that it can accept handover, the target eNB moves to Step ST1607. A case in which the target eNB judges that it cannot accept handover is regarded as an end of the process, and description thereof will not be given.

In Step ST1607, the target eNB notifies the source eNB of a handover request acknowledgment (handover request Ack).

In Step ST1608, the source eNB notifies the UE of an RRC connection reconfiguration message including mobility control information in which parameters necessary for handover are mapped. At the same time, the source eNB instructs the UE to perform handover.

In Step ST1609, the source eNB forwards data on the UE to the target eNB (data forwarding).

In Step ST1610, the UE attempts the connection to the target eNB using the parameters received in Step ST1608. Specifically, the UE transmits a RACH to the target eNB to transmit an RRC connection request.

In Step ST1611, the target eNB notifies the UE of a timing advance (TA) as a response to the RRC connection request transmitted from the UE in Step ST1610.

In Step ST1612, the UE notifies the target eNB of an RRC connection reconfiguration complete.

Figure 17:
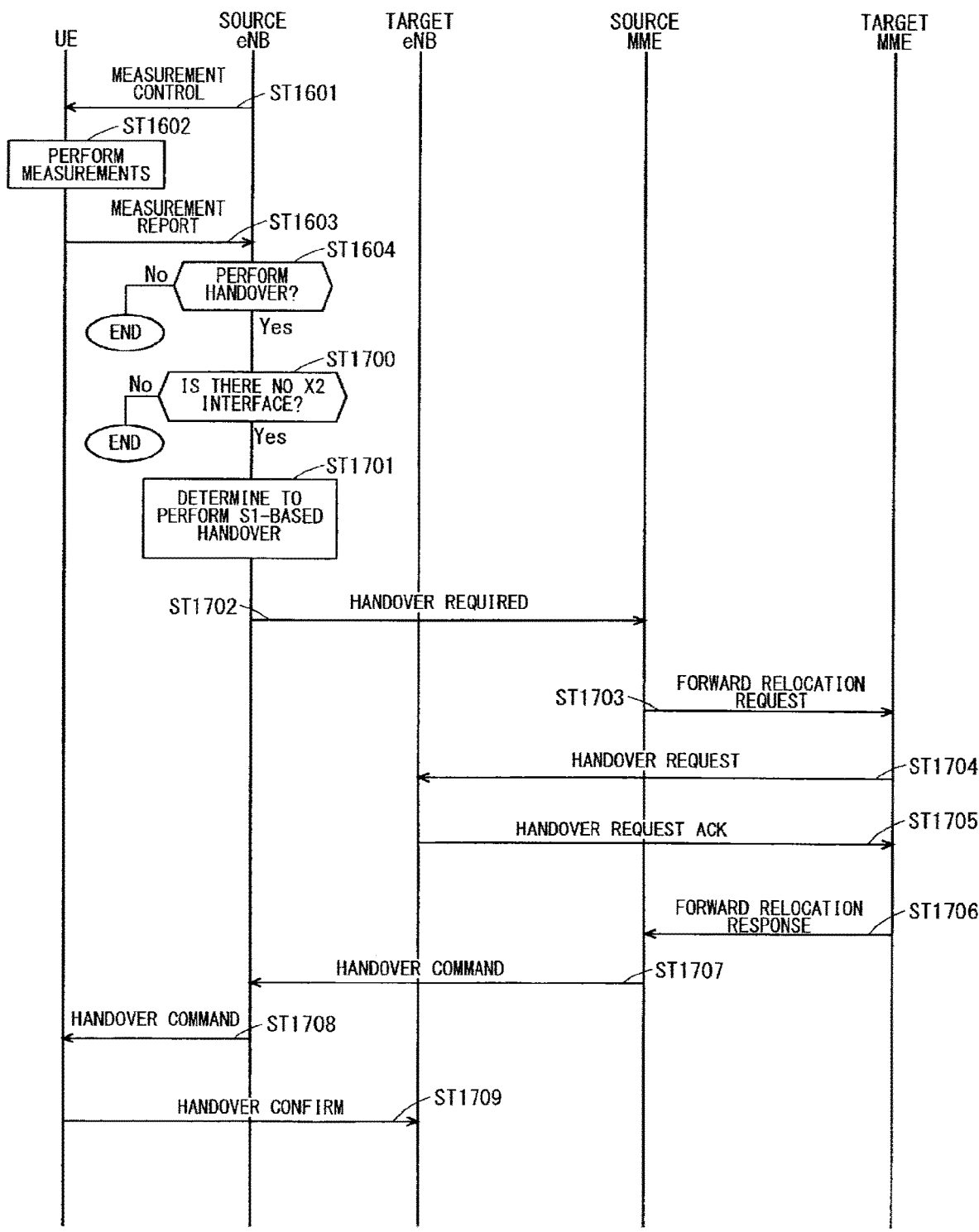
FIG. 17 shows an exemplary sequence of a handover process based on an S1 interface.

FIG. 17 shows an exemplary sequence of a handover process based on an S1 interface. The sequence shown in FIG. 17 is similar to the sequence shown in FIG. 16, and thus, the same steps will be denoted by the same step numbers and common description will be omitted.

The processes of Steps ST1601 to ST1604 are performed as described above, and then, the process proceeds to Step ST1700. In Step ST1700, the source eNB judges whether an X2 interface is located between the source eNB and target eNB. The source eNB moves to Step ST1701 when judging that there is no X2 interface or ends the handover process based on an S1 interface when judging that there is an X2 interface.

In Step ST1701, the source eNB determines to perform handover based on the S1 interface, that is, to perform S1-based handover. For example, if there is no X2 interface between the source eNB and target eNB, the source eNB moves from Step ST1700 to Step ST1701 and performs handover based on the S1 interface (hereinafter, also referred to as "S1-based handover").

In Step ST1702, the source eNB notifies the source MME being an MME that manages the source eNB of a request of handover (handover required) including the identity of the target eNB.

In Step ST1703, the source MME notifies the target MME being an MME that manages the target eNB of a forward relocation request including the identity of the target eNB.

In Step ST1704, the target MME notifies the target eNB of a request of handover (handover request) including a setup request of the EPS bearer.

In Step ST1705, the target eNB judges whether it can accept handover based on whether it can accept a setup of the requested EPS bearer. The target eNB judges that it can accept handover when it can accept the setup of the EPS bearer or judges that it cannot accept handover when it fails to accept the setup of the EPS bearer.

In a case of judging that it can accept handover, the target eNB notifies the target MME of handover request acknowledgement (handover request Ack). The description in a case where the target eNB judges that it cannot accept handover is omitted.

In Step ST1706, the target MME notifies the source MME of a forward relocation response.

In Step ST1707, the source MME notifies the source eNB of a handover command.

In Step ST1708, the source eNB notifies the UE of a handover command in which parameters necessary for handover are mapped.

In Step ST1709, the UE is connected to the target eNB and notifies the target eNB of handover confirmation (handover confirm).

In a conventional UE handover procedure, for example, when judging in Step ST1604 of FIG. 16 that handover is performed, the source eNB determines a target eNB.

As described above, the DeNB is obtained by adding the function of supporting an RN to a conventional function of an eNB. In other words, not all the eNBs have a DeNB function. Thus, the source eNB may select, as a target eNB, an eNB that cannot support an RN, namely an eNB that does not have a DeNB function.

As described above, the RN is connected to the radio access network through the DeNB. In other words, the RN cannot be connected to the radio access network without the DeNB.

Thus, when the source eNB selects the eNB that cannot supports an RN, namely the eNB that does not have a DeNB function as a target eNB, the RN cannot be supported as an RN by the target eNB being a moving destination. This causes a problem that the RN stops services to a UE being served thereby.

The solution to the problem above will be described below. When the RN accesses a target eNB that does not have the DeNB function, the target eNB rejects the RN. The RN that has been rejected by the target eNB may stop the handover process and return to the source eNB. Alternatively, the RN that has been rejected may search for a neighbor cell and select another eNB as the DeNB. In the description below, the source eNB for the RN may be referred to as a "source DeNB".

The following two (1) and (2) will be disclosed as specific examples of the method of judging whether to reject access to a target eNB by the RN.

(1) The target eNB judges whether to reject the access by the RN. In a case where the target eNB itself does not have the DeNB function for the access from the RN, the target eNB judges to reject the access.

The following two (1-1) and (1-2) will be disclosed as specific examples of the method in which the target eNB judges whether the access is made from the RN.

(1-1) An RN indication transmitted from the RN during RRC connection establishment is used. The RN indication that is notified the target eNB from the RN in the attach process as an RN may be used. The target eNB judges that the access is made from the RN in a case where there is an RN indication or judges that the access is not from the RN in a case where there is no RN indication.

(1-2) "Indication that a connection request is from an RN" is newly provided in an establishment cause of the RRC connection request. "Indication that a connection request is from an RN" may be, for example, a "connection request from an RN" or "attach from an RN". For example, the target eNB receives an RRC connection request and judges that the access is made from the RN in a case where the establishment cause is an "attach from an RN" or judges that the access is not from the RN in a case where the establishment cause is not an "attach from an RN".

(2) The EPC judges whether to reject the access from the RN. Specific examples of the EPC include an MME. The MME instructs the target eNB to reject the access from the RN in a case where the target eNB does not have the DeNB function.

A specific example of the method in which the MME judges whether the target eNB has the DeNB function will be disclosed below.

In a case where the eNB does not have the DeNB function, the initial UE message to the MME cannot contain the IP address of the S-GW/P-GW functionality. Therefore, in a case where the access is made from the RN but the initial UE message from the target eNB does not contain the IP address of the S-GW/P-GW functionality, the MME judges that the eNB which has notified the initial UE message does not have the DeNB function. In a case where the initial UE message from the target eNB contains the IP address of the S-GW/P-GW functionality, the MME judges that the eNB which has notified the initial UE message has the DeNB function.

A specific example of the method in which the MME judges that the access is made from the RN will be disclosed below. The MME judges that the access is made from the RN in a case where the initial UE message from the target eNB contains an RN indication or judges that the access is not made from the RN in a case where the initial UE message from the target eNB does not contain an RN indication.

A specific example of the method in which the MME instructs the target eNB to reject the access will be disclosed below. The MME instructs the target eNB to reject the access using an S1 interface or using S1 signaling.

In a case where the MME rejects access from the RN to the target eNB, the reason therefor may be added to the rejection notification to the RN. Specifically, such an indication that rejection is made because the target eNB does not have the DeNB function or such an indication that rejection is made because the RN is not allowed a relay operation is newly provided.

The EPC conventionally, checks whether the RN is allowed a relay operation during, for example, the attach process as an RN in Step ST1501 shown in FIG. 15 described above.

The addition of the reason for rejection to a rejection notification enables the RN to recognize the reason for access rejection. As a specific example, the RN can recognize whether the reason for rejection is "because the target eNB does not have the DeNB function" or "because the RN is not allowed a relay operation". The following effect can be achieved when the RN obtains the reason for access rejection. In a case where the rejection is made because the target eNB does not have the DeNB function, the RN can recognize that it may be supported as an RN if it reselects another cell.

Next, a specific example of the method in which a target eNB rejects access from the RN will be disclosed below. The target eNB notifies the RN of an RRC connection rejection (RRC connection reject).

In a case of rejecting access from the RN, the target eNB may add the reason therefor to the rejection notification for the RN. Specifically, such a reason that the rejection is made because the target eNB does not have the DeNB function is added. The above-mentioned addition of the reason for rejection to the rejection notification enables the RN to recognize the reason for access rejection. The following effect can be achieved when the RN knows the reason for access rejection. In a case where a rejection is made because the target eNB does not have the DeNB function, the RN can recognize that it may be supported as an RN through reselection of another cell.

The operation will be described next. If handover of the mobile RN is supported by means of the conventional UE handover procedure, the sequences are such that the operations of the UE shown in FIGS. 16 and 17 are replaced with the operations of the RN. In the handover procedure based on an X2 interface, the RN accesses the target eNB in Step ST1610 of FIG. 16. In the handover procedure based on an S1 interface, the RN accesses the target eNB in Step ST1709 of FIG. 17.

The sequence of the mobile communication system in the first embodiment will be described with reference to FIGS. 18 and 19. FIGS. 18 and 19 show part of the sequence of the overall handover. Specifically, FIGS. 18 and 19 show in detail the parts of Step ST1610 of FIG. 16 and Step ST1709 of FIG. 17 in a case where handover of a mobile RN is supported by means of the conventional UE handover procedure.

FIG. 18 shows an exemplary sequence of the mobile communication system in the first embodiment. FIG. 18 shows the sequence in a case where the target eNB judges whether to reject the access from the RN.

In Step ST1801, the RN notifies the target eNB of an RRC connection request. In this case, the establishment cause is an "attach from an RN".

In Step ST1802, the target eNB judges whether the establishment cause in the RRC connection request received in Step ST1801 shows an "attach from an RN". In a case of judging that the establishment cause shows an "attach from an RN", the target eNB moves to Step ST1803. In a case of judging that the establishment cause does not show an "attach from an RN", the target eNB moves to Step ST1805. In Step ST1802, the target eNB judges whether the access is made from the RN.

In Step ST1803, the target eNB judges whether the own device has the DeNB function. In a case of judging that the own device does not have the DeNB function, the target eNB moves to Step ST1804. In a case of judging that the own device has the DeNB function, the target eNB moves to Step ST1805.

In Step ST1804, the target eNB notifies the RN of an RRC connection rejection (RRC connection reject). In Step ST1804, the target eNB that does not have the DeNB functions reject the RN.

In Step ST1805, the target eNB notifies the RN of an RRC connection setup.

In Step ST1806, the RN confirms a response to the RRC connection request notified the target eNB in Step ST1801. The RN judges whether it has received an RRC connection reject. In a case of judging to have received the RRC connection reject, that is, if not receiving the RRC connection setup, the RN moves to Step ST1807. In a case of judging to have not received the RRC connection reject, that is, in a case of receiving an RRC connection setup, the RN moves to Step ST1808.

In Step ST1807, the RN stops the handover process and returns to the source eNB.

In Step ST1808, the RN continues the handover process and continues the process for connection with the target eNB. In other words, the RN returns to Step ST1610 of FIG. 16 or Step ST1709 of FIG. 17.

FIG. 19 shows an exemplary sequence of a mobile communication system in the first embodiment. FIG. 19 shows the sequence in a case where an EPC judges whether to reject the access from an RN.

In Step ST1901, the RN notifies the target eNB of an RN indication during RRC connection establishment.

In Step ST1803, next, the target eNB judges whether the own device has the DeNB function. The target eNB moves to Step ST1902 in a case of judging that it does not have the DeNB function. The target eNB moves to Step ST1903 in a case of judging that it has the DeNB function.

In Step ST1902, the target eNB maps an RN indication and notifies an MME of an initial UE message to which the IP address of the S-GW/P-GW functionality is not mapped. The target eNB that does not have the DeNB function cannot map the IP address of the S-GW/P-GW functionality to the initial UE message.

In Step ST1903, the target eNB maps an RN indication and notifies the MME of an initial UE message to which the IP address of the S-GW/P-GW functionality is mapped.

In Step ST1904, the MME judges whether the initial UE message received from the target eNB that is an eNB being served thereby contains an RN indication. In a case of judging that the initial UE message contains an RN indication, the MME judges that the access is made from the RN and moves to Step ST1905. In a case of judging that the initial UE message contains no RN indication, the MME judges that the access is not from the RN and ends the process, which is not specific to the present invention and is thus not described here.

In Step ST1905, the MME judges whether the initial UE message received from the target eNB that is an eNB being served thereby contains the IP address of the S-GW/P-GW functionality. In a case of judging that the initial UE message contains no IP address, the MME judges that the target eNB does not have the DeNB function and moves to Step ST1906. In a case of judging that the initial UE message contains the IP address, the MME judges that the target eNB has the DeNB function and ends the process, which is not specific to the present invention and is thus not described here.

In Step ST1906, the MME instructs the target eNB to reject the access from the RN.

In Step ST1907, the target eNB that has been instructed to reject the access from the RN in Step ST1906 notifies the RN of access rejection. For example, the target eNB notifies the RN of an RRC connection rejection (RRC connection reject).

The RN judges whether it has received the RRC connection rejection in Step ST1806, and moves to Step ST1807 in a case of judging that it has received the RRC connection rejection or moves to Step ST1808 in a case of judging that it has not received the RRC connection rejection.

In Step ST1807, the RN stops the handover process and returns to the source eNB.

In Step ST1808, the RN continues the handover process and continues the process for connection with the target eNB. In other words, the RN returns to Step ST1610 of FIG. 16 or Step ST1709 of FIG. 17.

The first embodiment above can achieve the following effects. If the source eNB selects an eNB that cannot support the RN, namely an eNB that does not have the DeNB function as a target eNB, the target eNB can reject the RN. The rejection enables the RN to return to the connection with the source eNB or to select other eNB as a DeNB, which allows the RN to continue the connection with the base station device. Thus, the communication between the RN and base station device can be continued if the RN moves, so that the communication service to the UE being served by the RN can be continued.

The specific examples (1) and (2) of the method of judging whether to reject the access of the RN to the target eNB, which has been disclosed in this embodiment, can be used in the embodiments described below. Alternatively, those examples can be used in access from the RN, not limited to during handover.

First Modification of First Embodiment

A first modification of the first embodiment will disclose another solution to the problem same as that of the first embodiment described above. The solution in the first modification of the first embodiment will be described below.

The target eNB stops the handover activated by the source DeNB in a case where the own device does not have the DeNB function. Upon stop of handover, the source DeNB stops the handover process.

The source DeNB may notify, when activating handover, the target eNB that the entity being an object to be handed over is the RN.

Upon stop of the handover from the target eNB, the source DeNB may stop the handover process or reselect the target eNB.

The following two (1) and (2) will be disclosed as specific examples of the method in which the source DeNB judges whether the entity being a handover object is the RN.

(1) The RN transmits an RN indication to the DeNB during the RRC connection establishment in the attach process as the RN. Or, the RN may transmit a mobile RN indication. The DeNB associates the RN indication with the cell identity, PCI, COT, or the like and then stores the associated RN indication. The source DeNB judges whether the entity being a handover object is the RN based on the cell identity of the handover object.

(2) The RN also notifies, in notification of a measurement report, the source DeNB that the entity is the RN. Or, the RN may transmit a mobile RN indication. The indicator as to whether the entity is an RN may be added as the information element of the measurement report. Or, the indicator as to whether the entity is a mobile RN may be added as the information element of the measurement report. The source DeNB judges whether to allow the RN to perform handover based on, for example, the measurement report. Compared with the method (1) described above, the source DeNB is capable of collectively receiving pieces of information about handover, resulting in a reduction in processing load of the source DeNB.

The following two (1) and (2) will be disclosed as specific examples of the method in which the source DeNB also notifies, when activating handover, the target eNB that the entity being a handover target is an RN.

(1) If the handover procedure based on an X2 interface is used, the source DeNB also notifies, in a request of handover to the target eNB, that the entity being an object to be handed over is the RN. The indicator as to whether the entity being an object to be handed over is the RN may be added as the information element of the request of handover.

(2) If the handover procedure based on the S1 interface is used, the source DeNB also notifies, in a request of handover to the source MME, that the entity being an object to be handed over is the RN. The indicator as to whether the entity being an object to be handed over is the RN may be added as the information element of the request of handover.

If the same MME manages the source DeNB and target eNB, the source DeNB notifies the target eNB via the MME that the entity being a handover object is the RN. If different MMES manage the source DeNB and target eNB, the source DeNB notifies the target eNB via the source MME and target MME that the entity being a handover object is the RN.

The following will be disclosed as a specific example of the method in which the target eNB stops handover if the own device does not have the DeNB function. The target eNB notifies a handover request rejection (handover request Nack or handover preparation failure) for the handover request.

If the handover procedure based on an S1 interface is used, the following may be performed.

The MME manages whether the eNB being served thereby supports the DeNB function. The MME associates the cell identity with whether the DeNB function is supported and then stores the cell identity.

The source DeNB notifies that the entity being a handover object is the RN and notifies the cell identity of the target eNB when activating handover. The MME that manages the target eNB may judge, before notifying the target eNB of a request of handover, whether the target eNB has the DeNB function based on the cell identity of the target eNB. The MME stops the handover in a case of judging that the target eNB does not have the DeNB function. Meanwhile, the MME notifies the target eNB of a request of handover in a case of judging that the target eNB has the DeNB function.

The operation will be described next. If the handover of the mobile RN is supported by means of the conventional UE handover procedure, the sequence in which the operation of the UE shown in FIGS. 16 and 17 is replaced with the operation of the RN is obtained.

Figure 21:
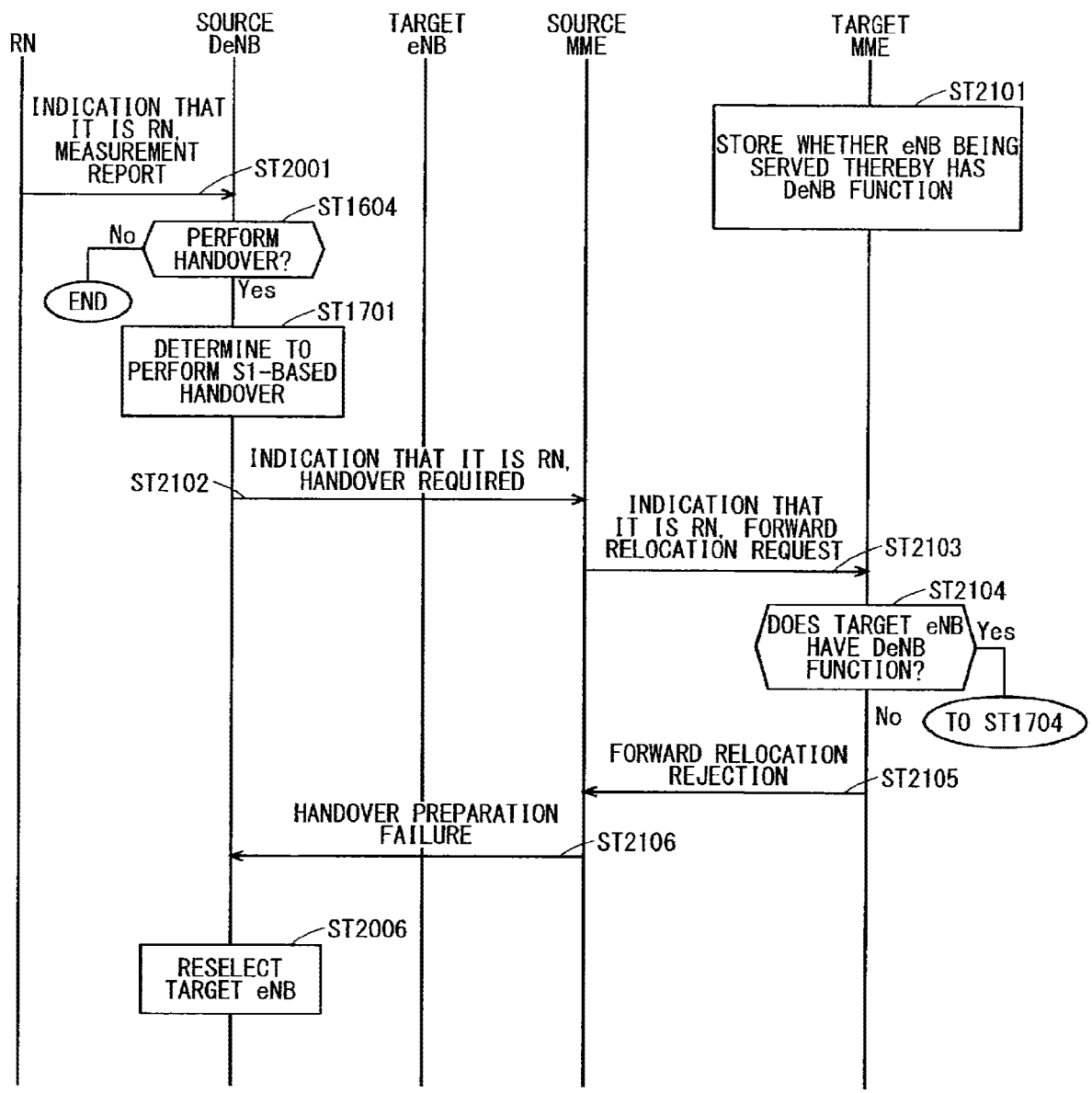
FIG. 21 shows another exemplary sequence of the mobile communication system in the first modification of the first embodiment.

The sequence of a mobile communication system in the first modification of the first embodiment will be described with reference to FIGS. 20 and 21. FIGS. 20 and 21 show part of the sequence of the overall handover. Specifically, FIG. 20 shows the portions of Steps ST1603 to ST1607 of FIG. 16 in detail, and FIG. 21 shows the portions of Steps ST1603 to ST1705 of FIG. 17 in detail.

FIG. 20 shows an exemplary sequence of the mobile communication system in the first modification of the first embodiment. FIG. 20 shows the sequence in a case where the handover process based on an X2 interface is used.

In Step ST2001, the RN notifies the source DeNB of a measurement report and that the entity being a handover object is the RN.

In Step ST1604, the source DeNB judges whether to cause the UE to perform handover based on, for example, the measurement report received in Step ST2001. The source DeNB determines a target eNB being a handover destination if causing the UE to perform handover.

In Step ST2002, the source DeNB notifies the target eNB of a request of handover (handover request) and that the entity being an object to be handed over is the RN.

In Step ST2003, the target eNB judges whether the entity being a handover object is the RN. If having received, from the source DeNB, that the entity being an object to be handed over is the RN together with the request of handover, the target eNB judges that the entity being a handover target is the RN and then moves to Step ST2004. If not having received, from the source DeNB, that the entity being an object to be handed over is the RN together with the request of handover, the target eNB judges that the entity being an object to be handed over is not the RN and then moves to Step ST1606 of FIG. 16.

In Step ST2004, the target eNB judges whether the own device has the DeNB function. In a case of judging that it does not have the DeNB function, the target eNB moves to Step ST2005. In a case of judging that it has the DeNB function, the target DeNB moves to Step ST1606 of FIG. 16.

In Step ST2005, the target eNB notifies the source DeNB of a handover request rejection (handover request Nack).

In Step ST2006, the source DeNB that has received the handover request rejection in Step ST2005 reselects the target eNB. Or, the source DeNB may request a measurement from the RN. The source DeNB may notify the RN of measurement control. The measurement control may differ from the previous measurement control in contents.

FIG. 21 shows an exemplary sequence of a mobile communication system in the first modification of the first embodiment. FIG. 21 shows the sequence in a case where the handover process based on the S1 interface is used.

In Step ST2101, the target MME stores whether the eNB being served thereby has the DeNB function, that is, whether the eNB being served thereby supports the DeNB function.

In Step ST2001, the RN notifies the source DeNB of a measurement report and that the entity being a handover target is the RN.

In Step ST1604, the source DeNB judges whether to cause the UE to perform handover based on, for example, the measurement report received in Step ST2001. In a case of causing the UE to perform handover, the DeNB determines the target eNB being a handover destination.

In Step ST1701, the source DeNB determines to perform handover based on an S1 interface. For example, if there is no X2 interface between the source DeNB and target eNB, the source DeNB performs handover based on the S1 interface.

In Step ST2102, the source DeNB notifies the source MME of a request of handover (handover required) and that the entity being a handover object is the RN.

In Step ST2103, the source MME notifies the target MME that manages the target eNB of a forward relocation request including the identity of the target eNB and that the entity being a handover object is the RN.

In Step ST2104, the target MME judges whether the target eNB has the DeNB function. In a case of judging that the target eNB does not have the DeNB function, the target MME moves to Step ST2105. In a case of judging that the target eNB has the DeNB function, the target MME moves to Step ST1704 of FIG. 17.

In Step ST2105, the target MME notifies the source MME of a forward relocation request rejection.

In Step ST2106, the source MME notifies the source DeNB of a handover request rejection (handover preparation failure).

In Step ST2006, the source DeNB that has received the handover request rejection in Step ST2106 reselects the target eNB. Or, the source DeNB may request a measurement from the RN. The source DeNB may notify the RN of measurement control. The measurement control may differ from the previous measurement control in contents.

The first modification of the first embodiment described above can achieve the following effects in addition to the effects of the first embodiment. At an earlier stage of the handover process than that of the first embodiment, the source DeNB can recognize that the target eNB does not have the DeNB function. The RN accordingly needs not to be connected with the target eNB. Also, the source DeNB can select other eNB as the target eNB. This results in a reduction in control delay compared with the first embodiment.

Second Modification of First Embodiment

The problem to be solved in a second modification of the first embodiment will be described below. The solutions in the first embodiment and the first modification of the first embodiment activate the handover that is always rejected because the target eNB does not have the DeNB function. This causes problems in the processing load and control delay as a mobile communication system.

The solution in the second modification of the first embodiment will be described below. The RN judges whether the eNB has the DeNB function. Or, in a case where the entity being a handover object is the RN, the source DeNB may select the eNB having the DeNB function as a target eNB, based on the judgment results of the RN as to whether the eNB has the DeNB function. In other words, the source DeNB does not select the eNB that does not have the DeNB function as a target eNB.

The following three (1) to (3) will be disclosed as specific examples of the method in which the RN judges whether the eNB has the DeNB function.

(1) The information indicative of whether the eNB has the DeNB function is broadcast. The RN receives the broadcast information from the eNB, and then judges whether the eNB has the DeNB function based on the received broadcast information.

Described below are specific examples of the method of broadcasting the information indicative of whether the eNB has the DeNB function. The information indicative of whether the eNB has the DeNB function is newly added as an information element of the existing system information (system information block (SIB), see Non-Patent Document 2). The system information is broadcast over the BCCH.

The following three (1-1) to (1-3) will be disclosed as specific examples of the method of taking the information indicative of whether the eNB has the DeNB function as an SIB information element.

(1-1) Information is added as an information element of the SIB1. If the information is mapped to the SIB1, the following effects can be achieved. For example, in the LTE mobile communication system, the SIB1 can be received at an early stage of the search. As a specific example, the SIB1 can be received in Step ST1205 of FIG. 12. Thus, if the information indicative of whether the eNB has the DeNB function is mapped to the SIB1, a control delay can be prevented, leading to a reduction in power consumption.

(1-2) Information is added as an information element of the SIB2. If the information is mapped to the SIB2, the following effects can be achieved. It is aimed in the current 3GPP to map a radio resource configuration common to all user equipments being served by the RN is mapped to the SIB2. The addition of the information common to all RNs to the SIB2 including similar parameters allows similar parameters to be obtained through the reception of the same system information. This consequently prevents the mobile communication system from becoming complicated, preventing a control delay.

(1-3) Information is added as an information element of the SIB3. If the information is mapped to the SIB3, the following effects can be achieved. The 3GPP is currently aimed to map, to the SIB3, a configuration common to cell reselections. The addition of the information common to cell reselections to the SIB3 including similar parameters allows similar parameters to be obtained through the reception of the same system information. This consequently prevents the mobile communication system from becoming complicated, preventing a control delay.

The information indicative of whether the eNB has the DeNB function may be broadcast from only the eNB having the DeNB function. If this information is not broadcast, the eNB is judged to not have the DeNB function, without any problem. Also, the eNB that does not have the DeNB function does not require additional information.

(2) The cell identity to be allocated to the eNB that has the DeNB function and the cell identity to be allocated to the eNB that does not have the DeNB function are separated from each other. Of the cell identities, the RN can recognize the PCI at an early stage of the measurement performed by the RN. Specifically, the RN recognizes the synchronization codes individually corresponding to the PCIs using a primary synchronization signal (P-SS) and a secondary synchronization signal (S-SS) transmitted from a neighbor base station (see Step ST1201 of FIG. 12).

Thus, the range of PCIs to be allocated to the eNB that has the DeNB function and the range of PCIs to be allocated to the eNB that does not have the DeNB function may be separated from each other. The eNB broadcasts the method of separating cell identities or the method of separating PCI ranges. The RN judges whether the eNB has the DeNB function using the cell identity of the eNB or the PCI. Only the eNB that has the DeNB function may broadcast the method of separating cell identities or the method of separating PCI ranges. The eNB that does not have the DeNB function consequently does not require additional information.

(3) The carrier frequency for the eNB that has the DeNB function and the carrier frequency for the eNB that does not have the DeNB function are separated from each other. The eNB broadcasts the frequency separation method. The RN judges whether the eNB has the DeNB function using the carrier frequency of the eNB. Only the eNB that has the DeNB function may broadcast the frequency separation method. The eNB that does not have the DeNB function consequently does not require additional information.

The following four (1) to (4) will be disclosed as specific examples of the method in which the RN notifies the source eNB of the judgment results as to whether the eNB has the DeNB function.

(1) The RN eliminates the eNBs that do not have the DeNB function from the measurement objects. In other words, the RN does not measure the eNB that does not have the DeNB function. That is, the RN notifies the source DeNB of the eNB that has the DeNB function as a candidate for the target eNB. The source DeNB judges that all the eNBs of the measurement report object notified from the RN have the DeNB function.

(2) The RN eliminates the eNBs that do not have the DeNB function from the targets for the measurement report. In other words, the RN does not issue, to the source DeNB, a measurement report of the eNB that does not have the DeNB function. That is, the RN notifies the source DeNB of the eNB that has the DeNB function as a candidate for target eNB. The source DeNB judges that all the eNBs of the measurement report object notified from the RN have the DeNB function.

(3) The RN also notifies, when issuing a measurement report, whether the target eNB has the DeNB function. The indicator as to whether the target eNB has the DeNB function may be added as the information element of the measurement report. The source DeNB judges whether the target eNB in the measurement report has the DeNB function using the indicator as to whether the target eNB has the DeNB function.

(4) The RN issues, to the source DeNB, a measurement report targeted for the eNB that has the best reception quality among the eNBs that have the DeNB function. In other words, the RN notifies the source DeNB of the eNB that has the DeNB function as a target eNB. The source DeNB judges that the eNB of the measurement report object notified from the RN has the DeNB function.

The DeNB may select, for the RN, any method to be used from the methods (1) to (4) in which the RN notifies the source eNB of the judgment results as to whether the eNB has the DeNB function. The following three (1) to (3) will be described as specific examples of the method in which the DeNB notifies the RN of the selected method.

(1) The selected method is notified using the S1 interface through S1 signaling.

(2) When notifying measurement control, the selected method is also notified. As an information element of the measurement control, an indicator may be added which indicates the selected method of notifying the source eNB of the judgment results by the RN as to whether the eNB has the DeNB function.

(3) As the broadcast information, the method in which the RN notifies the source eNB of the judgment results as to whether the eNB has the DeNB function.

Specific example of the method in which a source DeNB judges whether an entity being a handover object is the RN are similar to those of the first modification of the first embodiment described above, which will not be described here.

The operation will be described next. If the handover of the mobile RN is supported by the conventional UE handover procedure, the sequence in which the operations of the UE described in FIGS. 16 and 17 are replaced by the operations of the RN is obtained.

Figure 22:
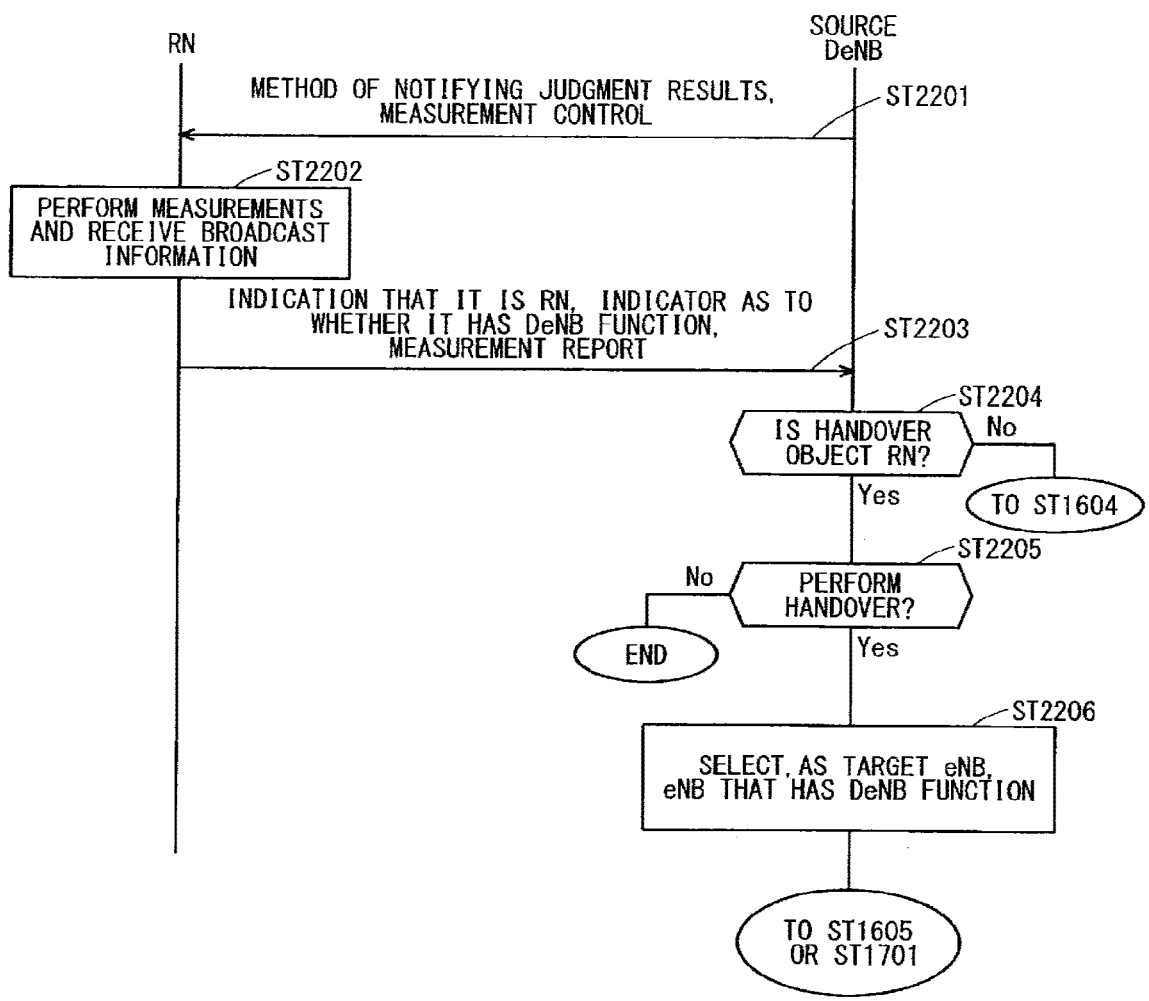
FIG. 22 shows an exemplary sequence of a mobile communication system in a second modification of the first embodiment.

The sequence of a mobile communication system in the second modification of the first embodiment will be described with reference to FIG. 22. FIG. 22 shows part of the sequence of the overall handover. Specifically, FIG. 22 shows the portions of Steps ST1601 to ST1604 of FIGS. 16 and 17 in detail.

FIG. 22 shows an exemplary sequence of the mobile communication system in the second modification of the first embodiment. In Step ST2201, the source DeNB notifies the RN of measurement control. At the same time, the source DeNB instructs, to the RN, the method of notifying the source DeNB of the judgment results by the RN as to whether the eNB has the DeNB function. This operational example will be described assuming that the source DeNB has also instructed, when issuing a measurement report, the method of notifying whether a target eNB has the DeNB function.

In Step ST2202, the RN performs measurements in accordance with the measurement control received in Step ST2201. The RN receives and decodes the broadcast information of the eNB being a measurement object, and then confirms whether the eNB has DeNB function to be mapped to the broadcast information.

In Step ST2203, the RN notifies the source DeNB of the measurement report in accordance with the measurement control received in Step ST2201. At the same time, the RN notifies the source DeNB of the judgment results as to whether the eNB being a measurement report object has the DeNB function and that the entity being a handover object is the RN.

In Step ST2204, the source DeNB judges whether the entity being a handover object is the RN. In a case of having received the indication that the entity being a handover object is the RN from the RN together with the measurement report, the source DeNB judges that the entity being a handover object is the RN and then moves to Step ST2205. In a case of not having received, from the RN, the indication that the entity being a handover object is the RN together with the measurement report, the source DeNB judges that the entity being a handover object is not the RN and then moves to Step ST1604 of FIGS. 16 and 17.

In Step ST2205, the source DeNB judges whether to perform handover, specifically, whether to cause the RN to perform handover, based on the measurement report received in Step ST2203, and the like. In a case of judging to cause the RN to perform handover, in Step ST2206, the source DeNB determines a target eNB from the eNBs that have the DeNB function, based on the judgment results as to whether the eNB of the measurement report object has the DeNB function received in Step ST2203. In other words, the source DeNB selects the eNB that has the DeNB function as a target eNB.

When the target eNB is determined from the eNBs that have the DeNB function in Step ST2206, the source DeNB moves to Step ST1605 of FIG. 16 or Step ST1701 of FIG. 17.

The second modification of the first embodiment described above can achieve the following effects in addition to the effects of the first embodiment and the first modification of the first embodiment. The handover that is always rejected because the target eNB does not have the DeNB function can be prevented from being activated. This reduces the processing load as a mobile communication system and prevents a control delay.

Third Modification of First Embodiment

A third modification of the first embodiment will disclose another solution to the same problem as that of the second modification of the first embodiment described above. The solution in the third modification of the first embodiment will be described below.

The source DeNB judges whether a neighbor eNB has the DeNB function. If the entity being a handover object is the RN, the source DeNB may select the eNB that has the DeNB function as a target eNB. In other words, the source DeNB does not select the eNB that does not have the DeNB function as a target eNB.

The following three (1) to (3) will be disclosed as specific examples of the method in which the source DeNB judges whether a neighbor eNB has the DeNB function.

(1) The source DeNB obtains, in setup as a base station, the information as to whether a neighbor cell has the DeNB function as a part of the neighbor cell information from an OAM or separately from the neighbor cell information.

The eNB that has the DeNB function alone may obtain the information as to whether a neighbor cell has the DeNB function. This leads to such an effect that the eNB that does not have the DeNB function requires no additional function.

The following three (1-1) to (1-3) will be disclosed as specific examples of the information as to whether a neighbor cell has the DeNB function.

(1-1) Information as to whether a neighbor eNB has the DeNB function in association with a cell identity of this eNB.

(1-2) Information on a range of PCIs to be allocated to an eNB that has the DeNB function.

(1-3) Information on a carrier frequency to be used by an eNB that has the DeNB function.

The information as to whether a neighbor cell has the DeNB function may be changed due to new installation of an eNB that has the DeNB function, removal of an eNB that has the DeNB function, or other cause.

The following will be disclosed as a specific example of the method in which a possibility that the information as to whether a neighbor cell has the DeNB function will be changed is taken into consideration.

If the information as to whether a neighbor cell has the DeNB function is changed, the OAM notifies the source DeNB.

(2) As in the second modification of the first embodiment, when the information indicative of whether an eNB has the DeNB function is broadcast, the source DeNB receives and decodes the broadcast information of a neighbor eNB, and confirms the information indicative of whether an eNB has the DeNB function that is to be mapped to the broadcast information. The source DeNB stores whether an eNB has the DeNB function in association with a cell identity of this eNB.

The information as to whether a neighbor cell has the DeNB function may be changed due to new installation of an eNB that has the DeNB function, removal of an eNB that has the DeNB function, or other cause.

The following will be disclosed as a specific example of the method in which a possibility that the information as to whether a neighbor cell has the DeNB function will be changed is taken into consideration.

The source DeNB periodically receives and decodes the broadcast information of a neighbor eNB, and confirms the information indicative of whether an eNB has the DeNB function to be mapped to the broadcast information.

(3) The DeNB inquires the MME or the OAM for RN of the information as to whether a neighbor cell has the DeNB function, as a part of the neighbor cell information or separately from the neighbor cell information, and then obtains that information. The following three (3-1) to (3-3) will be disclosed as specific examples of the trigger for a DeNB to make an inquiry.

(3-1) A case where the first access is received from the RN, an example of which is a case where an RRC connection request is received from the RN. A specific example of the method according to the first embodiment in which a target eNB judges whether access is made from the RN can be used as the method of judging whether access is made from the RN.

(3-2) A case where a measurement report being one of the triggers of a handover process is received from the RN.

(3-3) A case where a DeNB notifies the RN of measurement control.

The information as to whether a neighbor cell has the DeNB function may be changed due to new installation of an eNB that has the DeNB function, removal of an eNB that has the DeNB function, or other cause.

The following will be disclosed as a specific example of the method in which a possibility that the information as to whether a neighbor cell has the DeNB function will be changed is taken into consideration.

The source DeNB periodically obtains, from the MME or the OAM, the information as to whether a neighbor cell has the DeNB function, as part of the neighbor cell information or separately from the neighbor cell information.

Specific examples of the method in which a source DeNB judges whether the entity being a handover object is the RN are similar to those of the first modification of the first embodiment, which will not be described here.

The following two (1) and (2) will be disclosed as specific examples of the method in which the source DeNB selects an eNB that has the DeNB function as a target eNB.

(1) A method in which a judgment is made by a source DeNB. When receiving a measurement report from the RN, the source DeNB judges whether an eNB of the measurement report object has the DeNB function, based on a cell identity included in the measurement report. The source DeNB selects an eNB that has the DeNB function as a target eNB.

(2) A method in which a source DeNB provides an instruction. The source DeNB notifies the RN that an eNB having the DeNB function is taken as a measurement object. The source DeNB selects a target eNB from eNBs of the measurement report objects from the RN. The measurement object for the RN is an eNB that has the DeNB function, and thus, it suffices that the source DeNB selects a target eNB from eNBs of the measurement report objects. The following two (2-1) and (2-2) will be disclosed as specific examples of the method of notifying that an eNB is a measurement object.

(2-1) The source DeNB maps, to the broadcast information, the information as to whether a neighbor eNB has the DeNB function. The information may be mapped to the broadcast information as a neighbor cell list, neighbor cell information, or a neighbor cell configuration. The RN receives and decodes the broadcast information, and then takes an eNB that has the DeNB function as a measurement object.

It suffices to separate the neighbor cell information for RN from the normal neighbor cell information. This is because the entity except for the RN, namely the UE can receive services from an eNB that does not have the DeNB function and thus needs not to recognize an eNB that does not have the DeNB function.

The following two (2-1-1) and (2-1-2) will be disclosed as specific examples of the information as to whether an eNB has the DeNB function.

(2-1-1) A cell identity of a neighbor eNB that has the DeNB function is notified. A range of PCIs to be allocated to an eNB that has the DeNB function may be notified. The cell identity of the neighbor eNB and the indicator as to whether this eNB has the DeNB function may be associated with each other and then be notified.

(2-1-2) A carrier frequency of an eNB having the DeNB function is notified.

(2-2) The source DeNB designates an eNB that has the DeNB function as a measurement object in measurement control for the RN. The following two (2-2-1) and (2-2-2) will be disclosed as specific examples of the designation method.

(2-2-1) The source DeNB designates an eNB by a cell identity of the eNB that has the DeNB function. An eNB may be designated within a cell identity range of the eNB that has the DeNB function or may be designated within a range of PCIs to be allocated to the eNB that has the DeNB function.

(2-2-2) The source DeNB notifies a carrier frequency of an eNB that has the DeNB function.

The operation will be described next. If the handover of a mobile RN is supported by the conventional UE handover procedure, the sequence in which the operations of the UE shown in FIGS. 16 and 17 are replaced with the operations of the RN is obtained.

Figure 23:
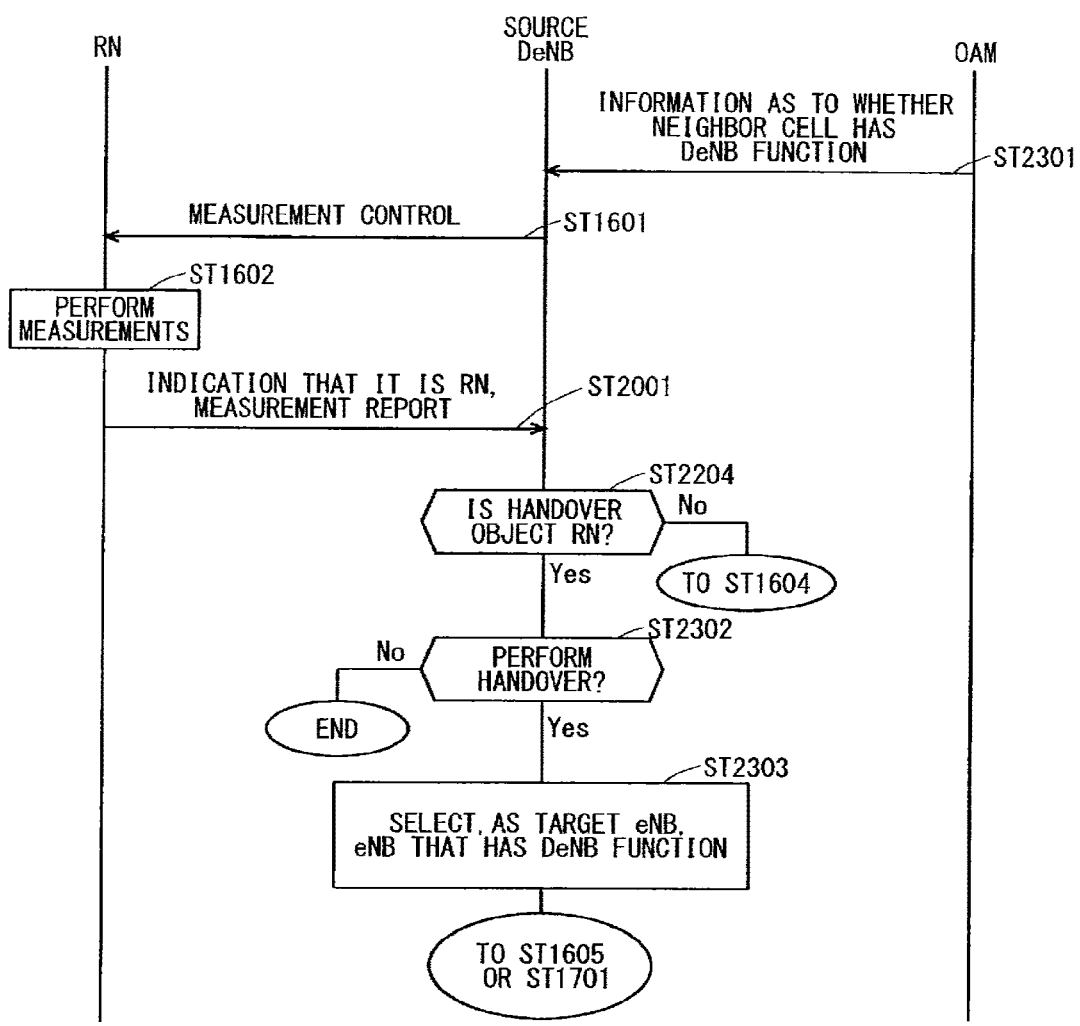
FIG. 23 shows an exemplary sequence of a mobile communication system in a third modification of the first embodiment.

The sequence of the mobile communication system in the third modification of the first embodiment will be described with reference to FIGS. 23 and 24. FIGS. 23 and 24 show part of the sequence of the overall handover.

FIG. 23 shows an exemplary sequence of the mobile communication system in the third modification of the first embodiment. FIG. 23 shows the sequence in a case where the method in which the source DeNB makes a judgment is used as the method in which the source DeNB selects an eNB having the DeNB function as a target eNB.

In Step ST2301, the OAM notifies the source DeNB of the information as to whether a neighbor cell has the DeNB function. In setup, the source DeNB obtains the information as to whether a neighbor cell has the DeNB function from the OAM in Step ST2301.

In Step ST1601, the source DeNB being a handover source notifies the UE of measurement control.

In Step ST1602, the UE performs measurements in accordance with the measurement control received in Step ST1601.

In Step ST2001, the RN notifies the source DeNB of a measurement report and that the entity being a handover object is the RN.

In Step ST2204, the source DeNB judges whether the entity being a handover object is the RN. In a case of having received the indication that the entity being a handover object is the RN together with the measurement report from the UE, the source DeNB judges that the entity being a handover object is the RN and then moves to Step ST2302. In a case of not having received, from the RN, the indication that the entity being a handover object is the RN together with the measurement report, the source DeNB judges that the entity being a handover object is not the RN and then moves to Step ST1604 of FIGS. 16 and 17.

In Step ST2302, the source DeNB judges whether to perform handover, specifically, to cause the RN to perform handover based on the measurement report received in Step ST2001, and the like. In a case of judging to cause the RN to perform handover, in Step ST2303, the source DeNB determines a target eNB from the eNBs that have the DeNB function based on the information as to whether the neighbor cell has the DeNB function obtained in Step ST2301. In other words, the source DeNB selects the eNB having the DeNB function as a target eNB.

When determining a target eNB from the eNBs that have the DeNB function in Step ST2303, the source DeNB moves to Step ST1605 of FIG. 16 or Step ST1701 of FIG. 17.

FIG. 24 shows an exemplary sequence of the mobile communication system in the third modification of the first embodiment. FIG. 24 shows the sequence in a case where the method in which designation is made by the source DeNB is used as the method in which the source DeNB selects the eNB that has the DeNB function as a target eNB.

In Step ST2301, the OAM notifies the source DeNB of the information as to whether a neighbor cell has the DeNB function. In setup, the source DeNB obtains the information as to whether a neighbor cell has the DeNB function from the OAM in Step ST2301.

In Step ST2401, the source DeNB notifies the RN of measurement control for instructing the RN to take an eNB that has the DeNB function as a measurement target based on the information as to whether a neighbor cell has the DeNB function, which has been obtained in Step ST2301.

In Step ST2402, the RN performs measurements targeted for an eNB having the DeNB function as a measurement object, in accordance with the measurement control received in Step ST2401.

In Step ST1603, the RN notifies the source DeNB of a measurement report in accordance with the measurement control received in Step ST2401. The source DeNB that has received the measurement report in Step ST1603 moves to Step ST1604 of FIGS. 16 and 17.

The third modification of the first embodiment described above can achieve effects similar to those of the second modification of the first embodiment.

Fourth Modification of First Embodiment

Non-Patent Documents 1 to 9 and References 1 to 3 above do not disclose details of the list of DeNB cells.

The following two (1) and (2) will be disclosed as specific examples of for which RN the list of DeNB cells is provided.

(1) The list of DeNB cells targeted for all RNs is provided. The list of DeNB cells targeted for all RNs will be referred to as a "list of DeNB cells for all RNs" in the following description. In other words, the list of DeNB cells for all RNs is a list of eNBs that have the DeNB function. Alternatively, the list of DeNB cells for all RNs may be the list of part of the eNBs that have the DeNB function. An eNB that has the function of a DeNB in the neighborhood of the source DeNB will be a specific example of part of the eNBs. The "list of DeNB cells for all RNs" may be provided every different radio access technology (RAT). The "list of DeNB cells for all RNs" may be provided per carrier frequency.

If the list of DeNB cells for all RNs is provided, as described below, the first embodiment to the third modification of the first embodiment can be used, leading to simplification of the RN handover process. Also, access control becomes easier as described below.

(2) A list of DeNB cells targeted for each RN or RN group is provided. In the following description, the list of DeNB cells targeted for each RN or RN group will be referred to as a "list of DeNB cells per RN". This allows for setting of DeNBs connectable per RN or RN group. A "list of DeNB cells per RN" may be provided every different radio access technology (RAT). A "list of DeNB cells per RN" may be provided per carrier frequency.

The list of DeNB cells per RN allows for higher consistency with a service request. For example, the DeNBs connectable with an RN installed on the Tokaido Shinkansen and an RN installed on the Tohoku Shinkansen can be set independently of each other with the use of the list of DeNB cells per RN.

A list merely referred to as a list of DeNB cells in the following description shows that there is no distinction between the list of DeNB cells for all RNs and the list of DeNB cells per RN.

The problem to be solved in a fourth modification of the first embodiment will be described below. If a list of DeNB cells per RN is provided in the mobile communication system, the following problem arises. The first embodiment to the third modification of the first embodiment, in which the judgment as to whether an eNB has the DeNB function is used, cannot be used as part of the solution. This is because the list of DeNB cells per RN is obtained by selecting and listing DeNBs from the DeNBs that have the DeNB function mainly in terms of service per RN or RN group, and thus, an eNB that has the DeNB function cannot always provide services to a target RN. In other words, in a mobile communication system, the problem of the first embodiment arises again if a list of DeNB cells per RN is provided.

Note that the solutions of the first embodiment to the third modification of the first embodiment can be used through improvements as described below also in a case where a "list of DeNB cells per RN" targeted for each RN group is provided.

The RNs registered with the same RN group can access the DeNBs belonging to the same RN group. In other words, the RN that has not been registered with the RN group same as that of the DeNB fails to access the DeNBs. An RN group may be merely referred to as a group in the following description.

An improvement is made in the first embodiment as described below. When the RN accesses a target eNB that does not have the DeNB function or when the RN accesses a DeNB that does not belong to the same group, the target eNB rejects the RN.

The following is added as the method of judging whether to reject the access from the RN to the target eNB. For the access from the RN, if the target eNB itself does not belong to the group same as that of the RN, the target eNB judges to reject this access.

The following two (1) and (2) will be disclosed as specific examples of the method in which a target eNB judges a group to which the RN belongs.

(1) The RN notifies the target eNB of an identity of a group to which the own RN belongs, during RRC connection establishment. This may be notified together with the RN indication. The RN may notify the target eNB of the identity of a group to which the own RN belongs through the attach process.

(2) The RN notifies the target eNB of the identity of a group to which the own RN belongs, together with an RRC connection request. The identity of a group to which the own RN belongs may be added as an information element of the RRC connection request.

The target eNB notifies an RN that does not belong to the group same as the group to which itself belongs of an RRC connection reject.

If rejecting the access from the RN, the target eNB may add the reason therefor to a rejection notification for the RN.

Specifically, the target eNB adds the reason that the rejection has been made because the target eNB does not belong to the same group. The addition of the reason for rejection to a rejection notification in this manner allows the RN to recognize the reason for access rejection. The following effects can be achieved when the RN obtains the reason for access rejection. In a case where a rejection has been made because the target eNB does not belong to the same group, the RN can recognize that it may be supported as an RN through reselection of other cell.

The first modification of the first embodiment is improved as follows. The target eNB stops the handover activated by the source DeNB if the own device does not have the DeNB function or if access is made from an RN that does not belong to the group same as that of the own device. The source eNB may notify, in activating handover, the target eNB that the entity being a handover object is the RN and notify the identity of the group to which the RN belongs.

The following two (1) and (2) will be disclosed as specific examples of the method in which a source DeNB judges a group of the RN being a handover object.

(1) The RN transmits, to the DeNB, the identity of a group to which the own RN belongs during RRC connection establishment in the attach process as an RN. The DeNB associates the identity of the group to which the RN belongs with the identity of the cell and stores them.

(2) The RN also notifies, when notifying the source DeNB of a measurement report, the identity of the group to which the own RN belongs. The identity of the group to which the own RN belongs may be added as an information element of the measurement report.

The following two (1) and (2) will be disclosed as specific examples of the method in which the source DeNB notifies, when activating handover, the target eNB of the identity of the group to which the RN belongs.

(1) In a case where the handover procedure based on an X2 interface is used, the source DeNB also notifies the target eNB of the identity of the group to which the RN belongs. The source DeNB may add the identity of the group to which the RN belongs as an information element of the request of handover.

(2) In a case where the handover procedure based on an S1 interface is used, the source DeNB also notifies, when issuing a request of handover to the source MME, the identity of the group to which the RN belongs. The source DeNB may add the identity of the group to which the RN belongs, as an information element of a request of handover.

The second modification of the first embodiment is improved as follows. The RN judges whether an eNB has the DeNB function and whether it belongs to the group same as that of the DeNB. If the entity being a handover object is the RN, the source DeNB may select an eNB that has the DeNB function and belongs to the same group, using the judgment results as to whether the eNB has the DeNB function and the judgment results as to whether the RN belongs to the same group as that of the DeNB, the judgment results being made by the RN. In other words, the source DeNB does not select, as a target eNB, an eNB that does not have the DeNB function or an eNB that does not belong to the same group.

The following will be disclosed as a specific example of the method in which an RN judges whether an eNB belongs to the group same as that of the own RN.

The eNB broadcasts the identity of a group to which it belongs. The RN receives the broadcast information of the eNB, and then judges whether the eNB belongs to the group same as that of the own RN based on the received broadcast information. A specific example of the method of broadcasting the identity of a group to which the eNB belongs is similar to the specific example of the method of broadcasting the information indicative of whether the eNB has the DeNB function in the second modification of the first embodiment, which will not be described here.

The following four (1) to (4) will be disclosed as specific examples of the method in which an RN notifies a source eNB of the judgment results as to whether an eNB belongs to the same group as that of the own RN.

(1) The RN eliminates an eNB that does not belong to the group same as that of the own RN from measurement objects. In other words, the RN does not measure an eNB that does not belong to the group same as that of the own RN. That is, the RN notifies the source DeNB of eNBs that belong to the group same as that of the own RN, as candidates for the target eNB. The source DeNB judges that all the eNBs of the measurement report objects notified from the RN belong to the group same as that of the RN.

(2) The RN eliminates an eNB that does not belong to the group same as that of the own RN from measurement report objects. In other words, the RN does not issue, to the source DeNB, a measurement report for an eNB that does not belong to the group same as that of the own RN. That is, the RN notifies the source DeNB of eNBs that belong to the group same as that of the own RN as candidates for a target eNB. The source DeNB judges that all the eNBs of the measurement report objects notified from the RN belong to the group same as that of the own RN.

(3) The RN also notifies, in issuing a measurement report, whether a target eNB belongs to the group same as that of the own RN. An indicator as to whether a target eNB belongs to the group same as that of the own RN may be added as an information element of a measurement report. The source DeNB judges whether an eNB of the measurement report object belongs to the group same as that of the RN, using an indicator as to whether the source DeNB belongs to the group same as that of the RN.

(4) The RN issues, to the source DeNB, a measurement report targeted for an eNB having the best reception quality among the eNBs belonging to the group same as that of the own RN. In other words, the RN notifies the source DeNB of an eNB belonging to the group same as that of the own RN as a target eNB. The source DeNB judges that an eNB of the measurement report object notified from the RN belongs to the group same as that of the own RN.

The DeNB may select, for the RN, any method to be used from the methods (1) to (4) in which the RN notifies the source eNB of the judgment results as to whether the eNB belongs to the group same as that of the own RN. Specific examples of the method in which a DeNB notifies an RN of the selected method are similar to those of the second modification of the first embodiment, which will not be described here.

The third modification of the first embodiment is improved as follows. The source DeNB judges whether a neighbor eNB has the DeNB function and recognizes a group to which the neighbor eNB belongs.

If the entity being a handover object is the RN, the source DeNB may select an eNB that has the DeNB function as a target eNB and select an eNB that belongs to the group same as that of the RN as a target eNB. In other words, the source DeNB does not select, as a target eNB, an eNB that does not have the DeNB function or an eNB that does not belong to the same group.

The following three (1) to (3) will be disclosed as specific examples of the method in which a source DeNB recognizes a group to which a neighbor eNB belongs.

(1) The source DeNB obtains, in setup as a base station, the identity of a group to which a neighbor cell belongs from the OAM as part of the neighbor cell information or separately from the neighbor cell information.

(2) If the identity of the group to which an eNB belongs is broadcast as in the second modification of the first embodiment, the source DeNB receives and decodes the broadcast information of the neighbor eNB, and then confirms the identity of a group to which an eNB belongs, the identity being mapped to the broadcast information. The source DeNB stores the identity of a group to which the eNB belongs by associating it with the cell identity of the neighbor eNB.

(3) The DeNB inquires the MME or the OAM for RN of the identity of a group to which a neighbor cell belongs and obtains it as part of the neighbor cell information or separately from the neighbor cell information. The trigger for causing the DeNB to make an inquiry is similar to that of the third modification of the first embodiment, which will not be described here.

The following two (1) and (2) will be disclosed as specific examples of the method in which a source DeNB selects an eNB that belongs to the group same as that of the RN as a target eNB.

(1) A method in which the source DeNB makes a judgment. In a case of receiving a measurement report from the RN, the source DeNB judges whether an eNB of a measurement report object is an eNB that belongs to the group same as that of the RN, based on a cell identity included in the measurement report. The source DeNB selects the eNB that belongs to the group same as that of the RN as a target eNB.

(2) A method in which a source DeNB provides an instruction. The source DeNB notifies the RN that an eNB belonging to the group same as that of the RN is taken as a measurement object. The source DeNB selects a target eNB from the eNBs of measurement report objects from the RN. The measurement object of the RN is an eNB belonging to the group same as that of the RN, whereby it suffices that the source DeNB selects a target eNB from the eNBs of the measurement report objects. The following will be disclosed as a specific example of the method of notifying that an eNB is taken as a measurement object.

The source DeNB maps, to the broadcast information, the identity of a group to which the neighbor eNB belongs. The source DeNB may map a neighbor cell list, neighbor cell information, or a neighbor cell configuration to the broadcast information. The RN receives and decodes the broadcast information and takes an eNB belonging to the group same as that of the RN as a measurement object.

Meanwhile, if a list of DeNB cells for all RNs is provided in a mobile communication system, the first embodiment to the third modification of the first embodiment can be used in the RN handover process.

The solution in the fourth modification of the first embodiment will be described below. The solution in this modification is applicable not only to a case in which a list of DeNB cells per RN is provided but also to a case in which a list of DeNB cells for all RNs is provided. A "list of DeNB cells" is used in the description of this modification.

The RN judges whether an eNB is included in the list of DeNB cells. If the entity being a handover object is the RN, the source DeNB may select an eNB included in the list of DeNB cells as a target eNB, using the judgment results by the RN as to whether the eNB has the DeNB function. In other words, the source DeNB does not select, as a target eNB, an eNB that is not included in the list of DeNB cells.

A specific example of the method in which an RN judges whether an eNB is included in the list of DeNB cells will be disclosed below. The RN judges whether an eNB is included in the list of DeNB cells using the list of DeNB cells obtained from the OAM for RN in setup, namely in Phase I.

The following four (1) to (4) will be disclosed as specific examples of the method in which an RN notifies the source eNB of the judgment results as to whether an eNB is included in the list of DeNB cells.

(1) The RN eliminates an eNB that is not included in the list of DeNB cells from measurement objects. In other words, the RN does not measure an eNB that is not included in the list of DeNB cells. That is, the RN notifies the source DeNB of eNBs included in the list of DeNB cells as candidates for a target eNB. The source DeNB judges that all the eNBs of the measurement report objects notified from the RN are included in the list of DeNB cells.

(2) The RN eliminates an eNB that is not included in the list of DeNB cells from measurement report objects. In other words, the RN does not issue, to the source DeNB, a measurement report of the eNB that is not included in the list of DeNB cells. That is, the RN notifies the source DeNB of eNBs included in the list of DeNB cells as candidates for the target eNB. The source DeNB judges that all the eNBs of the measurement report objects notified from the RN are included in the list of DeNB cells.

(3) The RN also notifies, in issuing a measurement report, whether a target eNB is included in the list of DeNB cells. An indicator as to whether a target eNB is included in the list of DeNB cells may be added as an information element of the measurement report. The source DeNB judges whether eNBs of measurement report objects are included in the list of DeNB cells using the indicator as to whether target eNBs are included in the list of DeNB cells.

(4) The RN issues, to the source DeNB, a measurement report for an eNB having the best reception quality among the eNBs included in the list of DeNB cells. In other words, the RN notifies the source DeNB of the eNB included in the list of DeNB cells as a target eNB. The source DeNB judges that the the eNB of the measurement report object notified from the RN is included in the list of DeNB cells.

The DeNB may select, for an RN, any method to be used from the methods (1) to (4) above in which an RN notifies a source eNB of the judgment results as to whether an eNB is included in the list of DeNB cells. The following three (1) to (3) will be disclosed as specific examples of the method in which a DeNB notifies an RN of the selected method.

(1) The DeNB notifies the selected method using an S1 interface through S1 signaling.

(2) The DeNB also notifies, in notifying a measurement control, the selected method. An indicator showing the selected method in which the RN notifies the source eNB of the judgment results as to whether an eNB is included in the list of DeNB cells may be added as an information element of the measurement control.

(3) The DeNB notifies the method in which an RN notifies the source eNB of the judgment results as to whether an eNB is included in the list of DeNB cells as the broadcast information.

Specific examples of the method in which a source DeNB judges whether the entity being a handover object is an RN are similar to those of the first modification of the first embodiment, which will not be described here.

The operation will be described next. If the handover of a mobile RN is supported by the conventional UE handover procedure, a sequence in which the operations of the UE shown in FIGS. 16 and 17 are replaced with the operations of the RN is obtained.

Figure 25:
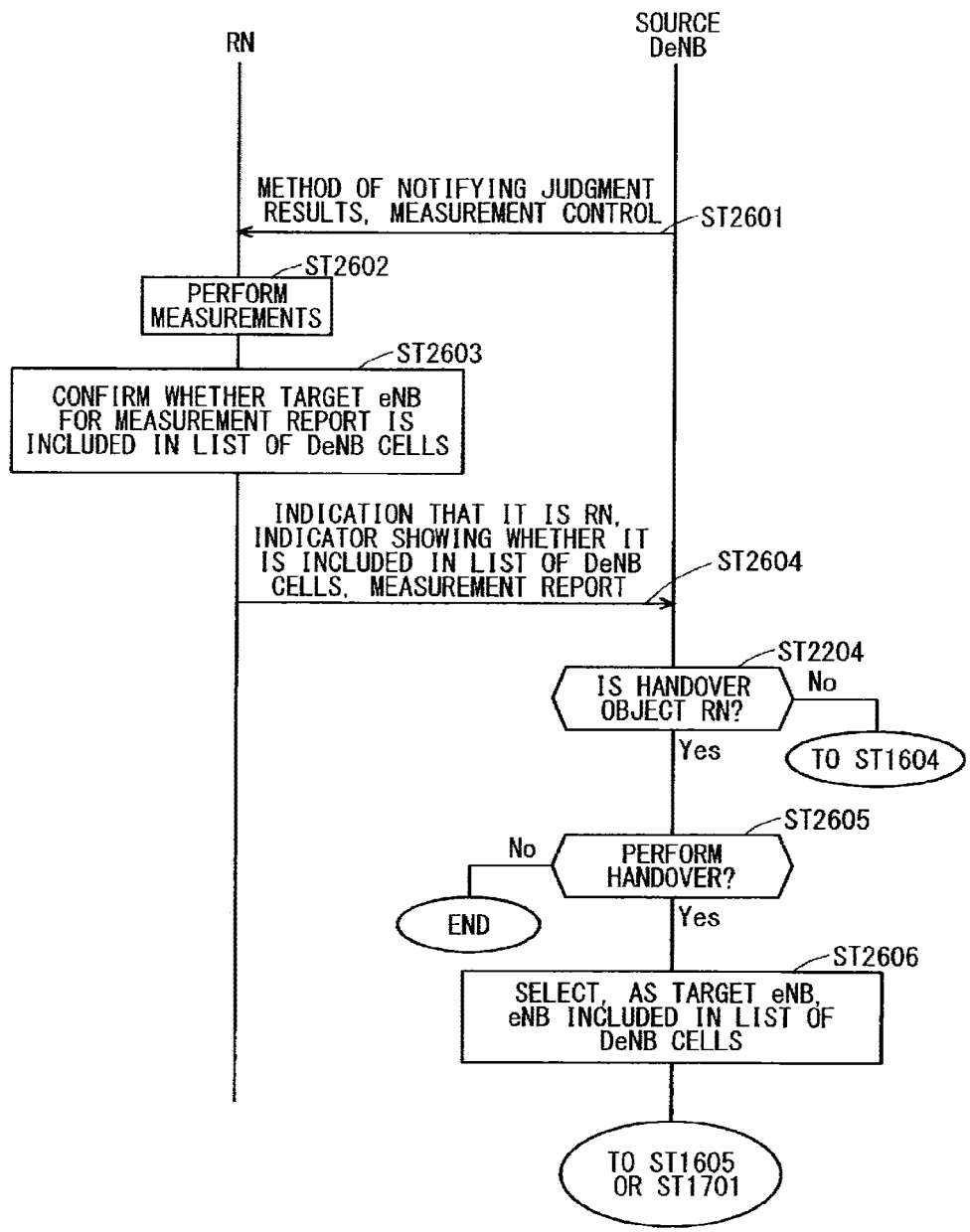
FIG. 25 shows an exemplary sequence of a mobile communication system in a fourth modification of the first embodiment.

A sequence of a mobile communication system in the fourth modification of the first embodiment will be described with reference to FIG. 25. FIG. 25 shows part of the sequence of the overall handover. Specifically, FIG. 25 shows the portions of Steps ST1601 to ST1604 of FIGS. 16 and 17 in detail.

FIG. 25 shows an exemplary sequence of the mobile communication system in the fourth modification of the first embodiment. In Step ST2601, the source DeNB notifies the RN of measurement control. At the same time, the source DeNB instruct to the RN, the method in which the RN notifies the judgment results as to whether an eNB is included in the list of DeNB cells. This operational example will be described below assuming that in issuing a measurement report, the source DeNB has instructed the method of notifying whether a target eNB is included in the list of DeNB cells.

In Step ST2602, the RN performs measurements in accordance with the measurement control received in Step ST2601.

In Step ST2603, the RN confirms whether an eNB of a measurement report object is included in the list of the DeNB cells obtained from the OAM for RN in setup. The RN may confirm whether an eNB of a measurement report object is included in the obtained list of DeNB cells, using the cell identity.

In Step ST2604, the RN notifies the source DeNB of a measurement report in accordance with the measurement control received in Step ST2601. At the same time, the RN notifies the source DeNB of the judgment results as to whether an eNB of a measurement report object is included in the list of DeNB cells and that the entity being a handover object is the RN.

In Step ST2204, the source DeNB judges whether the entity being a handover object is the RN. In a case of having received, from the RN, that the entity being a handover object is the RN together with the measurement report, the source DeNB judges that the entity being a handover object is the RN and moves to Step ST2605. In a case of not having received, from the RN, that the entity being a handover object is not the RN together with the measurement report, the source DeNB judges that the entity being a handover object is not the RN and then moves to Step ST1604 of FIGS. 16 and 17.

In Step ST2605, the source DeNB judges whether to perform handover, specifically, to cause the RN to perform handover, based on the measurement report received in Step ST2604, and the like. In a case of judging to cause the RN to perform handover, in Step ST2606, the source DeNB selects a target eNB from the eNBs included in the list of DeNB cells, based on the judgment results as to whether an eNB of a measurement report object is included in the list of DeNB cells, which have been received in Step ST2604. In other words, the source DeNB selects an eNB that has the DeNB function as a target eNB.

In Step ST2606, a target eNB is determined from the eNBs included in the list of DeNB cells, and then, the source DeNB moves to Step ST1605 of FIG. 16 or Step ST1701 of FIG. 17.

The fourth modification of the first embodiment described above can achieve the following effects. An eNB included in the list of DeNB cells can be selected as a target eNB even in a case of a "list of DeNB cells for all RNs" or a case of a "list of DeNB cells per RN". This allows for continued communication services to UEs being served by the RN. Also, the activation of handover, which is always rejected because a target eNB is not included in the list of DeNB cells, can be prevented. This results in a reduction in processing load as a mobile communication system, preventing a control delay.

Fifth Modification of First Embodiment

A fifth modification of the first embodiment will disclose another solution to the problem same as that of the fourth modification of the first embodiment described above. The solution in the fifth modification of the first embodiment will be described below. The solution in this modification is applicable not only to a case in which a list of DeNB cells per RN is provided but also to a case in which a list of DeNB cells for all RNs is provided. The "list of DeNB cells" is thus used in the description of this modification.

The source DeNB judges whether a neighbor eNB is included in the list of DeNB cells. In a case where the entity being a handover object is the RN, the source DeNB may select an eNB included in the list of DeNB cells as a target eNB. In other words, the source DeNB does not select an eNB that is not included in the list of DeNB cells as a target eNB.

The following two (1) and (2) will be disclosed as specific examples of the method in which the source DeNB judges whether a neighbor eNB is included in the list of DeNB cells.

(1) If the RN obtains a list of DeNB cells from the OAM for RN in setup, namely in Phase I, data in the list of DeNB cells is notified from the OAM for RN to the RN via the DeNB. When notifying the RN of the list of DeNB cells from the OAM, the DeNB stores this list of DeNB cells.

It suffices that in storing the list of DeNB cells, the DeNB associates the list of DeNB cells with the cell identity of the RN. For the DeNB to easily extract the list of DeNB cells from the initial configuration parameters, the list of DeNB cells may be mapped to the beginning or end of the initial configuration parameters. Or, an indicator showing an area to which the list of DeNB cells is mapped may be newly provided. Or, two destinations, the RN and DeNB, may be designated as the area to which the list of DeNB cells is mapped.

Only the eNB having the DeNB function may obtain the list of DeNB cells from the OAM for RN. The eNB that does not have the DeNB function needs no additional function.

(2) The DeNB inquires the MME or the OAM for RN of the list of DeNB cells of the RN being served thereby and obtains the list. The following three (2-1) to (2-3) will be disclosed as specific examples of the trigger for the DeNB to make an inquiry.

(2-1) A case where the DeNB receives the first access from the RN, an example of which is a case where the DeNB receives an RRC connection request from the RN. The specific examples of the method in which the target eNB judges whether the access is made from the RN according to the first embodiment can be used as the method of judging whether the access is made from the RN.

(2-2) A case in which the DeNB receives, from the RN, a measurement report being one of the triggers for the handover process.

(2-3) A case in which the DeNB notifies the RN of measurement control.

The specific examples of the method according to the first modification of the first embodiment in which the source DeNB judges whether the entity being a handover object is the RN can be used as the method of judging whether a measurement report is made from the RN.

A specific example of the method in which the source DeNB judges whether the entity being a handover object is the RN is similar to that of the first modification of the first embodiment, which will not be described here.

The following two (1) and (2) will be disclosed as specific examples of the method in which the source DeNB selects an eNB included in the list of DeNB cells as a target eNB.

(1) A method in which the source DeNB makes a judgment. In a case of receiving a measurement report from the RN, the source DeNB judges whether an eNB of a measurement report object is included in the list of DeNB cells, based on the cell identity included in the measurement report. The source DeNB selects, as a target eNB, the eNB included in the list of DeNB cells.

(2) A method in which the source DeNB provides an instruction. The source DeNB notifies the RN that an eNB included in the list of DeNB cells is taken as a measurement object. The source DeNB selects a target eNB from the eNBs of the measurement report object from the RN. The measurement object of the RN is the eNB included in the list of DeNB cells, and thus, the source DeNB may select a target eNB from the eNBs of the measurement report objects.

A specific example of the method of notifying that the eNB included in the list of DeNB cells is taken as a measurement object will be disclosed below. The source DeNB designates, for the RN, an eNB included in the list of DeNB cells as a measurement object in measurement control. As a specific example of the method of designating an eNB included in the list of DeNB cells, an eNB is designated by the cell identity of the eNB included in the list of DeNB cells.

The operation will be described next. If the handover of the mobile RN is supported by means of the conventional UE handover procedure, the sequence in which the operations of the UE shown in FIGS. 16 and 17 are replaced with the operations of the RN.

Figure 26:
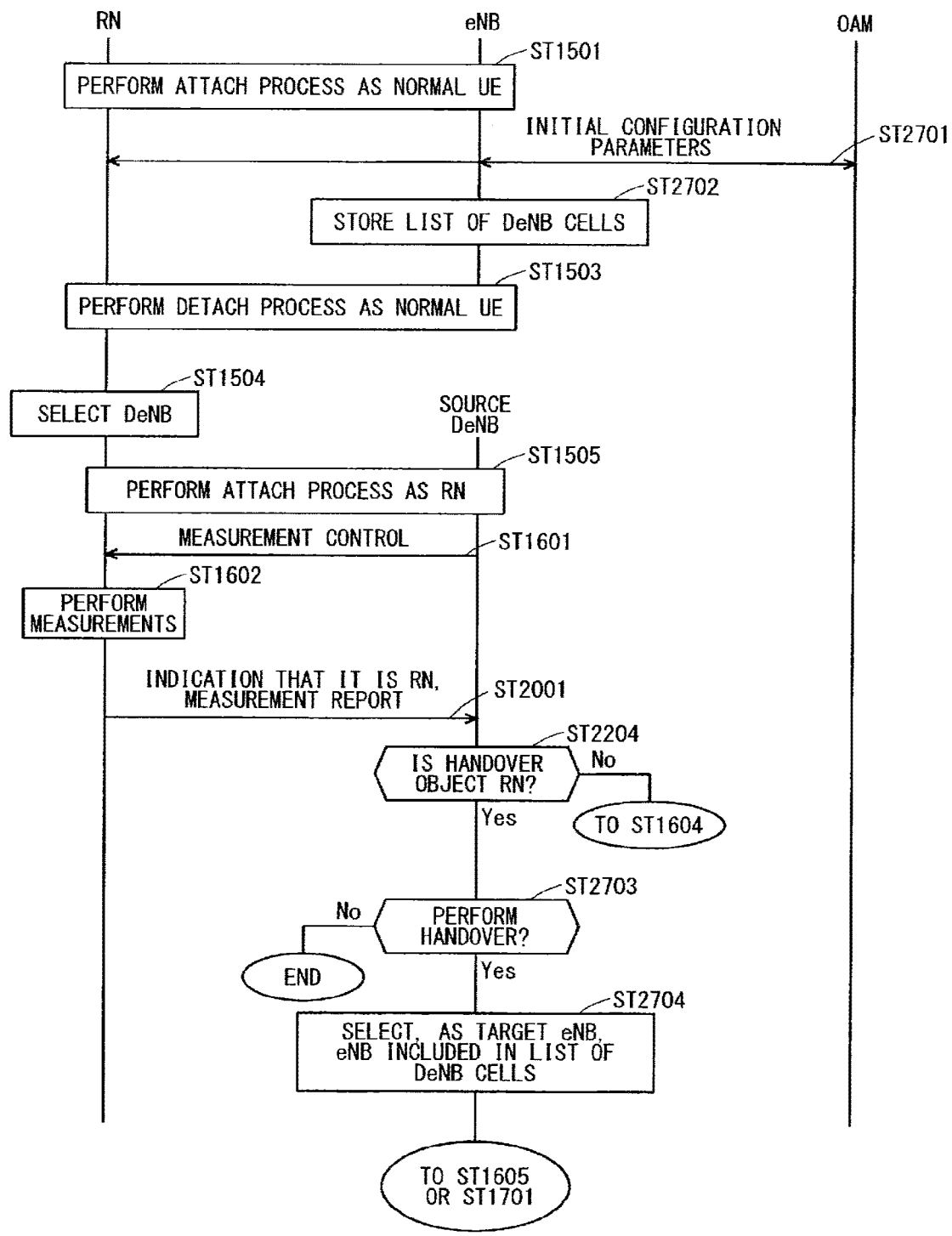
FIG. 26 shows an exemplary sequence of a mobile communication system in a fifth modification of the first embodiment.
Figure 27:
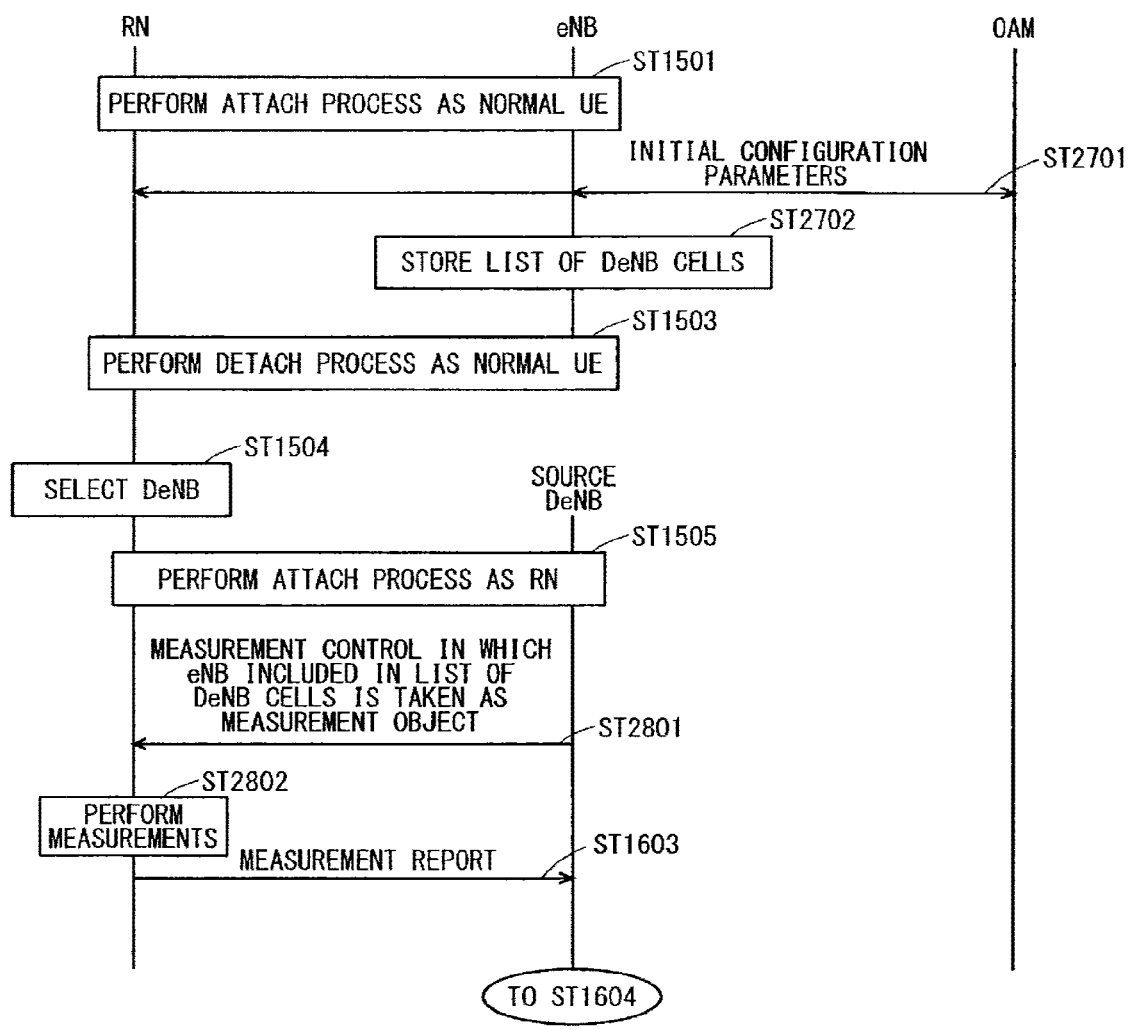
FIG. 27 shows another exemplary sequence of the mobile communication system in the fifth modification of the first embodiment.

The sequence of the mobile communication system in the fifth modification of the first embodiment will be described with reference to FIGS. 26 and 27. FIGS. 26 and 27 show part of the sequence of the overall handover.

FIG. 26 shows an exemplary sequence of the mobile communication system in the fifth modification of the first embodiment. FIG. 26 shows the sequence in a case where the method in which the source DeNB makes a judgment is used as the method in which the source DeNB selects an eNB included in the list of DeNB cells as a target eNB.

In Step ST1501, the RN performs an attach process as a normal UE for an initial configuration. As a specific example, the RN performs the attach process with the eNB.

In Step ST2701, the eNB receives initial configuration parameters including the list of DeNB cells, which are notified from the OAM for RN to the RN via the eNB in setup of the RN.

In Step ST2702, the eNB extracts the list of DeNB cells from the received initial configuration parameters, and then stores the extracted list of DeNB cells. The eNB may associate, in storing the list of DeNB cells, the list of DeNB cells with the cell identity of the RN.

In Step ST1503, the RN performs a detach process as a normal UE. The RN then activates Phase II of the RN startup procedure.

In Step ST1504, the RN selects a DeNB from the list of DeNB cells obtained in Phase I.

In Step ST1505, the RN performs an attach process as an RN. In Step ST1601, the source DeNB notifies the RN of measurement control.

In Step ST1602, the RN performs measurements in accordance with the measurement control received in Step ST1601.

In Step ST2001, the RN notifies the source DeNB of a measurement report and that the entity being a handover object is the RN.

In Step ST2204, the source DeNB judges whether the entity being a handover object is the RN. In a case of having received, from the RN, that the entity being a handover object is the RN together with the measurement report, the source DeNB judges that the entity being a handover object is the RN and then moves to Step ST2703. In a case of not having received, from the RN, that the entity being a handover object is the RN together with the measurement report, the source DeNB judges that the entity being a handover object is not the RN and then moves to Step ST1604 of FIGS. 16 and 17.

In Step ST2703, the source DeNB judges whether to perform handover, specifically, to cause the RN to perform handover, based on the measurement report received in Step ST2001, and the like. In a case of judging to cause the RN to perform handover, in Step ST2704, the source DeNB determines a target eNB from the eNBs included in the list of DeNB cells, based on the list of DeNB cells stored in Step ST2702. In other words, the source DeNB selects an eNB included in the list of DeNB cells as a target eNB.

When a target eNB is determined from the eNBs included in the list of DeNB cells in Step ST2704, the source DeNB moves to Step ST1605 of FIG. 16 or Step ST1701 of FIG. 17.

FIG. 27 shows an exemplary sequence of the mobile communication system in the fifth modification of the first embodiment. FIG. 27 shows the sequence in a case where the method in which the source DeNB provides an instruction is used as the method in which the source DeNB selects an eNB included in the list of DeNB cells as a target eNB.

In Step ST1501, the RN performs an attach process as a normal UE for an initial configuration. As a specific example, the RN performs the attach process with the eNB.

In Step ST2701, the eNB receives the initial configuration parameters including the list of DeNB cells, which are notified from the OAM for RN to the RN via the eNB in setup of the RN.

In Step ST2702, the eNB extracts the list of DeNB cells from the received initial configuration parameters and then stores the extracted list of DeNB cells.

In Step ST1503, the RN performs the detach process as a normal UE. The RN then activates Phase II of the RN startup procedure.

In Step ST1504, the RN selects a DeNB from the list of DeNB cells obtained in Phase I. In Step ST1505, the RN performs an attach process as an RN.

In Step ST2801, the source DeNB notifies, based on the list of DeNB cells stored in Step ST2702, the RN of measurement control for instructing that an eNB included in the list of DeNB cells is taken as a measurement object.

In Step ST2802, the RN measures an eNB included in the list of DeNB cells as a measurement object, in accordance with the measurement control received in Step ST2801.

In Step ST1603, the RN notifies the source DeNB of a measurement report in accordance with the measurement control received in Step ST2801. The source DeNB that has received the measurement report in Step ST1603 moves to Step ST1604 of FIGS. 16 and 17.

The fifth modification of the first embodiment can achieve effects similar to those of the fourth modification of the first embodiment.

Sixth Modification of First Embodiment

The problem to be solved in a sixth modification of the first embodiment will be described below. The following problem arises in a mobile communication system if a list of DeNB cells per RN or a list of DeNB cells for all RNs, which is a list of part of eNBs that have the DeNB function, is provided.

It is conceivable that when a mobile RN is configured, the RN will move outside the coverage of an eNB included in the list of DeNB cells that has been obtained from the OAM for RN in setup. The RN cannot recognize which eNB supports the RN as an RN at a moving destination. Thus, a suitable eNB cannot be selected as a DeNB, causing a problem that services to the UEs being served by the RN stop.

The following four (1) to (4) will be disclosed as the solutions in the sixth modification of the first embodiment.

(1) One type of list of DeNB cells, which is targeted for each RN, is provided for the whole PLMN. Alternatively, one type of list of DeNB cells, which is targeted for each RN group, is provided for the whole PLMN. One type of list of DeNB cells for all RNs, namely one type of list of eNBs that have the DeNB function is provided for the whole PLMN. One type of list of part of eNBs that have the DeNB function is provided for the whole PLMN. In other words, the list of DeNB cells covers the whole PLMN. Thus, if the RN moves, the RN will not be outside the coverage of the eNB included in the list of DeNB cells. Compared with the solution (2) described below, the solution (1) needs not to update the list of DeNB cells and thus can simplify the process of the mobile communication system.

(2) The list of DeNB cells is updated along with the RN moving. The following four (2-1) to (2-4) will be disclosed as specific examples of the method of updating a list of DeNB cells.

(2-1) The target eNB updates the list of DeNB cells. When the RN performs handover, the target eNB, namely the DeNB being a handover destination or MME notifies the RN of an eNB that has the DeNB function, located near the target eNB, as a new list of DeNB cells. The RN that has received the new list of DeNB cells updates the list of DeNB cells.

The target eNB may instruct to add or delete an eNB to or from the list of DeNB cells before handover. The specific examples of the method according to the third modification of the first embodiment in which the source DeNB judges whether a neighbor eNB has the DeNB function can be used as a specific example of the method in which the DeNB being a handover destination obtains an eNB that has the function of a neighbor DeNB.

At the same time, the target eNB may notify the MME and the OAM for RN of a new list of DeNB cells together with the cell identity of the RN to update the list of DeNB cells of the RN managed by the network.

(2-2) The RN updates the list of DeNB cells. The RN adds, to the list of DeNB cells, an eNB having the function of a neighbor DeNB that exhibits a good reception quality in measurement. Alternatively, an eNB that has the function of a neighbor DeNB having good reception quality may be replaced with an eNB in the list of DeNB cells that exhibits a poor reception quality. In replacement, a maximum number of eNBs to be included in the list of DeNB cells may be preliminarily determined or may be notified from the DeNB. Or, an eNB in the list of DeNB cells that exhibits a poor reception quality may be deleted from the list of DeNB cells.

As to whether a reception quality is good or poor, a threshold may be preliminarily provided or a threshold may be notified from the DeNB. The specific examples of the methods according to the second modification of the first embodiment in which the RN recognizes whether an eNB has the DeNB function can be used as a threshold notification method. The RN may notify the MME and the OAM for RN, via the DeNB, of a new list of DeNB cells together with a cell identity of the RN and update the list of DeNB cells of the RN managed by the network.

(2-3) The source DeNB notifies the list of DeNB cells. The source DeNB notifies, when notifying the RN of a message to which the parameters required for handover are mapped, the RN of a new list of DeNB cells together. The RN that has obtained the new list of DeNB cells updates the list of DeNB cells. Specific examples of the message for notifying a new list of DeNB cells include an RRC connection reconfiguration message and a handover command. The source eNB may notify the MME and the OAM for RN, via the DeNB, of a new list of DeNB cells together with the cell identity of the RN and update the list of DeNB cells of the RN managed by the network.

The following two (2-3-1) and (2-3-2) will be disclosed as specific examples of the method in which a source DeNB obtains a new list of DeNB cells optimum for a target eNB.

(2-3-1) If the handover procedure based on an X2 interface is used, the source DeNB obtains a new list of DeNB cells via the target eNB.

(2-3-2) If the handover procedure based on an S1 interface is used, the source DeNB obtains a new list of DeNB cells via the source MME and the target MME.

(2-4) The RN performs reattach to obtain a list of DeNB cells from the OAM for RN. If being instructed to perform handover from the source DeNB, the RN performs RRC connection with the target eNB and then activates RN setup. The RN then performs Phase I again, thereby obtaining a new list of DeNB cells via the target eNB.

If a target eNB cell is not included in a new list of DeNB cells, the RN stops the handover process and then returns to the source eNB. Alternatively, the RN searches for a neighbor cell and selects the other eNB as a DeNB. In a case of selecting other eNB as a DeNB, the RN may select it from the eNBs included in a new list of DeNB cells.

The following problem arises if the RN activates setup of the RN to perform Phase I again while keeping being RRC_CONNECTED with a UE being served by the RN.

FIG. 28 shows an architecture of a mobile communication system in a case where an RN is located being served by a DeNB.

An RN 1304 and a UE 2901 are located being served by a DeNB 1305. A UE 1303 is located being served by the RN 1304. The DeNB 1305 and the RN 1304 are connected by a downlink backhaul link (BL_DL) 2902 and an uplink backhaul link (BL_UL) 2903. The RN 1304 and the UE 1303 are connected by a downlink access link (AL_DL) 2904 and an uplink access link (AL_UL) 2905. The DeNB 1305 and the UE 2901 are connected by a normal downlink (Normal_DL) 2906 and a normal uplink (Normal_UL) 2907.

The method of using subframes in FDD in a case where the RN 1304 and the UE 2901 are located being served by the DeNB 1305 will be described with reference to FIGS. 29 and 30.

FIG. 29 shows the exemplary configurations of the downlink subframes in FDD in a case where the RN 1304 and the UE 2901 are located being served by the DeNB 1305. In FIG. 29, the subframes represented by reference numeral "3001" shows an exemplary configuration of the downlink subframes from the DeNB 1305 to the RN 1304 and UE 2901 being served thereby. The subframes represented by reference numeral "3002" show an exemplary configuration of the downlink subframes from the RN 1304 to the UE 1303 being served thereby.

FIG. 30 shows the exemplary configuration of the uplink subframes in FDD in a case where the RN 1304 and the UE 2901 are located being served by the DeNB 1305. In FIG. 30, the subframes represented by reference numeral "3003" show an exemplary configuration of the uplink subframes from the RN 1304 and UE 2901 being served by the DeNB 1305 to the DeNB 1305. The subframes represented by reference numeral "3004" show an exemplary configuration of the uplink subframes from the UE 1303 being served by the RN 1304 to the RN 1304.

The downlink 3001 shows downlinks from the DeNB 1305 to the RN 1304 or a downlink from the DeNB 1305 to the UE 2901. The downlink 3002 shows downlinks from the RN 1304 to the UE 1303.

The uplink 3003 shows uplinks from the RN 1304 or UE 2901 to the DeNB 1305. The uplink 3004 shows uplinks from the UE 1303 to the RN 1304.

Of the downlinks 3001, the downlink backhaul link (BL_DL) 2902 from the DeNB 1305 to the RN 1304 and the normal downlink (Normal_DL) 2906 from the DeNB 1305 to the UE 2901 are time-division multiplexed. As a specific example, the downlink backhaul link (BL_DL) 2902 uses subframe numbers #1 and #2, and the normal downlink (Normal_DL) 2906 uses subframe numbers #0 and #3 to #9.

Of the uplinks 3003, the uplink backhaul link (BL_UL) 2903 from the RN 1304 to the DeNB 1305 and the normal uplink (Normal_UL) 2907 from the UE 2901 to the DeNB 1305 are time-division multiplexed. As a specific example, the uplink backhaul link (BL_UL) 2903 uses subframe numbers #1, #2, #5, and #6, and the normal downlink (Normal_DL) 2906 uses subframe numbers #0, #3, #4, and #7 to #9.

As described above, in order to prevent the transmission by the RN from interfering the reception by the own RN in the RN, the downlink backhaul link (BL_DL) 2902 from the DeNB 1305 to the RN 1304 and the downlink access link (AL_DL) 2904 from the RN 1304 to the UE 1303 are time-division multiplexed. As a specific example, the downlink backhaul link (BL_DL) 2902 uses the subframe numbers #1 and #2 of the downlinks 3001, and the downlink access link (AL_DL) 2904 uses subframe numbers #0 and #3 to #9 of the downlinks 3002.

The uplink backhaul link (BL_UL) 2903 from the RN 1304 to the DeNB 1305 and the uplink access link (AL_UL) 2905 from the UE 1303 to the RN 1304 are time-division multiplexed. As a specific example, the uplink backhaul link (BL_UL) 2903 uses the subframe numbers #1, #2, #5, and #6 of the uplinks 3003, and the uplink access link (AL_UL) 2905 uses subframe numbers #0, #3, #4, and #7 to #9 of the uplinks 3004.

If no improvement is made, the RN is connected to the DeNB as a normal UE in setup. Thus, in downlink, the RN performs reception of the normal downlink (Normal_DL) 2906 for setup using the subframe number #0 of the downlinks 3001 and performs transmission of the downlink access link (AL_DL) 2904 for continuing connection with the UE 1303 being served thereby using the subframe number #0 of the downlinks 3002.

In downlink, consequently, the transmission by the RN interferes with the reception by the own RN in, for example, subframe number #0.

Similarly in uplink, the RN transmits the normal uplink (Normal_UL) 2907 for setup using the subframe number #0 of the uplinks 3003 and receives the uplink access link (AL_UL) 2905 using the subframe number #0 of the uplinks 3004 for continuing connection with the UE 1303 being served thereby.

In uplink, consequently, the transmission by the RN interferes with the reception by the own RN in, for example, the subframe number #0.

The following two (2-4-1) and (2-4-2) will be disclosed as solutions to the interference described above.

(2-4-1) The RN does not allocate resources to UEs being served thereby while performing reattach. A gap is provided. The RN does not allocate resources in the uplink access link (AL_UL) 2905 and the downlink access link (AL_DL) 2904.

This prevent occurrences of transmission and reception in the same subframe in the RN. Thus, the transmission by the RN can be prevented from interfering with the reception by the own RN. The RN may notify, in performing reattach, the UE being served thereby of a hold command indicating that resources are not allocated for a predetermined period. Or, the RN may notify only the UE being in connection therewith of a hold command. Specific examples of the predetermined period include a period in which the RN is performing reattach.

(2-4-2) The RN and the DeNB use resources for the backhaul links 2902 and 2903 in communication during reattach. This prevents occurrences of transmission and reception in the same subframe in the RN. Thus, the transmission by the RN can be prevented from interfering the reception by the own RN. It suffices that the RN notifies the DeNB of an indicator showing reattach. Alternatively, the RN may notify the DeNB of an indicator showing an attach process performed while the RN is being in connection with the UE being served thereby.

(2-5) The methods (2-1) to (2-4) described above need to update a list of DeNB cells every time the RN moves or performs handover, which causes a problem that the processing load of the mobile communication system increases. Thus, one type of list of DeNB cells is provided per RN for the MME. Or, one type of list of DeNBs cells is provided per RN group for the MME. One type of a list of part of eNBs that have the DeNB function is provided for the MME. In other words, a list of DeNB cells is provided per MME. This results in that the list of DeNB cells needs not to be updated unless the RN moves beyond a range managed by the MME.

If the RN moves beyond the range managed by the MME, the list of DeNB cells needs to be updated. The following two (2-5-1) and (2-5-2) will be disclosed as specific examples of the method of updating a list of DeNB cells in a case where the RN moves beyond the range managed by the MME.

(2-5-1) The source DeNB notifies a list of DeNB cells. The source DeNB obtains a new list of DeNB cells via a target MME. A specific example is similar to (2-3) above.

(2-5-2) The RN performs reattach and obtains a list of DeNB cells from the OAM for RN. The time when the RN needs reattach is unknown. The source DeNB may notify the RN that it needs reattach if the selected target eNB is a cell managed by the MME, which differs from the own cell. Specific examples of the message for notifying that the RN needs reattach include an RRC connection reconfiguration message and a handover command. A specific method is similar to (2-4) described above.

(3) The list of DeNB cells is used only in RN setup, that is, is used only in Phase II in setup. After setup, the list of DeNB cells is not used in selection of a DeNB cell or in judgment as to whether the RN is connectable.

(4) The list of DeNB cells is regularly or periodically updated. The following two (4-1) and (4-2) will be disclosed as specific examples of the update method.

(4-1) The source DeNB obtains, from the OAM, the list of DeNB cells of the RN being served thereby.

(4-2) The OAM notifies the source DeNB of the list of DeNB cells of the RN being served by the source DeNB.

The operation will be described next. A sequence of the mobile communication system in the sixth modification of the first embodiment will be described with reference to FIGS. 31 32, 33, and 34. FIGS. 31 to 34 show the part of the sequence of the overall handover, in which the list of DeNB cells is updated.

Figure 31:
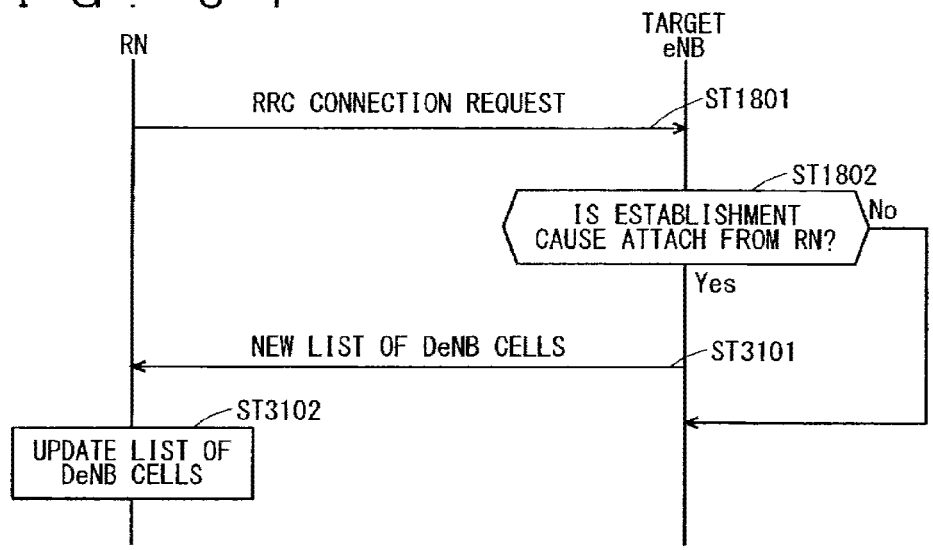
FIG. 31 shows an exemplary sequence of a mobile communication system in a sixth modification of the first embodiment.

FIG. 31 shows an exemplary sequence of the mobile communication system in the sixth modification of the first embodiment. FIG. 31 shows the sequence in a case where the target eNB updates the list of DeNB cells.

In Step ST1801, the RN notifies the target eNB of an RRC connection request. In this case, an establishment cause is an "attach from the RN".

In Step ST1802, the target eNB judges whether the access is made from the RN. Specifically, in Step ST1802, the target eNB judges whether the establishment cause in the RRC connection request received in Step ST1801 shows an "attach from the RN".

In a case of judging that the establishment cause shows an "attach from the RN" in Step ST1802, the target eNB judges that the access is made from the RN and then moves to Step ST3101. In a case of judging that the establishment cause does not show an "attach from the RN" in Step ST1802, the target eNB judges that the access is not made from the RN and does not perform Step ST3101.

In Step ST3101, the target eNB notifies the RN of a new list of DeNB cells.

In Step ST3102, the RN that has received the new list of DeNB cells in Step ST3101 updates the list of DeNB cells.

Figure 32:
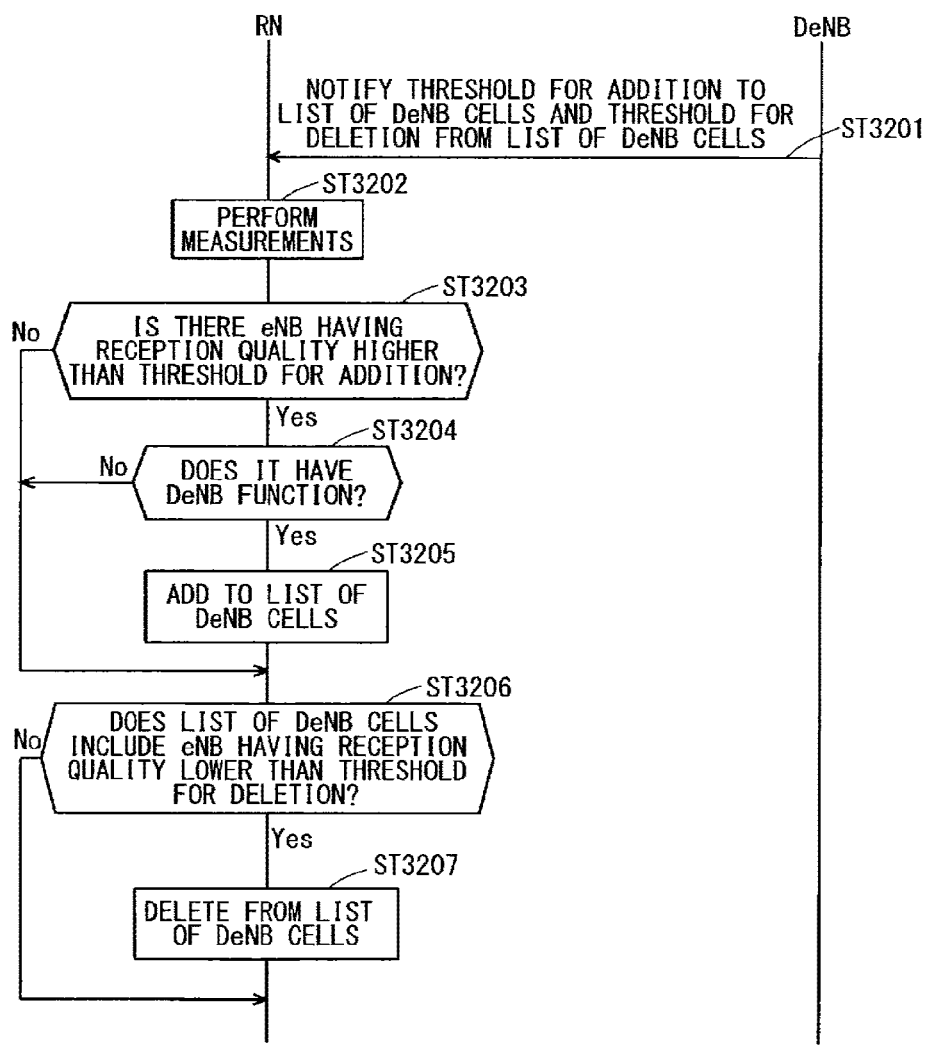
FIG. 32 shows an exemplary sequence of the mobile communication system in the sixth modification of the first embodiment.

FIG. 32 shows an exemplary sequence of the mobile communication system in the sixth modification of the first embodiment. FIG. 32 shows the sequence in a case where the RN updates a list of DeNB cells.

In Step ST3201, the DeNB notifies the RN of a threshold (hereinafter, referred to as an "threshold for addition to the list of DeNB cells") indicating whether an eNB is added to the list of DeNB cells, as a threshold indicating whether the reception quality is good. The DeNB notifies the RN of a threshold (hereinafter, referred to as a "threshold for deletion from the list of DeNB cells") indicating whether an eNB cell is deleted from the list of DeNB cells, as a threshold indicating whether the reception quality is poor.

In Step ST3202, the RN performs measurements. In this case, the RN may also measure an eNB included in the list of DeNB cells.

In Step ST3203, the RN judges, from the measurement results of Step ST3202, whether there is an eNB having a reception quality higher than the threshold for addition to the list of DeNB cells that has been received in Step ST3201. In a case of judging in Step ST3203 that there is an eNB having a reception quality higher than the threshold for addition to the list of DeNB cells, the RN moves to Step ST3204. In a case of judging in Step ST3203 that there is no eNB having a reception quality higher than the threshold for addition to the list of DeNB cells, the RN moves to Step ST3206.

In Step ST3204, the RN judges whether the eNB having a reception quality higher than the threshold for addition to the list of DeNB cells has the DeNB function. In a case of judging that the eNB has the DeNB function, the RN moves to Step ST3205. In a case of judging that the eNB does not have the DeNB function, the RN moves to Step ST3206.

In Step ST3205, the RN adds, to the list of DeNB cells, an eNB having a reception quality higher than the threshold for addition to the list of DeNB cells.

In Step ST3206, the RN judges, based on the measurement results of Step ST3202, whether the list of DeNB cells includes an eNB having a value indicating a reception quality which is smaller than a threshold for deletion, that is, having a reception quality lower than the threshold for deletion from the list of DeNB cells which has been received in Step ST3201. In a case of judging in Step ST3206 that there is an eNB having a reception quality lower than the threshold for deletion from the list of DeNB cells, the RN moves to Step ST3207. In a case of judging in Step ST3206 that there is no eNB having a reception quality lower than the threshold for deletion from the list of DeNB cells, the RN does not perform Step ST3207.

In Step ST3207, the RN deletes, from the list of DeNB cells, an eNB having a reception quality lower than the threshold for deletion from the list of DeNB cells.

The processes of Steps ST3203 to ST3205 and the processes of Steps ST3206 and ST3207 are performed in any order and may be performed independently of each other.

FIG. 33 shows an exemplary sequence of the mobile communication system in the sixth modification of the first embodiment. FIG. 33 shows the sequence in a case where the source DeNB notifies the list of DeNB cells.

In Step ST3301, the source DeNB notifies the RN of a message including mobility control information to which the parameters required for handover are mapped. In this case, the source DeNB also notifies the RN of a new list of DeNB cells. Specific examples of the message for notifying a new list of DeNB cells include an RRC connection reconfiguration message and a handover command.

In Step ST3302, the RN that has received a new list of DeNB cells in Step ST3301 updates the list of DeNB cells.

FIG. 34 shows an exemplary sequence of the mobile communication system in the sixth modification of the first embodiment. FIG. 34 shows the sequence in a case where the RN performs reattach and obtains a list of DeNB cells from the OAM for RN.

In Step ST3401, the source DeNB notifies the RN of an RRC connection reconfiguration message including the mobility control information to which the parameters required for handover are mapped. At the same time, the source DeNB instructs the RN to perform handover.

In Step ST3402, the RN that has received the mobility control information from the source DeNB notifies the UE being served thereby of a hold command.

In Step ST3403, the RN stops scheduling of an access link (AL) to the UE being served thereby.

In Step ST1501, the RN performs, for an initial configuration, an attach process on the E-UTRAN or EPC as a normal UE via the target eNB.

In Step ST3404, the operation administration and maintenance (OAM) for RN notifies the RN of initial configuration parameters including a new list of DeNB cells.

In Step ST3405, the RN that has received the new list of DeNB cells in Step ST3404 updates the list of DeNB cells.

In Step ST3406, the RN judges whether the target eNB is included in the list of DeNB cells. In this case, the RN may make a judgment using the cell identity. In a case of judging in Step ST3406 that the target eNB is included in the list of DeNB cells, the RN moves to Step ST3407. In a case of judging in Step ST3406 that the target eNB is not included in the list of DeNB cells, the RN moves to Step ST3408.

In Step ST3407, the RN restarts scheduling of an access link (AL) for a UE being served thereby.

In Step ST3408, the RN stops a handover process and returns to the source eNB.

The sixth modification of the first embodiment can achieve the following effects. The list of DeNB cells is updated along with the RN moving. This allows the RN to recognize by which eNB it is supported as an RN. Thus, the RN can continue the service to a UE being served thereby.

Seventh Modification of First Embodiment

It is conceivable that the mobile RN will be installed in a moving body such as an express bus and high-speed train. In other words, it is conceivable that the mobile RN will move on a routine route. This modification will disclose a handover processing method optimum for the mobile RN in such a case.

If the entity being a handover object is an RN, the source DeNB selects an eNB that covers a moving route correspondingly to the RN as a target eNB. If the entity being a handover object is an RN, the source DeNB may select, as a target eNB, an eNB having the DeNB function that covers the moving route correspondingly to the RN.

Specific examples of the method of judging whether the entity being a handover object is an RN are similar to those of the first modification of the first embodiment, which will not be described here.

The following three (1) to (3) will be disclosed as specific examples of the method of selecting a target eNB corresponding to an RN.

(1) A target eNB corresponding to an RN location is selected. The source DeNB confirms an RN position. The existing technology such as global positioning system (GPS) can be used as the method of confirming a position.

(2) A target eNB corresponding to an RN movement is selected. If the entity being a handover object is an RN, the source DeNB checks the direction of the RN movement. The source DeNB confirms the direction of the RN movement through estimation and computation of the RN positions at two different times.

(3) A target eNB corresponding to a moving route of the RN is selected. A corresponding route may be set per RN. The following two (3-1) and (3-2) will be disclosed as specific examples of the method of storing a corresponding route per RN.

(3-1) The route information is stored in the server by being associated with the cell identity of the RN.

(3-2) The route information associated with a moving route is added per RN. This addition may be allocated from the OAM for RN in RN setup. The RN notifies the DeNB of the route information added to the own RN, namely the allocated route information during RRC connection establishment in the attach process. Alternatively, the RN also notifies, when notifying the source DeNB of a measurement report, the route information added to the own RN.

A specific example of the method in which the source DeNB obtains an eNB that covers a moving route will be disclosed below. An eNB that covers the moving route is stored in the server by being associated with the route information. The source DeNB inquires the server of an eNB that covers the moving route, using the cell identity of the RN or the route information of the RN. The source DeNB may inquire the RN location and the direction of RN moving in the above-mentioned inquiry. The specific examples according to the fifth modification of the first embodiment can be used as a trigger for causing the DeNB to make an inquiry. Also, an eNB that covers a moving route may be stored in the DeNB in advance. The moving route may be stored by being associated with the cell identity of the RN or the route information of the RN. In this case, the server may notify the DeNB of any change in contents such as the route information of the RN and an eNB that covers the moving route.

The following two (1) and (2) will be disclosed as specific examples of the method in which the source DeNB selects an eNB included in the list of DeNB cells as a target eNB.

(1) A method in which the source DeNB makes a judgment. In a case of receiving a measurement report from the RN, the source DeNB judges whether an eNB of a measurement report object is included in eNBs that cover the moving route, based on the cell identity included in the measurement report. The source DeNB selects, as a target eNB, an eNB included in the eNBs that cover the moving route.

(2) A method in which the source DeNB provides an instruction. The source DeNB notifies the RN that an eNB included in eNBs that cover the moving route is taken as a measurement object. The source DeNB selects a target eNB from the eNBs of the measurement report objects from the RN. The measurement object for the RN is an eNB that covers the moving route, and thus, the source DeNB may select a target eNB from the eNBs of measurement report objects.

Disclosed below is a specific example of the method of notifying that a relevant eNB is taken as a measurement object. The source DeNB designates, for the RN, an eNB that covers the moving route as a measurement object in measurement control. As a specific example of the designation method, an eNB is designated by the cell identity of an eNB included in the list of DeNB cells.

Additionally, the source DeNB may notify the RN, as a measurement object, an eNB located closest to the own eNB among the eNBs that cover the moving route. In other words, the source DeNB predetermines a target eNB. In this case, the RN needs not to measure other neighbor cells. The RN may need to only notify in a measurement report that the reception quality of the source DeNB has become lower or a reception quality has become smaller than a predetermined threshold. This results in a reduction in processing load of the RN.

Figure 35:
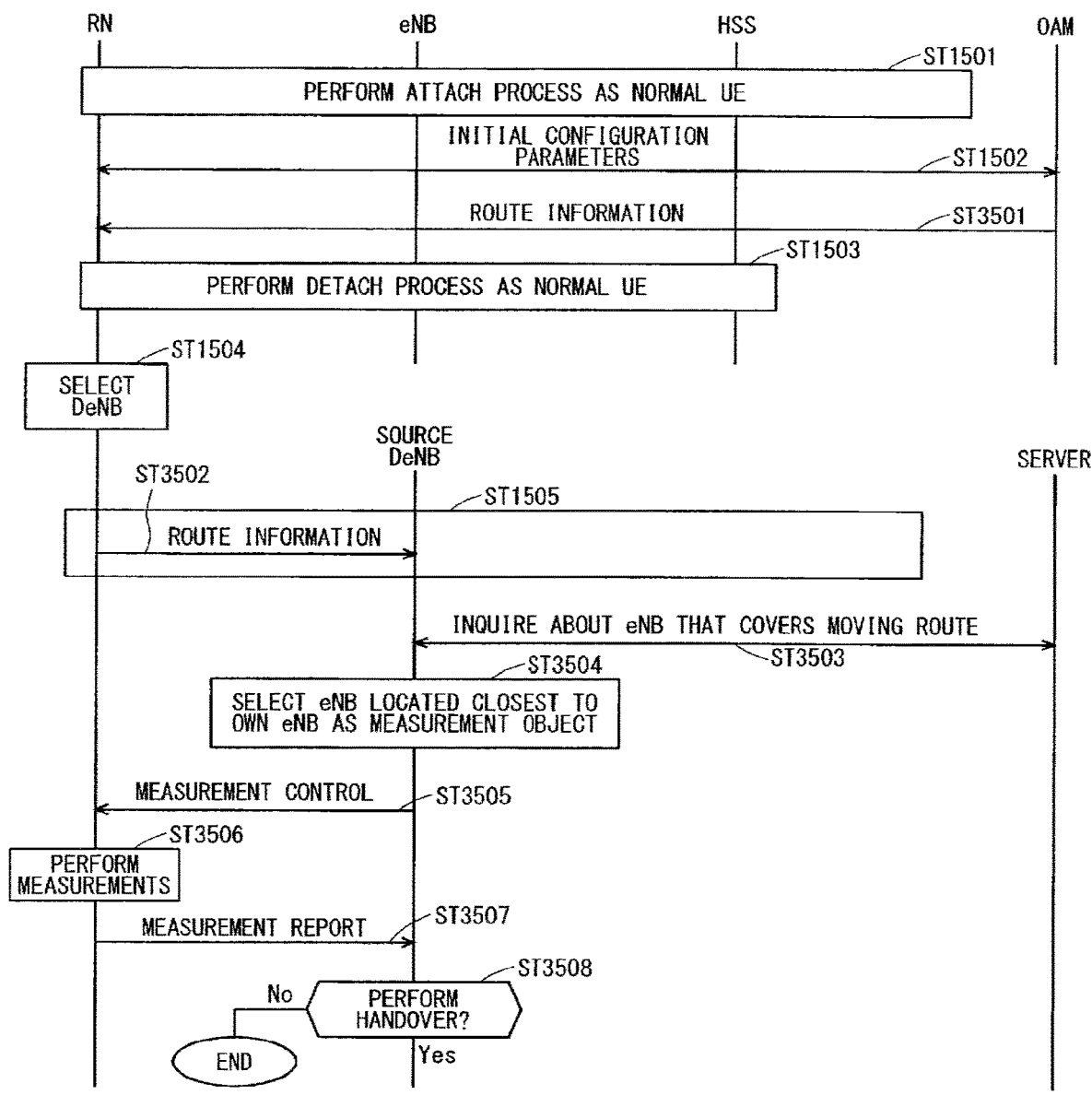
FIG. 35 shows an exemplary sequence of a mobile communication system in a seventh modification of the first embodiment.

The operation will be described next. FIG. 35 shows an exemplary sequence of a mobile communication system in the seventh modification of the first embodiment.

In Step ST1501, the RN performs an attach process as a normal UE for an initial configuration. Specifically, the RN performs the attach process with the eNB and the HSS.

In Step ST1502, the RN reads initial configuration parameters including a list of DeNB cells from the OAM for RN.

In Step ST3501, the OAM for RN notifies the RN of the route information associated with the moving route of the RN. The RN accordingly obtains the route information associated with the moving route of the own RN from the OAM for RN.

In Step ST1503, the RN performs a detach process from the network as a normal UE. The RN then activates Phase II of the RN startup procedure.

In Step ST1504, the RN selects a DeNB from the list of DeNB cells obtained in Phase I.

In Step ST3502, the RN notifies the source DeNB of the route information allocated to the own RN during RRC connection establishment in the attach process of Step ST1505.

In Step ST3503, the source DeNB uses the route information received in Step ST3502 to inquire an eNB that covers the moving route corresponding to the route information from the server, to thereby obtain the information on this eNB.

In Step ST3504, the source DeNB selects, as a target eNB being a measurement object, an eNB located closest to the own eNB among the eNBs that cover the moving route received in Step ST3503.

In Step ST3505, the source DeNB notifies the RN of measurement control. The source DeNB may notify the target eNB selected in Step ST3504 as a measurement object.

In Step ST3506, the RN performs measurements in accordance with the measurement control received in Step ST3505.

In Step ST3507, the RN notifies the source DeNB of a measurement report in accordance with the measurement control received in Step ST3505.

In Step ST3508, the source DeNB judges whether to cause the RN to perform handover based on the measurement report received in Step ST3507, and the like. The source DeNB has already selected the target eNB, and thus needs not to perform the process of selecting a target eNB.

The seventh modification of the first embodiment above can achieve the following effects. If the mobile RN moves on a routine route, the eNB that covers this moving route can be selected as a target eNB. This allows for a handover process optimum for moving on a routine route, preventing an unnecessary handover process. This results in a reduction in processing load, preventing a control delay.

Second Embodiment

An inband relay (inband RN) has been studied (see Non-Patent Document 7). The method of using frequencies in an inband RN will be described with reference to FIG. 28.

The downlink backhaul link (BL_DL) 2902 from the DeNB 1305 to the RN 1304 and the downlink access link (AL_DL) 2904 from the RN 1304 to the UE 1303 are time-division multiplexed in one carrier frequency. The carrier frequency same as those of the BL_DL 2902 and the AL_DL 2904 is used in the normal downlink (Normal_DL) 2906 from the DeNB 1305 to the UE 2901.

The uplink access link (AL_UL) 2905 from the UE 1303 to the RN 1304 and the uplink backhaul link (BL_UL) 2903 from the RN 1304 to the DeNB 1305 are time-division multiplexed in one carrier frequency. The carrier frequency same as those of the AL_UL 2905 and the BL_UL 2903 is used for the normal uplink (Normal_UL) 2907 from the UE 2901 to the DeNB 1305. The RN whose frequency for backhaul link is identical to the frequency for access link as described above is referred to as an inband relay (inband RN).

The problem to be solved in the second embodiment will be described below.

Considered here is a case in which an inband RN moves to the coverage of the eNB operated in a frequency or frequency band different from that of a source DeNB. Such a situation is referred to as inter-frequency handover (HO).

If the inband RN performs inter-frequency handover, such a problem that different frequencies are used in backhaul link and access link occurs.

The solution in the second embodiment will be described below. If the inband RN performs inter-frequency handover, the frequency of the access link is changed correspondingly to the frequency of the backhaul link.

If the frequency of the access link is changed correspondingly to the frequency of the backhaul link, a new problem arises in connection between the RN and a UE being served thereby.

There arises a problem that the reception quality of the access link of a UE being served by an RN, which is during communication, suddenly deteriorates, and accordingly, communication is suddenly disconnected.

The solution to the problem above will be described below. When performing inter-frequency handover, the inband RN notifies a UE being served by the RN, which is in an RRC_CONNECTED state, of an instruction to change a frequency and perform RRC reconnection. The inband RN may also notify the frequency of a new backhaul link for a target eNB.

The following will be disclosed as a specific example of the method of notifying an instruction to perform RRC reconnection. An inter-frequency RRC connection change message is newly provided, which indicates to change a frequency and instruct RRC reconnection.

The following two (1) and (2) will be disclosed as specific examples of the parameters to be mapped to an inter-frequency RRC connection change message.

(1) A frequency of a new access link after the inband RN has performed inter-frequency handover.

(2) An MBSFN subframe configuration in a new access link. The MBSFN subframe configuration is broadcast in system information. The MBSFN subframe configuration in a new access link is notified in the inter-frequency RRC connection change message, which eliminates the need for a UE to receive broadcast information in a new access link. This results in a reduction in processing load of the UE.

Figure 36:
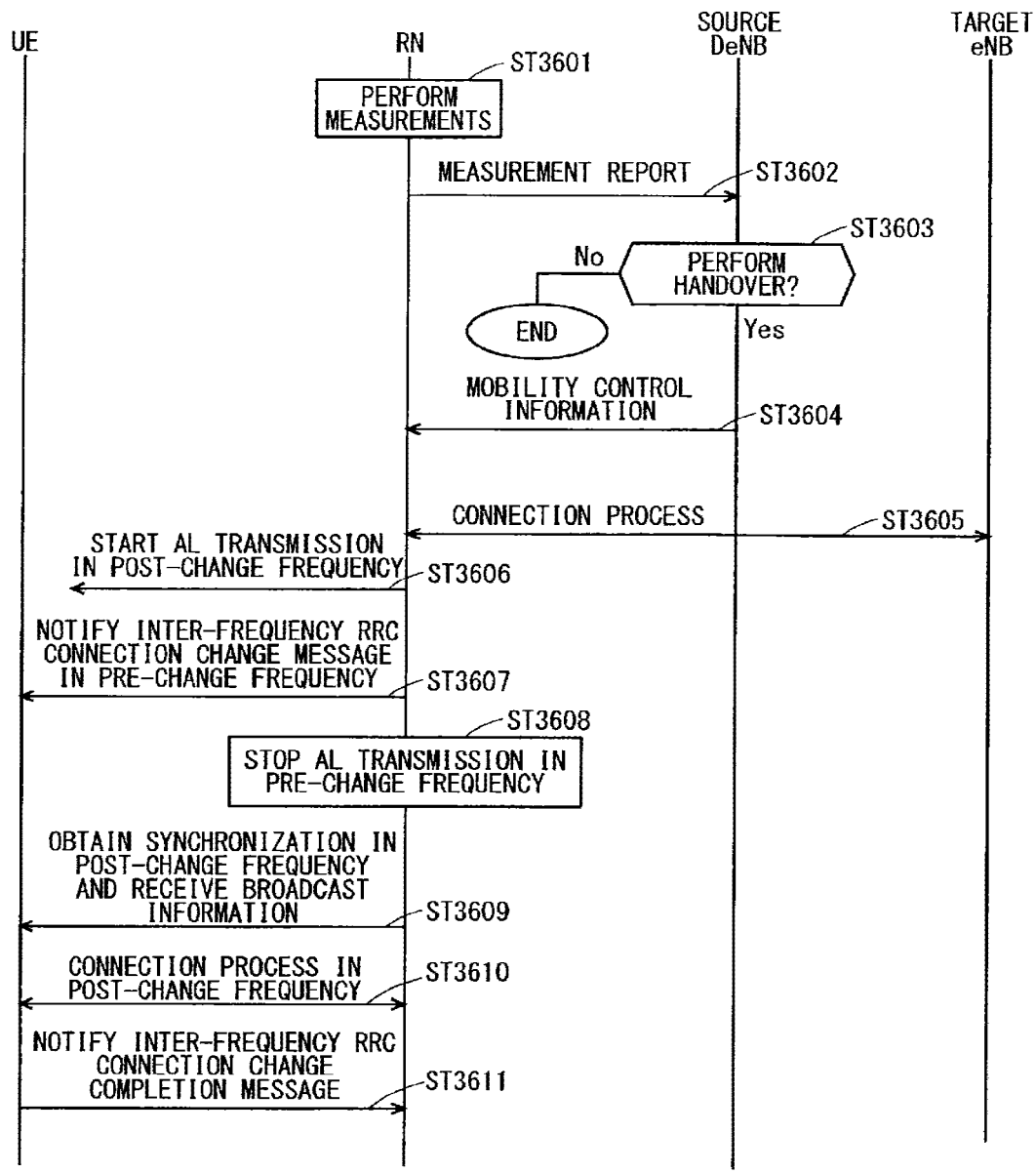
FIG. 36 shows an exemplary sequence of a mobile communication system in a second embodiment.

The operation will be described next. FIG. 36 shows an exemplary sequence of a mobile communication system in the second embodiment.

In Step ST3601, the RN performs measurements.

In Step ST3602, the RN notifies the source DeNB of a measurement report.

In Step ST3603, the source DeNB judges whether to cause the RN to perform handover based on the measurement report received in Step ST3602, and the like. If the RN is caused to perform handover, the source DeNB determines a target eNB being a handover destination.

In Step ST3604, the source DeNB notifies the RN of an RRC connection reconfiguration message including the mobility control information to which the parameters required for handover are mapped. At the same time, the source DeNB instructs the RN to perform handover.

In Step ST3605, the RN performs a process for connection with the target eNB.

In Step ST3606, the RN starts transmitting an access link (AL) in the frequency operated by the target eNB, namely the frequency same as the frequency used for the backhaul link between the RN and the target eNB. In the following description, the frequency operated by a target eNB will be referred to as a "post-change frequency".

In Step ST3607, the RN notifies the UE being served thereby of an inter-frequency RRC connection change message in the frequency of the access link before handover, namely the frequency used in the backhaul link between the RN and the source DeNB. At the same time, the RN may notify the UE being served thereby of a hold command indicating that resources will not be allocated for a predetermined period. In the following description, the frequency of the access link before handover will be referred to as a "pre-change frequency".

In Step ST3608, the RN stops transmitting an access link (AL) in the pre-change frequency.

In Step ST3609, the RN notifies the UE of broadcast information. The UE being served by the RN performs cell search using the frequency of a new access link notified in the inter-frequency RRC connection change message, obtains synchronization, and receives the broadcast information.

In Step ST3610, the UE being served by the RN performs the process for connection with the RN.

In Step ST3611, the UE being served by the RN notifies the RN of an inter-frequency RRC connection change completion message.

The point, at which the transmission of an access link is started in a post-change frequency, or the point, at which the transmission of an access link is stopped in a pre-change frequency, is not limited to the example above. The following two (1) and (2) will be disclosed as specific examples.

(1) The RN may perform the process of Step ST3608 after confirming that it has received the inter-frequency RRC connection change completion notification from the UE being served by the RN, which is in an RRC_CONNECTED state. This enables the UE being served by the RN, which is in an RRC_CONNECTED state, to stop transmitting an access link in the post-change frequency after completing the connection in a post-change frequency. Thus, a more user-friendly mobile communication system can be constructed.

(2) The process of Step ST3606 of starting the transmission of an access link in the post-change frequency may be performed after the process of Step ST3608 of stopping transmission of an access link in the pre-change frequency. This prevents the RN from transmitting an access link in two types of frequencies, the pre-change frequency and the post-change frequency. This results in reductions in size, consumption power, and cost of the RN.

The second embodiment above can achieve the following effects. If an inband RN moves, the same frequency can be used for the backhaul link and access link.

If the RN performs inter-frequency handover, the RN notifies the UE being served thereby, which is in an RRC_CONNECTED state, of an inter-frequency RRC connection change message. This allows the RN and the UE being served by the RN to continue connection and communication using an access link transmitted in the post-change frequency.

First Modification of Second Embodiment

The problem to be solved in a first modification of the second embodiment will be described below. In the solution of the second embodiment, a message is newly provided, which notifies an instruction to change a frequency for RRC reconnection. However, a problem of a complicated mobile communication system arises if the message for notifying an instruction to perform RRC reconnection is newly provided.

The solution in the first modification of the second embodiment will be described below. If the inband RN performs inter-frequency handover, the frequency of an access link is changed correspondingly to the frequency of a backhaul link. The UE being served by the RN, which is in an RRC_CONNECTED state, is notified of an instruction to change a frequency for RRC reconnection. This frequency is the frequency of a new backhaul link between the target eNB and the inband RN. The UE handover process is used in this notification. This eliminates the need for providing a new message, preventing a mobile communication system from becoming complicated.

The following three (1) to (3) will be disclosed as specific examples of the case in which the UE handover process is used in a case where an instruction to change a frequency for RRC reconnection is notified.

(1) Specific examples of the messages to be used will be disclosed. An RRC connection reconfiguration message including the mobility control information to which the parameters necessary for handover are mapped is used in the notification from the source eNB to the UE being served thereby. Or, an RRC connection reconfiguration message may be merely used. Or, a handover command to which the parameters necessary for handover are mapped is used in the notification from a source eNB to a UE being served thereby.

(2) The following three (2-1) to (2-3) will be disclosed as specific examples of the parameters to be mapped to a message.

(2-1) An instruction to change a frequency for RRC reconnection.

(2-2) A frequency of a new access link after the inband RN has performed inter-frequency handover.

(2-3) An MBSFN subframe configuration in a new access link. The MBSFN subframe configuration is broadcast in the system information. The MBSFN subframe configuration in a new access link is notified in an inter-frequency RRC connection change message, which eliminates the need for a UE to receive broadcast information in a new access link. This results in a reduction in processing load of the UE.

(3) If the inband RN performs inter-frequency handover without merely using a UE conventional handover process, a change suitable for notification of an instruction to change a frequency for RRC reconnection is added for a UE being served by the RN, which is in an RRC_CONNECTED state. This results in a reduction in unnecessary processes, preventing a control delay. The following two (3-1) and (3-2) will be disclosed as specific examples of points to be changed.

(3-1) The source eNB in a conventional UE handover process does not perform the process of forwarding UE-related data (data forwarding) to the target eNB. For example, the source eNB does not perform the process of Step ST1609 of FIG. 16. If the inband RN has performed inter-frequency handover, there is no change to the partner of the communication with a UE being served by the inband RN, which remains the inband RN. Thus, the UE-related data needs not to be forwarded.

(3-2) The source eNB in a conventional UE handover process does not perform the process of notifying a target eNB of the information for preserving a packet data convergence protocol (PDCP) status. Specific examples of the notification message include an SN status transfer message. As an example, the above-mentioned process is performed before the process of Step ST1609 of FIG. 16. If the inband RN has performed inter-frequency handover, there is no change to the partner of the communication with a UE being served by the inband RN, which remains the inband RN. Thus, the information for preserving a PDCP status needs not to be notified.

Figure 37:
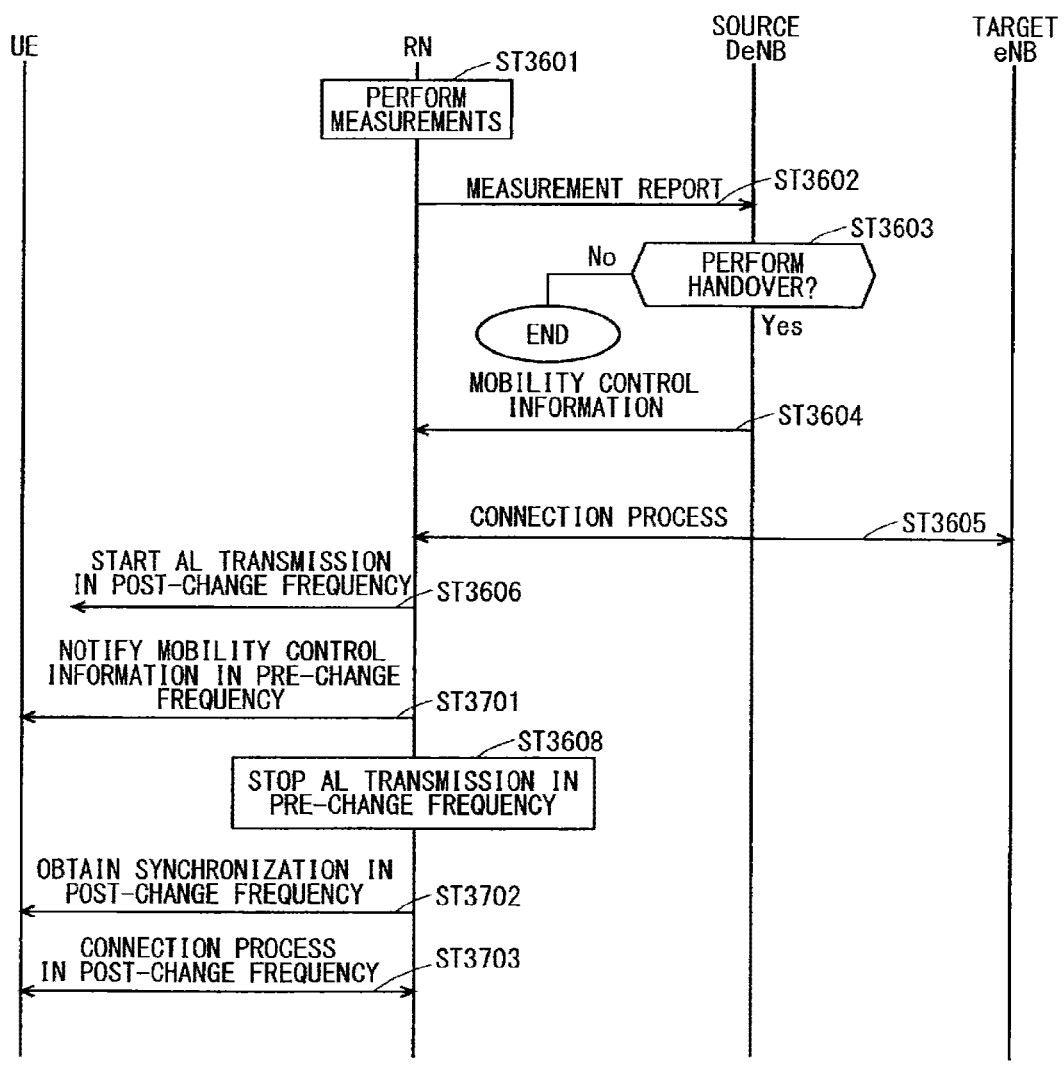
FIG. 37 shows an exemplary sequence of a mobile communication system in a first modification of the second embodiment.

The operation will be described next. FIG. 37 shows an exemplary sequence of a mobile communication system in the first modification of the second embodiment.

The processes of Steps ST3601 to ST3606 are performed, and then, in Step ST3701, the RN notifies the UE being served thereby of mobility control information in the pre-change frequency. The RN notifies an instruction to change a frequency for RRC reconnection and a post-change frequency in the notification above. At the same time, the RN may notify the UE being served thereby of an MBSFN subframe configuration in a new access link such that the UE needs not to receive the broadcast information in a post-change frequency.

After the process of Step ST3608, in Step ST3702, the UE being served by the RN performs cell search using a frequency in a new access link that has been notified in the mobility control information. If the UE has received, for example, an MBSFN subframe configuration in a new access link such that the UE needs not to receive broadcast information in a post-change frequency in Step ST3701, the UE needs not to receive the broadcast information in Step ST3702. This results in lower power consumption of the UE.

In Step ST3703, the UE being served by the RN performs the processes for connection with the RN.

The first modification of the second embodiment above can achieve the following effects in addition to the effects of the second embodiment. It is not necessary to newly provide a message. The mobile communication system can be thus prevented from being complicated.

Second Modification of Second Embodiment

The problem to be solved in a second modification of the second embodiment will be described below.

If the frequency of an access link is changed correspondingly to the frequency of a backhaul link, the following new problem arises in connection between an RN and a UE being served thereby. There arises a problem that the reception quality of an access link of the UE being served by the RN, which is in idle, sharply deteriorates. The UE judges the cell selection of the UE in idle. The following two cases are accordingly conceivable: a case in which an inband RN whose operation is started in a post-change frequency, namely an inter-frequency is reselected, and a case in which other neighbor cell is reselected. In other words, whether an inband RN is reselected is unknown.

A case where a mobile RN is installed in an express bus or the like is considered here, which is assumed as the service of the mobile RN. If the mobile RN performs inter-frequency handover, the UE possessed by a passenger of an express bus in which the mobile RN is installed is desired to select the mobile RN as a cell.

The solution in the second modification of the second embodiment will be described below. When recognizing that the UE has camped on a mobile RN and the reception quality of the mobile RN has sharply deteriorated, cell search in which the mobile RN has high priority is performed. Or, cell search involving an inter-frequency may be performed. Or, it may be estimated that a mobile RN has performed inter-frequency handover and cell search in which an inter-frequency has priority may be performed.

The following three (1) to (3) will be disclosed as specific examples of the method of recognizing that a UE has camped on the mobile RN.

(1) Information indicative of whether the RN is a mobile RN is broadcast. The UE receives the broadcast information of the RN and judges whether the RN is a mobile RN.

Specific examples of the method of broadcasting the information indicative of whether the RN is a mobile RN will be described below. The information indicative of whether the RN is a mobile RN is newly added as an information element of the existing system information (system information block (SIB), see Non-Patent Document 2). The system information is broadcast over the BCCH.

The following three (1-1) to (1-3) will be disclosed as specific examples of the method in which the information indicative of whether the RN is a mobile RN is used as an information element of the SIB.

(1-1) Information is added as an information element of the SIB1. The following effects can be achieved if the information is mapped to the SIB1. For example, in the LTE mobile communication system, the SIB1 can be received at an early stage of the search, as shown in Step ST1205 of FIG. 12. Thus, a control delay can be prevented through mapping of the information indicative of whether the RN is a mobile RN to the SIB1, resulting in lower power consumption.

(1-2) Information is added as an information element of the SIB2. The following effects can be achieved if the information is mapped to the SIB2. It is currently aimed in 3GPP to map, to the SIB2, a radio resource configuration common to all the user equipments being served by the mobile RN. The information common to all the user equipments is added to the SIB2 including similar parameters, whereby similar parameters can be obtained through reception of the same system information. This prevents a mobile communication system from becoming complicated, preventing a control delay.

(1-3) Information is added as an information element of the SIB3. The following effects can be achieved if the information is mapped to the SIB3. It is currently aimed in 3GPP to map, to the SIB3, a configuration common to cell reselections. The information common to cell reselections is added to the SIB3 including similar parameters, whereby similar parameters can be obtained through reception of the same system information. This prevents a mobile communication system from becoming complicated, preventing a control delay.

The information indicative of whether the RN is a mobile RN may be broadcast solely from the mobile RN. It is judged that the RN is not a mobile RN if the above-mentioned information is not broadcast, which causes no problem. Besides, the eNB and RN devoid of the function of a mobile RN need no additional information.

(2) A cell identity to be allocated to a mobile RN is separated from cell identities to be allocated to an RN that differs from the mobile RN and an eNB. The RN can recognize PCIs among the cell identities at an early stage of the measurement performed by the UE. Specifically, for example in Step ST1201 of FIG. 12, the RN recognizes synchronization codes that individually correspond to the PCIs using a primary synchronization signal (P-SS) and a secondary synchronization signal (S-SS) transmitted from a neighbor base station. Thus, the range of PCIs to be allocated to the mobile RN may be separated from the range of PCIs allocated to an RN that differs from a mobile RN and an eNB.

The method of separating cell identities or the method of separating PCI ranges is broadcast from the RN and eNB. The UE judges whether the serving cell is a mobile RN using a cell identity or PCI. The method of separating cell identities or the method of separating PCI ranges may be broadcast only from the mobile RN. Thus, the eNB that does not have a mobile RN function needs no additional information.

(3) The carrier frequency for a mobile RN is separated from the carrier frequencies for an RN that differs from the mobile RN and an eNB. The frequency separation method is broadcast from the RN and eNB. The UE judges whether the serving cell is a mobile RN using a carrier frequency. The frequency separation method may be broadcast only from the mobile RN. Thus, an eNB that does not have a mobile RN function needs no additional information. Or, a carrier frequency operable for a mobile RN may be broadcast.

The following will be disclosed as a specific example of the method of performing cell search in which a mobile RN has priority. The UE being served by a mobile RN performs cell search in an inter-frequency using the PCI of the mobile RN. The UE may perform cell search in an inter-frequency using the PCI in the range of PCIs to be allocated to the mobile RN. The UE may perform cell search in a carrier frequency for a mobile RN or using a carrier frequency operable for a mobile RN, using the PCI of the mobile RN or using the PCI in the range of PCIs to be allocated to the mobile RN. Alternatively, in a case where, for example, the PCI is determined per frequency, the UE may perform cell search merely in an inter-frequency or a carrier frequency operable for the mobile RN.

The following two (1) and (2) will be disclosed as specific examples of the method in which the UE judges whether the reception quality of the mobile RN has sharply deteriorated.

(1) If the reception quality of the serving cell, namely the mobile RN has fallen below a predetermined threshold within a predetermined period of time, the UE judges that the reception quality has sharply deteriorated. The predetermined period of time and the predetermined threshold may be determined in advance or may be notified from the mobile RN. As to the notification method, they are broadcast from the mobile RN.

(2) If the ratio of a decrease amount of the reception quality to a time of the serving cell, namely mobile RN is larger than the predetermined threshold, the UE judges that the reception quality has sharply deteriorated. For example, the ratio of a decrease amount of reception quality to a unit time is referred to as a decrease factor. The predetermined threshold may be determined in advance or notified from the mobile RN. As to the notification method, the predetermined threshold is broadcast from the mobile RN.

The UE may judge whether the reception quality has sharply deteriorated only in a case where the UE has camped on the mobile RN.

Figure 38:
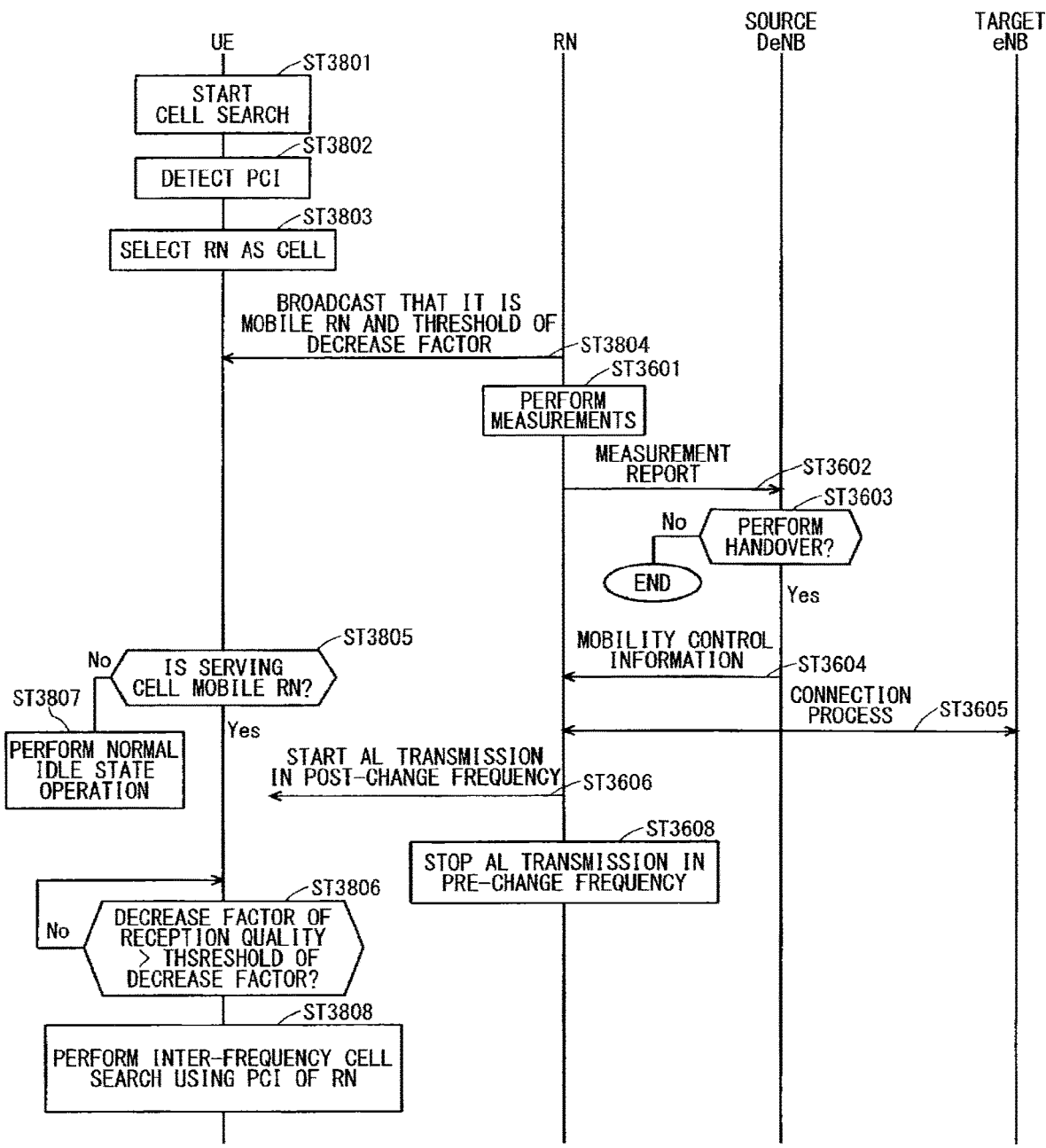
FIG. 38 shows an exemplary sequence of a mobile communication system in a second modification of the second embodiment.

The operation will be described next. FIG. 38 shows an exemplary sequence of a mobile communication system in the second modification of the second embodiment.

In Step ST3801, the UE starts cell search. In Step ST3802, the UE obtains synchronization with a neighbor cell and also detects (specifies) the PCI of the synchronized cell.

In Step ST3803, the UE selects a cell having the best RS reception quality, for example, a cell having the best RS reception power, namely the best cell from one or more cells detected before Step ST3802. The UE selects the RN as a cell in this operation example.

In Step ST3804, the RN broadcasts, to the UE, the information indicating that the RN is a mobile RN and a threshold of a decrease factor of reception quality. The UE receives the information indicating that the RN is a mobile RN and the threshold of a decrease factor of reception quality which are broadcast from the RN.

In Step ST3805, the UE judges whether the serving cell is a mobile RN. In a case of judging in Step ST3805 that the serving cell is a mobile RN, the UE moves to Step ST3806. In a case of judging in Step ST3805 that the serving cell is not a mobile RN, the UE moves to Step ST3807.

In Step ST3806, the UE judges whether the reception quality of the mobile RN has sharply deteriorated. Specifically, the UE judges whether the decrease factor of the reception quality of the serving cell, namely the mobile RN that has performed measurements is larger than the threshold of the decrease factor of reception quality that has been received in Step ST3804. In a case where the decrease factor of the reception quality is larger than the threshold of the decrease factor of reception quality, the UE judges that the reception quality of the mobile RN has sharply deteriorated and then moves to Step ST3808. In a case where the decrease factor of reception quality is not more than the threshold of the decrease factor of reception quality, the UE judges that the reception quality of the mobile RN has not sharply deteriorated and then repeats the process of Step ST3806. The UE may perform a normal cell reselection process in a case where the decrease factor of reception quality is not more than the threshold of the decrease factor of reception quality.

In Step ST3808, the UE performs inter-frequency cell search. The UE may perform inter-frequency cell search using the PCI of the serving cell, namely the mobile RN detected in Step ST3802.

The second modification of the second embodiment can achieve the following effects. If the RN has performed inter-frequency handover, the UE being served by an RN, which is in an idle state, can estimate that the mobile RN has performed inter-frequency handover and then perform cell search in which the mobile RN has priority. Thus, if the mobile RN has performed inter-frequency handover, the UE being served by the mobile RN, which is in an idle state, is highly likely to select the mobile RN as a cell.

Third Modification of Second Embodiment

A third modification of the second embodiment will disclose another solution to the problem as same as that of the second modification of the second embodiment described above. The solution in the third modification of the second embodiment will be described below.

In a case of performing inter-frequency handover, the inband RN notifies the UE being served by the RN, which is in an idle state, that the own RN will perform inter-frequency handover. The UE that has received the notification may perform cell search using an inter-frequency. The UE may perform cell search involving an inter-frequency as the cell search.

The UE may notify a post-change frequency and an instruction for cell reselection, besides an instruction to perform inter-frequency handover.

The following two (1) and (2) will be disclosed as specific examples of the method in which the inband RN notifies the UE being served by the RN, which is in an idle state, that the own RN performs inter-frequency handover.

(1) The inband RN broadcasts a pre-change frequency in the system information. An information element indicative of the execution of inter-frequency handover is newly provided in the broadcast information. Upon change of the broadcast information, all members are called through paging. This allows the RN to notify a user equipment being served thereby, which is in an idle state. The UE receives the broadcast information again in a case of receiving paging and being notified a change in broadcast information, whereas the UE performs cell search in a case where an indicator indicating that inter-frequency handover has performed is included. In a case of being notified of a post-change frequency at the same time, the UE performs cell search in the post-change frequency.

(2) The inband RN makes a notification through paging in a pre-change frequency. All members are called. An information element indicating that the serving cell has performed inter-frequency handover is newly provided in the paging message. The UE performs cell search in a case where the paging message, which has been received thereby, includes an indicator indicating that inter-frequency handover has been performed. In a case of being notified of a post-change frequency at the same time, the UE performs cell search in the post-change frequency.

Figure 39:
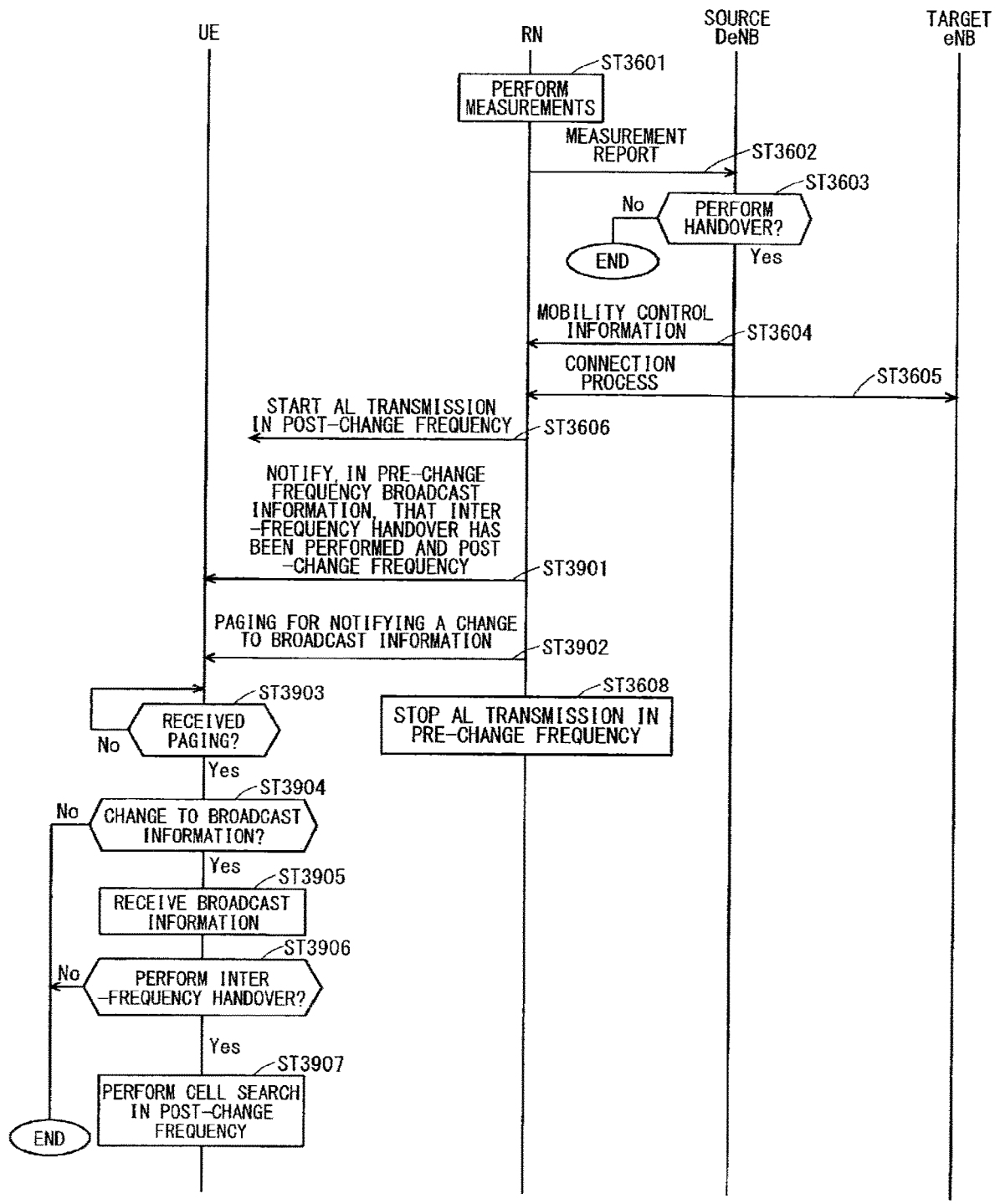
FIG. 39 shows an exemplary sequence of a mobile communication system in a third modification of the second embodiment.

The operation will be described next. FIG. 39 shows a mobile communication system in the third modification of the second embodiment.

After the processes of Steps ST3601 to ST3606, in Step ST3901, the RN notifies that it will perform inter-frequency handover in a pre-change frequency, in the broadcast information. In this case, the RN may also notify a post-change frequency. The notification of a post-change frequency limits frequencies in which a UE being served by the RN performs inter-frequency cell search, resulting in a reduction in processing load of the UE.

In Step ST3902, as a result of the broadcast information having been changed in Step ST3901, the RN notifies, in a pre-change frequency, the UE being served thereby of a paging for notifying a change made to broadcast information.

In Step ST3903, the UE judges whether to have received the paging. In a case of judging to have received the paging, the UE moves to Step ST3904. In a case of judging to not have received the paging, the UE repeats the process of Step ST3903.

In Step ST3904, the UE judges whether the paging received in Step ST3902 is for notifying a change to broadcast information. In a case of judging that the paging is for notifying a change to broadcast information, the UE moves to Step ST3905. In a case of judging that the paging is not for notifying a change to broadcast information, all the processes are caused to be ended in order to omit the description thereafter.

In Step ST3905, the UE receives broadcast information in a pre-change frequency. In Step ST3906, the UE judges whether the broadcast information received in Step ST3905 has notified the execution of inter-frequency handover. In a case of judging that the execution of inter-frequency handover has been notified, the UE moves to Step ST3907. In a case of judging that the execution of inter-frequency handover has not been notified, all the processes are caused to be ended in order to omit the description thereafter.

In Step ST3907, the UE performs cell search using an inter-frequency. The UE may perform cell search in a post-change frequency in a case where the broadcast information received in Step ST3905 has also notified a post-change frequency.

The third modification of the second embodiment above can achieve the following effects. If the RN has performed inter-frequency handover, the RN notifies the UE being served thereby that the RN performs inter-frequency handover. The UE being served by the RN, which is in an idle state, can recognize that the RN performs inter-frequency handover, and thus can perform cell search in an inter-frequency or a post-change frequency in which the RN operates. Thus, if the mobile RN has performed inter-frequency handover, the UE being served by the mobile RN, which is in an idle state, is highly likely to select the mobile RN as a cell.

Third Embodiment

If the RN moves, interference occurs between an existing RN and the RN, which results from an access link and a backhaul link existing in RN operation. FIGS. 29 and 30 show specific examples of the subframe configuration of the inband RN. It is shown that subframes are configured in one RN so as to prevent downlink access link transmission from interfering with downlink backhaul link reception or uplink backhaul link transmission from interfering with uplink access link reception. Thus, there is no interference between the backhaul link and access link in one RN.

The subframe configurations of the backhaul links of RNs are dedicatedly notified from the DeNB per RN using RRC signaling. This means that the subframe configuration of the RN differs from RN to RN. For this reason, if a plurality of RNs are close to each other, interference occurs between the backhaul link and access link of different RNs. This causes a problem that the transmission by one RN interferes with the reception by another RN.

Figure 40:
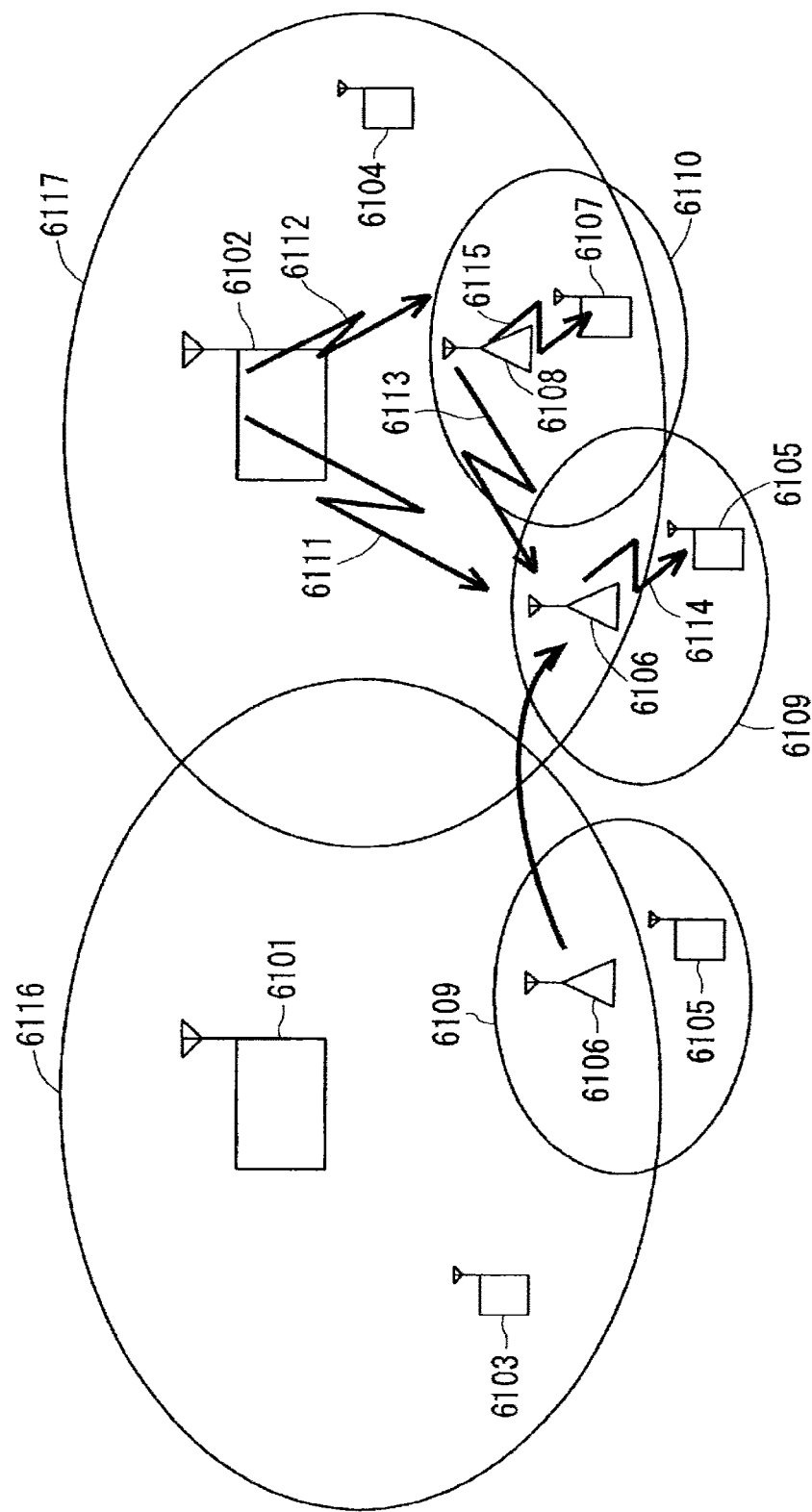
FIG. 40 is a diagram for describing interference occurring between an RN that has moved and an existing RN.
Figure 41:
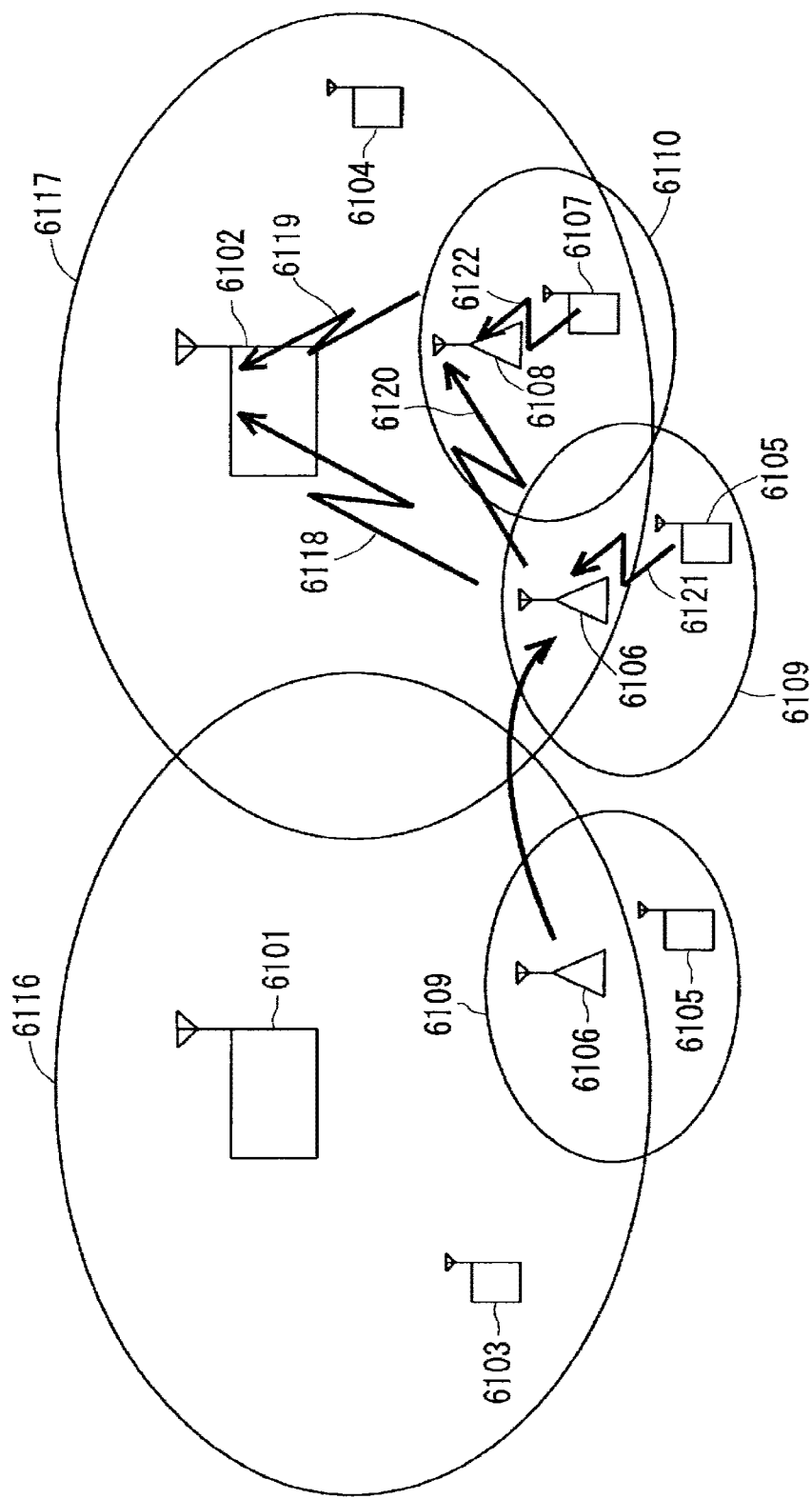
FIG. 41 is another diagram for describing interference occurring between the RN that has moved and the existing RN.

FIGS. 40 and 41 are diagrams for describing interference occurring between an RN that has moved and an existing RN. A first eNB (first DeNB) 6101 provides a first coverage 6116. A second eNB (second DeNB) 6102 provides a second coverage 6117. The first eNB 6101 and second eNB 6102 are DeNBs that have a RN serving function. A first RN 6106 and a third UE 6103 are located being served by the first eNB 6101.

The first RN 6106 provides a first RN coverage 6109. A first UE 6105 is located being served by the first RN 6106. A second RN 6108 and a fourth UE 6104 are located being served by the second eNB 6102. The second RN 6108 provides a second RN coverage 6110. A second UE 6107 is located being served by the second RN 6108. The first RN 6106 is configured to move from being served by the first eNB 6101 to being served by the second eNB 6102.

In FIG. 40, an arrow represented by reference numeral "6111" indicates a downlink (downlink backhaul link) from the second eNB 6102 to the first RN 6106. An arrow represented by reference numeral "6112" indicates a downlink (downlink backhaul link) from the second eNB 6102 to the second RN 6108. An arrow represented by reference numeral "6114" indicates a downlink (downlink access link) from the first RN 6106 to the first UE 6105. An arrow represented by reference numeral "6115" indicates a downlink (downlink access link) from the second RN 6108 to the second UE 6107.

In FIG. 41, an arrow represented by reference numeral "6118" indicates an uplink (uplink backhaul link) from the first RN 6106 to the second eNB 6102. An arrow represented by reference numeral "6119" indicates an uplink (uplink backhaul link) from the second RN 6108 to the second eNB 6102. An arrow represented by reference numeral "6121" indicates an uplink (uplink access link) from the first UE 6105 to the first RN 6106. An arrow represented by reference numeral "6122" indicates an uplink (uplink access link) from the second UE 6107 to the second RN 6108.

When RNs come closer to each other, a downlink access link of one RN interferes with a downlink backhaul link of the other RN. For example, as shown in FIG. 40, when the first RN 6106 that has moved into the coverage 6117 of the second eNB 6102 becomes closer to the second RN 6108, the downlink access link 6115 of the second RN 6108 causes interference 6113 to the downlink backhaul link 6111 of the first RN 6106.

An uplink backhaul link of the RN interferes with an uplink access link of the other RN. For example, as shown in FIG. 41, the transmission of the uplink backhaul link 6118 from the first RN 6106 to the second eNB 6102 causes interference 6120 to the reception of the uplink access link 6122 from the second UE 6107 to the second RN 6108.

This embodiment will disclose a method of reducing interference between the backhaul link and access link of different RNs.

The subframe of the access link is caused to differ from the subframe of the backhaul link between RNs. For example, the subframe of the downlink access link of the second RN 6108 is caused to differ from the subframe of the downlink backhaul link of the first RN 6106. The subframe of the uplink backhaul link of the first RN 6106 is caused to differ from the subframe of the uplink access link of the second RN 6108.

As the method of causing the subframes of the access link to differ from the subframes of the backhaul link between RNs, the RN sets the subframes of the downlink access link which causes interference to MBSFN subframes. The RN avoids uplink scheduling in the subframes of the uplink access link that causes interference.

For example, the uplink access link of the second RN 6108 is not scheduled in the subframe of the uplink backhaul link of the first RN 6106. The uplink access link of the first RN 6106 is not scheduled in the subframe of the uplink backhaul link of the second RN 6108.

As another example, a radio resource for performing scheduling of a backhaul link may differ from a radio resource for performing scheduling of an access link. Radio resources may be provided in RB units, RE units, subcarrier units, or other units.

A radio resource may differ from frequency band to frequency band. The RN may avoid downlink scheduling in a subframe of a downlink access link that causes interference. These methods are also applicable to the method of using subframes that has been disclosed in the sixth modification of the first embodiment.

Figure 42:
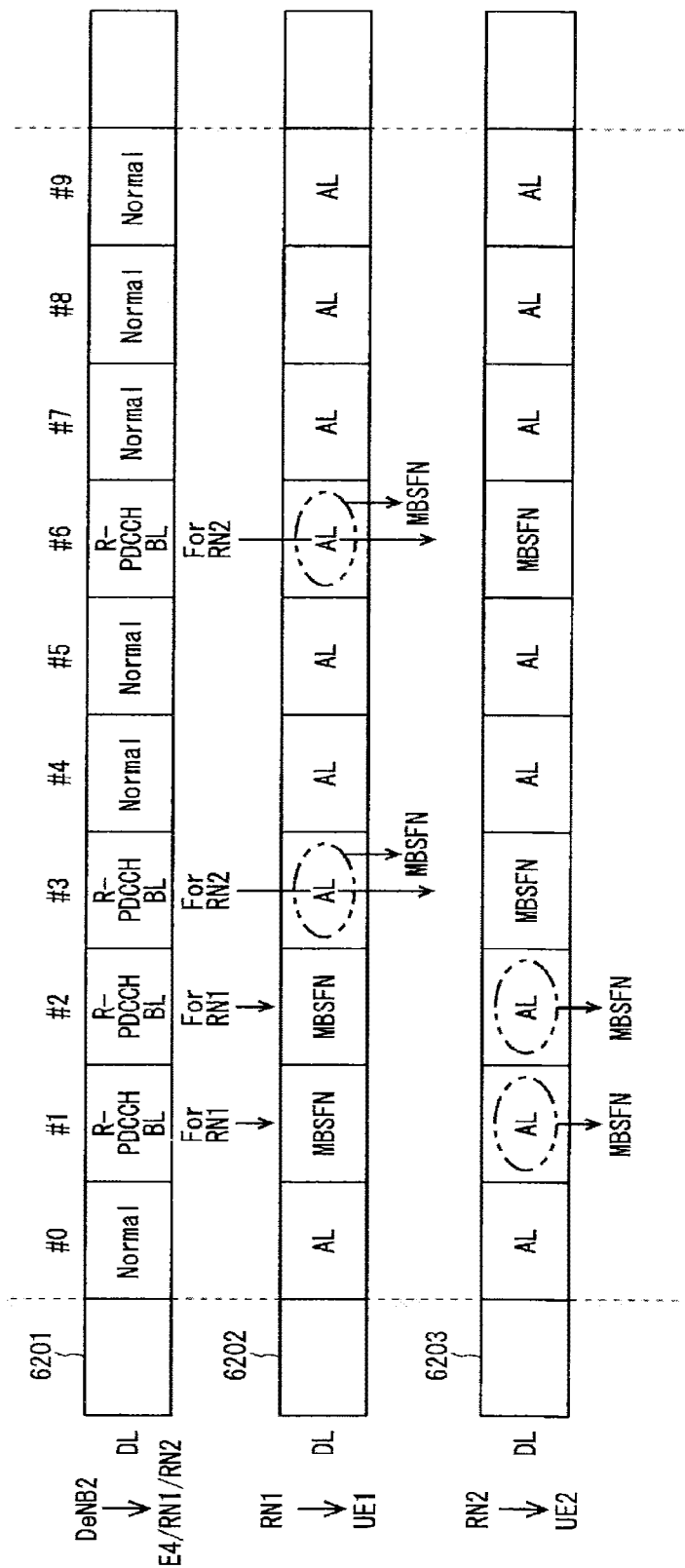
FIG. 42 shows exemplary configurations of downlink subframes in a case where access link subframes and backhaul link subframes differ between RNs.
Figure 43:
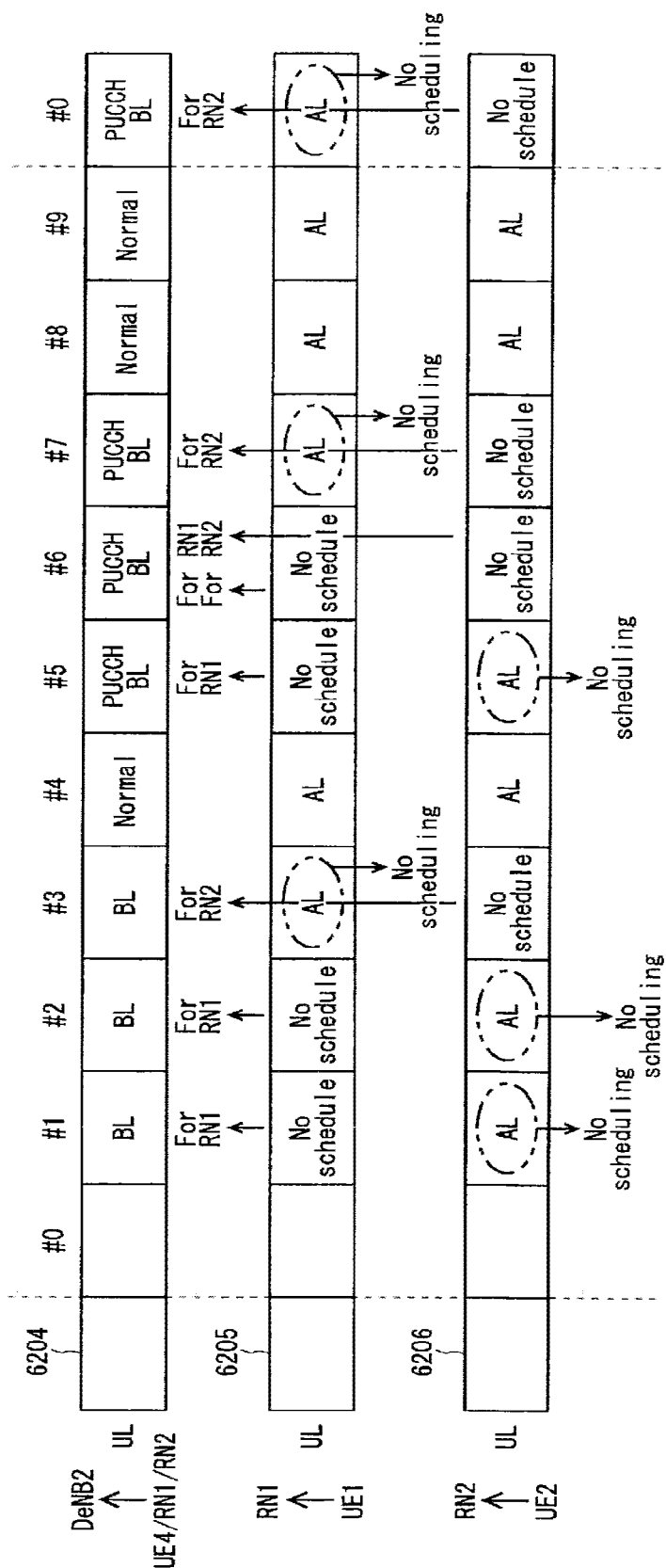
FIG. 43 shows exemplary configurations of uplink subframes in a case where access link subframes and backhaul link subframes differ between RNs.

FIGS. 42 and 43 show an exemplary subframe configuration in a case where the subframe of the access link is caused to differ from the subframe of the backhaul link between RNs. In FIGS. 42 and 43, the second DeNB 6102 shown in FIGS. 40 and 41 is represented by "DeNB2" and the fourth UE 6104 being served by the second DeNB 6102 is represented by "UE4". The first RN 6106 is represented by "RN 1", and the first UE 6105 being served by the first RN 6106 is represented by "UE1". The second RN 6108 is represented by "RN2", and the second UE 6107 being served by the second RN 6108 is represented by "UE2".

FIG. 42 shows the exemplary configurations of the downlink subframes in which the subframe of the access link is caused to differ from the subframe of the backhaul link between RNs. In FIG. 42, the subframes represented by "6201" are an exemplary configuration of the downlink subframes from the second DeNB (DeNB2) 6102 to the fourth UE (UE4) 6104, first RN (RN1) 6106, and second RN (RN2) 6108 being served by the second DeNB 6102. The subframes represented by reference numeral "6202" are an exemplary configuration of the downlink subframes from the first RN (RN1) 6106 to the first UE (UE1) 6105 being served thereby. The subframes represented by reference numeral "6203" are an exemplary configuration of the downlink subframes from the second RN (RN2) 6108 to the second UE (UE2) 6107 being served thereby.

FIG. 43 shows the exemplary configurations of the uplink subframes in a case where the subframe of the access link is caused to differ from the subframe of the backhaul link between RNs. In FIG. 43, the subframes represented by "6204" are an exemplary configuration of the uplink subframes from the fourth UE (UE4) 6104, first RN (RN1) 6106, and second RN (RN2) 6108 being served by the second DeNB (DeNB2) 6102 to the second DeNB (DeNB2) 6102. The subframes represented by reference numeral "6205" are an exemplary configuration of the uplink subframes from the first UE (UE1) 6105 being served by the first RN (RN1) 6106 to the first RN (RN1) 6106. The subframes represented by reference numeral "6206" are an exemplary configuration of the downlink subframes from the second UE (UE2) 6107 being served by the second RN (RN2) 6108 to the second RN (RN2) 6108.

First, the downlinks shown in FIG. 42 will be described. A subframe #1 and a subframe #2 configure RN subframes from the second DeNB (DeNB2) 6102 to the first RN (RN1) 6106. The first RN (RN1) 6106 sets the subframe #1 and the subframe #2 to the MBSFN subframes. Meanwhile, a subframe #3 and a subframe #6 constitute RN subframes from the second DeNB (DeNB2) 6102 to the second RN (RN2) 6108. The second RN (RN2) 6108 sets the subframe #3 and the subframe #6 to the MBSFN subframes.

In this case, the downlink backhaul link 6112 from the second DeNB (DeNB2) 6102 to the second RN (RN2) 6108 overlaps the downlink access link 6114 from the first RN (RN1) 6106 to the first UE (UE1) 6105 in the subframe #3 and the subframe #6. The downlink access link 6114 from the first RN (RN1) 6106 to the first UE (UE1) 6105 accordingly causes interference to the downlink backhaul link 6112 from the second DeNB (DeNB2) 6102 to the second RN (RN2) 6108.

Meanwhile, the downlink backhaul link 6111 from the second DeNB (DeNB2) 6102 to the first RN (RN1) 6106 overlaps the downlink access link 6115 from the second RN (RN2) 6108 to the second UE (UE2) 6107 in the subframe #1 and the subframe #2. The downlink access link 6115 from the second RN (RN2) 6108 to the second UE (UE2) accordingly causes interference to the downlink backhaul link 6111 from the second DeNB (DeNB2) to the first RN (RN1) 6106.

In order to reduce such interference, the subframes #3 and #6 of the downlink access link 6114 from the first RN (RN1) 6106 to the first UE (UE1) 6105 are set to the MBSFN subframes, and the subframes #1 and #2 of the downlink access link 6115 from the second RN (RN2) 6108 to the second UE (UE2) 6107 are set to the MBSFN subframes.

The subframes #1, #2, #3, and #6 are thus set to the MBSFN subframes in the downlink access link 6114 from the first RN (RN1) 6106 to the first UE (UE1) 6105, and the subframes #1, #2, #3, and #6 are set to the MBSFN subframes in the downlink access link 6115 from the second RN (RN2) 6108 to the second UE (UE2) 6107.

The subframes that suffer from interference between a backhaul link and an access link of different RNs are set as the MBSFN subframes, resulting in a reduction in interference.

The uplinks shown in FIG. 43 will be described next. Uplink scheduling from the first RN (RN1) 6106 to the second DeNB (DeNB2) 6102 is performed in the subframes #1, #2, #5, and #6, and the first RN (RN1) 6106 performs the transmission of an uplink backhaul link. The first RN (RN1) 6106 does not perform uplink scheduling to the first UE (UE1) 6105 in the subframes #1, #2, #5, and #6. The first RN (RN1) 6106 accordingly does not perform the reception of the uplink access link 6121 from the first UE (UE1) 6105 being served thereby in these subframes.

Meanwhile, in the subframes #0, #3, #6, and #7, uplink scheduling from the second RN (RN2) 6108 to the second DeNB (DeNB2) 6102 is performed, and the second RN (RN2) 6108 performs the transmission of an uplink backhaul link. The second RN (RN2) 6108 does not perform uplink scheduling to the second UE (UE2) 6107 in the subframes #0, #3, #6, and #7. The second RN (RN2) 6108 accordingly does not perform the reception of the uplink access link 6122 from the second UE (UE2) 6107 being served thereby in these subframes.

In this case, the uplink backhaul link 6119 from the second RN (RN2) 6108 to the second DeNB (DeNB2) 6102 overlaps the uplink access link 6121 from the first UE (UE1) 6105 to the first RN (RN1) 6106 in the subframes #0, #3, and #7. The uplink backhaul link 6119 from the second RN (RN2) 6108 to the second DeNB (DeNB2) 6102 accordingly causes interference to the uplink access link 6121 from the first UE (UE1) 6105 to the first RN (RN1) 6106.

Meanwhile, the uplink backhaul link 6118 from the first RN (RN1) 6106 to the second DeNB (DeNB2) 6102 overlaps the uplink access link 6122 from the second UE (UE2) 6107 to the second RN (RN2) 6108 in the subframes #1, #2, and #5. The uplink backhaul link 6118 from the first RN (RN1) 6106 to the second DeNB (DeNB2) 6102 accordingly causes interference to the uplink access link 6122 from the second UE (UE2) 6107 to the second RN (RN2) 6108.

In order to reduce such interference, the first RN (RN1) 6106 avoids uplink scheduling in the subframes #0, #3, and #7 of the uplink access link 6121 from the first UE (UE1) 6105 to the first RN (RN1) 6106. The second RN (RN2) 6108 avoids uplink scheduling in the subframes #1, #2, and #5 of the uplink access link 6122 from the second UE (UE2) 6107 to the second RN (RN2) 6108.

Thus, in the uplink access link 6121 from the first UE (UE1) 6105 to the first RN (RN1) 6106, uplink scheduling is set not to be performed in the subframes #0, #1, #2, #3, #5, and #6. In the uplink access link 6122 from the second UE (UE2) 6107 to the second RN (RN2) 6108, uplink scheduling is set not to be performed in the subframes #0, #1, #2, #3, #5, and #6.

A time offset may be provided to frame timings of the DeNB and RN. A time offset may be provided to a frame timing of a backhaul link and a frame timing of an access link. The time offset may be provided in subframe units. The subframe numbers at the same time differ from one another in this case. In consideration of the above, setting may be made as to which subframe is an MBSFN subframe and in which subframe scheduling is not performed. An offset of a frame timing per RN may be determined by the DeNB. An offset may be set in the frame timing of the access link based on the frame timing of the backhaul link.

Uplink scheduling is avoided in the subframe that causes interference between the backhaul link and access link of different RNs in this manner, resulting in a reduction in interference.

Through the above, the subframe of an access link can differ from the subframe of a backhaul link between RNs, resulting in a reduction in interference caused by the transmission by one RN to the reception by the other RN.

Disclosed below is a method in which if the RN performs HO, a target eNB that is an eNB being a moving destination sets the RN subframe configuration of this RN. In 3GPP, nothing has been discussed and no technology has been disclosed as to this method. Unlike a conventional fixed RN, the following becomes an issue: in a case where the RN performs HO, at which timing, which node sets an RN subframe configuration, and how to notify the RN.

The following two specific examples (1) and (2) will be described as the method of setting an RN subframe configuration when an RN performs HO.

(1) Before the RN is connected to the target eNB, the source eNB notifies the RN of the information about the RN subframe configuration set by the target eNB.

(2) After the RN is connected to the target eNB, the target DeNB notifies the RN of the information about the RN subframe configuration set by the target eNB.

In these methods, if the RN subframe configuration set by the target eNB is identical to the RN subframe configuration set in the source eNB, the process in which the target eNB notifies the RN of the RN subframe configuration may be skipped.

FIG. 44 shows an exemplary sequence of a mobile communication system in the third embodiment. The sequence shown in FIG. 44 is similar to the sequence shown in FIG. 16, and thus, the same steps will be denoted by the same step numbers and common description will be omitted. FIG. 44 shows the sequence in a case where before the RN is connected to the target eNB, the source eNB notifies the RN of the information about the RN subframe configuration set by the target eNB.

After determining to perform HO in Step ST1604, the source eNB moves to Step ST6301.

In Step ST6301, the source eNB notifies the target eNB of the information about an RN subframe configuration of the RN being a handover object set by the source eNB. The information about the RN subframe configuration of the RN set by the source eNB may be included in a request of handover (HO request) message or may be notified as other message or as other signaling.

The target eNB moves to Step ST6302 in a case of judging in Step ST1606 that it can accept the handover of the RN or ends the process in a case of judging in Step ST1606 that it cannot accept the handover.

In Step ST6302, the target eNB determines an RN subframe configuration of the RN.

In Step ST6303, the target eNB notifies the source eNB of the information about the determined RN subframe configuration (hereinafter, also referred to as "RN subframe configuration information"). The RN subframe configuration information determined by the target eNB may be included in a handover request response (HO request Ack) message or may be notified as other message or through other signaling.

If a time offset is provided to a frame timing, it suffices to notify the time offset information together with the RN subframe configuration information. This is applicable to embodiments and modifications thereof below.

In Step ST6304, the source eNB that has received the RN subframe configuration information determined by the target eNB notifies the RN, which is to be caused to perform handover, the RN subframe configuration information determined by the target eNB. The RN subframe configuration information determined by the target eNB may be notified together with mobility control information or may be notified as other message or through other signaling.

In Steps ST6303 and ST6304, the RN subframe configuration information determined by the target eNB may be notified by being included in an RN reconfiguration message. The system information of the target eNB may be notified together with the RN subframe configuration information determined by the target eNB. The RN is capable of obtaining the system information of the target eNB before being connected to the target eNB, allowing for a reduction in control delay when the RN is connected to the target eNB.

Signaling between the source eNB and target eNB is performed by means of an X2 interface.

Through the above, the RN can receive the RN subframe configuration set by the target eNB when the RN performs HO. The method of the specific example (1) above enables the RN to obtain the RN subframe configuration set by the target eNB before being connected to the target eNB, thereby allowing prompt setting of the subframes for the backhaul link and access link.

This exemplary sequence is configured such that in Step ST6301, the source eNB notifies the target eNB of the RN subframe configuration information of the RN set by the source eNB. This enables the target eNB to set the RN subframe configuration in consideration of this information.

As an example, if the RN subframe configuration set by the source eNB can be configured by the target eNB, the target eNB also uses this RN subframe configuration for the RN. This does not change the RN subframe configuration, reducing a load in the control process by the RN.

As another method, in Step ST6301, the source eNB needs not to notify the target eNB of the RN subframe configuration information of the RN set by the source eNB. This allows for a reduction in message information amount in a case where the target eNB sets the RN subframe configuration without consideration of the RN subframe configuration set by the source eNB.

Figure 45:
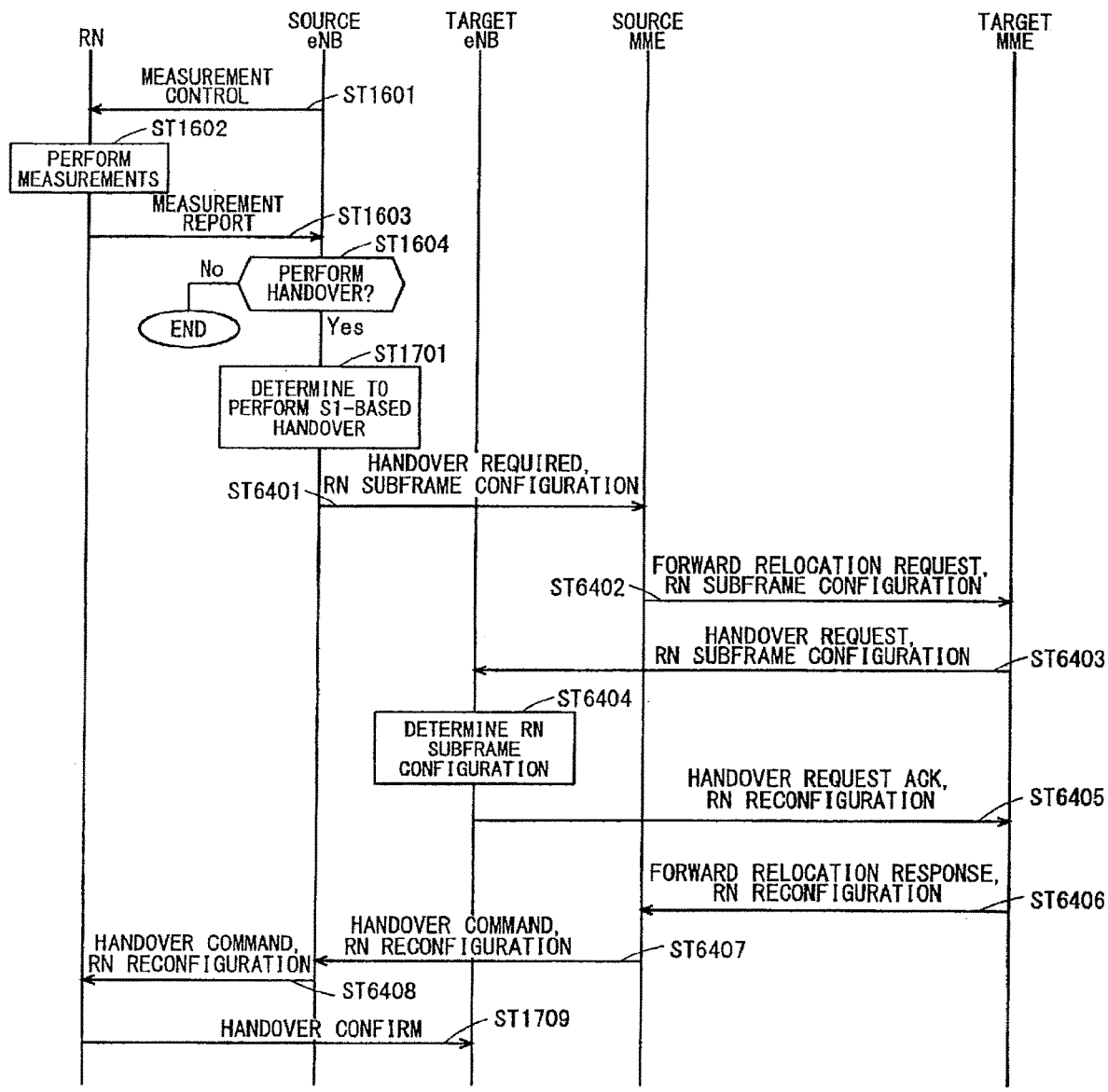
FIG. 45 shows an exemplary sequence of the mobile communication system in the third embodiment.

FIG. 45 shows an exemplary sequence of the mobile communication system in the third embodiment. The sequence shown in FIG. 45 is similar to the sequence shown in FIG. 17, and thus, the same steps will be denoted by the same step numbers and common description will be omitted. FIG. 45 shows the sequence in a case where before the RN is connected to the target eNB, the source eNB notifies the RN of the information about the RN subframe configuration set by the target eNB.

In this exemplary sequence, the information about the RN subframe configuration between the source eNB and the target eNB is transmitted/received by means of an S1 interface. Described here is a case in which HO is performed based on an S1 interface, that is, S1-based HO is performed.

In Step ST6401, the source eNB that has determined to perform S1-based HO in Step ST1701 notifies the source MME of the information about the RN subframe configuration of the RN being a HO object set by the source eNB.

The information about the RN subframe configuration of the RN that has been set by the source eNB may be included in a request of handover (handover required) message or may be notified as other message or as other signaling.

In Step ST6402, the source MME notifies the target MME of the information about the RN subframe configuration of the RN that has been set by the source eNB. The information about the RN subframe configuration of the RN that has been set by the source eNB may be included in a forward relocation request message or may be notified as other message or as other signaling.

In Step ST6403, the target MME notifies the target eNB of the information about the RN subframe configuration of the RN that has been set by the source eNB. The information about the RN subframe configuration of the RN that has been set by the source eNB may be included in a handover request message or may be notified as other message or as other signaling.

In Step ST6404, the target eNB determines the RN subframe configuration of the RN.

In Step ST6405, the target eNB notifies the target MME of the information about the determined RN subframe configuration. The RN subframe configuration information determined by the target eNB may be included in a handover request response (handover request Ack) message or may be notified as other message or through other signaling.

In Step ST6406, the target MME notifies the source MME of the RN subframe configuration information determined by the target eNB. The RN subframe configuration information determined by the target eNB may be included in a forward relocation response message or may be notified as other message or through other signaling.

In Step ST6407, the source MME notifies the source eNB of the RN subframe configuration information determined by the target eNB. The RN subframe configuration information determined by the target eNB may be included in a handover command message or may be notified as other message or through other signaling.

In Step ST6408, the source eNB notifies the RN being a handover object of the RN subframe configuration information determined by the target eNB. The RN subframe configuration information determined by the target eNB may be included in a handover command message or may be notified as other message or through other signaling.

Signaling between the source eNB and target eNB is performed by means of an S1 interface through the source MME and target MME.

In Steps ST6405 to ST6408, the RN subframe configuration information determined by the target eNB may be notified by being included in an RN reconfiguration message. Or, the system information of the target eNB may be notified together with the RN subframe configuration information determined by the target eNB. The RN is capable of obtaining the system information of the target eNB before being connected to the target eNB, resulting in a reduction in control delay when the RN is connected to the target eNB.

Through the above, the effects similar to those described above can be achieved, which further allows for the application to a case in which S1-based HO is performed.

In Steps ST6401 to ST6403, the source eNB needs not to notify the target eNB of the RN subframe configuration information of the RN that has been set by the source eNB. In a case where, for example, the target eNB sets the RN subframe configuration without considering the RN subframe configuration set by the source eNB, an information amount of messages can be reduced.

FIG. 46 shows an exemplary sequence of the mobile communication system in the third embodiment. The sequence shown in FIG. 46 is similar to the sequences shown in FIGS. 16 and 44, and thus, the same steps will be denoted by the same step numbers and common description will be omitted. FIG. 46 shows the sequence in a case where the RN is connected to the target eNB, and then, the target DeNB notifies the RN of the information about the RN subframe configuration set by the target eNB.

In Step ST1612, the RN being a handover object completes RRC connection with the target eNB. In Step ST6501, the target eNB determines the RN subframe configuration of the newly RRC-connected RN.

In Step ST6502, the target eNB notifies the RN of the determined RN subframe configuration information. The RN subframe configuration information determined by the target eNB may be notified by being included in the RN reconfiguration message. Or, the system information of the target eNB may be notified together with the RN subframe configuration information determined by the target eNB. The RN is capable of obtaining the system information of the target eNB before being connected to the target eNB, resulting in a reduction in control delay when the RN is connected to the target eNB.

In Step ST6503, the RN notifies the target eNB of an RN subframe configuration completion (RN reconfiguration complete) message.

Through the above, the RN is capable of receiving the RN subframe configuration set by the target eNB when the RN performs HO. In the method of the specific example (2), the RN obtains the RN subframe configuration set by the target eNB after being connected to the target eNB. This prevents unnecessary signaling of an RN subframe configuration, which occurs in a HO failure and HO rejection by the target eNB.

Figure 47:
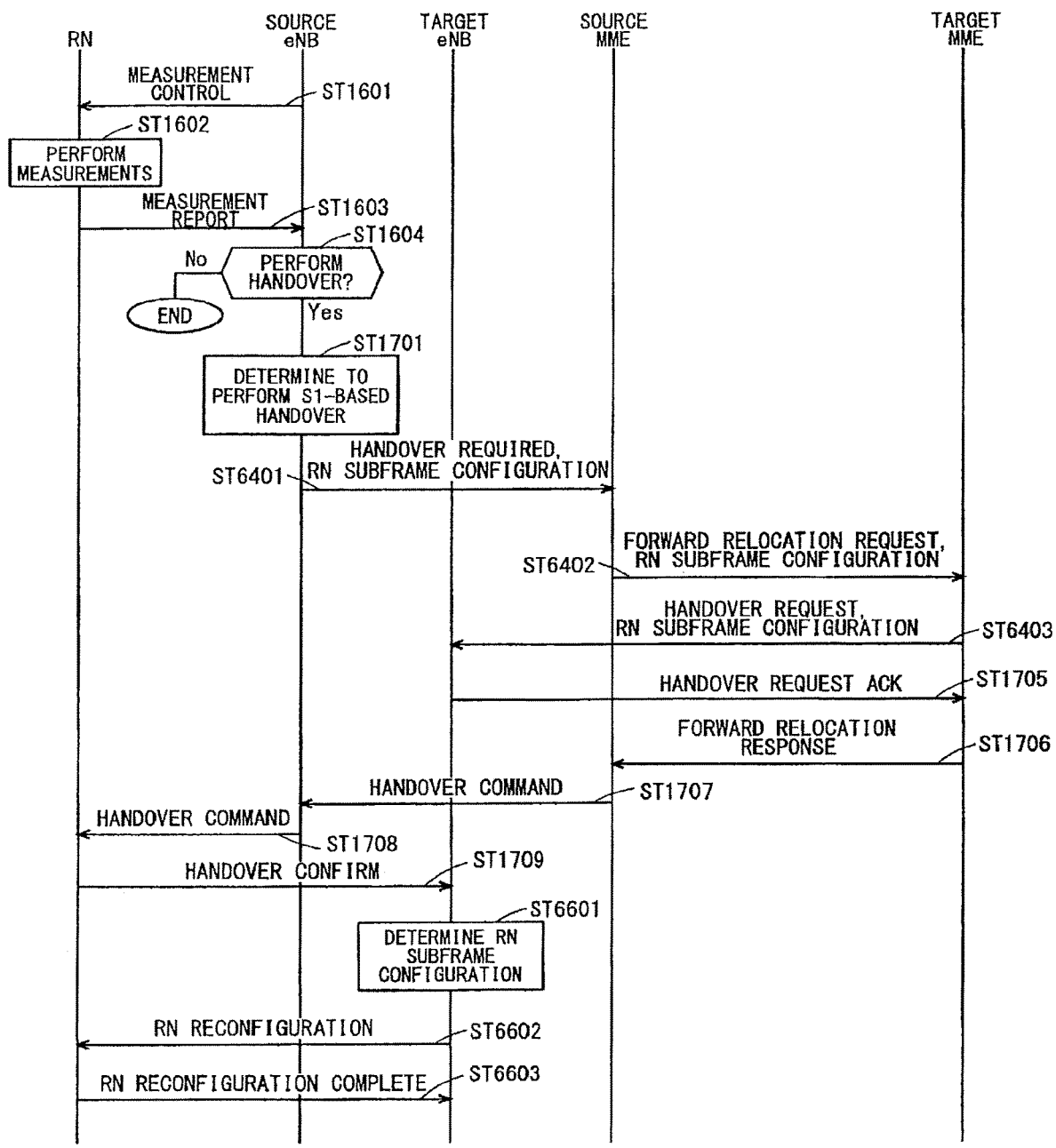
FIG. 47 shows an exemplary sequence of the mobile communication system in the third embodiment.

FIG. 47 shows an exemplary sequence of the mobile communication system in the third embodiment. The sequence shown in FIG. 47 is similar to the sequences shown in FIGS. 17 and 45, and thus, the same steps will be denoted by the same step numbers and common description will be omitted. FIG. 47 shows the sequence in a case where the RN is connected to the target eNB, and then, the target DeNB notifies the RN of the information about the RN subframe configuration set by the target eNB. FIG. 47 shows a case in which S1-based HO is performed.

In Step ST1709, the RN being a handover object completes the RRC connection with the target eNB, and notifies the target eNB of a handover confirmation response (handover confirm) message.

In ST6601, the target eNB determines an RN subframe configuration of the newly RRC-connected RN.

In Step ST6602, the target eNB notifies the RN of the determined RN subframe configuration information. The RN subframe configuration information determined by the target eNB may be notified by being included in the RN reconfiguration message. The system information of the target eNB may be notified together with the RN subframe configuration information determined by the target eNB. The RN is capable of obtaining the system information of the target eNB before being connected to the target eNB, resulting in a reduction in control delay when the RN is connected to the target eNB.

In Step ST6603, the RN notifies the target eNB of an RN subframe configuration completion (RN reconfiguration complete) message.

Through the above, effects similar to those described above can be achieved, which further allows for application also to a case in which S1-based HO is performed.

Disclosed next is a specific example of the method of causing the subframes of an access link to differ from the subframes of a backhaul link between RNs.

As the method of causing the subframes of an access link to differ from the subframes of a backhaul link between RNs, it has been disclosed that the RN sets the subframes of a downlink access link that causes interference to MBSFN subframes and that the RN avoids uplink scheduling in the subframes of an uplink access link that causes interference.

The RN normally does not recognize the subframe that causes interference. The method in which the RN recognizes a subframe that causes interference is thus expected. The following two specific examples (1) and (2) will be described as the method in which an RN recognizes a subframe that causes interference.

(1) A DeNB notifies an RN of RN subframe configuration information of other RN.

(2) At least any one of RN subframe configuration information and MBSFN subframe configuration information is notified between RNs. As an example, the RN notifies an RN nearby of at least any one of the RN subframe configuration information and MBSFN subframe configuration information of the own cell.

The methods allow the RN to recognize a subframe that causes interference.

When reducing interference between RNs, interference may be reduced among all the RNs being served by a DeNB or may be reduced among limited RNs. The following three specific examples (1) to (3) will be described as the method of limiting RNs.

(1) An RN measures a surrounding radio wave environment and detects nearby RNs. The RN reports the detected nearby RNs to the DeNB. The DeNB selects part or all of the RNs reported.

(2) The RN measures the position of the own RN and notifies the DeNB or network (NW) of the location information. The DeNB detects, from the notified location information of the RN, RNs located near the reported RN, and then selects part or all of the detected RNs.

(3) The RN measures a surrounding radio wave environment and detects nearby RNs. The RN selects a part or the whole of the detected nearby RNs.

Through the above, the RNs that suffer from interference can be selected to limit the RNs whose interference is to be reduced.

The DeNB may request the location information of the RN or information on an RN located nearby from the RN. Any of the methods (1) to (3) above may be performed in response to this request.

As another method, the RN appropriately measures the information or location information on a nearby RN and appropriately notifies the NW of such information. Examples of the NW include an MME and an HSS. The NW may be an OAM. The NW stores the information or location information on a nearby RN that has been measured by the RN. The DeNB may notify the NW of appropriate information on an RN, for example, an identity, as required and request the information or location information on an RN located near the relevant RN. The NW notifies the DeNB of the information or location information on an RN located near the relevant RN in response to this request. Or, the NW may have the function of detecting an RN located nearby from the location information on the RN. The NW may notify the information on a nearby RN that has been derived from the location information, in response to a request for the information on a nearby RN that is transmitted from the DeNB.

If RNs whose interference is to be reduced are limited, the information on the number of limited RNs may be notified in the above-mentioned method in which an RN recognizes a subframe that causes interference. For example, the DeNB may notify the RN of the number of other RNs as well as the RN subframe configuration information on those RNs.

The methods (1) and (2) above may be applied to a case in which the DeNB notifies the RN of the RN subframe configuration information on other RN in the method in which the RN recognizes a subframe that causes interference. The method (3) above may be applied to a case in which at least any one of the RN subframe configuration information and the MBSFN subframe configuration information is notified between RNs in the method in which the RN recognizes a subframe that causes interference.

The limitation of RNs whose interference is to be reduced leads to the limitation of the number of the subframes that are set to MBSFN subframes or the subframes that are not scheduled, resulting in an improvement in resource use efficiency and an increase in communication capacity.

The method in which an RN changes the MBSFN subframe configuration of a downlink access link will be disclosed. The following two specific examples (1) and (2) will be described for the body that determines to change an MBSFN subframe configuration.

(1) An RN determines to change an MBSFN subframe configuration.

(2) A DeNB determines to change the MBSFN subframe configuration of an RN.

In the specific example (1), the RN may determine a change upon receipt of other RN subframe configuration information from the DeNB. This may be applied to the above-mentioned method in which a DeNB notifies an RN of the RN subframe configuration information of other RN. Or, the RN may determine a change upon receipt of at least any one of the RN subframe configuration information and the MBSFN subframe configuration information from other RN. This may be applied to the above-mentioned method in which at least any one of the RN subframe configuration information and the MBSFN subframe configuration information is notified between RNs.

The RN that has determined to change an MBSFN subframe configuration changes the MBSFN subframe configuration of a downlink access link.

In the specific example (2), the DeNB may determine a change upon RRC connection of the RN with the DeNB. For example, the target eNB determines a change upon receipt of RRC connection completion from the RN through HO of the RN. Or, the DeNB may determine a change upon receipt of the information on a nearby RN from the RN. Or, the DeNB may determine a change upon receipt of the information on a nearby RN from the NW. Or, the DeNB may determine a change upon detection of a nearby RN based on the location information from the RN.

The DeNB, which has determined to change the MBSFN subframe configuration of the RN, notifies this RN of a change of the MBSFN subframe configuration. The information indicative of a change of the MBSFN subframe configuration may be provided and be notified through RRC signaling, MAC signaling, or by being included in the control information to be mapped to the PDCCH. The RN that has received the information indicative of a change of the MBSFN subframe configuration changes the MBSFN subframe configuration of a downlink access link.

The method in which an RN changes an MBSFN subframe configuration will be disclosed. The MBSFN subframe configuration is broadcast as system information. It thus suffices to modify the system information for changing the MBSFN subframe configuration. Specifically, the RN notifies, through paging, a UE being served thereby of the information indicative of a modification of the system information. The UE that has received this information receives the modified system information, which is broadcast from the RN. The procedure for modifying system information can be executed in any of a case where the UE is in an RRC_Idle state and a case where it is in an RRC_Connected state.

This allows the RN to change the MBSFN subframe configuration.

Disclosed below is an operational example of the method of causing the subframes of an access link to differ from the subframes of a backhaul link between RNs.

Figure 48:
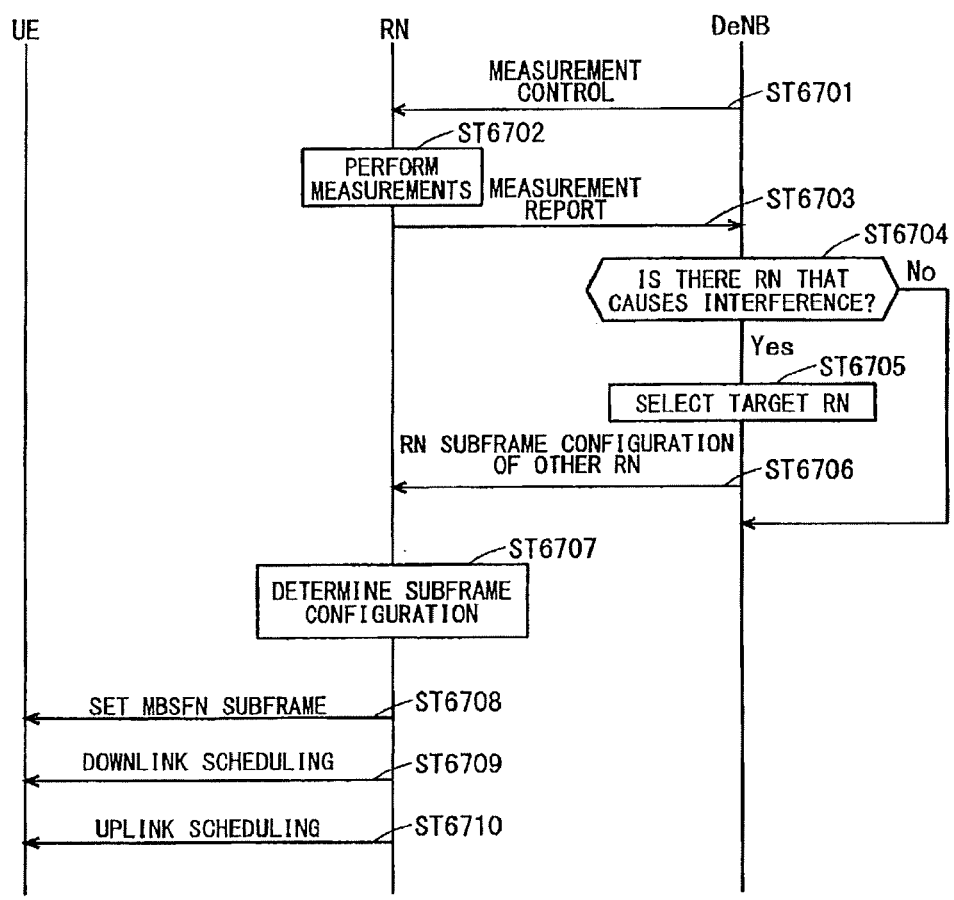
FIG. 48 shows an exemplary sequence of the mobile communication system in the third embodiment.

FIG. 48 shows an exemplary sequence of the mobile communication system in the third embodiment. FIG. 48 shows the sequence after the RN has performed HO and has completed RRC connection with the DeNB. FIG. 48 shows the sequence in a case where the subframe of an access link is caused to differ from the subframe of a backhaul link between RNs.

In Step ST6701, the DeNB notifies the RN of the information for requesting a measurement of a surrounding radio wave environment and information such as measurement conditions and report conditions. The information may be notified in a measurement control message or may be notified as other message or as other signaling.

In Step ST6702, the RN measures a surrounding radio wave environment. In Step ST6703, the RN notifies the DeNB of information such as RN identity, for example, cell identity, as to an RN that meets the report conditions. The report conditions and measurement results may also be notified together at this time. The information may be notified in a measurement report message or may be notified as other message or as other signaling.

In Step ST6704, the DeNB judges whether there is an RN that causes interference with the relevant RN. The DeNB moves to Step ST6705 in a case of judging that there is an RN that causes interference or will not perform the processes after Step ST6704 in a case of judging that there is no RN that causes interference. The DeNB may judge whether there is an RN that causes interference based on the information received from the RN in Step ST6703. The threshold for judging that interference is the issue may be provided. For example, a threshold may be provided for reception power or reception quality such as RSRP or reference signal received quality (RSRQ) to judge that interference is the issue if the reception power or reception quality is equal to or more than the threshold.

The threshold may be set by the DeNB and notified by being included in a measurement control message as report conditions of Step ST6701. In this case, in Step ST6703, the RN may notify the DeNB of an RN having a reception power or reception quality equal to or more than the threshold.

In Step ST6705, the DeNB that has judged in Step ST6704 that there is an RN that causes interference with the relevant RN selects an RN whose interference is to be reduced. The DeNB recognizes the RN subframe configuration of the selected RN.

In Step ST6706, the DeNB notifies the RN of the information about an RN subframe configuration of other RN. The DeNB may notify a cell identity together with the RN subframe configuration of the other RN. The RN selected in Step ST6705 is taken as other RN. This may be notified through RRC signaling or by means of an S1 interface.

In ST6707, the RN determines the subframe configuration of an access link using the received RN subframe configuration of other RN. As the method of causing the subframes of an access link to differ from the subframes of a backhaul link between RNs, as described above, the RN may recognize the subframe configuration of a backhaul link of other RN from the RN subframe configuration of the other RN and set the subframes in the downlink access link to MBSFN subframes.

In ST6708, the RN sets the subframe in the downlink access link to an MBSFN subframe. If there is an MBSFN subframe that has been already set, the RN may set subframe such that other MBSFN subframes are added or may reset the subframe together with an MBSFN subframe to be newly set. The MBSFN subframe may be set by means of the above-mentioned method in which the RN changes an MBSFN subframe configuration. The UE that has received the setting information of the changed MBSFN subframe performs the reception process on this subframe as an MBSFN subframe.

In Steps ST6709 and ST6710, the RN avoids downlink scheduling in the subframe of a downlink access link that causes interference and avoids uplink scheduling in the subframe of the uplink access link that causes interference.

The RN, which has been notified of the information about the RN subframe configuration of other RN from the DeNB in Step ST6706, promptly performs the processes of Steps ST6707, ST6708, ST6709, and ST6710. This minimizes the period in which interference occurs.

The RN may measure a surrounding radio wave environment in Step ST6702 and, in Step ST6703, notify the DeNB of the information about the cell that meets the report conditions, such as a cell identity. This is applicable to a case in which the RN fails to judge whether the neighbor cell is an RN. In this case, in Step ST6704, the DeNB may judge whether there is an RN that causes interference from the cells that has been reported.

The RN may broadcast, as system information, the information indicative of whether the own cell is an RN. When measuring a surrounding radio wave environment in Step ST6702, the RN receives broadcast information of a cell that meets the report conditions and judges whether the cell is an RN. In Step ST6703, the RN may associate the information as to whether the own cell is an RN with the cell information that meets the report conditions and then notify the DeNB of the resultant information. Or, in Step ST6703, the RN may notify the DeNB of only the RN information that meets the report conditions. In Step ST6704, the DeNB may judge whether there is an RN that causes interference, using this information. This allows the RN to judge the presence of a neighbor RN.

In Step ST6701, the DeNB may notify the RN of a cell that causes the RN to perform measurements. On that occasion, targets may be limited to RNs. This results in a reduction in amount of information in signaling.

Through the above, the subframe of an access link can differ from the subframe of a backhaul link between RNs, resulting in a reduction in interference occurring between the backhaul link and the access link of different RNs. The interference caused by the transmission by the RN to other RN can be reduced.

The methods disclosed above including one disclosed in this exemplary sequence may be appropriately used in combination, and similar effects can be achieved.

While the RN performs measurements based on a request for measuring a surrounding radio wave environment from the DeNB in Step ST6702, the RN may autonomously measure a surrounding radio wave environment without a request for measuring a surrounding radio wave environment from the DeNB. In that case, the measurement conditions and report conditions may be broadcast from the DeNB in advance or may be statically determined based on, for example, standards in advance. This results in a reduction in signaling between the RN and DeNB.

A trigger for measurements may be appropriately set by the RN or may be the transmission of RRC connection completion when the RN is newly RRC-connected to the DeNB, for example, when the RN performs HO. Interference can be reduced immediately after the execution of HO by measuring, as a trigger, the transmission of RRC connection completion when HO is performed.

The RN may measure a surrounding radio wave environment at regular time intervals or in cycles. The RN may independently set the regular time intervals or cycles or the DeNB connected with the RN may notify them. The DeNB may notify the RN when the RN attaches to the DeNB, when the RN performs HO, or when the RN performs cell reselection. Or, the DeNB may appropriately notify the RN. A notification from the DeNB may be broadcast by being included in system information or may be notified individually to the RNs. In a case where RNs are notified individually, a notification may be made through RRC signaling. For example, the DeNB may notify the regular time intervals or cycles in Step ST6701. The RN measures a surrounding radio wave environment at regular time intervals or in cycles that have been notified.

This allows the RN to measure a surrounding radio wave environment at regular time intervals or in cycles and detect an RN that causes interference. Thus, an RN that causes interference can be updated at regular time intervals or in cycles. The DeNB can update an RN that causes interference based on the surrounding radio wave environment measurement results notified from the RN. For example, the DeNB may use the updated information in judging whether there is an RN that causes interference to the relevant RN and in selecting an RN whose interference is to be reduced.

The DeNB can accordingly notify the RN of the updated RN subframe configuration of an RN that causes interference, and the relevant RN can set a subframe configuration based on the notified information.

Through the above, for example, also in a case where other RN, which has been located near the RN and has caused interference during moving of the RN, causes no interference, the other RN can be removed from the RNs that cause interference, and it is not necessary to take into consideration the RN subframe configuration of the other RN. This results in an improvement in resource use efficiency.

The RN may notify the DeNB of an MBSFN subframe configuration after determining or setting the MBSFN subframe of an access link in Step ST6707 or ST6708. The DeNB is capable of judging whether interference can be avoided through reception of the MBSFN subframe of an access link from each RN.

If interference cannot be avoided, a modification of the MBSFN subframe configuration of an access link may be requested or the RN subframe configuration of a backhaul link may be modified for a desired RN. This reduces interference between RNs that inevitably cause interference.

Disclosed below is another operational example of the method of causing the subframes of an access link to differ from the subframes of a backhaul link between RNs.

Figure 49:
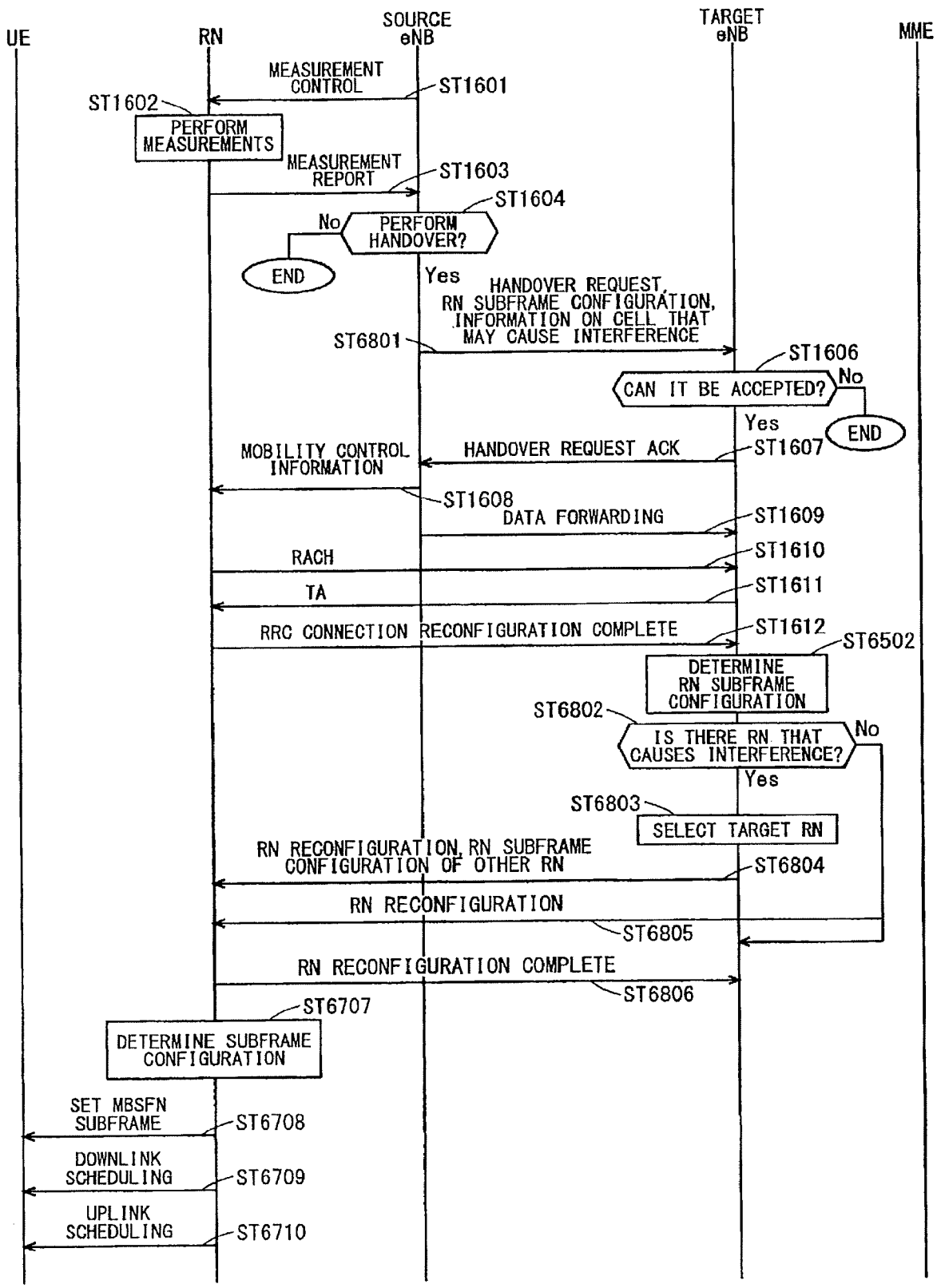
FIG. 49 shows an exemplary sequence of the mobile communication system in the third embodiment.

FIG. 49 shows an exemplary sequence of the mobile communication system of the third embodiment. The sequence shown in FIG. 49 is similar to the sequences shown in FIGS. 46 and 48, and thus, the same steps will be denoted by the same step numbers and common description will be omitted. FIG. 49 shows the sequence in a case where the subframe of an access link is caused to differ from the subframe of a backhaul link between RNs.

In the measurement processes of Steps ST1601 to ST1603, the RN also detects a cell that may cause interference and notifies the source eNB (DeNB) of the detected cell. The processes of Steps ST6701 to ST6703 of FIG. 48 may be performed together between the source eNB (DeNB) and the RN. This results in a reduction in signaling amount for measurement.

The processes of Steps ST6701 to ST6703 of FIG. 48 may be performed separately after the process of Step ST1603 or the process of Step ST1604. The source eNB can thus cause a desired RN to perform the measurement process of the cell that causes interference. The signaling amount can be accordingly reduced as a system. A desired RN may be, for example, an RN that is caused to perform handover.

In Step ST6801, the source eNB notifies the target eNB of the information about the RN subframe configuration of an RN being a handover object set by the source eNB. At this time, the source eNB notifies the target eNB of the information about a cell that may suffer from interference, which has been notified from the RN. The information about a cell may be a cell identity, detection conditions, measurement results, or the like. The cell-related information may be included in a handover request message or may be notified as other message or as other signaling.

The target eNB continuously performs a HO procedure in Step ST1606, and in Step ST1612, the RRC connection is completed between the RN and the target eNB.

In Step ST6502, the target eNB determines an RN subframe configuration of the RRC-connected RN.

In Step ST6802, the target eNB judges whether there is an RN that causes interference with the relevant RN using the information about a cell that may suffer from interference, which has been received from the source eNB in Step ST6801. The method shown in FIG. 48 is applicable as the method of judging whether there is an RN that causes interference.

The DeNB knows an RN being served thereby. The DeNB may recognize the cell identity of the RN as the method of recognizing an RN being served thereby. This allows the DeNB to judge whether a cell that may cause interference is an RN based on the cell identity of the cell, which has been received from the source eNB. In this manner, the DeNB judges whether there is an RN that causes interference with the relevant RN.

In Step ST6803, the DeNB that has judged in Step ST6802 that there is an RN that causes interference with the relevant RN selects an RN whose interference is to be reduced. The DeNB recognizes the RN subframe configuration of the selected RN.

In Step ST6804, the DeNB notifies the RN of RN subframe configuration information of other RN. The RN selected in Step ST6803 is taken as other RN. This notification may be made through RRC signaling or by means of an S1 interface. The RN subframe configuration information of other RN may be notified together with the RN subframe configuration information of the RN determined in Step ST6502 by the target eNB. At least any one of the RN subframe configuration information of an RN and the RN subframe configuration information of other RN may be notified by being included in an RN reconfiguration message. Or, system information of the target eNB may be notified together.

In Step ST6805, the DeNB, which has judged that there is no RN that causes interference with the relevant RN in Step ST6802, notifies the relevant RN of the RN subframe configuration information of an RN.

In Step ST6806, the RN notifies the target eNB of an RN subframe configuration completion (RM reconfiguration complete) message.

In Steps ST6707 to ST6710, the RN, which has received at least any one of the RN subframe configuration information of the own RN and the RN subframe configuration information of other RN, sets the subframe of an access link of the own RN and performs uplink scheduling or downlink scheduling.

The RN, which has been notified of the RN subframe configuration information of other RN from the DeNB in Step ST6804, promptly performs the processes of Steps ST6707, ST6708, ST6709, and ST6710 as in the method disclosed in FIG. 48. This minimizes the period in which interference occurs.

Through the above, the subframe of an access link can differ from the subframe of a backhaul link between RNs, resulting in a reduction in interference occurring between the backhaul link and access link of different RNs. This reduces interference caused by the transmission by an RN to the reception by other RN.

The source eNB detects a cell that may cause interference based on a measurement report from an RN and notifies the target eNB of the detected cell, which eliminates the need for the target eNB to notify the information for requesting a measurement of a surrounding radio wave environment and information such as measurement conditions and report conditions. The RN needs not to measure a surrounding radio wave environment. This results in a reduction in signaling amount and also a reduction in load of the RN in the measurement process.

The RN is capable of receiving an RN subframe configuration of other RN together with the RN subframe configuration set by the target eNB after performing HO, which eliminates the needs for the RN to change the MBSFN subframe configuration of an access link several times. This results in reductions in control load and control delay in the RN.

First Modification of Third Embodiment

This modification will disclose another method for reducing the interference between a backhaul link and an access link of different RNs.

The RN subframe configurations of the RNs that cause interference are made identical. The RN subframe configurations of all the RNs being served by a DeNB may be identical, or the RN subframe configurations of the limited RNs may be identical. The methods disclosed in the third embodiment above may be applied as the method of limiting RNs.

If the RN subframe configurations of the RNs that cause interference are made identical, to which RN subframe configuration they are made identical becomes an issue. The following specific examples (1) to (5) below will be disclosed as to which one the RN subframe configurations are made identical.

(1) The RN subframe configuration newly configured by a DeNB is used.

(2) Every DeNB has a specific RN subframe configuration, and that RN subframe configuration is used.

(3) The RN subframe configuration of the existing RN is used. In other words, the RN subframe configuration of an RN that has been moved or installed later is made to coincide with the RN subframe configuration of the existing RN.

(4) The RN subframe configuration of an RN that has been newly moved or installed is used. In other words, the RN subframe configuration of the existing RN is made to coincide with the RN subframe configuration of an RN that has been newly moved or installed.

(5) The configuration, which meets OR conditions of the RN subframe configuration of the existing RN and the RN subframe configuration of an RN that has been newly moved or installed, namely the RN subframe configuration of the existing RN or the RN subframe configuration of an RN that has been newly moved or installed, is used.

The method of the specific example (1) enables a DeNB to set an RN subframe configuration in consideration of the load in the cell or RN. A dynamic communication situation can be taken into consideration, improving the radio resource use efficiency, resulting in an increase in communication capacity as a system. The DeNB sets the newly set RN subframe configuration for an RN that causes interference.

The specific example (2) may use one or a plurality of RN subframe configurations specific to each DeNB. As a specific example of the case in which a plurality of RN subframe configurations specific to each DeNB are used, the number of RN subframes, namely the number of subframes that configure an R-PDCCH may differ in accordance with the number of RNs that have the same RN subframe configuration. The RN subframe configuration is repeated every eight subframes in the current specifications (see Patent Document 2). The number of RN subframes may be determined every eight subframes. Or, the number of RN subframes may be determined every one radio frame.

The RN subframe configured in each DeNB may be an RN subframe configuration for avoiding interference. This may be provided exclusively for avoiding interference. The RN subframe configuration for avoiding interference may be used for an RN that causes interference. Or, the RN subframe configured in each DeNB may have the RN subframe configuration for a mobile RN. This may be provided exclusively for a mobile RN. The RN subframe configuration for mobile RNs may be used for a mobile RN.

The method of the specific example (2) eliminates the need for the DeNB to take a dynamic situation into consideration. This results in a reduction in control delay and simplification of a circuit configuration. The method of the specific example (2) is also easily applicable to a case in which there are a large number of RNs that cause interference. Also, in the method of the specific example (2), the RN subframe configuration specific to each DeNB is used, and thus, each DeNB may include the RN subframe configuration in the system information. This system information may be broadcast. This eliminates the need for signaling to notify each RN of an RN subframe configuration.

The method of the specific example (3) does not require the DeNB to perform signaling to the existing RN. This results in a reduction in signaling amount.

The method of the specific example (4) does not require the DeNB to perform signaling to an RN that has been newly moved or installed, for coincidence of RN subframe configurations. This results in a reduction in signaling amount.

The method of the specific example (5) allows for a subframe configuration suitable for the communication capacity of a backhaul link per RN. This improves the radio resource use efficiency, resulting in an increase in communication capacity as a system.

Disclosed below is a subframe configuration in which the RN subframe configurations of the RNs that cause interference are made identical.

The subframes of an access link and the subframes of a backhaul link are made identical between RNs. Each RN sets the RN subframes in a set RN subframe configuration, namely the subframes of the downlink access link corresponding to the subframes that configure an R-PDCCH, as MBSFN subframes. The RN may avoid downlink scheduling in the subframe of a downlink access link. Also, each RN avoids uplink scheduling in the subframe of an uplink access link corresponding to the subframe in which an uplink backhaul link is configured by the set RN subframe configuration.

Figure 50:
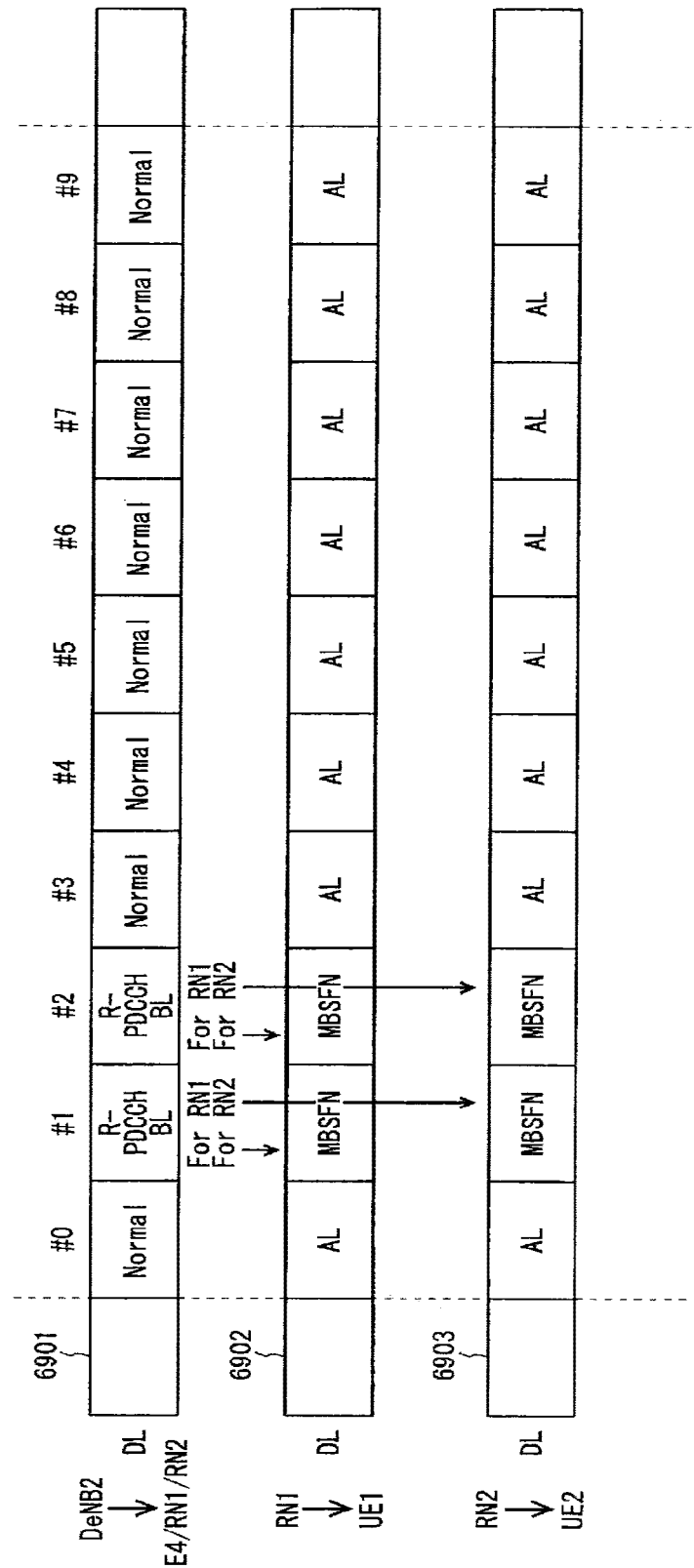
FIG. 50 shows an exemplary configuration of downlink subframes in a case where RNs which cause interference have the same RN subframe configuration.
Figure 51:
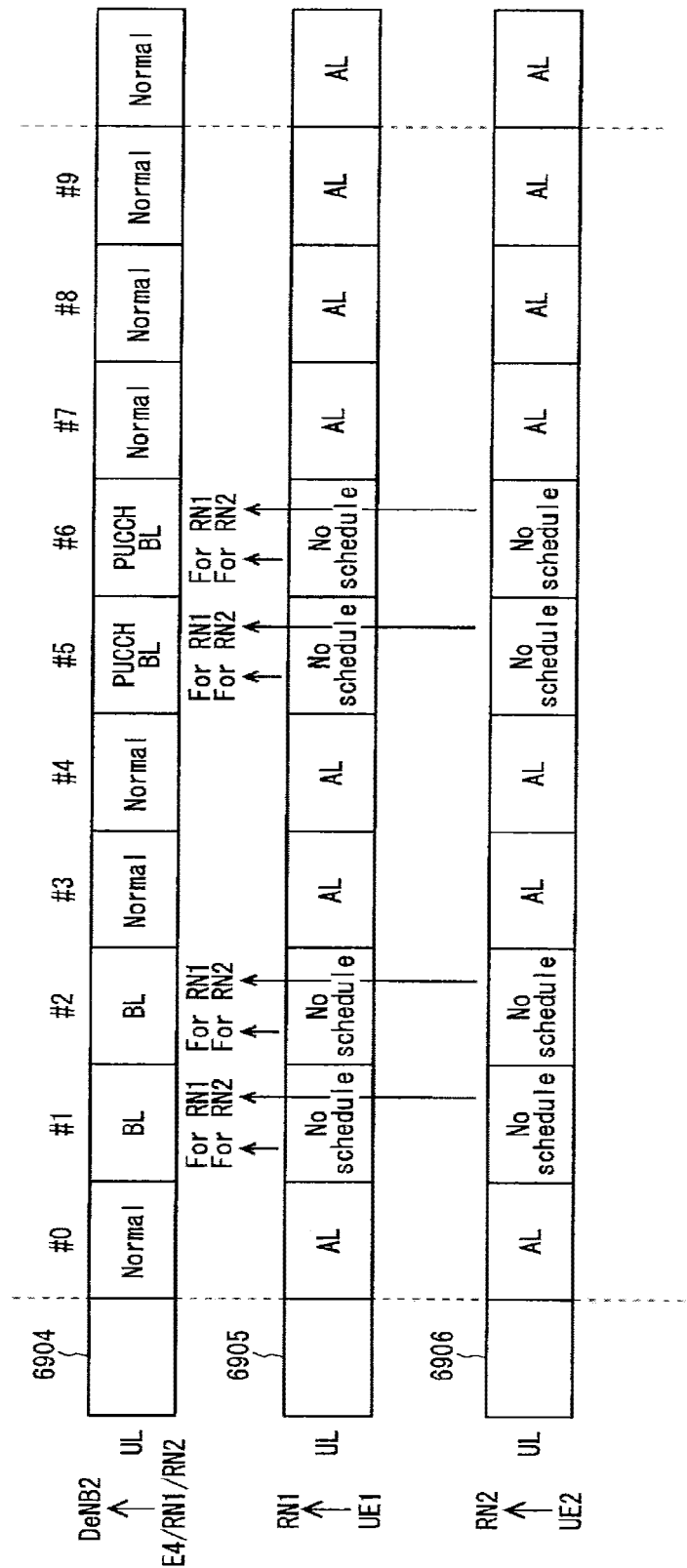
FIG. 51 shows an exemplary configuration of uplink subframes in a case where RNs which cause interference have the same RN subframe configuration.

FIGS. 50 and 51 show exemplary subframe configurations in a case where the RN subframe configurations of RNs that cause interference are made identical. In FIGS. 50 and 51, the second DeNB 6102 shown in FIGS. 40 and 41 is represented by "DeNB2" and the fourth UE 6104 being served by the second DeNB 6102 is represented by "UE4". The first RN 6106 is represented by "RN 1", and the first UE 6105 being served by the first RN 6106 is represented by "UE1". The second RN 6108 is represented by "RN2", and the second UE 6107 being served by the second RN 6108 is represented by "UE2".

FIG. 50 shows the exemplary configurations of the downlink subframes in a case where the RN subframe configurations of RNs that cause interference are made identical. In FIG. 50, the subframes represented by reference numeral "6901" show an exemplary configuration of the downlink subframes from the second DeNB (DeNB2) 6102 to the fourth UE (UE4) 6104, first RN (RN1) 6106, and second RN (RN2) 6108 being served thereby. The subframes represented by reference numeral "6902" show an exemplary configuration of the downlink subframes from the first RN (RN1) 6106 to the first UE (UE1) 6105 being served thereby. The subframes represented by reference numeral "6903" show an exemplary configuration of the downlink subframes from the second RN (RN2) 6108 to the second UE (UE2) 6107 being served thereby.

FIG. 51 shows the exemplary configurations of the uplink subframes in a case where the RN subframe configurations of RNs that cause interference are made identical. In FIG. 51, the subframes represented by reference numeral "6904" show an exemplary configuration of the uplink subframes from the fourth UE (UE4) 6104, first RN (RN1) 6106, and second RN (RN2) 6108 being served by the second DeNB (DeNB2) 6102 to the second DeNB (DeNB2) 6102.

The subframes represented by reference numeral "6905" show an exemplary configuration of the uplink subframes from the first UE (UE1) 6105 being served by the first RN (RN1) 6106 to the first RN (RN1) 6106. The subframes represented by reference numeral "6906" show an exemplary configuration of the uplink subframes from the second UE (UE2) 6107 being served by the second RN (RN2) 6108 to the second RN (RN2) 6108.

As shown in FIGS. 40 and 41, the second RN (RN2) 6108 is the existing RN being served by the second DeNB (DeNB2) 6102, and the first RN (RN1) 6106 is an RN that has begun to be served by the second DeNB (DeNB2) 6102 after moving.

Subframes #1 and #2 are configured as RN subframes for the second RN (RN2) 6108 before the RN subframe configurations of RNs that cause interference are made identical, and subframes #3 and #6 are configured as RN subframes for the first RN (RN1) 6106. FIGS. 50 and 51 show, as to which RN subframe configuration is used, the case in which the method of the specific example (3) is applied.

The downlinks shown in FIG. 50 will be described first. The subframe #1 and subframe #2 configure RN subframes from the second DeNB (DeNB2) 6102 to the second RN (RN2) 6108. The second RN (RN2) 6108 sets the subframe #1 and the subframe #2 to MBSFN subframes.

Meanwhile, the subframe #3 and subframe #6 configure RN subframes from the second DeNB (DeNB2) 6102 to the first RN (RN1) 6106. The first RN (RN1) 6106 sets the subframe #3 and subframe #6 to MBSFN subframes.

In this case, the downlink backhaul link 6111 from the second DeNB (DeNB2) 6102 to the first RN (RN1) 6106 and the downlink access link 6115 from the second RN (RN2) 6108 to the second UE (UE2) 6107 overlap one another in the subframe #3 and the subframe #6. For this reason, the downlink access link 6115 from the second RN (RN2) 6108 to the second UE (UE2) 6107 causes interference to the downlink backhaul link 6111 from the second DeNB (DeNB2) 6102 to the first RN (RN1) 6106.

Meanwhile, the downlink backhaul link 6112 from the second DeNB (DeNB2) 6102 to the second RN (RN2) 6108 and the downlink access link 6114 from the first RN (RN1) 6106 to the first UE (UE1) 6105 overlap one another in the subframe #1 and the subframe #2. For this reason, the downlink access link 6114 from the first RN (RN1) 6106 to the first UE (UE1) 6105 causes interference to the downlink backhaul link 6112 from the second DeNB (DeNB2) 6102 to the second RN (RN2) 6108.

To reduce such interference, the RN subframe configuration of the first RN (RN1) 6106 is caused to be identical to that of the second RN (RN2) 6108. In other words, the RN subframes of the first RN (RN1) 6106 are changed to the subframe #1 and the subframe #2.

The first RN (RN1) 6106 sets the subframes in the set RN subframe configuration as MBSFN subframes. In other words, the subframes #1 and #2 of the downlink access link 6114 from the first RN (RN1) 6106 to the first UE (UE1) 6105 are changed to MBSFN subframes.

The setting of the subframes #3 and #6 as MBSFN subframes is canceled. In other words, the subframes #3 and #6 are changed to the subframes for the downlink access link 6114 from the first RN (RN1) 6106 to the first UE (UE1) 6105.

In the downlink access link 6114 from the first RN (RN1) 6106 to the first UE (UE1) 6105 and the downlink access link 6115 from the second RN (RN2) 6108 to the second UE (UE2) 6107, the subframes #1 and #2 are set to MBSFN subframes.

Through the above, as shown in FIG. 50, the subframes of the backhaul link can be made identical between different RNs, and the subframes can be set as MBSFN subframes between different RNs, resulting in a reduction in the interference between a backhaul link and an access link of different RNs.

The uplinks shown in FIG. 51 will be described next. The subframes of the uplink backhaul link 6119 of the second RN (RN2) 6108 are set to the subframes #1 and #2 or the subframes #5 and #6 based on the RN subframe configuration of the second RN (RN2) 6108. The RN subframe configuration of the first RN (RN1) 6106 is caused to coincide with the RN subframe configuration of the second RN (RN2) 6108, so that the subframes of the uplink backhaul link 6118 of the first RN (RN1) 6106 are also set to the subframes #1 and #2 or the subframes #5 and #6.

The first RN (RN1) 6106 avoids scheduling of the uplink access link 6121 in the set subframes #1, #2, #5, and #6. Thus, the subframes of the uplink backhaul links 6118 and 6119 of the first RN (RN1) 6106 and the second RN (RN2) 6108 are identical to one another, and the subframes in which scheduling is nor performed become identical to one another in the uplink access links 6121 and 6122 of the first RN (RN1) 6106 and the second RN (RN2) 6108.

The transmission of the uplink backhaul link 6118 of the first RN (RN1) 6106 accordingly does not interfere with the reception of the uplink access link 6122 of the second RN (RN2) 6108. On the other hand, the transmission of the uplink backhaul link 6119 of the second RN (RN2) 6108 does not interfere with the reception of the uplink access link 6121 of the first RN (RN1) 6106. This results in a reduction in the interference between a backhaul link and an access link of different RNs.

The subframes of an access link and the subframes of a backhaul link are made identical to one another between RNs as described above, resulting in a reduction in the interference caused by the transmission by one RN to the reception by the other RN.

Disclosed below is an operational example of the method of causing the subframes of an access link to be identical to the subframes of a backhaul link between RNs.

Figure 52:
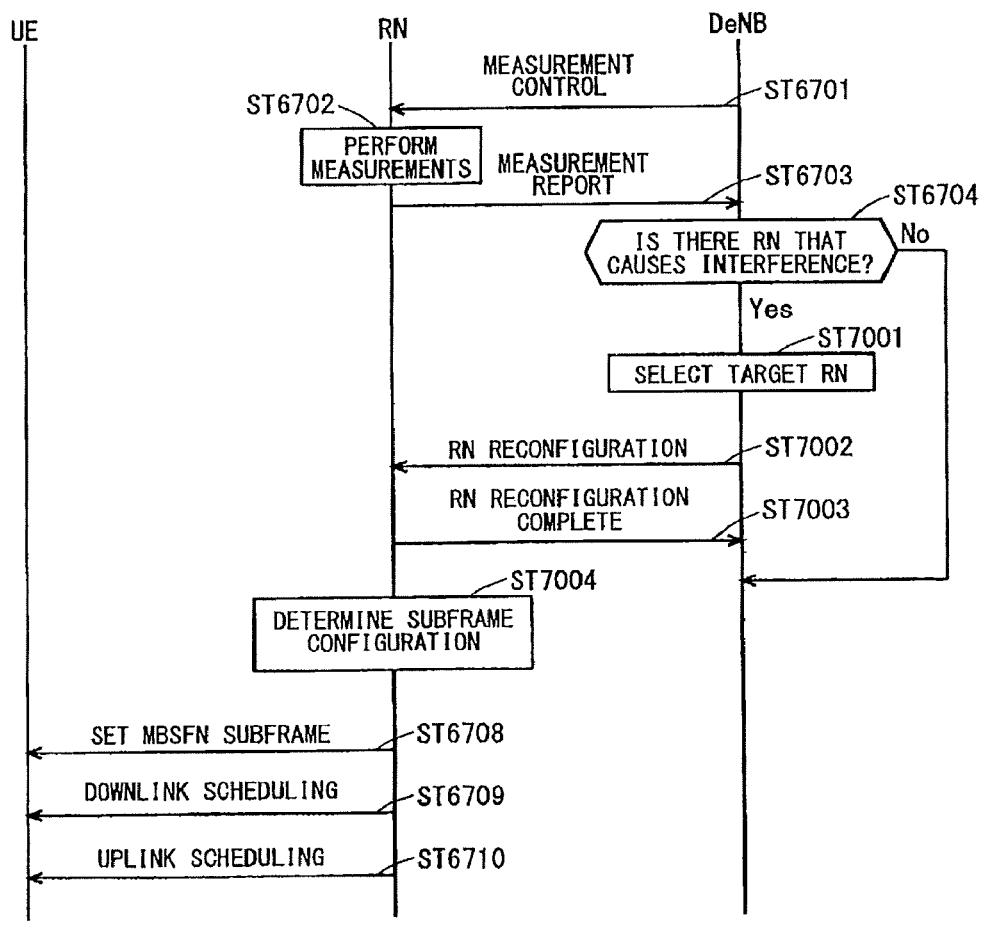
FIG. 52 shows an exemplary sequence of a mobile communication system in a first modification of the third embodiment.

FIG. 52 shows an exemplary sequence of a mobile communication system in the first modification of the third embodiment. The sequence shown in FIG. 52 is similar to the sequence shown in FIG. 48, and thus, the same steps will be denoted by the same step numbers and common description will be omitted. FIG. 52 shows the sequence after the state in which the RN has performed HO by the method of causing the subframes of the access link to be identical to the subframes of the backhaul link between RNs, and has completed RRC connection with the DeNB.

The DeNB that has judged in Step ST6704 that there is an RN that interferes with the relevant RN moves to Step ST7001.

In Step ST7001, the DeNB selects RNs whose interference is to be reduced. Here, the DeNB selects one RN whose interference is judged to be the largest from them. The DeNB judges this RN as the existing RN that causes interference.

The DeNB recognizes the RN subframe configuration of the existing RN. In Step ST7002, the DeNB notifies the RN of the RN subframe configuration of the existing RN. The DeNB may use RRC signaling or S1 interface in notifying the RN subframe configuration.

In Step ST7003, the RN notifies the DeNB of the RN subframe configuration completion message. The RN may use RRC signaling or S1 interface in notifying the RN subframe configuration completion message.

In Step ST7004, the RN determines the subframe configuration of an access link using the RN subframe configuration of the existing RN that has been received. As described above, as the method of causing the subframes of an access link to be identical to the subframes of a backhaul link between RNs, the RN may recognize the subframe configuration of a backhaul link of the existing RN from the RN subframe configuration of the existing RN and set the subframes in the downlink access link to MBSFN subframes.

In Step ST6708, the RN sets the subframes in the downlink access link to MBSFN subframes. If there are MBSFN subframes that have been already set, the RN may perform setting to add other MBSFN subframes or reset the already set MBSFN subframes as well as MBSFN subframes to be newly set. The RN may use, in setting the MBSFN subframes, the above-mentioned method in which an RN changes an MBSFN subframe configuration. The UE that has received the information on setting of the changed MBSFN subframes performs a reception process on this subframe as MBSFN subframes.

In Steps ST6709 and ST6710, the RN avoids downlink scheduling in the subframes of the downlink access link that causes interference and avoids uplink scheduling in the subframes of the uplink access link that causes interference.

Through the above, the subframes of an access link and the subframes of a backhaul link can be made identical to one another between RNs, resulting in a reduction in interference occurring between the backhaul link and access link of different RNs. The interference caused to the reception of other RN from the transmission by the RN can be reduced.

The method disclosed in this modification can achieve an effect that the number of subframes of an access link of the RN increases, compared with the method disclosed in the third embodiment above. Also, the communication capacity between an RN and a UE being served thereby can be increased. Further, the number of subframes of access links can be increased, which allows for easy setting of subframes of an access link between a plurality of RNs.

Although selecting one existing RN in Step ST7001 in the example above, the DeNB may select a plurality of existing RNs. In Step ST7002, the DeNB may notify the RN of the RN subframe configurations of the plurality of existing RNs. Also, in Step ST7004, the RN may set the MBSFN subframe configuration in a downlink access link based on the received plurality of RN subframe configurations.

A plurality of existing RNs can be supported, which allows for more flexible operation in installation and movement of an RN.

Second Modification of Third Embodiment

This modification will disclose another method for reducing the interference between a backhaul link and an access link of different RNs.

The carrier frequency of a backhaul link of the RN is caused to differ from the carrier frequency of an access link thereof, and the carrier frequencies of backhaul links of RNs being served by the DeNB are all caused to be identical to one another. The carrier frequency may be merely referred to as a frequency in the following description. The RN having the frequency of a backhaul link and the frequency of an access link different from each other is referred to as an outband relay (outband RN). The RN is an outband RN, and the frequencies of backhaul links of RNs being served by the DeNB are all caused to be identical to one another.

The frequency of a downlink backhaul link of the RN is represented by f_BL_DL (RN), and the frequency of a downlink access link of the RN is represented by f_AL_DL (RN). The frequency of an uplink backhaul link of the RN is represented by f_BL_UL (RN), and the frequency of an uplink access link of the RN is represented by f_AL_UL (RN). The frequencies are configured so as to meet the following two conditions (1) and (2).

(1) The frequency of a backhaul link is caused to differ from the frequency of an access link for one RN.

$$f\_BL\_DL(RNi) \neq f\_AL\_DL(RNi) \tag{a1}$$

$$f\_BL\_UL(RNi) \neq f\_AL\_UL(RNi) \tag{a2}$$

In Expressions (a1) and (a2), RNi denotes an RN being served by a DeNB.

(2) The frequencies of backhaul links of the RNs being served by the DeNB are caused to be identical to one another.

$$f\_BL\_DL(RNi) = f\_BL\_DL(RNj) \tag{a3}$$

$$f\_BL\_UL(RNi) = f\_BL\_UL(RNj) \tag{a4}$$

In Expressions (a3) and (a4), i is not equal to j, and RNi and RNj are RNs being served by the DeNB.

If the conditions of (1) and (2) above are met, the following can be established.

$$f\_BL\_DL(RNi) \neq f\_AL\_DL(RNj) \tag{a5}$$

$$f\_BL\_UL(RNi) \neq f\_AL\_UL(RNj) \tag{a6}$$

The frequency of a backhaul link and the frequency of an access link can differ from each other between different RNs as described above, resulting in a reduction in the interference between a backhaul link and an access link of different RNs.

Figure 53:
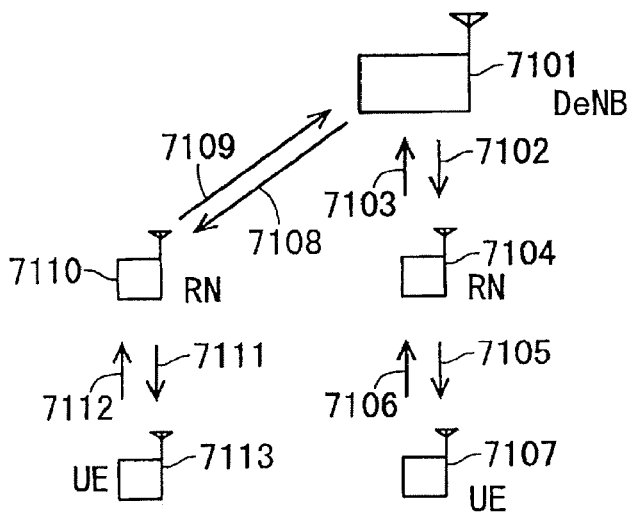
FIG. 53 shows an exemplary configuration of frequencies of backhaul links and access links in a second modification of the third embodiment.

FIG. 53 shows an exemplary configuration of the frequencies of backhaul links and access links in a second modification of the third embodiment.

A first RN (RN1) 7110 and a second RN (RN2) 7104 are located being served by a DeNB 7101. A first UE (UE1) 7113 is located being served by the first RN (RN1) 7110. A second UE (UE2) 7107 is located being served by the second RN (RN2) 7104.

The DeNB 7101 and the first RN (RN1) 7110 are connected by a downlink backhaul link (BL_DL) 7108 and an uplink backhaul link (BL_UL) 7109. The first RN (RN1) 7110 and the first UE (UE1) 7113 are connected by a downlink access link (AL_DL) 7111 and an uplink access link (AL_UL) 7112.

The DeNB 7101 and the second RN (RN2) 7104 are connected by a downlink backhaul link (BL_DL) 7102 and an uplink backhaul link (BL_UL) 7103. The second RN (RN2) 7104 and the second UE (UE2) 7107 are connected by a downlink access link (AL_DL) 7105 and an uplink access link (AL_UL) 7106.

The frequency of the downlink backhaul link (BL_DL) 7108 is represented by f_BL_DL (RN1), and the frequency of the downlink access link (AL_DL) 7111 is represented by f_AL_DL (RN1). The frequency of the uplink backhaul link (BL_UL) 7109 is represented by f_BL_UL (RN1), and the frequency of the uplink access link (AL_UL) 7112 is represented by f_AL_UL (RN1).

The frequency of the downlink backhaul link (BL_DL) 7102 is represented by f_BL_DL (RN2), and the frequency of the downlink access link (AL_DL) 7105 is represented by f_AL_DL (RN2). The frequency of the uplink backhaul link (BL_UL) 7103 is represented by f_BL_UL (RN2), and the frequency of the uplink access link (AL_UL) 7106 is represented by f_AL_UL (RN2).

Here, the conditions of (1) and (2) above are met. In other words, the frequencies are set so as to meet Expressions (a7) to (a12) below.

$$f\_BL\_DL(RN1) \neq f\_AL\_DL(RN1) \tag{a7}$$

$$f\_BL\_UL(RN1) \neq f\_AL\_UL(RN1) \tag{a8}$$

$$f\_BL\_DL(RN2) \neq f\_AL\_DL(RN2) \tag{a9}$$

$$f\_BL\_UL(RN2) \neq f\_AL\_UL(RN2) \tag{a10}$$

$$f\_BL\_DL(RN1) = f\_BL\_DL(RN2) \tag{a11}$$

$$f\_BL\_UL(RN1) = f\_BL\_UL(RN2) \tag{a12}$$

The frequencies are set so as to meet Expressions (a7) to (a12) above, whereby Expressions (a13) to (a16) below can be established.

$$f\_BL\_DL(RN1) \neq f\_AL\_DL(RN2) \tag{a13}$$

$$f\_BL\_UL(RN1) \neq f\_AL\_UL(RN2) \tag{a14}$$

$$f\_BL\_DL(RN2) \neq f\_AL\_DL(RN1) \tag{a15}$$

$$f\_BL\_UL(RN2) \neq f\_AL\_UL(RN1) \tag{a16}$$

The frequency of a backhaul link differs from the frequency of an access link between different RNs as described above, resulting in a reduction in the interference between the backhaul link and access link of different RNs.

Disclosed below is an operation example of the method of causing the frequency of a backhaul link of a movable RN to differ from the frequency of an access link thereof and causing all of the frequencies of backhaul links of RNs being served by the DeNB to be identical to one another.

Figure 54:
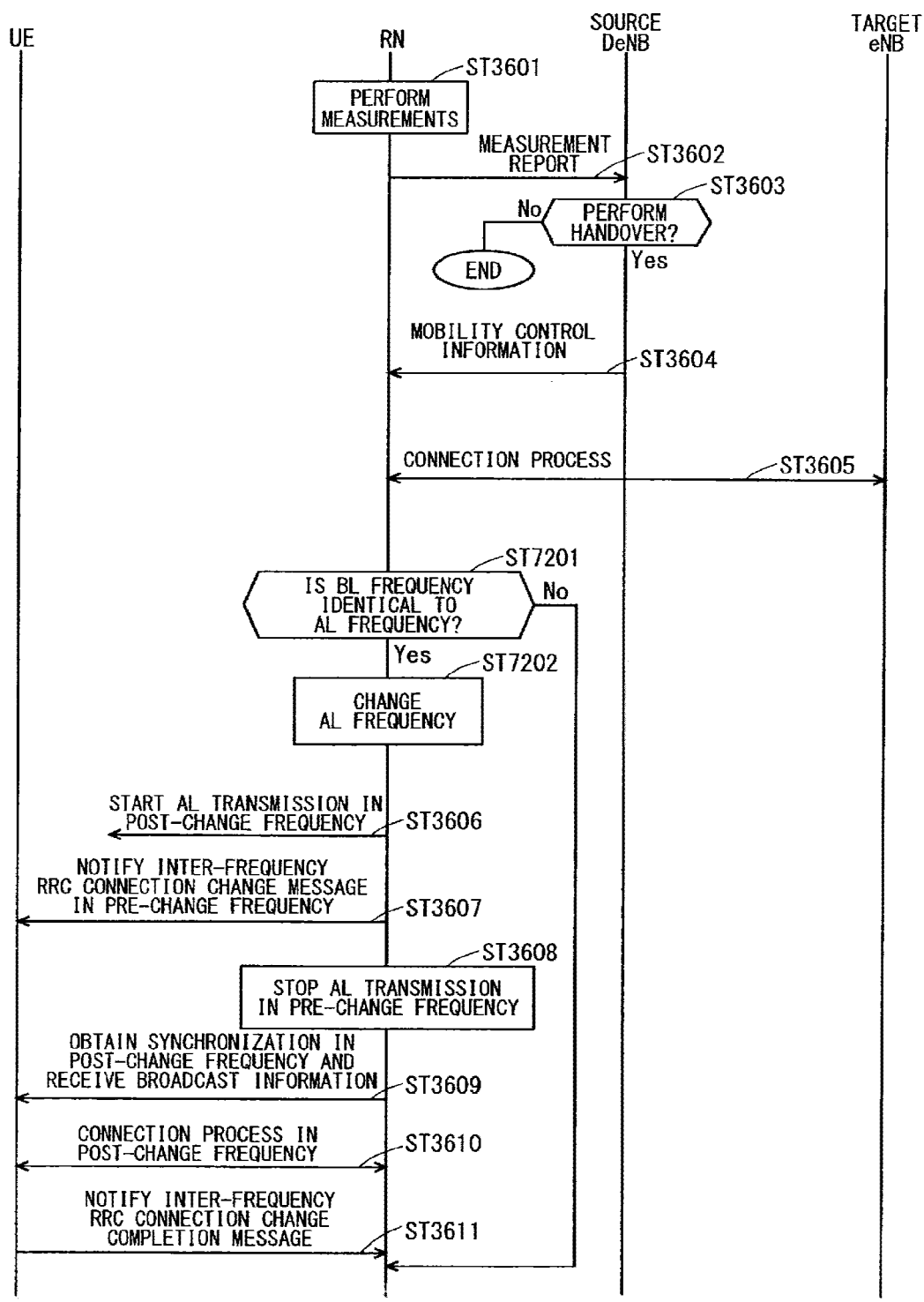
FIG. 54 shows an exemplary sequence of a mobile communication system in the second modification of the third embodiment.

FIG. 54 shows an exemplary sequence of a mobile communication system in the second modification of third embodiment. The sequence shown in FIG. 54 is similar to the sequence shown in FIG. 36, and thus, the same steps will be denoted by the same step numbers and common description will be omitted. FIG. 54 shows the sequence in a case where the frequency of a backhaul link of a movable RN is caused to differ from the frequency of an access link thereof, and the frequencies of backhaul links of RNs being served by the DeNB are caused to be identical to one another.

The RN performs HO and completes the process for connection with a target eNB (DeNB) in Step ST3605, and then, moves to Step ST7201.

HO may be HO in the same frequency (intra-frequency HO) or may be HO in different frequencies (inter-frequency HO). The RN performs HO with the frequency operated by the DeNB, and the backhaul link between the DeNB and RN is provided in this frequency.

If the DeNB fails to provide a backhaul link in the frequency of the HO destination, the method of changing the frequency of a backhaul link, described below, is applicable.

In Step ST7201, the RN judges whether the frequency of a backhaul link is identical to the frequency of an access link set by the own RN. In a case of judging in Step ST7201 that the frequency of a backhaul link is identical to the frequency of an access link set by the own RN, in Step ST7202, the RN changes the frequency of an access link to differ from the frequency of a backhaul link.

In Steps ST3606 to ST3611, the RN performs, on a UE being served thereby, the process of changing RRC connection to the changed frequency of an access link. The method disclosed in the second embodiment is applicable as this method.

In a case of judging in Step ST7201 that the frequency of a backhaul link is not identical to the set frequency of an access link, the RN does not change the frequency of an access link.

This exemplary sequence is applicable to the case in which the frequencies of backhaul links of all the RNs being served by the DeNB are identical to one another. Examples of the above include the case in which the DeNB is operated by one carrier and the backhaul links of all the RNs being served thereby are the carrier frequency. It is this carrier that the RN performs the process for connection with the DeNB in this case, and the frequency of a backhaul link of this RN is accordingly identical to the frequency of a backhaul link of the other RN.

The conditions (1) and (2) above are thus met, resulting in a reduction in the interference between the backhaul link and the access link of different RNs.

This modification needs not to adjust, reset, and change a subframe configuration, and thus needs not to limit the RN subframe configuration of the RN and the MBSFN subframe configuration. Thus, this modification can increase the communication capacity of the communication via the RN and can also support the flexible installation and movement of the RN.

The solution in a case where the frequencies of backhaul links of RNs being served by the DeNB are not identical to one another will be disclosed as another example. As another example of the above-mentioned case, the frequencies of backhaul links of a plurality of RNs that cause interference, not of all the RNs, may not be identical to one another. The DeNB is operated in a frequency of a backhaul link different from those of a plurality of RNs. An example of the above is a case in which the DeNB is operated in multiple carriers or perform carrier aggregation.

In this case, the following condition (3) may be added to the condition (1) described above.

(3) The frequency of an access link of an RN is caused to differ from the frequency of a backhaul link of other RN.

$$f\_BL\_DL(RNj) \neq f\_AL\_DL(RNi) \tag{a17}$$

$$f\_BL\_UL(RNj) \neq f\_AL\_UL(RNi) \tag{a18}$$

In Expressions (a17) and (a18), i is not equal to j, and RNi and RNj are RNs being served by the DeNB.

If Expressions (a17) and (a18) above are met, the Expressions (a19) and (a20) below can be established.

$$f\_BL\_DL(RNi) \neq f\_AL\_DL(RNj) \tag{a19}$$

$$f\_BL\_UL(RNi) \neq f\_AL\_UL(RNj) \tag{a20}$$

The interference between a backhaul link and an access link of different RNs can be accordingly reduced.

Figure 55:
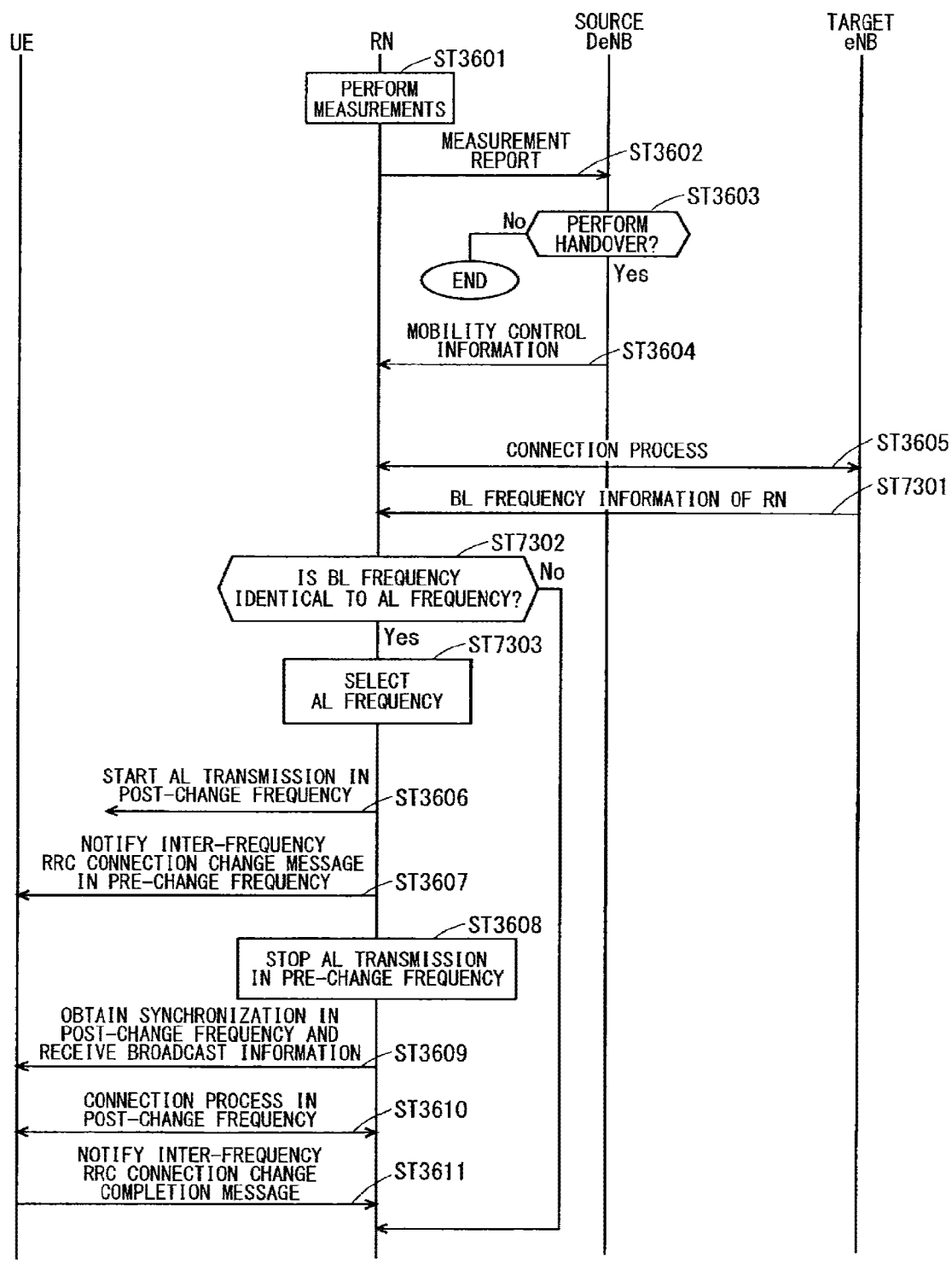
FIG. 55 shows an exemplary sequence of the mobile communication system in the second modification of the third embodiment.

FIG. 55 shows an exemplary sequence of the mobile communication system in the second modification of the third embodiment. The sequence shown FIG. 55 is similar to the sequence shown in FIG. 54, and thus, the same steps will be denoted by the same step numbers, and common description will be omitted. FIG. 55 shows the sequence in a case where the frequencies of backhaul links of RNs being served by the DeNB are not identical to one another.

In Step ST3605, the RN performs HO and completes the process for connection with a target eNB (DeNB). In this connection process, the target DeNB notifies the RN of frequency information of the backhaul link of the RN operated by this DeNB. The target DeNB may notify this information as other message or as other signaling, without performing the process of Step ST3605. With reference to FIG. 55, in Step ST7301, the target DeNB notifies the frequency information of the backhaul link of the RN as other message.

The information may be limited to the frequency information of the backhaul link of the RN that causes interference, in place of the frequency information of backhaul links of all the RNs operated by this DeNB. The method disclosed in the third embodiment is applicable as the limiting method. For example, the processes of Steps ST6701 to ST6705 of FIG. 48 may be performed after the process of Step ST3605.

In Step ST7302, the RN judges whether the frequency of the backhaul link is identical to the frequency of the access link using the received frequency information of the backhaul link of the RN operated by the DeNB. In a case of judging in Step ST7302 that the frequency of the backhaul link is identical to the frequency of the access link, in Step ST7303, the RN selects the frequency of the access link that meets the conditions (1) and (3) above. The backhaul links or access links may individually have the same frequency.

Through the above, if the DeNB is operated in a frequency of a backhaul link that is different from those of a plurality of RNs, the interference between a backhaul link and an access link of different RNs can be reduced.

If the interference between links of the DeNB and the UE being served thereby becomes an issue, in Step ST7303, the RN may select the frequency of an access link as a carrier frequency different from the frequency of a normal link between the DeNB and the UE being served thereby. This results in a reduction in the interference between a normal link between the DeNB and the UE being served thereby and the access link of the RN.

Although the RN selects the frequency of an access link in the example above, the DeNB may select the frequency of an access link of the RN as still another example.

Figure 56:
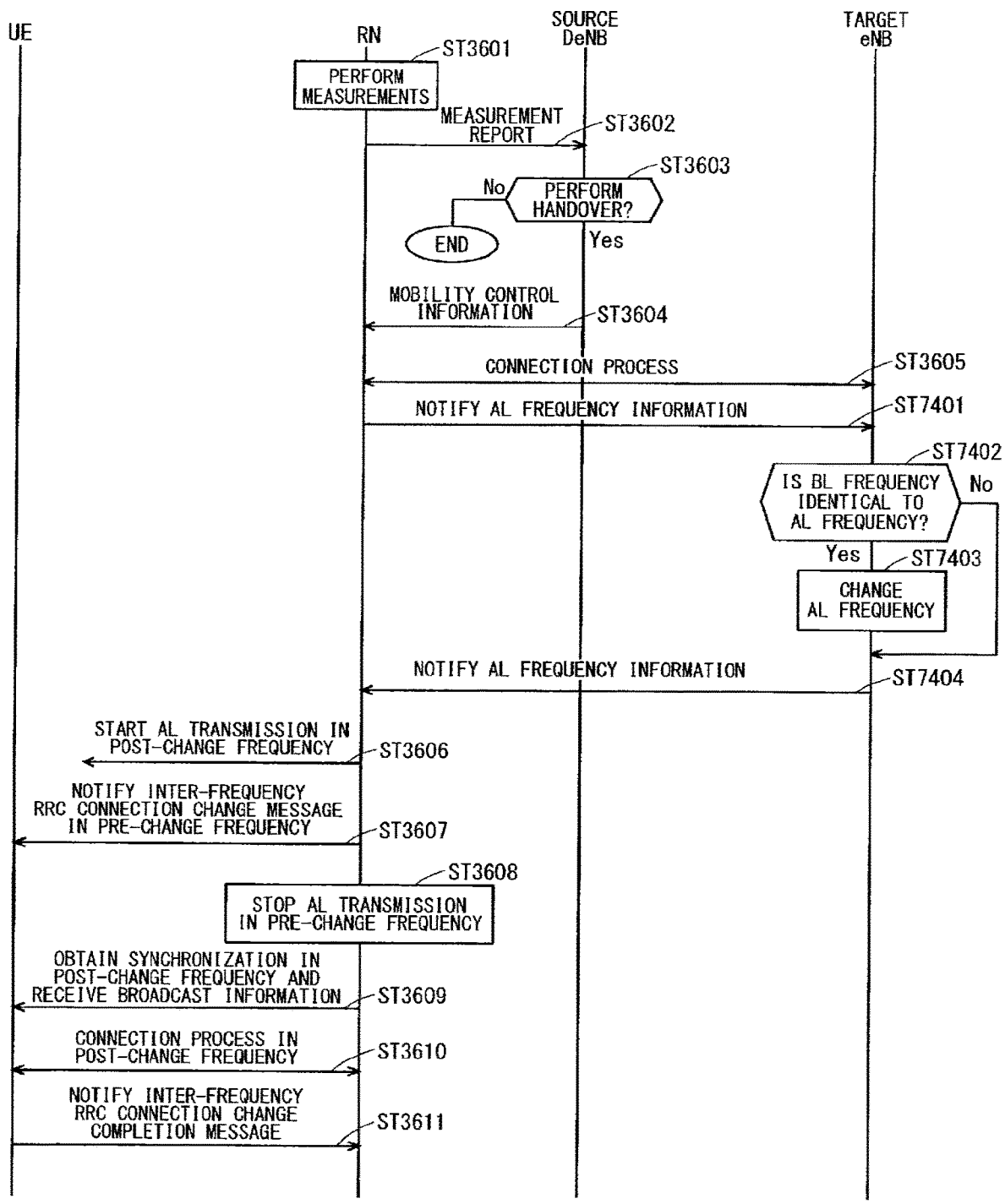
FIG. 56 shows an exemplary sequence of the mobile communication system in the second modification of the third embodiment.

FIG. 56 shows an exemplary sequence of the mobile communication system in the second modification of the third embodiment. The sequence shown in FIG. 56 is similar to the sequence shown in FIG. 54, and thus, the same steps will be denoted by the same step numbers, and common description will be omitted. FIG. 56 shows the sequence in a case where the DeNB selects the frequency of an access link of the RN.

In Step ST3605, the RN performs HO and completes the process for connection with a target eNB (DeNB). In this connection process, the RN notifies the DeNB of the frequency information of an access link set by the own RN. The RN may notify the above-mentioned information as other message or as other signaling, in place of the process of Step ST3605. With reference to FIG. 56, in Step ST7401, the RN notifies the frequency information of the access link set by the RN as other message.

In Step ST7402, the DeNB judges whether the frequency of a backhaul link is identical to the frequency of an access link using the received frequency information of the access link of the RN. In a case of judging in Step ST7402 that the frequency of a backhaul link is identical to the frequency of an access link, in Step ST7403, the DeNB changes the frequency of the access link of the RN. In this case, the DeNB may select one from the frequencies of access links supported by the RN.

In the process of Step ST3605 above, the frequency of the access link supported by the RN may be notified from the RN to the DeNB together with the frequency information of the access link set by the RN. Or, the frequency of the access link supported by the RN may be notified the DeNB as the capability information of the RN. The information may be notified as other message or as other signaling, in place of the process of Step ST3605.

In a case of judging in Step ST7402 that the frequency of the backhaul link is not identical to the frequency of the access link, the DeNB does not change the frequency of the access link.

In Step ST7404, the DeNB notifies the RN of the frequency information of the access link after the change. Also in a case of not changing the frequency of the access link, the DeNB may notify the information indicative of the above or the frequency information of the access link set by the RN, which has been received in Step ST7401.

In Steps ST3606 to ST3611, the RN that has received the frequency information of the access link after the change in Step ST7404 causes the UE being served thereby to perform the RRC connection change process in the frequency of an access link after the change.

Through the above, the DeNB can set the frequency of an access link of the RN that causes interference. The DeNB is caused to recognize the frequencies of access links of the RNs being served thereby and to exclusively perform control and manage to avoid interference, leading to easy control.

The DeNB also recognizes the frequencies of backhaul links of the RNs being served thereby, and thus can control and manage the frequencies of backhaul links as well as the frequencies of an access links.

In Step ST7401, the RN notifies the DeNB of the frequency information of the access link set by the own RN. As another approach, the RN notifies the NW, for example, MME or OAM of the frequency information of the access link set by the own RN. The DeNB may obtain the frequency information of an access link set by a desired RN from the NW, as required. The DeNB may transmit, to the NW, the message indicating a request for the frequency information of an access link of the RN, whereas the NW may transmit, to the DeNB, a message for responding to the request for the frequency information of an access link of the RN.

In Step ST7401, the RN may notify the DeNB of the frequency information of an access link that the own RN can support. This information may be notified in the connection process of Step ST3605 or may be notified in other message or through other signaling. This allows the DeNB, in setting the frequency of an access link of the RN in Step ST7403, to select one from the frequencies of access links supported by the RN.

Although the DeNB notifies the RN of the frequency information of an access link after the change in Step ST7404, the DeNB may notify the frequency information of an access link after the change by including it in an RN reconfiguration message. This successfully reduces the types of messages.

In this modifications, the frequency of an access link is set or changed. This leads to more simplified control than the method of setting or changing the frequency of a backhaul link described below. This is because the method of setting or changing the frequency of a backhaul link needs to perform the process of changing the connection between the RN and DeNB, which accordingly complicates control.

Third Modification of Third Embodiment

This modification will disclose another method for reducing the interference between a backhaul link and an access link of different RNs.

For example, in the place to which the outband RN has moved, RNs that cause interference include an RN whose frequency of a backhaul link is identical to the frequency of an access link, such as an inband RN. In this case, a problem arises if the frequency of the backhaul link of the outband RN is identical to the frequency of the backhaul link of the inband RN. This is because the frequency of a backhaul link of the outband RN is identical to the frequency of an access link of the inband RN.

The outband RN needs not to support an RN subframe. Thus, the methods disclosed in the third embodiment and the first modification of the third embodiment cannot be normally applied. For this reason, if the frequency of the backhaul link of the outband RN is identical to the frequency of the access link of the inband RN, interference occurs between them.

This modification will disclose a solution in a case where interference becomes an issue between the inband RN and the outband RN.

The frequency of the backhaul link of the inband RN is caused to differ from the frequency of the backhaul link of the outband RN. Besides, the frequency of the access link of the inband RN is caused to differ from the frequency of the access link of the outband RN.

The inband RN and outband RN are denoted by "RNib" and "RNob", respectively.

For the inband RN, the conditions represented by Expressions (a21) and (a22) below arise.

$$f\_BL\_DL(RNib) = f\_AL\_DL(RNib) \qquad (a21)$$

$$f\_BL\_UL(RNib) = f\_AL\_UL(RNib) \qquad (a22)$$

For the outband RN, the conditions represented by Expressions (a23) and (a24) below arise.

$$f\_BL\_DL(RNob) \neq f\_AL\_DL(RNob) \qquad (a23)$$

$$f\_BL\_UL(RNob) \neq f\_AL\_UL(RNob) \qquad (a24)$$

The conditions expressed by Expressions (a25) to (a28) below are added to the conditions represented by Expressions (a21) to (a24) above.

$$f\_BL\_DL(RNib) \neq f\_BL\_DL(RNob) \quad (a25)$$

and $$f\_AL\_DL(RNib) \neq f\_AL\_DL(RNob) \quad (a26)$$

$$f\_BL\_UL(RNib) \neq f\_BL\_UL(RNob) \quad (a27)$$

and $$f\_AL\_UL(RNib) \neq f\_AL\_UL(RNob) \quad (a28)$$

The conditions represented by Expressions (a25) to (a28) above are added to the conditions represented by Expressions (a21) to (a24) above, which enables the frequency of an access link and the frequency of a backhaul link to differ from each other between the inband RN and outband RN. The interference between a backhaul link and an access link of different RNs can be accordingly reduced.

Figure 57:
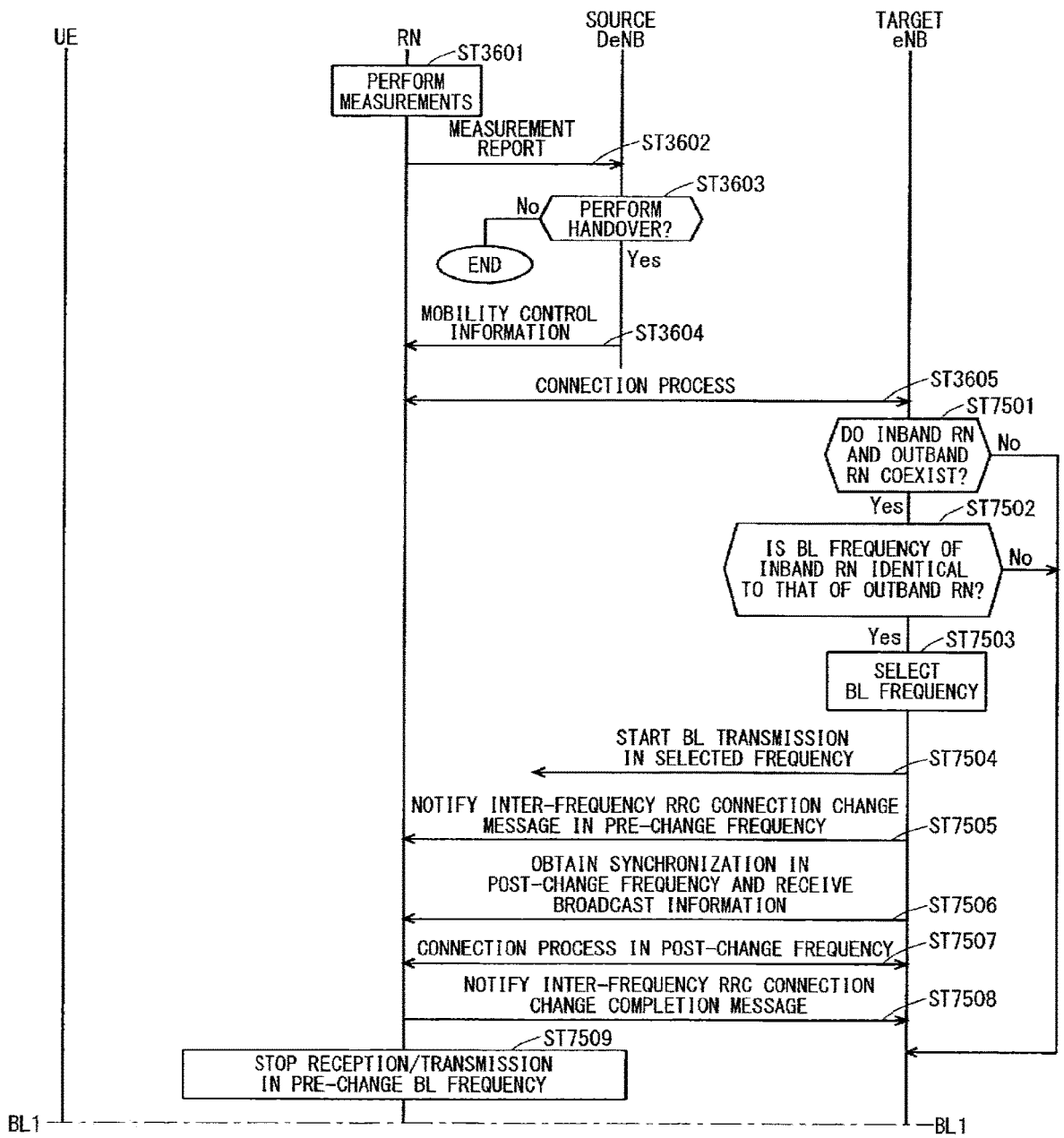
FIG. 57 shows an exemplary sequence of a mobile communication system in a third modification of the third embodiment.

FIGS. 57 and 58 show an exemplary sequence of a mobile communication system in the third modification of the third embodiment. FIG. 58 is continuous with FIG. 57 at a boundary BL1. The sequence shown in FIGS. 57 and 58 is similar to the sequence shown in FIG. 54, and thus, the same steps will be denoted by the same step numbers and common description will be omitted. FIGS. 57 and 58 show the sequence of the process of reducing the interference between a backhaul link and an access link of different RNs.

In Step ST3605, the RN performs HO and completes the processing for connection with a target eNB (DeNB). In Step ST7501, the DeNB judges whether an inband RN and an outband RN coexist in RNs being served thereby, including the RN connected with the DeNB in Step ST3605. The RNs need not to be all RNs but may be limited to ones that cause interference. The method disclosed in the third embodiment is applicable as the limiting method. As an example, the processes of Steps ST6701 to ST6705 of FIG. 48 may be performed after the process of Step ST3605.

To judge whether the RNs being served by the DeNB include an inband RN and an outband RN in Step ST7501, the RNs may provide the information indicative of the type of the own RN, and each RN may notify the DeNB of the information in the process for connection with the DeNB. Examples of the information indicative of the type of the own RN include the information indicating whether the own RN is an inband RN or outband RN.

With reference to FIGS. 57 and 58, in Step ST3605, the RN notifies the DeNB of the information indicative of whether the own RN is an inband RN or outband RN. The RN may notify the DeNB of the information as other message or as other signaling, in place of the process of Step ST3605.

In a case of judging in Step ST7501 that an inband RN and an outband RN coexist, in Step ST7502, the DeNB judges whether the frequency of the backhaul link of the inband RN is identical to the frequency of the backhaul link of the outband RN.

In a case of judging in Step ST7502 that the frequency of the backhaul link of the inband RN is identical to the frequency of the backhaul link of the outband RN, in Step ST7503, the DeNB selects the frequency of a backhaul link of the RN connected thereto in Step ST3605 such that the frequency of the backhaul link of the inband RN differs from the frequency of the backhaul link of the outband RN. In other words, the DeNB selects a frequency of a backhaul link of the RN so as to meet the conditions expressed by Expressions (a25) and (a27) above.

For example, if the connected RN is an outband RN, the DeNB causes the frequency of the backhaul link of the connected RN to differ from the frequency of the backhaul link of the inband RN existing between RNs that cause interference. As an example, if the connected RN is an inband RN, the DeNB causes the frequency of the backhaul link of the connected RN to differ from the frequency of the backhaul link of the outband RN existing between the RNs that causes interference.

The DeNB that has selected the frequency of the backhaul link of the connected RN in Step ST7503 performs the connection change process in the selected frequency of the backhaul link between the RNs.

In Step ST7504, the DeNB starts the transmission in the selected frequency of the backhaul link.

In Step ST7505, the DeNB notifies the RN of an inter-frequency RRC connection change message in the pre-change frequency. The message may contain the frequency information of the backhaul link after change and the information for instructing a connection change to the frequency of the backhaul link.

In Step ST7506, the RN is synchronized with the DeNB in the post-change frequency and then receives broadcast information.

In Step ST7507, the RN and DeNB perform the connection process in the frequency of the backhaul link after change.

In Step ST7508, the RN notifies the DeNB of an inter-frequency RRC connection change completion message in the frequency of the backhaul link after change.

In Step ST7509, the RN stops the transmission/reception in the frequency of the backhaul link before change.

These processes allow the RN to change RRC connection in the frequency of the backhaul link that has been selected by the DeNB.

In Step ST7510, the RN judges whether the own RN is an outband RN. In a case of judging in Step ST7510 that the own RN is an outband RN, the RN moves to Step ST7511.

In Step ST7511, the RN judges whether the frequency of a backhaul link after change is identical to the frequency of the access link that is set by the own RN. In a case of judging in Step ST7511 that the frequency of the backhaul link after change is identical to the frequency of the access link that is set by the own RN, in Step ST7512, the RN selects other frequency as the frequency of an access link of the own RN. The conditions expressed by Expressions (a26) and (a27) above are met accordingly.

In a case of judging in Step ST7510 that the own RN is not an outband RN, in Step ST7512, the RN selects the frequency of a backhaul link as the frequency of the access link of the own RN.

In Steps ST3606 to ST3611, the RN that has selected the frequency of the access link of the own RN in Step ST7512 performs, on the UE being served thereby, the RRC connection change process in the changed frequency of the access link. The method disclosed in the second embodiment is applicable as this method.

In a case of judging in Step ST7511 that the frequency of the backhaul link after change differs from the frequency of the access link that is set by the own RN, the RN does not change the frequency of the access link.

Through the above, the frequency of the access link can differ from the frequency of the backhaul link between the inband RN and outband RN. The interference between a backhaul link and an access link of different RNs can be accordingly reduced. If an inband RN and an outband RN coexist, interference can be reduced.

If the RNs that cause interference include a plurality of inband RNs having different frequencies of backhaul links and a plurality of outband RNs having different frequencies of backhaul links, the second modification of the third embodiment and this modification may be applied through appropriate combination. This results in a reduction in the interference between a backhaul link and an access link of different RNs.

This modification is applicable not only to a case in which an outband RN and an inband RN coexist, but also to a case in which the interference between inband RNs is reduced. If the RNs that cause interference include inband RNs having the same frequency of a backhaul link, the frequency of the backhaul link of one inband RN may be changed. The frequency of the access link of this inband RN may be accordingly changed as well. This allows the frequency of an access link and the frequency of a backhaul link to differ from each other between different inband RNs, resulting in a reduction in the interference between inband RNs.

As an operation example of the RN, a fixed RN may be an inband RN and a mobile RN may be an outband RN. This modification, or the second modification of the third embodiment and this modification are applied to this operation, resulting in a reduction in the interference between the mobile RN and the fixed RN being served by the DeNB being a moving destination.

The method of setting an RN subframe configuration of an inband RN, which has been disclosed in the third embodiment and the first modification of the third embodiment and the method of this modification may be used for different purposes. The DeNB may judge which method to be used, in consideration of the number of RNs that cause interference, the load status of a cell, the load status of each RN, the RN subframe configuration of each RN, the frequency of a backhaul link or the frequency of an access link supported by each RN, the carrier frequency supported by the DeNB, or the like. This allows for flexible support to various dynamically changing situations.

A node having an inband RN function and an outband RN function may be configured. Or, a physical device having an inband RN function and an outband RN function may be configured. The thus configured node or device has the functions of dividing a backhaul link and an access link in a time domain and in a frequency domain.

It is therefore possible to switch between the operation as an inband RN and the operation as an outband RN, depending on situations. For example, the RN is set as an inband RN when being fixed and is set as an outband RN when moving. This switching may be performed by the own RN, may be performed under an instruction from the DeNB, may be performed by the OAM, or may be performed by the person operating the RN, such as the operator.

For example, in serving a mobile RN, the DeNB may set the RN being served by the DeNB as an outband RN. Not the RN being served by the DeNB but the RN near the mobile RN may be set as an outband RN. This allows for flexible RN operation as a system, simplifying control, such as avoidance of interference.

Fourth Embodiment

If the RN moves, interference occurs between access links in RN operation between the existing RN and this RN. The subframe configurations of backhaul links of the RNs are individually notified from the DeNB through RRC signaling per RN, and thus, the subframe configuration of an access link of the RN normally differs from RN to RN. If a plurality of RNs are close to each other, accordingly, the subframe of an access link may be the same between different RNs. This causes a problem of the interference occurring between access links of different RNs.

Figure 59:
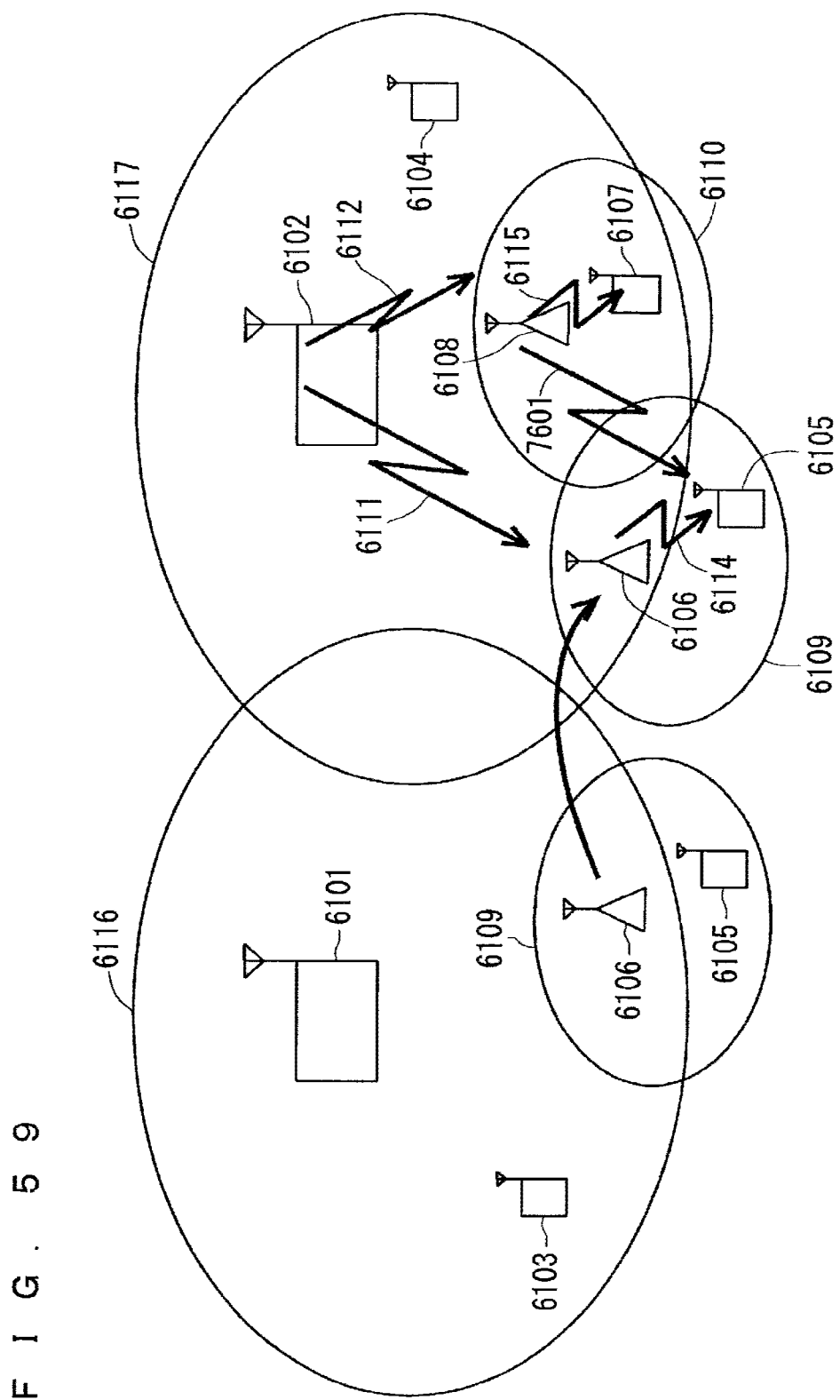
FIG. 59 is a diagram for describing interference occurring between an RN that has moved and an existing RN.
Figure 60:
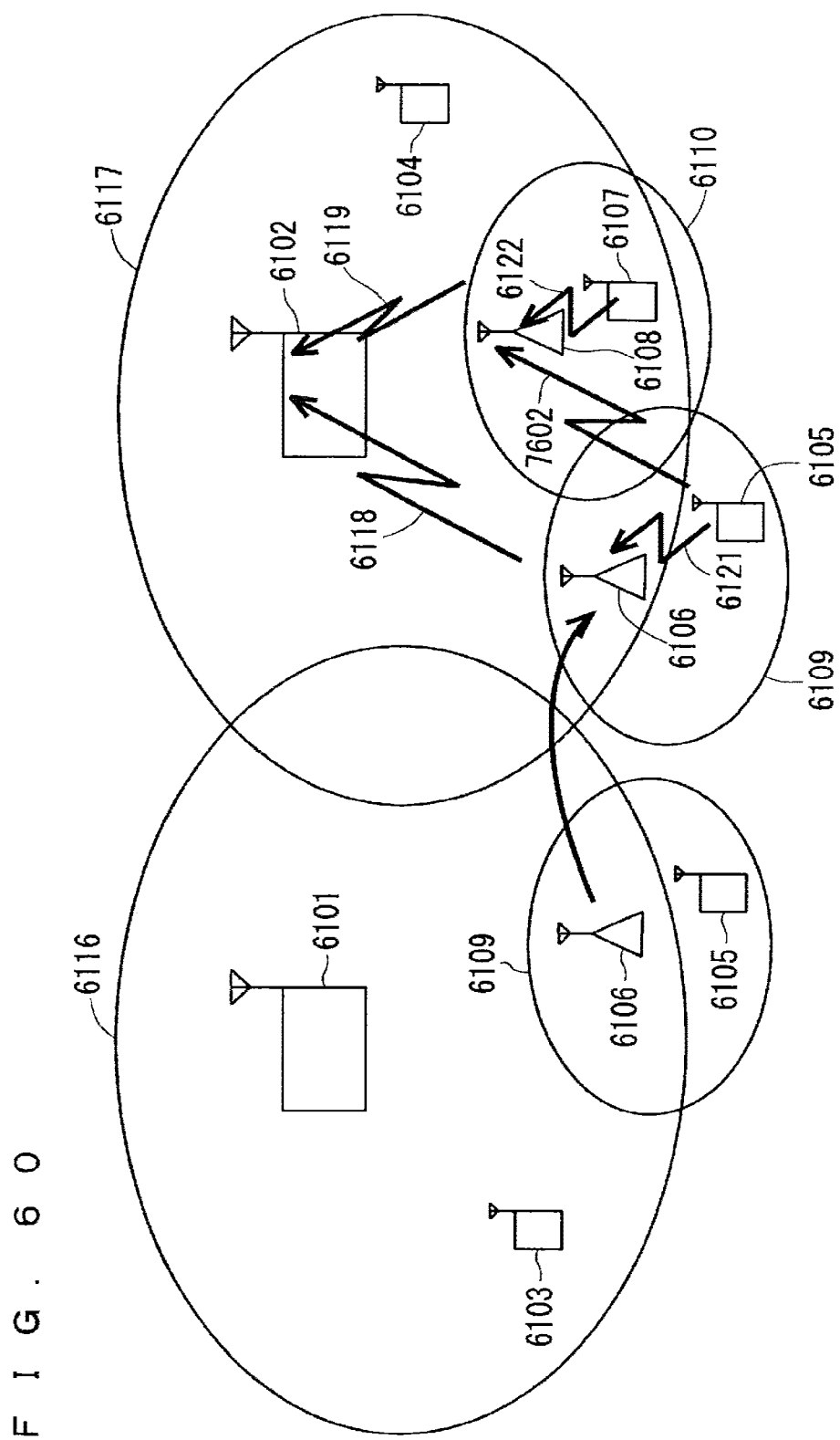
FIG. 60 is another diagram for describing interference occurring between an RN that has moved and an existing RN.

FIGS. 59 and 60 are diagrams for describing the interference occurring between the RN that has moved and the existing RN. FIGS. 59 and 60 are similar to FIGS. 40 and 41 in configuration, and thus, corresponding portions will be denoted by the same reference numerals and common description will be omitted.

If the RNs become closer to each other, the downlink access link of one RN causes interference to the downlink access link of the other RN. For example, as shown in FIG. 59, when the first RN (RN1) 6106 that has moved into the second coverage 6117 of the second DeNB (DeNB2) 6102 comes closer to the second RN (RN2) 6108, the downlink access link 6115 of the second RN (RN2) 6108 causes interference 7601 to the downlink access link 6114 of the first RN (RN1) 6106.

The uplink access link of one RN causes interference to the uplink access link of the other RN. For example, as shown in FIG. 60, the transmission of the uplink access link 6121 from the first UE (UE1) 6105 to the first RN (RN1) 6106 causes interference 7602 to the reception of the uplink access link 6122 from the second UE (UE2) 6107 to the second RN (RN2) 6108.

This embodiment will disclose the method of reducing the interference occurring between access links of different RNs as described above.

The subframe of the downlink access link is caused to differ between RNs. For example, the subframe of the downlink access link of the RN2 is caused to differ from the subframe of the downlink access link of the RN1. As the method of causing the subframe of the downlink access link to differ between RNs, the RN may set the subframe of the downlink access link that causes interference to at least any one of the MBSFN subframe and the almost blank subframe (ABS). The subframe to which the PDCCH is not mapped is referred to as "ABS". The PDCCH is also not mapped, and the PDSCH is not accordingly mapped.

If the MBSFN subframe and ABS are set to the same subframe, the PDCCH, and further, the CRS of the PDSCH are not mapped to this subframe. The RN may avoid downlink scheduling in the subframe of the downlink access link that causes interference.

The RN avoids uplink scheduling in the subframe of the uplink access link that causes interference. For example, the subframe of the uplink access link of the RN1 is caused to differ from the subframe of the uplink access link of the RN2. As another example, not subframes but radio resources to be scheduled may be caused to differ. The radio resources may be scheduled in RB units, RE units, subcarrier units, or other units. Or, the radio resources may differ from frequency band to frequency band. In the following description, this will be referred to as causing subframes to differ, which includes causing radio resources to be scheduled to differ.

Figure 61:
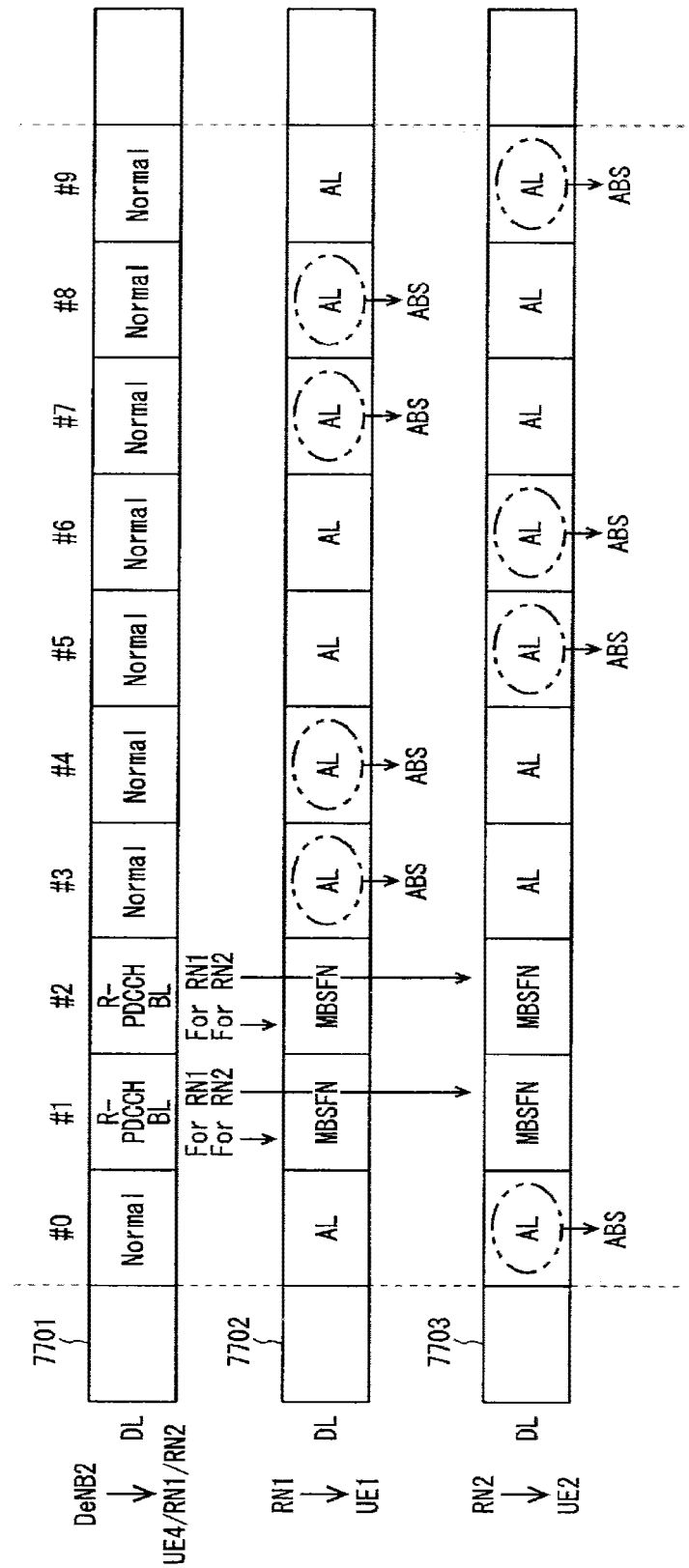
FIG. 61 shows an exemplary configuration of downlink subframes in a case where an access link subframe differs between RNs.

FIGS. 61 and 62 show an exemplary subframe configuration in a case where the subframe of an access link differs between RNs. In FIGS. 61 and 62, the second DeNB 6102 shown in FIGS. 59 and 60 is represented by "DeNB2", and the fourth UE 6104 being served by the second DeNB 6102 is represented by "UE4". The first RN 6106 is represented by "RN1", and the first UE 6105 being served by the first RN 6106 is represented by "UE1". The second RN 6108 is represented by "RN2", and the second UE 6107 being served by the second RN 6108 is represented by "UE2". The radio resources to be scheduled differ in uplink access links. The method disclosed in the first modification of the third embodiment is applied for the backhaul link and the access link.

FIG. 61 shows exemplary configurations of the downlink subframes in a case where the subframe of an access link differs between RNs. In FIG. 61, the subframes represented by reference numeral "7701" show an exemplary configuration of the downlink subframes from the second DeNB (DeNB2) 6102 to the fourth UE (UE4) 6104, first RN (RN1) 6106, and second RN (RN2) 6108 being served thereby. The subframes represented by reference numeral "7702" show an exemplary configuration of the downlink subframes from the first RN (RN1) 6106 to the first UE (UE1) 6105 being served thereby. The subframes represented by reference numeral "7703" show an exemplary configuration of the downlink subframes from the second RN (RN2) 6108 to the second UE (UE2) 6107 being served thereby.

FIG. 62 shows exemplary configurations of the uplink subframes in a case where the subframe of an access link differs between RNs. In FIG. 62, the subframes represented by reference numeral "7704" show an exemplary configuration of uplink subframes from the fourth UE (UE4), first RN (RN1) 6106, and second RN (RN2) 6108 being served by the second DeNB (DeNB2) 6102 to the second DeNB (DeNB2) 6102. The subframes represented by reference numeral "7705" show an exemplary configuration of the uplink subframes from the first UE (UE1) 6105 being served by the first RN (RN1) 6106 to the first RN (RN1) 6106. The subframes represented by reference numeral "7706" show an exemplary configuration of the uplink subframes from the second UE (UE2) 6107 being served by the second RN (RN2) 6108 to the second RN (RN2) 6108.

The method disclosed in the first modification of the third embodiment is applied to the backhaul link and access link. As shown in FIGS. 50 and 51, accordingly, the subframes of the backhaul links 6111 and 6112 between the second DeNB (DeNB2) 6102 and the first RN (RN1) 6106 and between the second DeNB (DeNB2) 6102 and the second RN (RN2) 6108 are identical to one another. Subframes #1 and #2 are for downlinks, and subframes #1, #2, #5, and #6 are for uplinks.

The subframes in which the MBSFN subframes are configured are the same in the downlinks between the first RN (RN1) 6106 and the first UE (UE1) 6105 being served thereby and between the second RN (RN2) 6108 and the second UE (UE2) 6107 being served thereby, which are the subframes #1 and #2. The subframe in which scheduling is not performed is the same in the uplinks between the first RN (RN1) 6106 and the first UE (UE1) 6105 being served thereby and between the second RN (RN2) 6108 and the second UE (UE2) 6107 being served thereby, which are the subframes #1, #2, #5, and #6.

The downlinks shown in FIG. 61 will be described first. The subframes of the downlink access link 6114 from the first RN (RN1) 6106 to the first UE (UE1) 6105 being served thereby and the subframes of the downlink access link 6115 from the second RN (RN2) 6108 to the second UE (UE2) 6107 being served thereby overlap one another in subframes other than subframes #1 and #2. The subframes including an overlap are the subframes #0, #3, #4, #5, #6, #7, #8, and #9.

In this case, the downlink access link of one of the RNs causes interference to the downlink access link of the other in the subframes #0, #3, #4, #5, #6, #7, #8, and #9.

To reduce such interference, the subframes of the downlink access link of the first RN (RN1) 6106 are caused to differ from the subframes of the downlink access link of the second RN (RN2) 6108. For example, as shown in FIG. 61, the subframes #3, #4, #7, and #8 are changed to ABSs in the downlink access link 6114 from the first RN (RN1) 6106 to the first UE (UE1) 6105 being served thereby. Meanwhile, the subframes #0, #5, #6, and #9 are changed to ABSs in the downlink access link 6115 from the second RN (RN2) 6108 to the second UE (UE2) 6107 being served thereby.

Through the above, the subframe of one of the downlink access links is the ABS of the other. The subframes of the downlink access link are caused to differ between RNs in this manner, resulting in a reduction in the interference between downlink access links of different RNs.

The uplinks shown in FIG. 62 will be described next. The subframes of the uplink access link 6121 from the first UE (UE1) 6105 being served by the first RN (RN1) 6106 to the first RN (RN1) 6106 and the subframes of the uplink access link 6122 from the second UE (UE2) 6107 being served by the second RN (RN2) 6108 to the second RN (RN2) 6108 overlap one another in subframes other than the subframes #1, #2, #5, and #6. The subframes including an overlap are the subframes #0, #3, #4, #7, #8, and #9.

In this case, the uplink access link of one of the RNs causes interference to the uplink access link of the other in the subframes #0, #3, #4, #7, #8, and #9.

To reduce such interference, the subframes of the uplink access link of the first RN (RN1) 6106 are caused to differ from the subframes of the uplink access link of the second RN (RN2) 6108. Or, radio resources to be scheduled in the subframes of the uplink access link of the first RN (RN1) and the subframes of the uplink access link of the second RN (RN2) are caused to differ from each other.

For example, as shown in FIG. 62, in the first RN (RN1) 6106, scheduling is performed in RB_upper of the even-numbered subframes among those subframes, whereas scheduling is performed in RB_lower of the odd-numbered subframes thereamong. Meanwhile, in the second RN (RN2) 6108, scheduling is performed in RB_lower of the even-numbered subframes, whereas scheduling is performed in RB_upper of the odd-numbered subframes. RB_upper and RB_lower are one or a plurality of resource blocks and are formed of different resource blocks.

Through the above, scheduling of one uplink access link is not performed in the resource block in which scheduling is performed in the other uplink access link. The subframes of an uplink access link or radio resources are caused to differ between RNs as described above, resulting in a reduction in the interference between downlink access links of different RNs.

To prevent interference by the SS or PBCH, a time offset may be provided to the frame timing between the first RN (RN1) 6106 and the second RN (RN2) 6108 such that the subframes in which the SS or PBCH is located do not overlap one another. In this case, the subframe numbers at the same time differ from each other. In consideration of this, setting may be made as to which subframe is set to an ABS or in which subframe scheduling is not performed. An offset of the frame timing per RN may be determined by the DeNB. An offset may be set to the frame timing of an access link based on the frame timing of a backhaul link.

The DeNB recognizes the RN subframe configuration of the RN but does not recognize the subframe configuration of the access link of the RN. Thus, in a case where the subframes of an access link are adjusted to differ between RNs, which node controls the adjustment becomes an issue.

This embodiment will disclose the following two specific examples (1) and (2) as a node which controls the adjustment.

(1) The DeNB sets the subframe configuration of an access link per RN.

(2) The RN sets the subframe configuration of an access link of the own RN.

As the setting of the subframe configuration, which subframe is set for the downlink access link or which subframe is set to at least any one of the ABS and MBSFN subframe is set.

To reduce the interference occurring in the access link between RNs, for the specific example (1), the DeNB sets the subframe configuration of each RN such that the subframes of an access link differ between RNs, and notifies each RN of the set subframe configuration. The RN applies the received subframe configuration to the access link of the own RN. The DeNB sets the subframe configuration of the access link per RN, whereby the DeNB can intensively control and manage the RNs that cause interference. This facilitates the control, resulting in reductions in control delay and the number of control circuits.

For the specific example (2) above, the RN sets the subframe configuration of the own RN so as to have subframes of the access link different from those of the other RN and applies the set subframe configuration to the access link of the own RN. The RN sets the subframes of the access link of the own RN, which allows for setting independently of the DeNB. The situation per RN, such as the load situation of a UE being served by the RN, can be thus reflected flexibly on the subframe configuration.

If the DeNB does not notify the RN of the subframe configuration of an access link, the RN may set the subframes of an access link of the own RN. The DeNB may notify each RN of the subframe configuration of an access link as required. This allows for more flexible control.

Disclosed below is an exemplary operation of the method of causing the subframes of a downlink access link to differ between RNs to avoid uplink scheduling in the subframes of an uplink access link that causes interference.

FIG. 63 shows an exemplary sequence of a mobile communication system in the fourth embodiment. The sequence shown in FIG. 63 is similar to the sequence shown in FIG. 52, and thus, the same steps will be denoted by the same step numbers and common description will be omitted. FIG. 63 shows the sequence in a case where the subframes of a downlink access link are caused to differ between RNs to avoid uplink scheduling in the subframes of an uplink access link that causes interference. Specifically, FIG. 63 shows the sequence after the state in which the RN has performed HO and completed the RRC connection with the DeNB. FIG. 63 shows the example of the specific example (1) in which the DeNB sets the subframe configuration of an access link per RN.

In Step ST7801, the DeNB that has judged that there are RNs that cause interference to the RN in Step ST6704 selects an RN whose interference is to be reduced.

The DeNB recognizes the RN subframe configuration of the selected RN. In Step ST7802, the DeNB thus determines the subframe configuration of an access link of each RN, using each RN selected and the RN subframe configuration to be set for the RN newly RRC-connected. Specifically, the DeNB determines the subframe configuration of an access link such that it differs between RNs.

In Step ST7803, the DeNB notifies each RN of the determined subframe configuration of the access link.

In Step ST7804, each RN that has received the subframe configuration determines the subframes to be set as ABSs, based on the received subframe configuration of the access link. For example, the RN may set subframes other than the received subframe configuration of the access link as ABSs.

In Step ST7805, each RN determines subframes and uplink resources for allowing uplink scheduling, based on the received subframe configuration of the access link. For example, each RN may avoid uplink scheduling in the subframes other than the received subframe configuration of an access link.

In Step ST7806, each RN sets an ABS for the UE being served thereby. The UE that has received the ABS setting information performs the reception process for this subframe as an ABS.

In Steps ST7807 and ST7808, the RN performs downlink scheduling in the subframes that are not set as ABSs and performs uplink scheduling using subframes and resources for allowing uplink scheduling.

This allows the subframe configuration of an access link to differ between RNs, resulting in a reduction in the interference occurring between access links of different RNs.

First Modification of Fourth Embodiment

This modification will disclose another method for reducing the interference occurring between access links of different RNs.

The frequency of an access link is caused to differ from RN to RN in the RNs that cause interference. The RN may be an inband RN or outband RN as long as the frequency of an access link differs from RN to RN.

Figure 64:
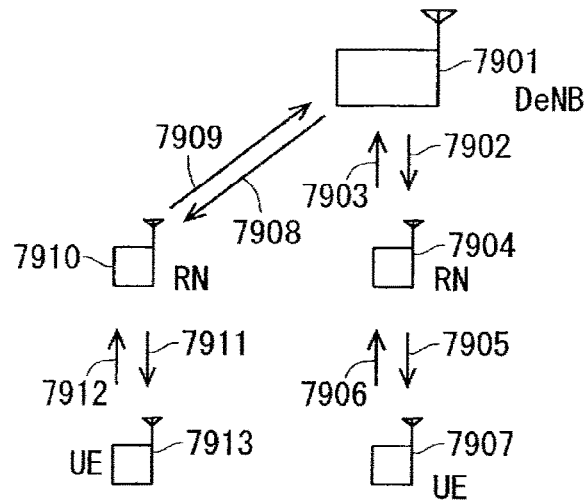
FIG. 64 shows an exemplary configuration of frequencies of backhaul links and access links in a first modification of the fourth embodiment.

FIG. 64 shows an exemplary configuration of frequencies of backhaul links and access links in the first modification of the fourth embodiment.

A first RN (RN1) 7910 and a second RN (RN2) 7904 are located being served by a DeNB 7901. A first UE (UE1) 7913 is located being served by the first RN (RN1) 7910. A second UE (UE2) 7907 is located being served by the second RN (RN2) 7904.

The DeNB 7901 and the first RN (RN1) 7910 are connected by a downlink backhaul link (BL_DL) 7908 and an uplink backhaul link (BL_UL) 7909. The first RN (RN1) 7910 and the first UE (UE1) 7913 are connected by a downlink access link (AL_DL) 7911 and an uplink access link (AL_UL) 7912.

The DeNB 7901 and the second RN (RN2) 7904 are connected by a downlink backhaul link (BL_DL) 7902 and an uplink backhaul link (BL_UL) 7903. The second RN (RN2) 7904 and the second UE (UE2) 7907 are connected by a downlink access link (AL_DL) 7905 and an uplink access link (AL_UL) 7906.

The frequency of the downlink backhaul link (BL_DL) 7908 is represented by f_BL_DL (RN1), and the frequency of the downlink access link (AL_DL) 7911 is represented by f_AL_DL (RN1). The frequency of the uplink backhaul link (BL_UL) 7909 is represented by f_BL_UL (RN1), and the frequency of the uplink access link (AL_UL) 7912 is represented by f_AL_UL (RN1).

Meanwhile, the frequency of the downlink backhaul link (BL_DL) 7902 is represented by f_BL_DL (RN2), and the frequency of the downlink access link (AL_DL) 7905 is represented by f_AL_DL (RN2). The frequency of the uplink backhaul link (BL_UL) 7903 is represented by f_BL_UL (RN2), and the frequency of the uplink access link (AL_UL) 7906 is represented by f_AL_UL (RN2).

Here, the frequencies are set so as to meet the conditions of (1) below.

(1) The AL frequency is caused to differ from RN to RN.

$$f\_AL\_DL(RNi) \neq f\_AL\_DL(RNj) \quad (a29)$$

$$f\_AL\_UL(RNi) \neq f\_AL\_UL(RNj) \quad (a30)$$

In Expressions (a29) and (a30), i is not equal to j and RNi and RNj are RNs being served by the DeNB.

This results in a reduction of the interference between access links of different RNs.

Figure 65:
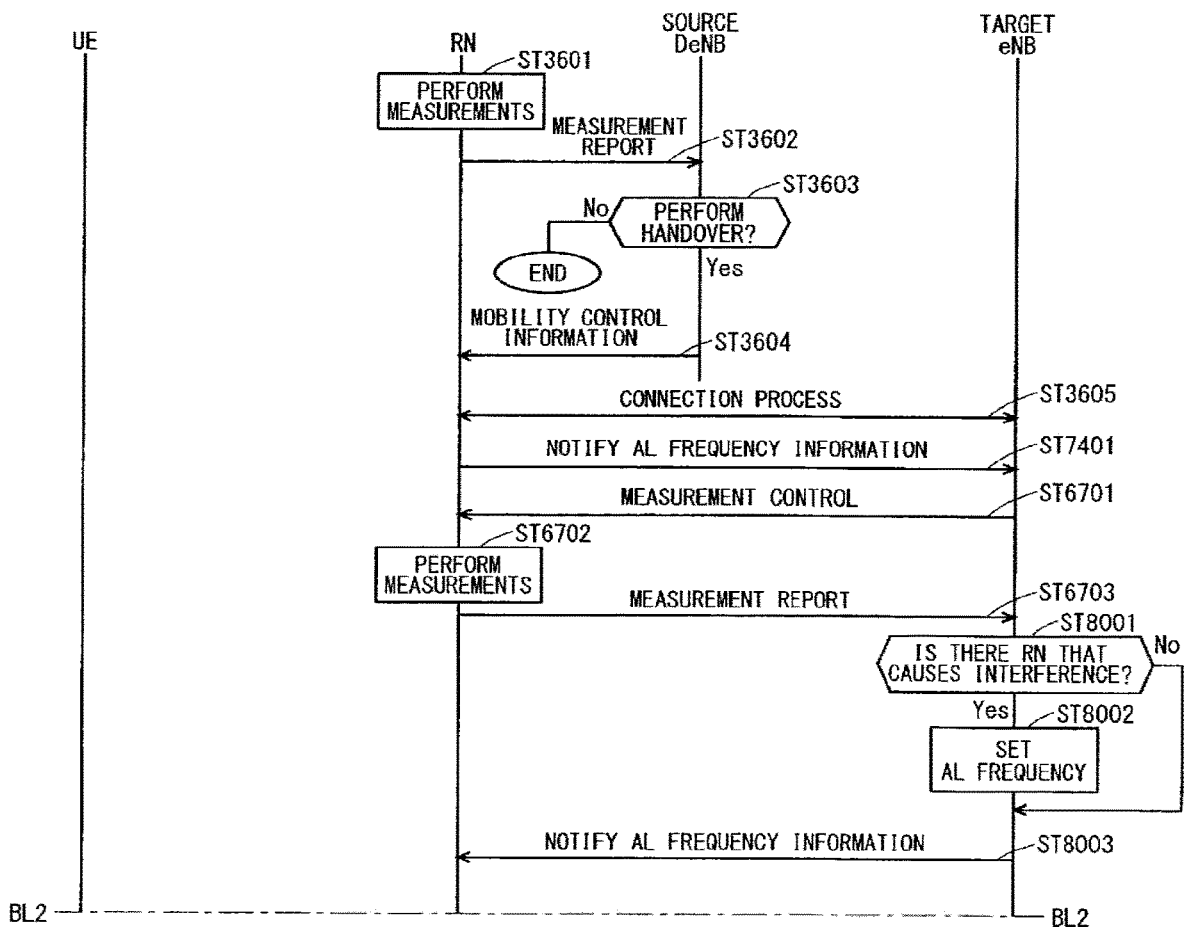
FIG. 65 shows an exemplary sequence of a mobile communication system in the first modification of the fourth embodiment.

Disclosed below is an exemplary operation of the method of causing frequency of an access link to differ from RN to RN. FIGS. 65 and 66 show an exemplary sequence of the mobile communication system in the first modification of the fourth embodiment. FIG. 66 is continuous with FIG. 65 at a boundary BL2. The sequence shown in FIGS. 65 and 66 is similar to the sequences shown in FIGS. 48 and 56, and thus, the same steps will be denoted by the same step numbers, and common description will be omitted. FIGS. 65 and 66 show the sequence in which the frequency of an access link is caused to differ from RN to RN. In FIGS. 65 and 66, the RN is an outband RN.

In Step ST3605, the RN performs HO and then completes the process for connection with the target eNB (DeNB). In this connection process, the RN notifies the DeNB of the frequency information of the access link set in the own RN. The RN may notify the DeNB of this information as other message or as other signaling, in place of the process of Step ST3605. With reference to FIGS. 65 and 66, in Step ST7401, the RN notifies the DeNB of the frequency information of the access link set in the own RN as other message.

In Step ST8001, the DeNB judges whether there is an RN that causes interference with the relevant RN. The DeNB may judge whether interference is an issue in Step ST8001, based on whether there is an RN having the frequency of an access link that is identical to the frequency of an access link of the relevant RN. The DeNB moves to Step ST8002 in a case of judging in Step ST8001 that there is an RN that causes interference or moves to Step ST8003 in a case of judging in Step ST8001 that there is no RN that causes interference.

In Step ST8002, the DeNB that has judged in Step ST8001 that there is an RN that causes interference sets the frequency of an access link of this RN to other frequency. The other frequency may be a frequency different from the frequency of an access link of the existing RN. Or, the other frequency may be a frequency different from the frequency of an access link of the RN that causes interference.

In Step ST8003, the DeNB notifies the RN of the set frequency information of an access link. If not changing the frequency of an access link, the DeNB may notify the RN of the information indicative of the above or the frequency information of an access link set by this RN. The DeNB may notify such information by including it in an RN reconfiguration message. The information is notified by being included in the RN reconfiguration message, resulting in a reduction in message type.

In Steps ST3606 to ST3611, the RN that has received in Step ST8003 the frequency information of an access link to be set after change causes the UE being served thereby to perform the RRC connection change process in the frequency of an access link after change, based on this information.

Through the above, the DeNB can set, for the relevant RN, the frequency of an access link different from that of the RN that causes interference. Additionally, the DeNB is caused to recognize the frequency of an access link of the RN being served thereby and is caused to intensively control and manage interference avoidance, leading to easier control.

If the RN is an inband RN, in Step ST8001, the DeNB may set the frequency of an access link to other frequency and may also set the frequency of a backhaul link to other frequency. The method disclosed in the third modification of the third embodiment is applicable to changing the frequency of a backhaul link to other frequency.

The DeNB also recognizes the frequency of a backhaul link of an RN being served thereby, and thus can control and manage the frequency of a backhaul link as well as the frequency of an access link.

Through the above, if the RN is an inband RN or outband RN, the frequency of an access link is caused to differ from RN to RN between the RNs that cause interference. This results in a reduction in the interference occurring between access links of different RNs.

Second Modification of Fourth Embodiment

This modification will disclose another method for reducing the interference occurring between access links of different RNs.

The RN may be brought into an open access mode or hybrid mode. This enables a UE being served by the RN to perform HO to other RN or reselect the other RN as a cell even if interference occurs between access links of different RNs due to the RN moving.

As another method, the transmission power of an access link of the RN may be adjusted to avoid interference with other RN. It is not necessary to adjust the transmission power of a backhaul link, and the transmission power of only an access link needs to be adjusted.

If the movable RN is brought into an open access mode or hybrid mode, a problem arises if RNs come closer to each other.

FIGS. 67 and 68 are diagrams for describing a change in the signal to interference ratio (SIR) of an access link in a UE being served by each RN in a case where the RNs are close to each other. FIG. 67 shows the state before RNs come closer to each other, and FIG. 68 shows the state in which RNs are close to each other.

Part (a) of FIG. 67 shows the state before RNs come closer to each other, and part (b) of FIG. 67 shows the SIR of an access link in a UE being served by each RN before RNs come closer to each other. Part (a) of FIG. 68 shows the state in which RNs are close to each other, and part (b) of FIG. 68 shows the SIR of an access link in a UE being served by each RN with the RNs being close to each other. In part (b) of FIG. 67 and part (b) of FIG. 68, the vertical axis and the horizontal axis represent the SIR and the position of a UE, respectively.

FIGS. 67 and 68 show the cases in which a first RN (RN1) 8103 and a second RN (RN2) 8104 come closer to each other. The first RN (RN1) 8103 provides a first coverage 8101. The second RN (RN2) 8104 provides a second coverage 8102. A first UE (UE1) 8107 that is a UE being served by the first RN (RN1) 8103 is located in the first coverage 8101. A second UE (UE2) 8108 that is a UE being served by the second RN (RN2) 8104 is located in the second coverage 8102.

In part (b) of FIG. 67 and part (b) of FIG. 68, reference numeral "8109" represents the SIR in a downlink 8105 from the first RN (RN1) 8103 to the first UE (UE1) 8107, and reference numeral "8110" represents the SIR in a downlink 8106 from the second RN (RN2) 8104 to the second UE (UE2) 8108.

Before RNs come closer to each other as shown in FIG. 67, the SIR gradually drops from centers Q1 and Q2 of the coverages 8101 and 8102 of the RNs (RN1 and RN2) 8103 and 8104 toward the edges of the coverages 8101 and 8102 (hereinafter, also referred to as "coverage edges"). In this case, the UE performs HO without any problem at the coverage edges of the first RN (RN1) 8103 and the second RN (RN2) 8104.

In FIG. 67, P1 represents an overlap of the coverages 8101 and 8102 (hereinafter, also referred to as a "coverage overlap") between the first RN (RN1) 8103 and the second RN (RN2) 8104 before the RNs come closer to each other. The distance between the centers Q1 and Q2 of the coverages 8101 and 8102 of the RNs (RN1 and RN2) 8103 and 8104 is represented by d1.

When the RNs are close to each other as shown in FIG. 68, a distance d2 between centers Q3 and Q4 of the coverages 8101 and 8102 of the RNs (RN1 and RN2) 8103 and 8104 decreases (d2<d1), and a coverage overlap P2 between the first RN (RN1) 8103 and the second RN (RN2) 8104 increases (P2>P1). In this case, the SIR drops sharply from the centers Q3 and Q4 of the coverages 8101 and 8102 of the RNs (RN1 and RN2) 8103 and 8104 toward the coverage edges.

In this case, the SIR drops sharply at the coverage edges of the first RN (RN1) 8103 and the second RN (RN2) 8104, and accordingly, HO is activated suddenly by the UE 8107 located in the coverage overlap P2 between the first RN (RN1) 8103 and the second RN (RN2) 8104. This frequently causes a problem that the HO process is not activated in time and fails, and reconnection to an original RN also fails and connection is disconnected.

This modification will disclose, to reduce such a problem, a method different from the methods disclosed in the fourth embodiment and the first modification of the fourth embodiment.

In the RN that causes interference, a movable RN is provided indoors. A shield is provided so as to cover a desired coverage of the movable RN. The antenna for access link of the RN and the antenna for backhaul link thereof are separately placed. The antenna for access link is placed indoors or inside the shield. The antenna for backhaul link is placed outdoors or outside the shield. The shield attenuates the transmission power from the outside RN by an amount for a desired value. An attenuation may be regulated such that a good SIR is obtained in the shield. Or, an attenuation may be regulated such that, if an RN inside the shield comes closer to the outside RN, the UE being served by the former RN does not activate HO at the edge of the shield.

FIG. 69 is a diagram for describing the SIR of an access link in a UE being served by each RN when RNs are close to each other, with one of the RNs being placed indoors. Part (a) of FIG. 69 shows the state in which RNs are close to each other in a case where one of the RNs is placed indoors, and part (b) of FIG. 69 shows the SIR of an access link in a UE being served by each RN. In FIG. 69, the portions corresponding to FIGS. 67 and 68 will be denoted by the same reference numerals, and description thereof will be omitted.

FIG. 69 shows a case in which a shield 8201 that covers the desired coverage 8101 of the first RN (RN1) 8103 is provided. An antenna unit for backhaul 8203 is placed outside the shield. The antenna unit 8203 is connected to the first RN (RN1) 8103 by means of an interface 8202.

The first RN (RN1) 8103 is surrounded by the shield 8201, which keeps a good communication quality of the access link 8105 between the first RN (RN1) 8103 and the first UE (UE1) 8105 being served thereby if the first RN (RN1) 8103 comes closer to the second RN (RN2) 8104.

In the diagram of part (b) of FIG. 69 showing the SIR, a solid line indicated by reference numeral "8109" represents the SIR of the first RN (RN1) 8103, and a chain double-dashed line indicated by reference numeral "8110" represents the SIR of the second RN (RN2) 8104.

As shown in part (b) of FIG. 69, the SIR of the first RN (RN1) 8103 changes sharply at a boundary provided by the shield 8201. Specifically, the SIR 8109 of the first RN (RN1) 8103 does not drop sharply inside the shield 8201 but drops sharply outside the shield 8201. This is because the shield 8201 can reduce the interference from the second RN (RN2) 8104. However, the signal intensity of the first RN (RN1) drops at the boundary provided by the shield 8201, and the SIR drops sharply outside the shield 8201.

The SIR of the second RN (RN2) 8104 likewise changes sharply at the boundary provided by the shield 8201. The SIR of the second RN (RN2) 8104 does not drop sharply outside the shield 8201, namely on the second RN (RN2) 8104, but drops sharply inside the shield 8201, namely on the first RN (RN1) 8103. This is because the shielding by the shield 8201 can reduce the interference from the first RN (RN1) 8103. However, the signal intensity of the second RN (RN2) 8104 drops at the boundary provided by the shield 8201, and the SIR drops sharply inside the shield 8201.

If the antenna for backhaul link 8203 is placed inside the shield 8201 of the first RN (RN1) 8103, the path loss between the DeNB and the first RN (RN1) 8103 increases, and the communication quality of the backhaul link deteriorates. Thus, the antenna for backhaul link 8203 is preferably placed outside the shield 8201. Baseband signals or carrier signals may be transmitted/received on the interface 8202. Or, analog signals or digital signals may be transmitted/received on the interface 8202.

As described above, the antenna for backhaul link 8203 is preferably placed outside the shield 8201. This avoids a sharp drop of the SIR of the first RN (RN1) 8103 inside the shield 8201. Thus, the first UE (UE1) 8107 being served by the first RN (RN1) 8103 located inside the shield 8201 needs not to suddenly activate HO and perform the HO process due to a sharp drop of the SIR. This reduces occurrences of such a problem that the communication of the first UE (UE1) 8107 being served by the first RN (RN1) 8103 is disconnected frequently.

The methods disclosed in the third embodiment to the second modification of the fourth embodiment are applicable not only to the case in which an RN moves in an RRC connected state but also to the case in which an RN moves in an Idle state and is then RRC-connected. The methods are also applicable when the RN is initially installed or when the RN is installed after it has moved. The methods are not only applicable to HO but also applicable when the RN moves in the coverage of the DeNB. Effects similar to those described above can be achieved.

Fifth Embodiment

Frequencies in a frequency band (hereinafter, also referred to as a "world band") operated in a plurality of areas or countries are more desirable than frequencies in a frequency band (hereinafter, also referred to as a "regional band") operated in only specific areas or countries, as the frequencies supported by a UE.

This is because more UEs can be manufactured and sold if they support the world band. Also, costs for UEs can be reduced. It is thus conceivable that a large number of UEs will support the world band. This embodiment therefore discloses the method of allowing the UEs that support only the world band to access an RN.

The frequency of an access link of the RN is set to the frequency in the world band. As a specific example, the inband RN sets the frequency between an RN and UEs being served by the RN, namely the frequency of an access link to the frequency in the world band. This allows the UEs supporting only the frequencies in the world band to access the RN.

Furthermore, the frequency band between a DeNB and UEs being served by the DeNB, namely the frequency band of a normal link may be identical to the frequency band between an RN and UEs being served by the RN. This allows the UEs supporting the world band to perform HO between the DeNB and the RN and reselect a cell.

Furthermore, the frequency between a DeNB and a UE being served by the DeNB may be identical to the frequency between an RN and a UE being served by the RN. This allows for HO between the DeNB and RN and cell reselection in the same frequency, resulting in a reduction in processing delay.

As another specific example, the frequency between an RN and a UE being served by the RN may be set to a frequency in the world band for the outband RN. In other words, the frequency of an access link of the RN may be set to a frequency in the world band for the outband RN. The outband RN has a frequency of a backhaul link and a frequency of an access link that are different from each other. Of those, the frequency of an access link is set to a frequency in the world band, allowing the UE that supports only a frequency in the world band to access this outband RN.

Furthermore, the frequency band between a DeNB and a UE being served by the DeNB may be identical to the frequency band between an RN and a UE being served by the RN. This allows a UE supporting a world band to perform HO between the DeNB and RN and reselect a cell.

Furthermore, the frequency band between a DeNB and a UE being served by the DeNB may be identical to the frequency band between the DeNB and RN. In other words, the frequency band may be identical to the frequency band of a backhaul link of the RN. This allows the RN to perform HO between DeNBs and reselect a cell in the same frequency band.

Furthermore, the frequency between a DeNB and a UE being served by the DeNB may be identical to the frequency between the DeNB and RN. In other words, the frequency may be identical to the frequency of a backhaul link of the RN. This allows the RN to perform HO between the DeNBs and reselect a cell in the same frequency, resulting in a reduction in processing delay.

If the frequency between a DeNB and a UE being served by the DeNB is a frequency in the world band, the outband RN may set the frequency between the DeNB and RN to a frequency in the world band. In other words, the frequency of a backhaul link of the RN may be set to a frequency in the world band. Although the outband RN has a frequency of a backhaul link and a frequency of an access link that are different from each other, a UE supporting only a frequency in the world band can access this outband RN by setting the both frequencies to frequencies in the world band. Also, if the DeNB supports only a frequency in the world band, this outband RN can be supported.

A specific example of the frequency configuration of the outband RN, disclosed in this embodiment, will be described with reference to FIG. 28. In FIG. 28, the RN 1304 is an outband RN. The outband RN 1304 and the UE 2901 are located being served by the DeNB 1305. The UE 1303 is located being served by the outband RN 1304.

The DeNB 1305 and the outband RN 1304 are connected by the downlink backhaul link (BL_DL) 2902 and the uplink backhaul link (BL_UL) 2903. The outband RN 1304 and the UE 1303 are connected by the downlink access link (AL_DL) 2904 and the uplink access link (AL_UL) 2905. The DeNB 1305 and the UE 2901 are connected by the normal downlink (Normal_DL) 2906 and the normal uplink (Normal_UL) 2907.

Here, the frequency of the downlink backhaul link (BL_DL) 2902 is represented by f_BL_DL, and the frequency of the downlink access link (AL_DL) 2904 is represented by f_AL_DL. The frequency of the uplink backhaul link (BL_UL) 2903 is represented by f_BL_UL, and the frequency of the uplink access link (AL_UL) 2905 is represented by f_AL_UL. The frequency of the normal downlink (Normal_DL) 2906 is represented by f_Normal_DL, and the frequency of the normal uplink (Normal_UL) 2907 is represented by f_Normal_UL.

The frequencies are set so as to meet the following two conditions (1) and (2).

(1) The frequency of a backhaul link of the outband RN is caused to be identical to the frequency of a normal link between the DeNB and UE.

$$f\_BL\_DL = f\_Normal\_DL \qquad (a31)$$

$$f\_BL\_UL = f\_Normal\_UL \qquad (a32)$$

(2) The frequencies (f_AL_DL, f_AL_UL) of an access link of the outband RN and the frequencies (f_Normal_DL, f_Normal_UL) of a normal link between the DeNB and UE are set to frequencies in the world band.

For the outband RN, Expressions (a33) and (a34) below are derived from Expressions (a31) and (a32) regarding the conditions described in (1) above.

$$f\_AL\_DL \neq f\_Normal\_DL \qquad (a33)$$

$$f\_AL\_UL \neq f\_Normal\_UL \qquad (a34)$$

Although the frequency of an access link of the outband RN needs to be set so as to meet the conditions (1) and (2) above when an outband RN is installed or when an outband RN moves, 3GPP has not discussed the setting method and disclosed technique relating to this.

The method of setting the frequency of an access link, disclosed in the second modification of the third embodiment, is applicable as the method of setting the frequency of an access link of the outband RN so as to meet the conditions (1) and (2) above.

Figure 70:
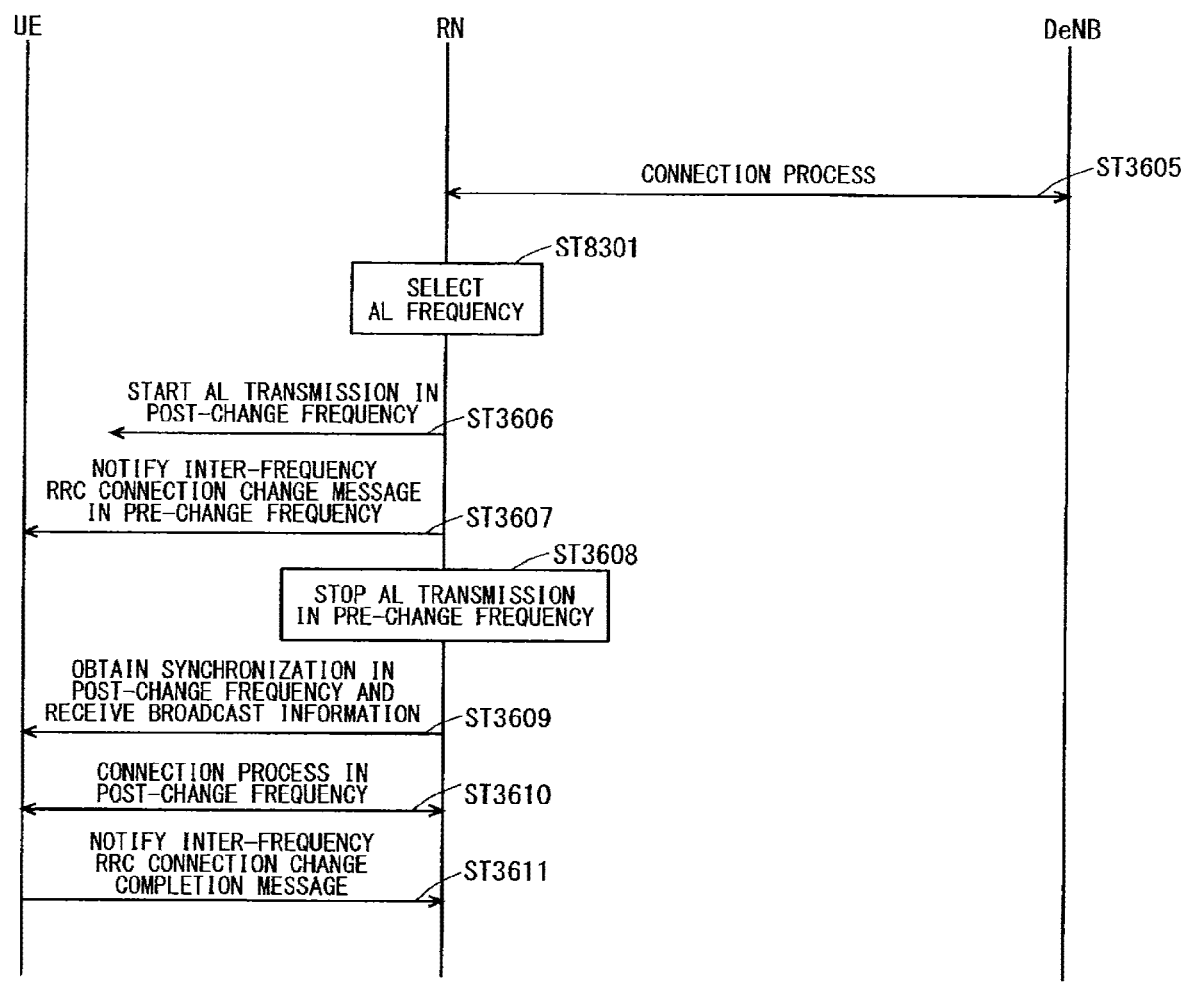
FIG. 70 shows an exemplary sequence of a mobile communication system in a fifth embodiment.

FIG. 70 shows an exemplary sequence of a mobile communication system in the fifth embodiment. The sequence shown in FIG. 70 is similar to the sequence shown in FIG. 54, and thus, the same steps will be denoted by the same step numbers and common description will be omitted. FIG. 70 shows the sequence showing the method of setting the frequency of an access link in the outband RN when HO is performed.

In Step ST3605, the RN performs the process for connection with the DeNB operated in the frequency of a normal downlink (f_Normal_DL). The frequency of a normal downlink (f_Normal_DL) is set to a frequency in the world band.

In Steps ST8301, the RN may set the frequency meeting the conditions (1) and (2) above to the frequency of an access link.

In Step ST3606 to ST3611, the RN performs, on a UE being served thereby, an RRC connection change process in the changed frequency of an access link. The method disclosed in the second embodiment is applicable as this method.

This exemplary sequence describes the case in which RN is performed HO. The sequence is not limited to the above, which may be the case in which the RN attaches to the DeNB operated in the frequency of a normal downlink (f_Normal_DL). In this case, the RN detects and selects a DeNB operated in the frequency of a normal downlink (f_Normal_DL) and attaches to the NW as an RN via the DeNB. After that, the RN may perform the processes of Step ST8301 and thereafter. The processes of Steps ST3607 and ST3608 being the processes before the frequency of an access link is changed between the RN and UE may be omitted.

Through the above, even a UE that supports only the world band can access the RN. This enables the UE to access, by supporting a few frequency bands, the RN in frequency bands of a plurality of areas or countries. UE manufacturers are only required to manufacture UEs that support only the world band for access to RNs in a plurality of areas or countries. This simplifies circuits of UEs, allowing for manufacture of UEs at low cost.

First Modification of Fifth Embodiment

This modification will disclose another specific example of the frequency configuration of an outband RN that has been disclosed in the fifth embodiment. Description will be given with reference to FIG. 28 as in the fifth embodiment.

Each frequency is set so as to meet the following conditions (1) to (3).

(1) The frequency of an access link of the outband RN is caused to be identical to the frequency of a normal link between the DeNB and UE.

$$f\_AL\_DL = f\_Normal\_DL \quad (a35)$$

$$f\_AL\_UL = f\_Normal\_UL \quad (a36)$$

(2) The frequencies (f_AL_DL, f_AL_UL) of an access link of the outband RN and the frequencies (f_Normal_DL, f_Normal_UL) of a normal link between the DeNB and UE are set to frequencies in the world band.

For the outband RN, the condition (3) below is obtained from Expressions (a35) and (a36) shown in the condition (1) above.

(3) The frequency of a backhaul link of the outband RN is caused to differ from the frequency of a normal link between the DeNB and UE.

$$f\_BL\_DL \neq f\_Normal\_DL \quad (a37)$$

$$f\_BL\_UL \neq f\_Normal\_UL \quad (a38)$$

The frequency of a backhaul link may be set to a frequency in the regional band. The use of only the frequencies in the world band increases a system load. The use of a regional band allows for the distribution of a system load in the area or country in which the operation of the regional band is allowed. The system load thus can be distributed by setting the frequency of a backhaul link of the outband RN to a frequency in the regional band.

The frequency of a backhaul link is not directly relevant to a UE. In other words, the UE needs not to support a frequency of a backhaul link. For this reason, the UE that supports only the world band can access the RN, which further allows for distribution of a system load.

Although the frequency of a backhaul link and the frequency of an access link of the outband RN need to be set so as to meet the conditions (1) to (3) above when an outband RN is installed or when an outband RN moves, 3GPP has not discussed this setting method and disclosed a technique relating to this.

The method of setting a frequency of a backhaul link and a frequency of an access link, disclosed in the third modification of the third embodiment, is applicable as the method of setting the frequency of a backhaul link frequency and an access link of the outband RN so as to satisfy the conditions (1) to (3) above.

Figure 72:
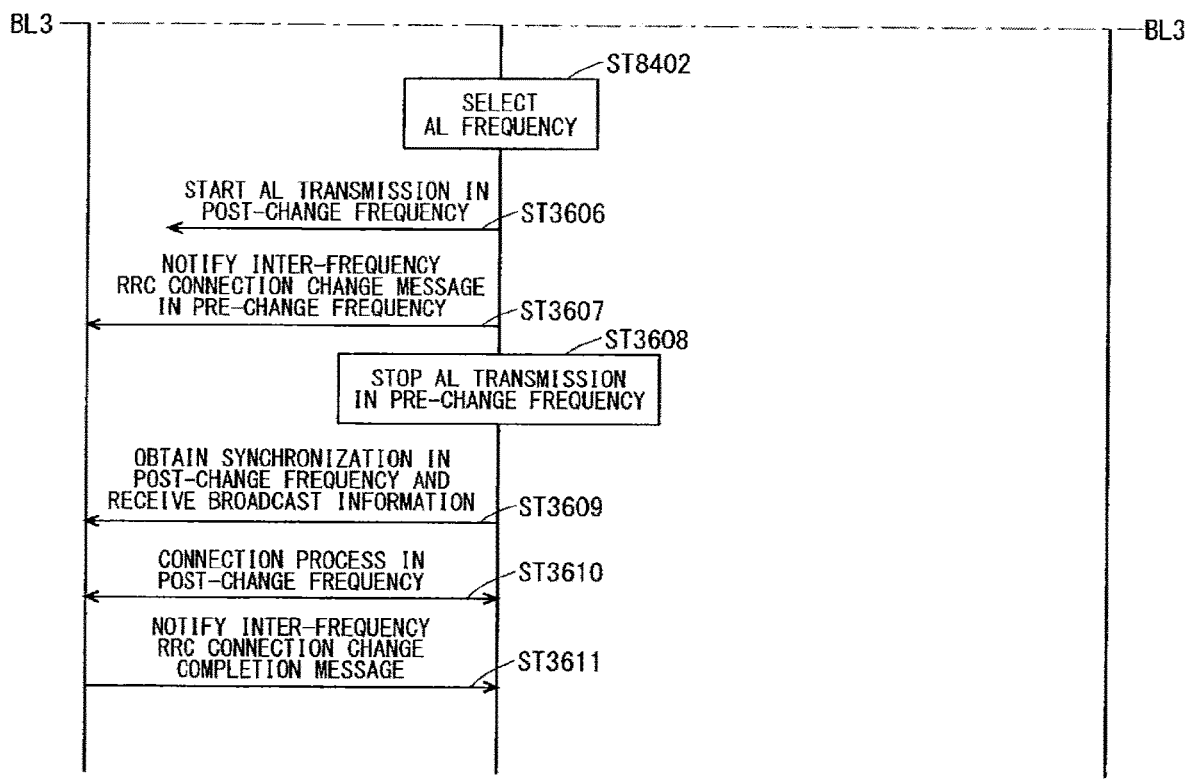
FIG. 72 shows another exemplary sequence of the mobile communication system in the first modification of the fifth embodiment.

FIGS. 71 and 72 show an exemplary sequence of a mobile communication system in the first modification of the fifth embodiment. FIG. 72 is continuous with FIG. 71 at a boundary BL3. The sequence shown in FIGS. 71 and 72 is similar to the sequence shown in FIGS. 57 and 58, and thus, the same steps will be denoted by the same step numbers and common description will be omitted. FIGS. 71 and 72 show the sequence showing the method of setting the frequency of an access link in the outband RN when HO is performed.

In Step ST3605, the RN performs the process for connection with the DeNB operated in the frequency of a normal downlink (f_Normal_DL). The frequency of a normal downlink (f_Normal_DL) is set to the frequency in the world band.

In Step ST8401, the DeNB may set such a frequency as to meet the condition (3) above to the frequency of a backhaul link. Further, the frequency of a backhaul link may be set to a frequency in the regional band.

In Steps ST7504 to ST7508, the DeNB performs the RRC connection change process in the frequency of a backhaul link between the RN and itself.

In Step ST7509, the RN stops the transmission/reception in the frequency of a backhaul link before change. The method disclosed in the third modification of the third embodiment is applicable as this method.

In Step ST8402, the RN may set such a frequency as to meet the conditions (1) to (3) above to the frequency of an access link.

In Steps ST3606 to ST3611, the RN performs, on the UE being served thereby, the RRC connection change process in the frequency of an access link after change. The method disclosed in the second embodiment is applicable as this method.

This exemplary sequence shows a case in which HO is performed to the RN. The sequence is not limited to the above, which may be the case in which the RN attaches to the DeNB operated in the frequency of a normal downlink (f_Normal_DL). In this case, the RN detects and selects the DeNB operated in the frequency of a normal downlink (f_Normal_DL) and then attaches to the NW as an RN via this DeNB. Then, the processes of Step ST8401 and thereafter may be performed. The processes of Steps ST7505 and ST7509, which are the processes before changing the frequency of a backhaul link between the DeNB and RN, and the processes of Steps ST3607 and ST3608, which are the processes before changing the frequency of an access link between the RN and UE, may be omitted.

Through the above, the effects disclosed in the fifth embodiment can be achieved. Also, the frequency of an access link of the outband RN is caused to be identical to the frequency of a normal link between the DeNB and UE, allowing for efficient use of frequency resources in the world band. Besides, the frequency of a backhaul link is set to a frequency in the regional band, which allows for the distribution of a system load without load concentration in the world band.

In a case where, for example, the RN moves, interference occurs between the existing RN and this RN. The methods disclosed in the third embodiment to the second modification of the fourth embodiment may be appropriately used as the method of reducing interference.

Second Modification of Fifth Embodiment

The fifth embodiment and the first modification of the fifth embodiment above have disclosed that a frequency in the world band is selected as the frequency of an access link of the RN. The first modification of the fifth embodiment above has disclosed that a frequency in the regional band is selected as the frequency of a backhaul link of the RN. This modification will disclose the method of selecting a frequency in the world band or a frequency in the regional band.

The following two specific examples (1) and (2) will be disclosed for the node (hereinafter, referred to as a "management node") that manages the information about a frequency band.

(1) The server that has the function of managing a frequency band is provided.

(2) The NW such as HSS, MME, and OAM has the function of managing a frequency band.

In the specific examples (1) and (2) above, each node may have the function of managing not only a frequency band but also a frequency to be operated.

In the specific example (1) above, the server may be provided in a 3GPP network or outside the 3GPP network. Or, the server may be commonly used between operators.

Specific examples of the data to be managed include identification numbers, frequency bands, areas or countries supporting the frequency bands, current operating conditions, operation areas, and planned operating times. Or, the data may be the type as to whether the frequency band is a world band or regional band. The data to be managed is not limited to the above, and the data necessary for flexibly operating a frequency band may be managed.

FIG. 73 shows a specific example of the data to be managed in the server. The data to be managed in the server may be listed as a table. The lower-end frequency and upper-end frequency of the frequency band are represented by fL and fU, respectively. The frequency bands indicated by a symbol "∘" show that they are currently operated. As to the operating times, a start time and an end time are represented by Ts and Te, respectively.

The frequency band with the identification number "1" is the frequency band of fL1 to fU1, whose corresponding areas or countries are EU and JP. As to the current operating condition, the frequency band is currently operated in an operation area Lc1, and the operating time is from Ts1 to Te1. The operation areas are desirably set such that areas that do not interfere with each other are easy to see.

The above-mentioned management leads to relatively easy understanding of, for example, what frequency bands are supported in Japan or in which area the relevant frequencies are or are not currently operated.

As to the access to the management node, the DeNB may access the management node such as a server, HSS, MME, or OAM via the MME. The management node notifies the DeNB of the above-mentioned management data in response to a request from the DeNB. The DeNB sets the frequency band and frequency to be set as the frequency of a backhaul link, based on the management data.

For example, In the first modification of the fifth embodiment, if the DeNB wishes to set the frequency of a backhaul link to a frequency in the regional band, in Step ST8401 of FIGS. 71 and 72 or before Step ST8401, the DeNB preliminary requests the management data from the management node and receives the management data from the management node. The DeNB may select, based on this management data, a regional band that is not operated in the area in which the own DeNB is located and select the frequency in this regional band as the frequency of a backhaul link of the RN.

An event for a management data request alone may be generated between the DeNB and MME. The MME that has received the event requests management data from the management node, and the management node notifies the MME being a request source of the management data. The MME may determine the frequency band and frequency of a backhaul link or the frequency band and frequency of an access link of the DeNB, using this management data. The MME may notify the DeNB of the determined frequency band and frequency. Or, the MME may instruct the DeNB to change the frequency band and frequency.

The DeNB may set the frequency band and frequency of an access link from the DeNB to the RN. In this case, the method disclosed in the second modification of the third embodiment is applicable. For example, the process of notifying the frequency information of an access link in Step ST7404 of FIG. 56 and the processes thereafter may be applied.

As disclosed in this modification, the frequency band can be flexibly operated in accordance with a time and area by providing a management node that manages the information about a frequency band and managing the information, resulting in an improvement in frequency use efficiency.

Third Modification of Fifth Embodiment

An increase in the number of UEs supporting the world band increases the load of radio resources in the frequency in the world band, causing a problem that the communication capacity as a system decreases.

To solve this problem, the RN disclosed in the fifth embodiment or the first modification of the fifth embodiment may be repeatedly used geographically or spatially. In other words, a plurality of RNs whose frequency of an access link is set to a frequency in the world band are installed in a DeNB to be separated from each other geographically or spatially. The DeNB may set the frequency of a normal link to a frequency in the world band.

The coverage of an RN being a low-output node is limited to a relatively small range than that of a macro cell. The same frequency can be thus used repeatedly by repeatedly installing RNs to be separated from each other geographically or spatially. Therefore, the load of radio resources in a frequency in the world band can be distributed geographically or spatially, which prevents a decrease in communication capacity as a system.

Furthermore, the frequency of a backhaul link of the RN may be set to a frequency in the regional band. This allows for further distribution of a load, improving frequency use efficiency.

The method of setting the frequency of an access link of the RN and the method of repeatedly installing RNs to be separated from each other geographically or spatially are applicable not only to RNs but also to local nodes. The access link of the RN may be applied to the normal link of a local node, namely the link between a local node and a UE being served thereby. Effects similar to those of this modification can be thus achieved if a variety of local nodes are used.

Fourth Modification of Fifth Embodiment

Disclosed below is another method for solving the problem same as that of the third modification of the fifth embodiment above.

The frequency of a normal link of the macro cell is set to a frequency of the world band, the frequency of a normal link of the local node is set to a frequency in the regional band, and a plurality of local nodes are repeatedly installed so as to be separated from each other geographically or spatially. The local nodes may include an RN. For the RN, the frequency of an access link may be set to a frequency in the regional band.

This allows the UE supporting only the world band to access the macro cell, and thus can receive services in a relatively large area.

Meanwhile, the UE that also supports the regional band is capable of accessing the local node, and thus can receive special services such as high-speed and high-capacity communication. The UE having such an additional function to also support the regional band is allowed to use the local node as described above, which prevents a decrease in communication capacity as a system.

The frequency of a normal link of the local node installed in the coverage of the macro cell may be set to a frequency in the regional band, and the frequency of a normal link of the local node installed outside the coverage of the macro cell may be set to a frequency in the world band. The effects similar to those of this modification can be accordingly achieved and, even if there is a local node outside the coverage of the macro cell, the UE that supports only the world band is allowed communication.

Sixth Embodiment

Deterioration of the quality of a backhaul link between the DeNB and RN leads to a problem that the UE being served by the RN cannot communicate with the network. This embodiment will disclose the method for solving this problem.

A node having an RN function and a HeNB function is configured. A physical device having an RN function and a HeNB function may be configured.

FIG. 74 shows the architecture of a mobile communication system including a node having an RN function and a HeNB function. The configuration shown in FIG. 74 is similar to the configuration shown in FIG. 13, and thus, corresponding portions will be represented by the same reference numerals and common description will be omitted.

The mobile communication system shown in FIG. 74 includes the MME for RN 1301, MME for UE 1302, UE 1303, RN 1304, DeNB 1305, P-GW for UE 1306, S-GW for UE 1307, a HeNB 8601, and a HeNBGW 8602. The RN 1304 and HeNB 8601 configure a node (hereinafter, referred to as a "dual node") 8606.

The UE 1303 and HeNB 8601 are connected by means of the Uu interface 1314, similarly to the UE 1303 and RN 1304. The MME for UE 1302 has the function of managing a movement of the UE 1303 being served by the HeNB 8601 in addition to the function of managing a movement of the UE 1303 being served by the RN 1304. The MME for UE 1302 and HeNB 8601 are connected by means of an S1-MME interface 8603. A HeNBGW 8602 may be provided between the HeNB 8601 and the MME for UE 1302.

The S-GW for UE 1307 has the function of transmitting/receiving user data of the UE 1303 being served by the HeNB 8601 in addition to the function of managing a movement of the UE 1303 being served by the RN 1304. The S-GW for UE 1307 and HeNB 8601 are connected by means of an S1-UE interface 8604.

The dual node 8606 is physically configured in one device. The RN 1304 and HeNB 8601 in the dual node 8606 are connected by means of an X2 interface 8605. Or, the RN 1304 and HeNB 8601 in the dual node 8606 may be connected by means of a dedicated interface because they are configured in the same device. The RN 1304 and HeNB 8601 in the dual node 8606 are connected by means of a dedicated interface, and accordingly, the information can be transmitted/received at higher speed between a function unit of the RN 1304 and a function unit of the HeNB 8601 in the dual node 8606, resulting in a reduction in control delay.

The RN 1304 and DeNB 1305 are wirelessly connected. The HeNB 8601 and the MME for UE 1302 or HeNBGW 8602 are wire-connected. For example, an optical communication line may be used in the physical connection between the HeNB 8601 and the MME for UE 1302 or HeNBGW 8602 by means of the S1-MME interface 8603 and the physical connection between the S-GW for UE 1307 and the HeNB 8601 by means of the S1-UE interface 8604. The dual node 8606 includes an antenna terminal for a backhaul link of the RN 1304 and a physical connection terminal for the S1-MME interface 8603 of the HeNB 8601 or a physical connection terminal for the S1-UE interface 8604.

For example, in a case where the communication between the UE 1303 and the NW is performed with the RN 1304, the UE 1303 is connected to the RN 1304, the DeNB 1305, the MME for UE 1302 or S-GW for UE 1307, and the P-GW for UE 1306.

Meanwhile, in a case where the communication between the UE 1303 and the NW is performed with the HeNB 8601, the UE 1303 is connected to the HeNB 8601, the MME for UE 1302 or S-GW for UE 1307, and the P-GW for UE 1306 in the configuration in which the HeNBGW 8602 is not provided. In the configuration in which the HeNBGW 8602 is provided, the UE 1303 is connected to the HeNB 8601, the HeNBGW 8602, the MME for UE 1302 or S-GW for UE 1307, and the P-GW for UE 1306.

If the configuration includes only the RN 1304 instead of the dual node 8606 including the RN 1304 and the HeNB 8601, the communication between the UE 1303 and the NW is performed with the RN 1304. For example, if the RN 1304 moves to be installed in a location in which an obstacle is located between the RN 1304 and the DeNB 1305, the communication quality of the backhaul link between the RN 1304 and DeNB 1305 deteriorates, and then, the communication between the RN 1304 and DeNB 1305 is disconnected. The communication between the UE 1303 and the NW may be accordingly disconnected.

Here, the dual node 8606 is configured and the HeNB 8601 and the S1-MME interface 8603 or S1-UE interface 8604 are connected using physical connection terminals at a moving destination. The dual node 8606 is thus connected to the MME for UE 1302 or S-GW for UE 1307 as the HeNB 8601 at the moving destination and can also function as the HeNB 8601.

Thus, if the communication quality of the backhaul link between the RN 1304 and DeNB 1305 deteriorates, the connection between the UE 1303 and NW is switched from the connection via the RN 1304 and the DeNB 1305 to the connection via the HeNB 8601, whereby the communication between the UE 1303 and NW can continue. For example, as the method of switching connection, the UE 1303 being served by the RN 1304 may be caused to perform HO from the RN 1304 to the HeNB 8601 by means of an X2 interface or a dedicated interface.

A case in which the UE 1303 is connected to the NW via the HeNB 8601 at a point is considered here. In this case, if the HeNB 8601 is solely provided, the HeNB 8601 cannot be normally moved. Owing to the configuration of the dual node 8606, however, the dual node 8606 can be moved. The RN 1304 configured in the dual node 8606 is provided for connection with the DeNB 1305 by means of a wireless interface. If the dual node 8606 moves, connection is changed by, for example, causing the UE 1303 being served thereby to perform HO to the RN 1304 of the dual node 8606. This allows the dual node 8606 to move while being in connection with the UE 1303 being served thereby.

For example, the dual node 8606 is installed in a high-speed train. In such a case, if the high-speed train is at a station or in a train depot, the dual node 8606 is connected to the HeNB 8601 by means of the S1-MME interface 8603 or S1-UE interface 8604 using a physical connection terminal. It suffices to allow the communication between the UE 1303 being served by the dual node 8606 and the NW via the HeNB 8601. While the high-speed train is moving, the communication between the UE 1303 being served by the dual node 8606 and the NW may be performed via the RN 1304.

This allows the UE 1303 in a high-speed train to communicate with the NW via the HeNB 8601 also in a case where, for example, the communication quality of the backhaul link between the RN 1304 and DeNB 1305 is poor at a station or in a train depot.

The UE 1303 is connected to the NW via the HeNB 8601, whereby a load can be distributed, resulting in an increase in communication capacity of a system.

FIG. 75 shows another architecture of the mobile communication system including a node that has an RN function and a HeNB function. The configuration shown in FIG. 75 is similar to the configuration shown in FIG. 74, and thus, corresponding portions will be denoted by the same reference numerals and common description will be omitted.

The mobile communication system shown in FIG. 75 includes the MME for RN 1301, MME for UE 1302, UE 1303, DeNB 1305, P-GW for UE 1306, S-GW for UE 1307, HeNBGW 8602, an eNB•HeNB function unit 8701, and a UE function unit 8702. The eNB•HeNB function unit 8701 and the UE function unit 8702 configure a dual node 8703.

The eNB•HeNB function unit 8701 functions as an eNB or HeNB. The UE function unit 8702 functions as a UE. The method disclosed in FIG. 74 will be used for the connection terminal.

This configuration allows for addition of blocks that function as an eNB or HeNB and blocks that function as a UE in blocks, simplifying the configuration of the dual node 8703. Also, the effects described above can be achieved and, if being physically configured, the dual node 8703 can be reduced in size and weight relatively easily.

Whether to perform connection via an RN or a HeNB can be set in accordance with the quality of service (QoS) required in the communication between the UE 1303 and the NW or in response to a request for service. Thus, various services can be provided with good communication quality depending on a communication situation.

The RN function and the HeNB function of the dual node may be operated simultaneously. The radio resources between the UE and dual node may be commonly used by the RN and the HeNB. For example, radio resources in the same carrier frequency may be used, and radio resources in the same subframe are divided through scheduling or the like to be allocated to the UE connected to the RN and the UE connected to the HeNB. The RN and HeNB can use the same signal which relates to Layer 1 such as SS and PBCH.

Through the above, radio resources can be used more flexibly as a system, resulting in an improvement in radio resource use efficiency.

Seventh Embodiment

The problem to be solved in a seventh embodiment will be described below.

The number of PCIs is not infinite but is finite. For example, the number of PCIs is 504 codes in the current decision as to the LTE system. The 504 codes are used through reuse in the whole LTE system. Thus, different base stations installed at distant sites may accordingly use the same PCI.

Considered here is a case in which the RN moves. It is conceivable that although the PCIs of the RN and its neighbor base station have not overlap one another before moving of the RN, the PCIs of the RN and its neighbor base station may overlap one another after moving of the RN.

The occurrence of overlap of PCIs causes a problem that a cell cannot be identified only with the PCI.

The solution in the seventh embodiment will be described below. In a case of performing handover, the mobile RN obtains the PCI of the neighbor cell and determines the PCI of the own cell such that the PCIs do not overlap one another. If the PCI of the neighbor cell does not overlap the PCI of the own cell, the mobile RN needs not to change the PCI of the own cell. Meanwhile, if the PCI of the neighbor cell overlaps the PCI of the own cell, the mobile RN changes the PCI of the own cell to the PCI that does not overlap the PCI of the neighbor cell. If the PCIs of a plurality of neighbor cells overlap the PCI of the own cell, the mobile RN changes the PCI of the own cell to the PCI that does not overlap the PCIs of the plurality of neighbor cells.

The following will be disclosed as a specific example of the method in which the mobile RN obtains the PCI of a neighbor cell. The mobile RN uses the cell search method by the UE (see FIG. 12). Or, the mobile RN may use part of the cell search method. This results in an effect that the communication system can be prevented from becoming complicated.

The following will be disclosed as a specific example of the part of the cell search method by the UE, which is to be used. The UE recognizes synchronization codes corresponding to the PCI one by one using the primary synchronization signal (P-SS) and secondary synchronization signal (S-SS) transmitted from a neighbor base station (see Step ST1201 of FIG. 12).

Figure 76:
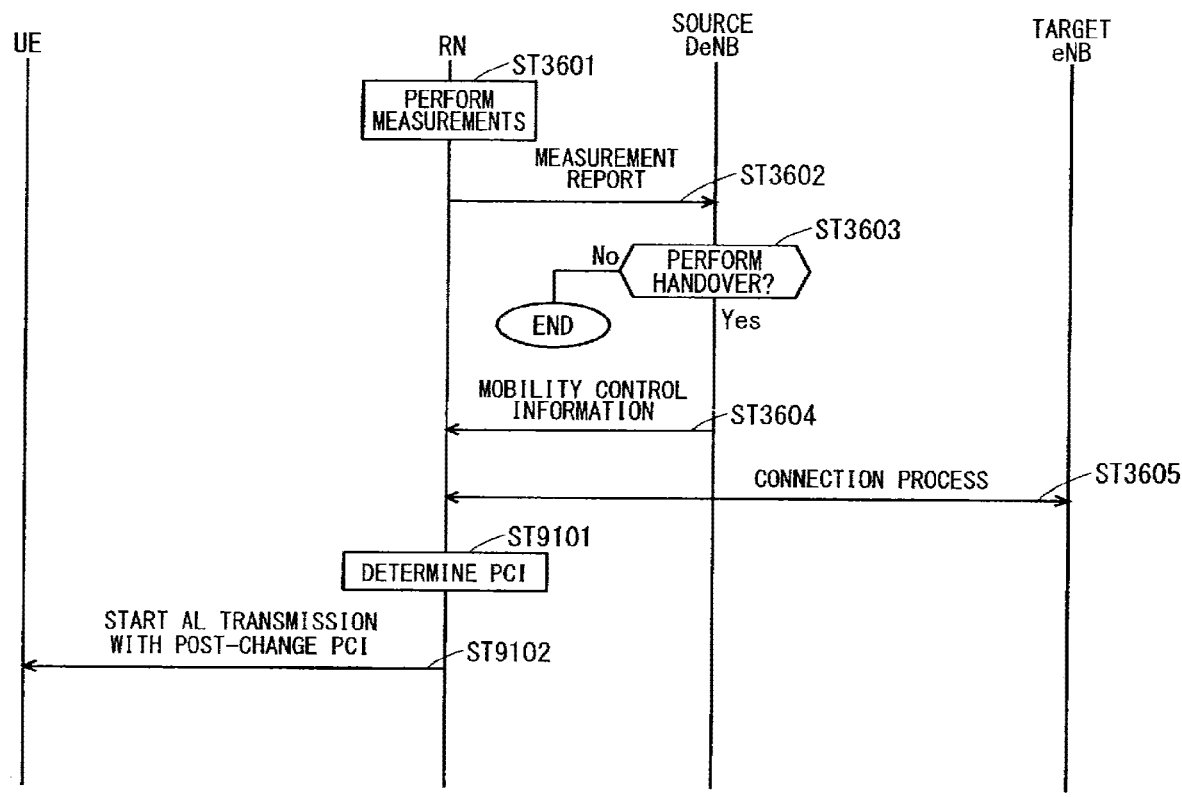
FIG. 76 shows an exemplary sequence of a mobile communication system in a seventh embodiment.

The operation will be described next. FIG. 76 shows an exemplary sequence of a mobile communication system in the seventh embodiment. The sequence shown in FIG. 76 is similar to the sequence shown in FIG. 36, and thus, the same steps will be denoted by the same step numbers and common description will be omitted.

In Step ST9101, the RN determines the PCI after handover. Specifically, the RN performs neighbor cell search.

The RN determines, as the PCI of the own cell, the PCI that does not overlap the PCI of the neighbor cell that has been obtained in neighbor cell search.

In Step ST9102, the RN starts transmission of a downlink access link with the use of the PCI determined in Step ST9101 as the PCI after change (hereinafter, also referred to as a "post-change PCI").

The seventh embodiment above can achieve the following effect. In this embodiment, even when the RN moves, the RN obtains the PCI of the base station installed near the moving destination and determines the PCI of the own cell such that the PCIs do not overlap one another, as described above. This prevents, even when the RN moves, the occurrence of an overlap of the PCIs in the moving destination. This embodiment can thus achieve an effect that the cell is identifiable with a PCI if a mobile RN is introduced into the mobile communication system.

First Modification of Seventh Embodiment

The problem to be solved in a first modification of the seventh embodiment will be described below.

In the solution of the seventh embodiment, when performing handover, the mobile RN obtains the PCI of a neighbor cell and determines the PCI of the own cell such that the PCIs do not overlap one another. Thus, a case in which the PCI of the mobile RN changes after the handover of the mobile RN is conceivable. If the PCI changes, the following problem arises anew in connection with the mobile RN and a UE being served by an RN.

There arises such a problem that the reception quality of an access link during communication of the UE during communication being served by an RN, namely the UE in the RRC_CONNECTED state deteriorates sharply and the communication thereof is suddenly disconnected.

The following problem arises in the UE in an idle state being served by the RN, namely the UE in the RRC_IDLE state.

The UE judges the cell selection of the UE in an idle state. Two cases are accordingly conceivable: a case in which the RN whose PCI has been changed is reselected and a case in which other neighbor cell is reselected. It is unknown whether the UE reselects the RN whose PCI has been changed. A case in which a mobile RN is installed in, for example, an express bus is considered here, which shows a manner in which the mobile RN provides services. If the mobile RN changes the PCI along with handover, the UE possessed by a passenger of an express bus in which the mobile RN is installed is desired to select the mobile RN as a cell.

The solution in the first modification of the seventh embodiment will be described below. In a case where the mobile RN changes the PCI along with handover, the mobile RN notifies the UE being served thereby of a post-change PCI. The mobile RN notifies the post-change PCI through communication using the PCI before change (also referred to as a "pre-change PCI"). This allows the UE being served by the RN to obtain the post-change PCI before the mobile RN changes the PCI.

A specific example of the method in which a mobile RN notifies a UE being served thereby of a PCI after change will be disclosed below.

The following (1) and (2) will be disclosed first as specific examples of the notification method for a UE during communication.

(1) Similarly to the solution in the second embodiment, the PCI is changed and an inter-PCI RRC connection change message indicative of RRC reconnection is newly provided.

The following two (1-1) and (1-2) will be disclosed as specific examples of the parameters to be mapped to the inter-PCI RRC connection change message.

(1-1) New PCI in a case where the mobile RN changes the PCI along with handover.

(1-2) MBSFN subframe configuration in an access link using a new PCI. The MBSFN subframe configuration is broadcast in the system information. The MBSFN subframe configuration in a new access link is notified in the inter-PCI RRC connection change message, which eliminates the need for the UE to receive broadcast information in the new access link. This achieves such an effect that the processing load of the UE can be reduced.

(2) Similarly to the solution in the first modification of the second embodiment, the handover process of a UE is used. Compared with the method of the specific example (1), accordingly, it is not necessary to provide a new message, leading to an effect that the communication system can be prevented from becoming complicated.

The following three (2-1) to (2-3) will be disclosed as specific examples in a case where the UE handover process is used.

(2-1) A specific example of the message to be used will be disclosed. An RRC connection reconfiguration message including the mobility control information in which parameters required for handover are mapped is used from a source eNB to a UE being served thereby. Or, an RRC connection reconfiguration message may be merely used. Or, a handover command in which parameters required for handover are mapped may be used from a source eNB to a UE being served thereby.

(2-2) The following three (2-2-1) to (2-2-3) will be disclosed as specific examples of the parameters to be mapped to a message.

(2-2-1) Instruction to change a PCI to perform RRC reconnection.

(2-2-2) New PCI in a case where a mobile RN performs handover to change a PCI.

(2-2-3) MBSFN subframe configuration in a new access link. The MBSFN subframe configuration is broadcast in system information. The MBSFN subframe configuration in a new access link is notified, which eliminates the need for the UE to receive broadcast information in the new access link. This results in an effect that the processing load of a UE can be reduced.

(2-3) In a case of not merely using a conventional handover process but changing a PCI when performing handover, the mobile RN makes, to a UE in the RRC_CONNECTED state being served by an RN, a change suitable for notification of the instruction to change the PCI and perform RRC reconnection. This reduces unnecessary processes, leading to an effect that a control delay can be prevented. The following two (2-3-1) and (2-3-2) will be disclosed as specific examples of points to be changed.

(2-3-1) The source eNB does not perform a data forwarding process of forwarding the data on a UE to the target eNB, this process being included in the conventional handover process by UE. This process is, for example, the process of Step ST1609 of FIG. 16. If the mobile RN changes the PCI, there is no change to the partner of the communication with the UE being served by the mobile RN, which remains a mobile RN. Therefore, UE-related data forwarding is not necessary.

(2-3-2) The source eNB does not perform the process of notifying the target eNB of the information for storing a PDCP state, this process being included in the conventional UE handover process. Specific examples of the message to be notified include an SN status transfer message. This process is performed before, for example, Step ST1609 of FIG. 16. If the mobile RN changes the PCI, there is no change to the partner of the communication with the UE being served by the mobile RN, which remains the mobile RN. Therefore, information for storing a PDCP state needs not to be notified.

The following two (1) and (2) will be disclosed next as specific examples of the notification method for a UE in an idle state.

(1) A pre-change PCI is broadcast in system information. An information element indicating that a PCI is changed is newly provided in the broadcast information. Upon change of the broadcast information, all members are called through paging. This allows for notification to a user equipment (UE) being served by a mobile RN. The UE receives paging and, if being notified of a change in broadcast information, receives the broadcast information again. If the broadcast information received again contains an indicator indicating that the PCI has been changed, the UE performs cell search. If being notified of a post-change PCI as well, the UE performs cell search by using the post-change PCI or giving priority to the post-change PCI.

(2) A notification is made through paging of a pre-change PCI. All members are called. An information element indicating that a serving cell has changed a PCI is newly provided in the paging message. The UE receives paging and, if the paging message contains an indicator indicating that the PCI has been changed, performs cell search. If being notified of a post-change PCI as well, the UE performs cell search by using the post-change PCI or giving priority to the post-change PCI.

Figure 77:
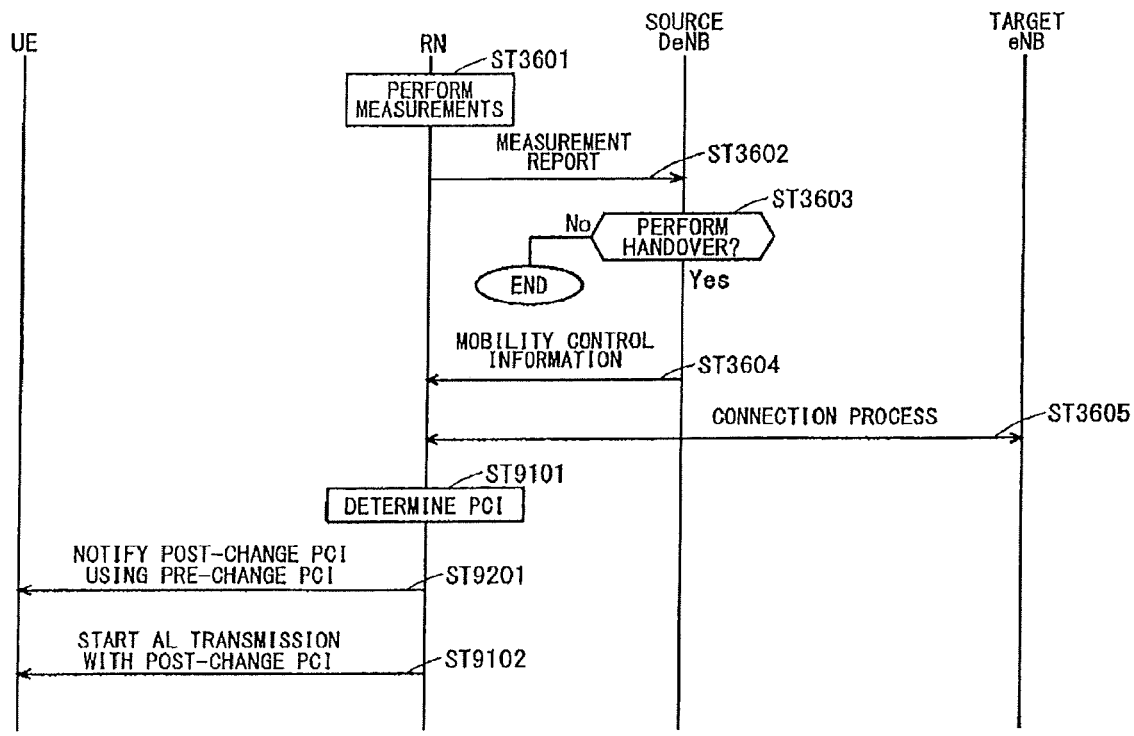
FIG. 77 shows an exemplary sequence of a mobile communication system in a first modification of the seventh embodiment.

The operation will be described next. FIG. 77 shows an exemplary sequence of the mobile communication system in the seventh embodiment. The sequence shown in FIG. 77 is similar to the sequences shown in FIGS. 36 and 76, and thus, the same steps will be denoted by the same step numbers and common description will be omitted.

In Step ST9201, the RN notifies a UE being served thereby of a post-change PCI. The RN notifies a post-change PCI through communication using a pre-change PCI.

If it is recognized that UE has camped on the mobile RN and the reception quality of the mobile RN deteriorates sharply, cell search in which priority is given to the mobile RN may be performed. Or, it may be estimated that the mobile RN has changed a PCI and then cell search may be performed.

Specific examples of the method of recognizing that the UE has camped on a mobile RN are similar to those of the second modification of the second embodiment, which will not be described.

The following will be disclosed as a specific example of the method of performing cell search in which priority is given to a mobile RN. The UE being served by the mobile RN performs cell search using the PCI of the mobile RN. Or, the UE being served by the mobile RN may perform cell search using the carrier frequency for mobile RN.

Specific examples of the method in which a UE judges whether the reception quality of the mobile RN has sharply deteriorated is similar to that of the second modification of the second embodiment, which will not be given.

The first modification of the seventh embodiment above can achieve the following effects. If the mobile RN changes the PCI along with handover, the RN can continue connection and communication with the UE being in an RRC_CONNECTED being served thereby. Also, if the mobile RN changes the PCI along with handover, the UE in an idle state being served thereby will be highly likely to select the mobile RN as a cell.

The methods disclosed in the present invention can be appropriately used in combination. Control corresponding to the state of a system, such as a UE, relay, DeNB, and MME can be performed.

Description has been given of a mobile user equipment (UE) possessed by a passenger of, for example, express bus or high-speed train. The methods disclosed in the present invention are not limited thereto and are also applicable to user equipments that do not require an operation by a person. The above-mentioned methods are also applicable to machine type communication (MTC) devices being equipments for MTC, as equipments that need not to be operated by a person.

Although the embodiments have described the RN in the LTE-A, the mobile communication system of the present invention is also applicable to a case in which relay communication is performed in other mobile communication system or a case in which relay communication is performed in an inter-communication system.

The embodiments above have mainly described the relationship between the macro cell and local node, which are also applicable to the relationship between local nodes, not limited to the above. For example, in the embodiments above, the macro cell may be replaced with a local node, or the macro cell may be replaced with a HeNB. The HeNB may be provided with the DeNB function, and the macro cell may be replaced with the HeNB, which may be applied in operations of the HeNB and RN. A system that can flexibly operate various nodes depending on various environments can be constructed.

While the invention has been shown and described in detail, the foregoing description is in all aspects illustrative and not restrictive. It is therefore understood that numerous modifications and variations can be devised without departing from the scope of the invention.

DESCRIPTION OF REFERENCE NUMERALS

1301, 1403 to 1405, 2901, 6103 to 6105, 6107 user equipment device (UE), 1304, 1407, 6106, 6108 relay node (RN), 1305, 6101, 6102 DeNB, 1401, 6116, 6117 coverage, 1402 base station, 1406 moving body.

The invention claimed is:

1. A mobile communication system comprising:
a movable user equipment device;
a plurality of base station devices configured to perform radio communication with said user equipment device; and
a relay device movably configured to relay radio communications between said user equipment device and said base station devices,
wherein in a handover process of switching a base station device to be connected with said relay device from a base station device being a moving source to a base station device being a moving destination along with moving of said relay device, said base station device being the moving source stores a list that is separate from a neighbor list of neighbor base station devices of the base station device and that includes neighbor base station devices other than neighbor base station devices that do not have a function supporting said relay device, selects said base station device being the moving destination from the stored list of neighbor base station devices other than the neighbor base station devices that do not have the function supporting said relay device, and performs said handover process such that said relay device is connected to the selected neighbor base station device, said base station device being the moving source is configured to obtain the list of neighbor base station devices other than the neighbor base station devices that do not have the function supporting said relay device by at least one of a plurality of list receiving methods, said base station device being the moving source selects one of the plurality of list receiving methods and notifies said relay device of the selected one of the plurality of list receiving methods, and said base station device being the moving source obtains the list of neighbor base station devices other than the neighbor base station devices that do not have the function supporting said relay device by the selected one of the list receiving methods, and the list of neighbor base station devices other than the neighbor base station devices that do not have the function supporting said relay device indicates the base station devices that support the relay device via carrier frequencies assigned to the base station devices that support the relay device.

2. The mobile communication system according to claim 1, comprising a plurality of said relay devices, wherein between said plurality of relay devices, different subframes are used for subframes of a communication frame for use in an access link from said user equipment device to said relay device and for subframes of a communication frame for use in a backhaul link from said relay device to said base station device.

3. The mobile communication system according to claim 1, wherein said base station device being the moving source receives initial configuration parameters from an operation administration and maintenance, and extracts the list of neighbor base stations devices other than the neighbor base station devices that do not have the function supporting said relay device from the received initial configuration parameters.

4. The mobile communication system according to claim 1, wherein said base station device being the moving source is configured to obtain the list of neighbor base station devices other than the neighbor base station devices that do not have the function supporting said relay device by one of the plurality of list receiving methods that include said relay device eliminating neighbor base station devices that do not have the function supporting said relay device from a list of the plurality of neighbor base station devices that are measurement objects, said relay device eliminating neighbor base station devices that do not have the function supporting said relay device from a list of the plurality of neighbor base station devices that are targets for a measurement report, said relay device notifies whether a target one of the plurality of neighbor base station devices has the function supporting said relay device when issuing a measurement report, and said relay device issues, to the base station device being the moving source, a measurement report targeted for the one of the plurality of neighbor base station devices that has the best reception quality among the base station devices that have the function supporting said relay device.

* * * * *